(12) United States Patent
Kim et al.

(10) Patent No.: US 12,305,862 B2
(45) Date of Patent: May 20, 2025

(54) COOKING APPLIANCE

(71) Applicant: LG ELECTRONICS INC., Seoul (KR)

(72) Inventors: Gyeongdong Kim, Seoul (KR); Hag Soo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 433 days.

(21) Appl. No.: 17/841,398

(22) Filed: Jun. 15, 2022

(65) Prior Publication Data

US 2022/0397283 A1     Dec. 15, 2022

(30) Foreign Application Priority Data

Jun. 15, 2021    (KR) ........................ 10-2021-0077690

(51) Int. Cl.
     *A47J 37/06*           (2006.01)
     *F24C 15/20*          (2006.01)

(52) U.S. Cl.
     CPC ....... *F24C 15/2007* (2013.01); *A47J 37/0641* (2013.01); *A47J 37/0664* (2013.01)

(58) Field of Classification Search
     CPC . F24C 15/2007; A47J 37/0641; A47J 37/0664
     USPC ...................................................... 126/21 A
     See application file for complete search history.

(56) References Cited

U.S. PATENT DOCUMENTS

| | | | | |
|---|---|---|---|---|
| 2,480,045 | A * | 8/1949 | Reeves | .................... F24C 15/16 126/41 R |
| 2,744,994 | A * | 5/1956 | Bruckner | ............ A47J 37/0635 219/405 |
| 6,029,649 | A | 2/2000 | Su | |
| 6,271,502 | B1 | 8/2001 | Lee | |
| 2013/0319394 | A1 * | 12/2013 | Yantis | .................... F24C 15/006 165/104.11 |
| 2020/0337497 | A1 * | 10/2020 | Anthony | ............ A47J 37/0629 |

FOREIGN PATENT DOCUMENTS

| | | |
|---|---|---|
| EP | 3680559 A1 | 7/2020 |
| JP | 6289602 B2 | 3/2018 |
| KR | 20-2011-0001565 U | 2/2011 |
| WO | 2020145765 A1 | 7/2020 |

* cited by examiner

*Primary Examiner* — Avinash A Savani
(74) *Attorney, Agent, or Firm* — Bryan Cave Leighton Paisner LLP

(57) ABSTRACT

The present disclosure relates to a co'oking appliance. The cooking appliance includes an exhaust inducing part being disposed on at least any one of both lateral surfaces of a housing and creating a flow of air from the front of a cooking space to the rear surface of the housing, and a door provided with an air exhaust opening that forms a passage for discharging air in the door out of the door.

16 Claims, 71 Drawing Sheets

COOKING APPLIANCE

CROSS-REFERENCE TO RELATED APPLICATION

This application claims priority to and the benefit of Korean Patent Application No. 10-2021-0077690, filed on 2021 Jun. 15, the disclosure of which is incorporated herein by reference in its entirety.

TECHNICAL FIELD

Disclosed herein is a cooking appliance.

BACKGROUND

Cooking appliances are installed in the kitchen and cook food as a user intends. The cooking appliances can fall into different categories, based on a heat source or a type, and the sort of fuel.

Additionally, the cooking appliances can be categorized into an open cooking appliance in which food is placed in an open space, and a sealed cooking appliance in which food is placed in a closed space, based on a way of cooking food. The sealed cooking appliance includes an oven, a microwave oven and the like, and the open cooking appliance includes a cooktop, a hob, and the like.

In the sealed cooking appliance, a space, in which food is placed, is shielded, and the shielded space is heated to cook food. The sealed cooking appliance is provided with a cooking space in which food is placed and which is shielded when the food is cooked. In the cooking space, food is actually cooked.

The sealed cooking appliances are broadly classified into gas ovens and electric ovens according to the type of heat source. The gas ovens use gas as a fuel and cook food using flames generated as gas is supplied to a plurality of burners, and the burners are ignited, which burns the supplied gas. Unlike the gas ovens, the electric ovens use electricity as a heat source and cook food using heat emitted from a plurality of heaters, which are heated by the electricity.

Of the gas ovens and the electric ovens, the use of the electric ovens has increased due to a faster cooking speed, higher thermal efficiency, and better stability when compared with the gas ovens. Also, reducing the size of the electric ovens is easier than reducing the size of the gas ovens. Accordingly, the electric ovens in the form of mini ovens having a small size (hereinafter referred to as "mini ovens") have also been launched.

The mini ovens have a small size, and thus are not suitable for cooking food of a large size but are suitable for baking or warming a small amount of food which does not require the use of large-capacity ovens.

Particularly, the mini ovens have advantages of being conveniently usable in toasting bread. In addition, the mini oven are usable in cooking a small amount of food or food having a small size. Accordingly, the use of the mini ovens as cooking appliances for replacing conventional toasters has increased.

In general, the mini oven includes an outer case for housing all its components, a plurality of shelves for placing food during cooking, and a cooking space having an open front surface through which food may be placed in the cooking space and cooked.

Also, the mini oven includes an oven heater for heating food to an appropriate temperature, and a door for opening and closing the cooking space.

The door is provided so that, while food is placed in the cooking space and cooked, the inside of the cooking space is closed from the outside environment and sealed. The door may include a handle for easily opening and closing the door and a glass window for viewing the inside of the cooking space without opening the door.

In the mini oven, the door is mostly provided as a downward opening type. That is, the door of the mini oven may have a lower end portion rotatably coupled to the outer case through a door hinge. The door opens the cooking space by rotating downward about the lower end portion rotatably coupled to the outer case and closes the cooking space by rotating upward when the cooking space is open.

The door may open the cooking space by rotating at an angle of about 90° when the cooking space is closed, and the shelves may be withdrawn or inserted while the cooking space is opened by the door.

That is, the door is opened in a state of being substantially parallel to the shelves inserted into the mini oven, and the withdrawal and insertion of the shelves are directly performed by the user.

However, the mini oven having the above configuration has the following disadvantages.

First, there is a problem in that, when the door is opened, the door inevitably protrudes from the front of the mini oven by as much as a height of the door. Thus, the opening of the door and the withdrawal and insertion of the shelves are difficult when the mini oven is installed in a narrow space.

Second, there is a problem in that, when the door is opened, the door protrudes from the front of the mini oven by as much as the height of the door, and the center of gravity of the mini oven is biased toward the front.

Due to the characteristics of the mini oven being lightweight as well as having a small size, the center of gravity of the mini oven is inevitably biased toward the front when the door opens forward from the mini oven. In this case, there is an increased risk that the mini oven may fall over.

Particularly, when the shelves are withdrawn, the shelves are often placed on the door for checking a cooking state or temporarily placing the shelves. In such a structure in which the center of gravity of the mini oven is biased toward the front, the risk of the mini oven's falling over is inevitably increased.

Furthermore, the risk is greater when the weight of the shelves or foods placed on the shelves are heavy. This not only adds risks to the cooking of heavyweight foods but also causes an increase in the weight of the shelves. That is, even when it is necessary to adopt shelves formed of a thick, heavy material to improve the cooking performance, adopting such shelves becomes difficult due to the risk of the mini oven's falling over.

Third, various limitations occur because a passage for the withdrawal and insertion of the shelves and a passage for checking the cooking state are limited to the front side of the mini oven.

That is, since the directions of the withdrawal and insertion of the shelves are limited to a front-rear direction, inconvenience occurs during the withdrawal and insertion of the shelves when the mini oven is installed at a low place. Since the passage for checking the cooking state is limited to the glass window provided in the door, there is considerable inconvenience in checking the cooking state when the mini oven is installed at a low place.

Generally, for properly checking the cooking state of the entire food, opening the door is not enough, and the withdrawal of the tray should necessarily be performed.

That is, when the user wants to properly check the cooking state of the entire food, the user should open the door and then withdraw the shelf containing the entire food. However, when the mini oven is installed at a low place, it is very inconvenient to perform such tasks. Also the possibility that the user will be exposed to the risk of injuries such as burns when the user withdraws and inserts the shelf is also increased.

Fourth, the user directly pushes a shelf into a cooking space and pulls the shelf out of the cooking space to insert and withdraw the shelf, increasing inconvenience and the risk of an accident.

There are times when the user directly checks a state of a food item being cooked by withdrawing the shelf during a cooking procedure. In this case, the user opens the door and then holds and withdraws the shelf. Additionally, when the cooking procedure starts again, the user directly holds and pushes the shelf into the cooking space.

That is, the user opens the door, and withdraws and inserts the shelf directly to check a state of a food item being cooked, causing inconvenience and increasing the risk of injury such as burns and the like.

In the procedure, the center of gravity of a mini oven shifts to a front, and the mini oven is highly likely to fall over, posing a threat to the safety of the user.

A heating and cooking appliance is disclosed in JP Patent No. 6289602 as a related art. The heating and cooking appliance includes a cooking plate that comes in and out of a cooking space in association with the opening and closing of the door.

In the configuration according to document 1, a cooking space is provided with a pair of sliding rails (herein after "first sliding rail"), and a door is provided with a pair of sliding rails (hereinafter "second sliding rail") that are detachably coupled to the sliding rails installed in the cooking space.

The second sliding rail is coupled to the first sliding rail in a slidable manner, and accordingly, the door opens and closes the cooking space while sliding in a front-rear direction.

The pair of second sliding rails is provided with a supporting member, and a cooking plate is hung from above at an upper end of the supporting member and supported by the supporting member. That is, the cooking plate is supported by the second sliding rails, using the supporting member and the second sliding rails are supported by the first sliding rails.

With the structure, the cooking plate moves in the front-rear direction along the door moving in the front-rear direction. That is, the cooking plate comes in and out of the coking space while moving in the front-rear direction in association with the door's front-rear movement to open and close the cooking space.

In the heating and cooking appliance according to document 1 configured as described above, since the cooking plate comes in and out in association with the door's opening and closing operation, the cooking plate is inserted into and withdrawn from the cooking space more easily.

The heating and cooking appliance according to document 1 has problems the same as the first and second problems with the mini oven described above.

That is, in the heating and cooking appliance according to document 1, the door protrudes to a front of the heating and cooking appliance by a height of the door at a time when the door is opened, and since the door protrudes to the front of the heating and cooking appliance by a height of the door at a time when the door is opened, the center of gravity of the heating and cooking appliance shifts to the front.

In the heating and cooking appliance disclosed in document 1, the cooking plate's insertion and withdrawal is simply associated with the door's opening and closing operations. Accordingly, the door needs to be opened by the user directly causing inconvenience to the user such that the user checks a state of a food item being cooked.

A door opening and closing device of a toaster is disclosed in document 2 (Korean Utility Model No. 20-2011-0001565). The door opening and closing device of a toaster has a structure in which a front and a partial upper portion of an inner space of the toaster are open together.

In the configuration according to document 2, a door is disposed at a front of the toaster, and the door swivels toward a front side of the toaster to open the inner space of the toaster. In this case, the door covers the partial upper portion as well as the front of the toaster. Accordingly, at a time when the door is opened, the front and the partial upper portion of the inner space of the toaster are opened together.

In the configuration according to document 2, a toaster holder is installed in the door, and at a time when the door is opened, the toaster holder swivels forward along with the door and is withdrawn out of the toaster.

In the door opening and closing device of a toaster according to document 2 configured as described above, the toaster holder's insertion and withdrawal is associated with the door's opening and closing operations, thereby enabling the toaster to be inserted into and withdrawn from the toaster more readily.

In the door opening and closing device of a toaster according to document 2, the partial upper portion of the inner space of the toaster is opened at a time when the door is opened. Accordingly, interference between the toaster accommodated in the toaster holder and a frame of the toaster can be avoided at a time when the door is opened.

The door opening and closing device of a toaster, configured as described above, has problems the same as the first and second problems with the mini oven described above.

That is, in the door opening and closing device of a toaster, the door protrudes to a front of the door opening and closing device of a toaster by a height of the door at a time when the door is opened, and since the door protrudes to the front of the door opening and closing device of a toaster by a height of the door at a time when the door is opened, the center of gravity of the door opening and closing device of a toaster shifts to the front. Additionally, a passage for inserting and withdrawing a shelf and a passage for checking a state of a food item being cooked are limited to the front of the door opening and closing device of a toaster. In the heating and cooking appliance according to document 1, a passage for inserting and withdrawing a shelf and a passage for checking a state of a food item being cooked are limited to the front of the heating and cooking appliance.

In the device disclosed in document 2, the toaster holder's insertion and withdrawal is simply associated with the door's opening and closing operations. Accordingly, the door needs to be opened by the user directly causing inconvenience to the user such that the user checks a state of a food item being cooked.

Further, in the device disclosed in document 2, since the toaster holder is installed in the door, the center of gravity of the toaster shifts eccentrically to the front at a time when the door is opened.

That is, in the configuration disclosed in document 2, at a time when the door is opened, the door is unfolded to the front of the toaster, and weight of the toaster holder, and weight of the toaster accommodated in the toaster holder are added to weight of the door unfolded toward the front. Thus, the center of gravity of the toaster shifts eccentrically to the front, and the toaster is highly likely to fall over at a time when the door is opened.

An oven provided with a front door and a top cover is disclosed in document 3 (U.S. Pat. No. 6,271,502).

In the configuration disclosed in document 3, the front door is disposed at a front of the oven. The top cover is installed in an upper portion of the oven. The front door and the top cover are disposed at different positions, and independently operate. A front of an inner space of the oven is opened and closed by the front door, and an upper portion of the inner space of the oven is opened and closed by the top cover.

The oven according to document 3 has problems the same as the first and second problems with the mini oven described above.

That is, in the oven according to document 3, the door protrudes to a front of the oven by a height of the door at a time when the door is opened, and since the door protrudes to the front of the oven by a height of the door at a time when the door is opened, the center of gravity of the oven shifts eccentrically to the front.

In the configuration disclosed in document 3, the inner space opened and closed by the front door, and the inner space opened and closed by the top cover separate from each other and do not connect to each other.

Although the front door and the top cover are opened together, a degree to which the inner space is opened by the front door does not increase, and a degree to which the inner space is opened by the top cover increases.

An oven door structure is disclosed in document 4 (U.S. Pat. No. 6,029,649). The oven door structure is installed in a cylindrical oven, and opens and closes the oven.

According to document 4, a door is disposed at a cylindrical body, and opens and closes the cylindrical body while rotating around the body. At a time when the door is opened, the door does not protrude to any of the front or the rear of the body. The door opens and closes the body only by rotating around the body.

The oven door structure according to document 4, configured as described above, has the following problems.

First, the door disclosed in document 4 is applied only to a cylinder-shaped main body of a cooking appliance. Accordingly, the door cannot be applied to a cuboid-shaped main body of an ordinary cooking appliance. Thus, the door has low compatibility.

Second, a structure for mounting a food item, such as a shelf, is hardly installed in the body disclosed in document 4. Additionally, although a structure such as a shelf is installed in the body, it is difficult for the shelf to be withdrawn from and inserted into the body due to the structure of the body.

In the structure of the door disclosed in document 4, a manipulation switch cannot be disposed on a front surface or an upper surface of a cooking appliance since most of the front surface and the upper surface of a body are covered by the door or are within a range of rotation of the door. Thus, in document 4, a manipulation switch such as a timer is disposed on a lateral surface of the body.

When the manipulation switch is disposed on the lateral surface of the cooking appliance rather than the front surface or the upper surface of the cooking appliance, user inconvenience can be caused when the user checks a state of the manipulation switch or manipulates the manipulation switch. Accordingly, arranging the manipulation switch as disclosed in document 4 is not a good of improving user convenience.

Furthermore, none of documents 1 to 4 suggests an arrangement of a manipulation switch on a door. Documents 1 to 4 present an arrangement of a manipulation switch at a main body.

In documents 1 and 3, a manipulation switch is disposed outside a door in a left-right direction while being disposed at a main body of a cooking appliance. In this configuration, a width of the main body in a left-right direction needs to be elongated as much as a space required for installing the manipulation switch. Accordingly, while the cooking appliance is entirely scaled up, a width opened by the door is narrowed.

In document 2, a manipulation switch is disposed in a lower portion of a main body of a cooking appliance. In this configuration, the manipulation switch is disposed at a low position, making it difficult for the user to manipulate the manipulation switch. In the configuration disclosed in document 2, a length of the main body in the up-down direction needs to be elongated as much as a space required for installing the manipulation switch. Accordingly, while the cooking appliance is entirely scaled up, a width opened by the door is narrowed.

In document 4, when a manipulation switch is disposed on a lateral surface of a cooking appliance, it is difficult for the user to check a state of the manipulation switch or manipulate the manipulation switch.

In the configurations disclosed in documents 1 to 4, the manipulation switch cannot be disposed on the door. In the configurations disclosed in documents 1 to 4, a see-through window is provided on the door such that the user looks into a cooking space. The see-through window takes up most of the area of the door. Thus, there is not enough space for installing a manipulation switch on the door.

When the manipulation switch is disposed on the door, a control board electrically connected to the manipulation switch needs to be installed in the door. However, there is not enough space for installing the control board in the door.

Thus, there is a growing need for a configuration as a solution to the above problems to dispose a manipulation switch on a door.

Additionally, in the above prior art documents, no configuration for preventing the leakage of heat and steam in the cooking space through a gap between the main body of the cooking appliance and the door is disclosed.

In the above prior art documents, in particular, in prior art documents 2 and 3, a configuration, in which a portion of the upper surface and the front surface of the space in the toaster or the body are opened together when the door is opened, is disclosed. As a range opened by the door expands as described above, heat and steam in the cooking space are highly likely to leak through the gap between the main body and the door of the cooking appliance.

As heat and steam in the cooking space leaks out of the front of the cooking appliance through the gap between the main body and the door of the cooking appliance, the heat or steam having leaked is highly likely to cause damage to a user.

Additionally, the steam having leaked through the gap between the main body and the door of the cooking appliance may cause the formation of droplets at the door and around the door, or the collection of water around the door, caused by the droplets being formed at the door.

PRIOR ART DOCUMENT

Patent Document

Document 1: JP Patent No. 6289602
Document 2: KR Patent No 20-2011-0001565
Document 3: U.S. Pat. No. 6,271,502
Document 4: U.S. Pat. No. 6,029,649

SUMMARY

Technical Problems

The present disclosure is directed to a cooking appliance that is scaled down and has an improved structure in which a passage opened by a door has an increased width.

The present disclosure is also directed to a cooking appliance that has an improved structure in which a manipulation switch is disposed on a door.

The present disclosure is also directed to a cooking appliance that helps to easily check a state of a food item being cooked and ensure improvement in structural reliability.

The present disclosure is also directed to a cooking appliance that ensures ease of opening a door and inserting and withdrawing a shelf.

The present disclosure is also directed to a cooking appliance that has an improved structure in which various types of components for the door are stably disposed at the door.

The present disclosure is also directed to a cooking appliance that has an improved structure in which various types of components for the door are disposed at the door easily and rapidly.

The present disclosure is also directed to a cooking appliance that has an improved structure for suppressing the discharge of heat and steam, generated in the cooking space during cooking, to the front side of the door.

The present disclosure is also directed to a cooking appliance that has an improved structure for effectively reducing the effect of heat or steam on various types of components required to be disposed at the door.

Technical Solutions

To achieve the above aims, a cooking appliance according to one aspect may enable a front and an upper portion of a housing to be opened together at a time when a door is opened.

According to another aspect, the cooking appliance includes a hinge assembly that swivably supports the door, and a cooling channel for cooling the front surface and the upper surface of the cooking appliance is provide in the hinge assembly.

The cooling channel may be disposed at a position eccentric to a front and an upper portion of the hinge assembly.

The cooling channel may be provided with a cooling fan in a lower portion thereof.

Accordingly, portions, which are easily affected by heat causing an increase in temperature and are highly likely to be contacted by a user, may be cooled, and the risk of an accident, and damage to components in the door, caused due to overheating of the door, may be prevented.

According to another aspect, the cooking appliance includes an exhaust inducing part creating a flow of air to the rear surface of the housing from the front of the cooking space while being disposed on a lateral surface of the housing and creating a flow of air in front of the cooking space.

The door may be provided with an air exhaust opening that forms a passage for discharging air in the door out of the door.

The exhaust inducing part may include a cooling channel being formed in a hinge assembly.

Preferably, a cool air discharge part may be disposed on the lateral surface of the housing, and external air having flown through the cooling channel may be discharged into the cooking space through the cool air discharge part.

With the configuration, heat and steam generated in the cooking space may be efficiently prevented from leaking out of the cooking appliance at the front of the cooking appliance.

In another aspect of the present disclosure, a control board is disposed in the door, and a cooling fan is disposed in the same space as the space where the control board is disposed and discharges air in the space where the control board is installed out of the door.

With the configuration, the effect of heat or steam on various types of components required to be disposed at the door may decrease.

Additionally, the cooling fan may be biased toward a cooling hole than to a door upper surface part.

Preferably, the cooling fan may be disposed under a touch panel supporting part and a temperature sensor that are disposed further downward than the door upper surface part.

With the configuration, the re-suction of high-temperature air and steam discharged from the cooling fan, and the flow of steam to the inside of the door front surface part from the inside of the door upper surface part are suppressed, and efficiency of cooling and removal of steam in the door may improve.

According to another aspect, the door upper surface part may be provided therein with a cable mounting part, and a cable for connecting between the first control board and a first heating part may be installed in the door upper surface part.

With the configuration, the user may look into a cooking space from above through the see-through window formed in an upper portion of the cooking appliance. Thus, the user may check a state of a food item being cooked conveniently and readily without leaning forward and bending the user's knees.

According to another aspect, a supporting panel may be coupled at least one of a door main body part and a door rear surface cover and fixed to an inside of the door main body part, and the control board may be fixed to the supporting panel.

According to another aspect, a handle, the supporting panel and the door may be coupled to a single bracket together.

According to another aspect, the rear surface cover, the control board, the supporting panel and the door may be coupled to a single bracket together.

Accordingly, components included in the door may be stably fixed to the inside of the door, and a man hour for assembling the door may be reduced, and the door may be assemble more easily and rapidly.

According to another aspect, the door for opening and closing the cooking space may be provided with a temperature sensor, and the temperature sensor may protrude out of the door toward the cooking space.

According to another aspect, the door for opening and closing the cooking space may be provided with a temperature sensor, and the temperature sensor may be disposed at a position eccentric to an upper portion of the cooking space while protruding out of the door toward the cooking space.

The temperature sensor may be biased toward a heating part than to the tray while being disposed between the tray and the heating part.

The temperature sensor may be disposed at a position adjacent to an edge on an upper side of the door front surface part.

The temperature sensor may be disposed at a position where the heating part is hidden by a shielding plate.

According to another aspect, the see-through window may be disposed in the door upper surface part.

Accordingly, even though the cooking appliance is disposed at a low position, the user may check a state of a food item being cooked conveniently and readily without leaning forward and bending the user's knees.

According to another aspect, the first heating part may be disposed in the door upper surface part.

The first heating part disposed over the tray may be installed in the door upper surface part covering the upper portion of the housing, and accordingly, the first heating part may be spaced apart from a manipulation device and a first control board, and the center of gravity of the door may be eccentric to a rear side.

According to another aspect, the first heating part and the see-through window may be disposed in the door upper surface part, and the manipulation device may be disposed in the door front surface part where the first heating part and the see-through window are not installed.

According to another aspect, components such as glass, a heater and the like that are relatively heavy may be disposed in the door upper surface part such that the center of gravity of the cooking appliance may shift from a center to a rear in a front-rear direction when the door opens the front surface and the upper surface of the housing.

The cooking appliance, configured as described above, may reduce the possibility of the fall of the cooking appliance when the door is opened, since the center of gravity of the cooking appliance shifts from the center to the rear in the front-rear direction when the door opens the cooking space.

A cooking appliance according to an aspect may include: a housing having a cooking space being surrounded by a bottom surface, both lateral surfaces and a rear surface therein and having an upper surface and a front surface being open; a door including a door upper surface part covering the upper surface of the housing and a door front surface part connecting to a front side of the door upper surface part and covering a front surface of the housing, and swiveling around a rear side of the door upper surface part and opening and closing the upper surface and the front surface of the housing; an exhaust inducing part being disposed on at least any one of both the lateral surfaces of the housing and creating a flow of air at a front of the cooking space; and a gasket being disposed at any one of a front side and an upper side of the exhaust inducing part and sealing between the housing and the door.

The exhaust inducing part may create at least any one of a flow of air to the other lateral surface of the housing from any one lateral surface of the housing out of both the lateral surfaces of the housing and a flow of air to the rear surface of the housing from the front of the cooking space.

In the present disclosure, preferably, the cooking appliance further includes a hinge case being disposed in at least any one of both the lateral portions of the housing, and the hinge case has a cooling channel guiding a flow of air flowing into the hinge case from the outside of the hinge case therein.

Preferably, the exhaust inducing part includes the cooling channel, a channel inlet being open from the cooling channel to the outside of the hinge case, and a channel outlet being open from the cooling channel to the inside of the cooking space.

Preferably, the channel outlet is formed in a way that penetrates in a lateral direction on the lateral surface of the hinge case facing a lateral surface of the housing.

Preferably, a cool air discharge part communicating with the channel outlet is provided on the lateral surface of the housing.

Preferably, at least a portion of air flowing into the cooling channel is discharged into the cooking space through the channel outlet and the cool air discharge part.

Preferably, the channel outlet and the cool air discharge part are disposed in the lateral direction, and at least a portion of air flowing into the cooling channel is discharged in the lateral direction through the cool air discharge part.

Preferably, the exhaust inducing part further includes a discharge projection surrounding the channel outlet and protruding toward the lateral surface of the housing from the hinge case.

Preferably, the discharge projection connects between the channel outlet and the cool air discharge part.

Preferably, the cool air discharge part includes a plurality of discharge openings that is formed in a way that penetrates on the lateral surface of the housing.

Preferably, the channel inlet is open to the lower portion of the hinge case, and the cooling fan is disposed at the channel inlet.

Preferably, the channel inlet has a greater width than the cool air channel with respect to a parallel direction with the bottom surface of the housing, and a fan mounting part surrounding the channel inlet and protruding from the lower portion of the hinge case in a parallel direction with the bottom surface of the housing is disposed in the lower portion of the hinge case.

Preferably, the cooling fan is disposed in the fan mounting part.

Preferably, the fan mounting part protrudes from the lower portion of the hinge case to the bottom surface of the housing, a space formed under the bottom surface of the housing is open toward the hinge case, and at least a portion of the fan mounting part is inserted into the space formed under the bottom surface of the housing.

Preferably, the front-to-rear positions of the cooling channel and the channel outlet are eccentric to the door front surface part of the hinge case.

Preferably, the up-to-down position of the channel outlet is eccentric to the door upper surface part of the hinge case.

Preferably, the cooling channel includes a first section extending upward from the channel inlet being disposed in the lower portion of the hinge case, and a second section extending rearward from the upper portion of the first section.

Preferably, the first section is disposed near the front surface of the housing and the door front surface part.

Preferably, the second section is disposed near the upper surface of the housing and the door upper surface part.

In the present disclosure, preferably, the cooking appliance includes at least any one of a first gasket being disposed between the hinge case or the lateral surface of the housing and the door front surface part, a second gasket being disposed between the bottom surface of the housing and the door front surface part, and a third gasket being disposed between the hinge case or the upper surface of the housing and the door upper surface part.

Preferably, the first gasket seals between the hinge case and the door front surface part or the lateral surface of the housing and the door front surface part, in front of the cooling channel.

Preferably, the second gasket seals between the bottom surface of the housing and the door front surface part, in front of the cooling channel.

Preferably, the third gasket seals between the hinge case and the door upper surface part or between the lateral surface of the housing and the door upper surface part on the cooling channel.

Preferably, the third gasket is disposed between the center of the housing in the lateral direction thereof and the second section.

Preferably, the first gasket and the second gasket are disposed on the rear surface of the door front surface part, facing the housing.

Preferably, the third gasket is disposed on the bottom surface of the door upper surface part, facing the housing.

Preferably, the door upper surface part has a space part therein, the door upper surface part has an air exhaust opening at the rear end thereof, and the air exhaust opening is formed in a way that penetrates at the rear end of the door upper surface part and opens the space part in the door upper surface part to the outside.

Preferably, the cooking appliance further includes a heating part being disposed at the door.

Preferably, the cooking appliance further includes a door frame supporting the heating part and being coupled to the door.

Preferably, the door frame is coupled to the door while covering the space part in the door upper surface part from below.

Preferably, a first heating part is installed in the door frame and disposed under the door upper surface part.

Preferably, the door frame includes a heater mounting part to which the first heating part is coupled; and a coupling part being coupled to the door upper surface part and allowing the heater mounting part to be supported by the door upper surface part.

Preferably, at least a portion of the coupling part is disposed under the door upper surface part.

Preferably, the coupling part includes a connection hole that is formed in a way that penetrates in the up-down direction and forms a passage connecting between the space part in the door upper surface part and the cooking space.

Preferably, the cooking appliance further includes a control board being accommodated in a space in the door front surface part and electrically connecting to the heating part.

Preferably, the cooking appliance further includes a cooling fan being disposed in the same space as the space where the control board is installed and discharging air in the space wherein the control board is installed to the outside.

Preferably, the door includes a first door main body part that forms the exterior of the door upper surface part; a second door main body part that forms the exterior of the door front surface part and has a space being openrearward therein; and a door rear surface cover covering one open side of the second door main body part.

Preferably, a cooling hole is formed in a way that penetrates on the bottom surface of the second door main body part.

Preferably, the cooking appliance further includes a supporting panel being disposed in the door front surface part and supporting the control board and the cooling fan.

Preferably, the supporting panel includes a first area where the control board is disposed, and a second area where the control board is not disposed, and the cooling fan is disposed in the second area.

Advantageous Effects

According to the present disclosure, a door may not be unfolded forward but may swivel upward to open both the front surface and the upper surface of a cooking space, thereby enabling the door to be open easily smoothly even in a narrow space and enabling a food item or a tray to be withdrawn conveniently and readily.

According to the present disclosure, since the front surface and the upper surface of the cooking space may be opened by the door, a tray may be exposed further. Accordingly, an object to be cooked may be easily put into and out of the cooking space only by partially withdrawing the tray, thereby ensuring improvement in convenience and safety.

According to the present disclosure, since the door is not unfolded forward but swivels upward to be opened and closed, it is unlikely that the center of gravity of the cooking appliance shifts forward at a time when the door is opened, thereby significantly reducing the risk of a fall of the cooking appliance.

According to the present disclosure, since a center of swiveling of the door is formed on a rear side of the cooking appliance, the center of gravity of the door may be more eccentric to a door upper surface part than to a door front surface part, and the center of gravity of the cooking appliance may be eccentric to the rear side of the cooking appliance at a time when the door is opened, thereby significantly reducing the risk of a fall of the cooking appliance and improving safety and ease of use of the cooking appliance.

According to the present disclosure, since a manipulation device is installed on the door, a housing may be scaled down, and an entrance of the cooking space may be large enough for a tray and a food item to come in and out, thereby ensuring a compact exterior and improving usability.

According to the present disclosure, a see-through window may be disposed in an upper portion of the door, and the manipulation device may be disposed at a front of the door such that the user checks a state of food item being cooked more conveniently and readily without leaning forward and bending the user's knees, thereby enabling the user to manipulate a manipulation switch conveniently and readily while facing the cooking appliance.

According to the present disclosure, components included in the door may be stably fixed to an inside of the door, and a man hour for assembling the door may be reduced, and the door may be assembled more easily and rapidly.

According to the present disclosure, portions which are easily affected by heat, causing an increase in temperature, and are highly likely to be contacted by the user may be cooled, thereby preventing a safety accident and preventing damage to the components in the door, caused by the overheating of the door.

According to the present disclosure, a gap between the front surface of the housing and the door front surface part or a gap between the end portion of the front of a lateral surface of the housing and the door front surface part may be adjusted depending on the front-to-rear position of the fastening part being coupled to a position adjustment guide part, thereby managing tolerance in relation to the Y-axis gap efficiently.

According to the present disclosure, an operational error in opening and closing the door, caused by improper management of tolerance in relation to the Y-axis gap of the door, may be prevented, and the leakage of heat and steam in the cooking space may be suppressed effectively.

According to the present disclosure, the front surface of the cabinet may be coupled to the housing by a fastening bracket in the state in which the front surface of the cabinet closely contacts the front surface of the housing in front of the housing, thereby managing tolerance in relation to the gap between the housing and the cabinet easily, ensuring greater ease of installation of the cabinet and improving the aesthetic qualities of the cooking appliance.

According to the present disclosure, the front surface of the cabinet may be coupled to the housing in the state in which the front surface of the cabinet closely contacts the front surface of the housing in front of the housing, thereby preventing air from leaking through the gap between the front surface of the cabinet and the front surface of the housing and discharging cool air through a cool air discharge part effectively.

According to the present disclosure, gaskets may be disposed at a point where the door and the housing contacts each other when the door closes the cooking space, thereby preventing a scratch on the door or the housing effectively, which is caused by contact between the door and the housing while the door opens and closes the cooking space.

According to the present disclosure, the gaskets may absorb an impact that is applied to the door when the door closes the cooking space, thereby effectively preventing damage to the door itself or the components installed in the door, which is caused while the door closes the cooking space.

According to the present disclosure, the discharge of heat and steam generated in the cooking space during cooking to the front side of the door may be suppressed effectively.

According to the present disclosure, damage to a user, caused by heat or steam leaking out of the front of the cooking appliance through the gap between the door and the housing, may be prevented efficiently.

According to the present disclosure, the formation of droplets on the door caused by steam leaking through the gap between the door and the housing, or the collection of water around the door caused by the droplets formed on the door may be prevented, thereby preventing the contamination of the cooking appliance and the surroundings thereof effectively.

According to the present disclosure, heat and steam having flown into the door front surface part accommodating a control board, a manipulation device and the like may be discharged out of the door smoothly, thereby reducing deterioration in the performance of the components in the door and failure of the components effectively.

According to the present disclosure, a first cooling fan may be disposed in a proper position in the door, thereby suppressing the re-suction of high-temperature air and steam discharged from the cooling fan and the flow of steam to the inside of the door front surface part from the inside of the door upper surface part.

According to the present disclosure, the efficiency of cooling and the efficiency of removal of steam in the door may improve, thereby reducing deterioration in the performance of the components in the door and failure of the components effectively.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
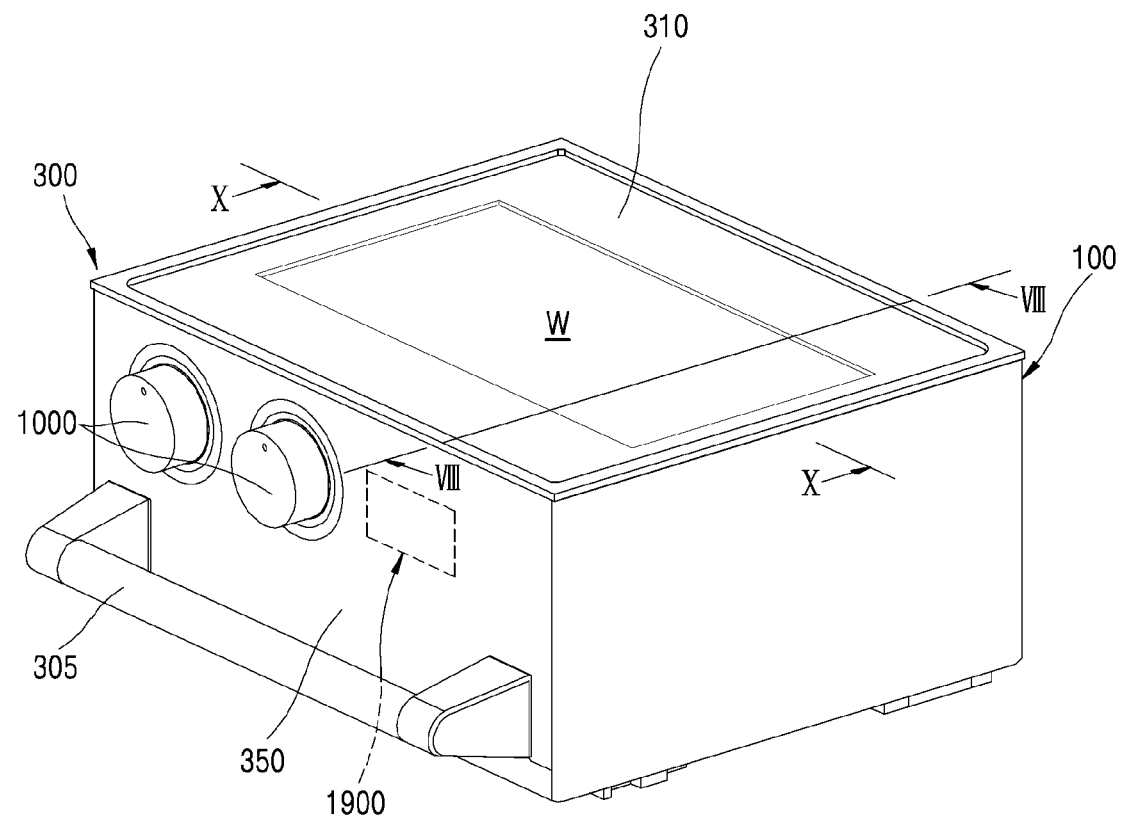
FIG. 1 is a perspective view showing a cooking appliance in one embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Embodiments are not limited to the embodiments set forth herein, and can be modified and changed in various different forms. The embodiments in the disclosure are provided such that the disclosure can be through and complete and the scope of the disclosure can be fully conveyed to one of ordinary skill in the art. Accordingly, all modifications, equivalents or replacements as well as a replacement of the configuration of one embodiment with the configuration of another embodiment or an addition of the configuration of one embodiment to the configuration of another embodiment, within the technical spirit and scope of the disclosure, should be construed as being included in the scope of the disclosure.

Accompanying drawings are provided for a better understanding of the embodiments set forth herein and are not intended to limit the technical spirit of the disclosure. It is to be understood that all the modifications, equivalents or replacements within the spirit and technical scope of the disclosure are included in the scope of the disclosure. Sizes or thicknesses of the components in the drawings are exaggerated or reduced to ensure ease of understanding. However, the protection scope of the subject matter of the disclosure should not be interpreted in a limited way.

The terms in the disclosure are used only to describe specific implementations or embodiments but not intended to limit the subject matter. The singular forms "a", "an" and "the" are intended to include the plural forms as well, unless explicitly indicated otherwise. It is to be understood that the terms "comprise", "include" and the like, set forth herein, are used to indicate presence of features, numbers, steps, operations, components, parts or combinations thereof, and do not imply the exclusion of one or more additional features, numbers, steps, operations, components, parts or combinations thereof.

The terms "first", "second" and the like are used herein only to distinguish one component from another component. Thus, the components should not be limited by the terms. Certainly, a first component can be a second component unless stated to the contrary.

When one component is described as being "connected" or "connected" to another component, one component can be directly connected or connected to another component. However, it is also to be understood that an additional component can be "interposed" between the two components. When one component is described as being "directly connected" or "directly connected" to another component, it is to be understood that no additional component is interposed between the two components.

When one component is described as being "on" or "under" another component, one component can be directly on or under another component, and an additional component can be interposed between the two components.

Unless otherwise defined, all the terms (technical or science words) used herein have the same meaning as commonly understood by one of ordinary skill in the art. Additionally, terms such as those defined in commonly-used dictionaries should be interpreted as having a meaning that is consistent with their meaning in the context of the relevant art, and unless explicitly defined herein, should not be interpreted in an ideal or overly formal way.

In the state in which a cooking appliance stands on the floor, with respect to the center of the cooking appliance, a direction toward the floor is defined as a downward direction and a direction toward a discharge part is defined as an upward direction. For convenience, a direction facing the downward direction and the upward direction can be referred to as a first direction. Then the downward direction is referred to as one direction of the first direction, and the upward direction is referred to as the other direction of the first direction.

Additionally, a gravitational direction can be defined as the downward direction, and a direction opposite to the gravitational direction can be defined as the upward direction.

Further, a horizontal direction across an up-down direction of the cooking appliance, i.e., a widthwise direction of the cooking appliance that is seen in front of the cooking appliance in the state of standing on the floor can be referred to as a left-right direction.

For convenience, the left-right direction can be referred to as a second direction. Then the right side can be referred to as one direction of the second direction, and the left side can be referred to as the other direction of the second direction.

Additionally, the widthwise direction of the cooking appliance can also be referred to as a lateral direction. The right side can also be referred to as one side of the lateral direction, and the left side can be referred to the other side of the lateral direction.

Further, a horizontal direction across the first direction and the second direction of the cooking appliance can be referred to as a front-rear direction of the cooking appliance.

For convenience, the front-rear direction can be referred to as the first direction, and a front can be referred to as one direction of a third direction while a rear can be referred to as the other direction of the third direction.

Furthermore, a direction, in which a flat surface parallel with the second direction and the third direction of the cooking appliance extends, can be referred to as a flat surface direction for convenience.

Throughout the disclosure, the terms "A and/or B" as used herein can denote A, B or A and B, and the terms "C to D" can denote C or greater and D or less, unless stated to the contrary.

[Entire Structure of Cooking Appliance]

Figure 2:
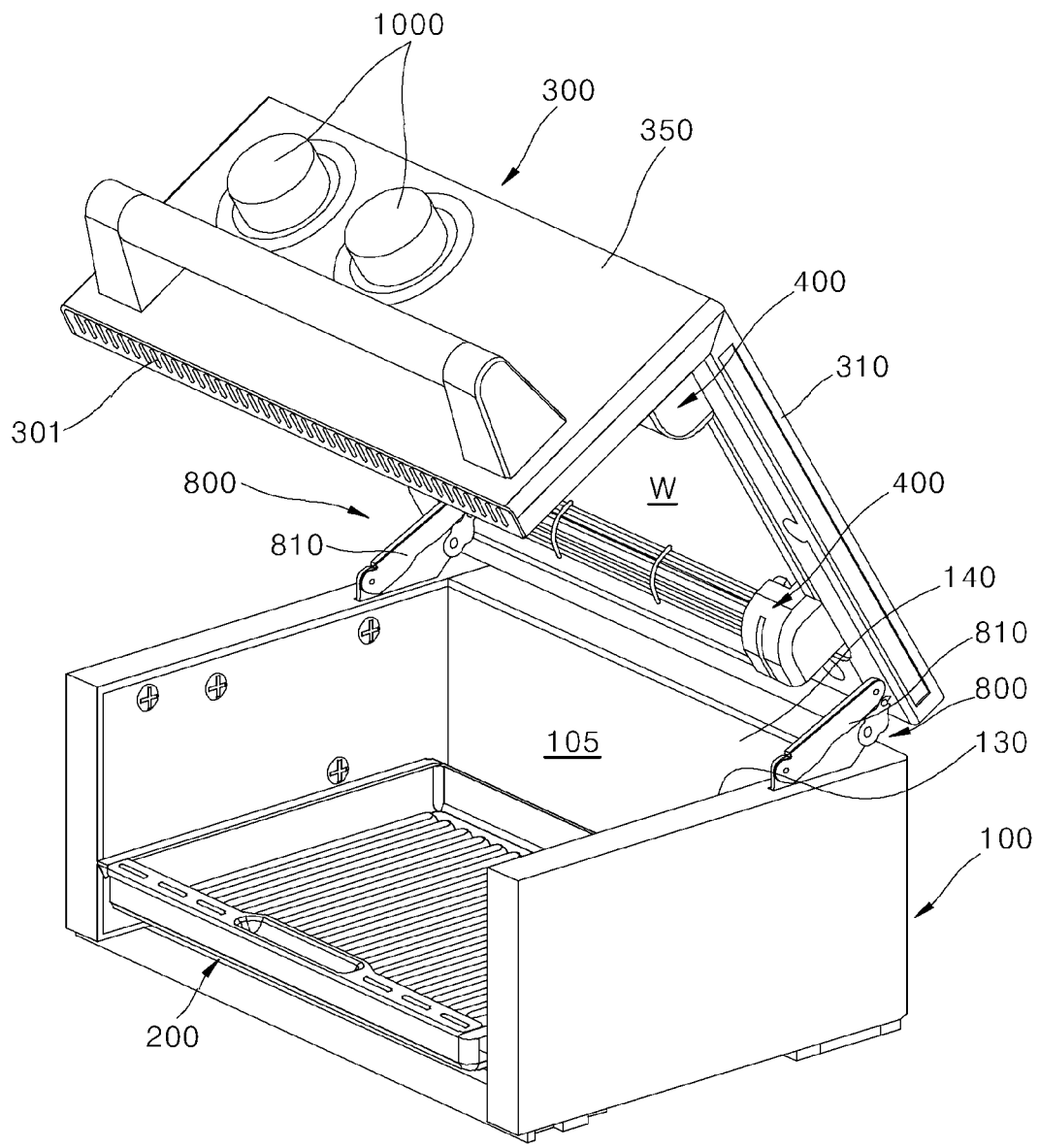
FIG. 2 is a perspective view showing a state in which a door of the cooking appliance in FIG. 1 is open.
Figure 3:
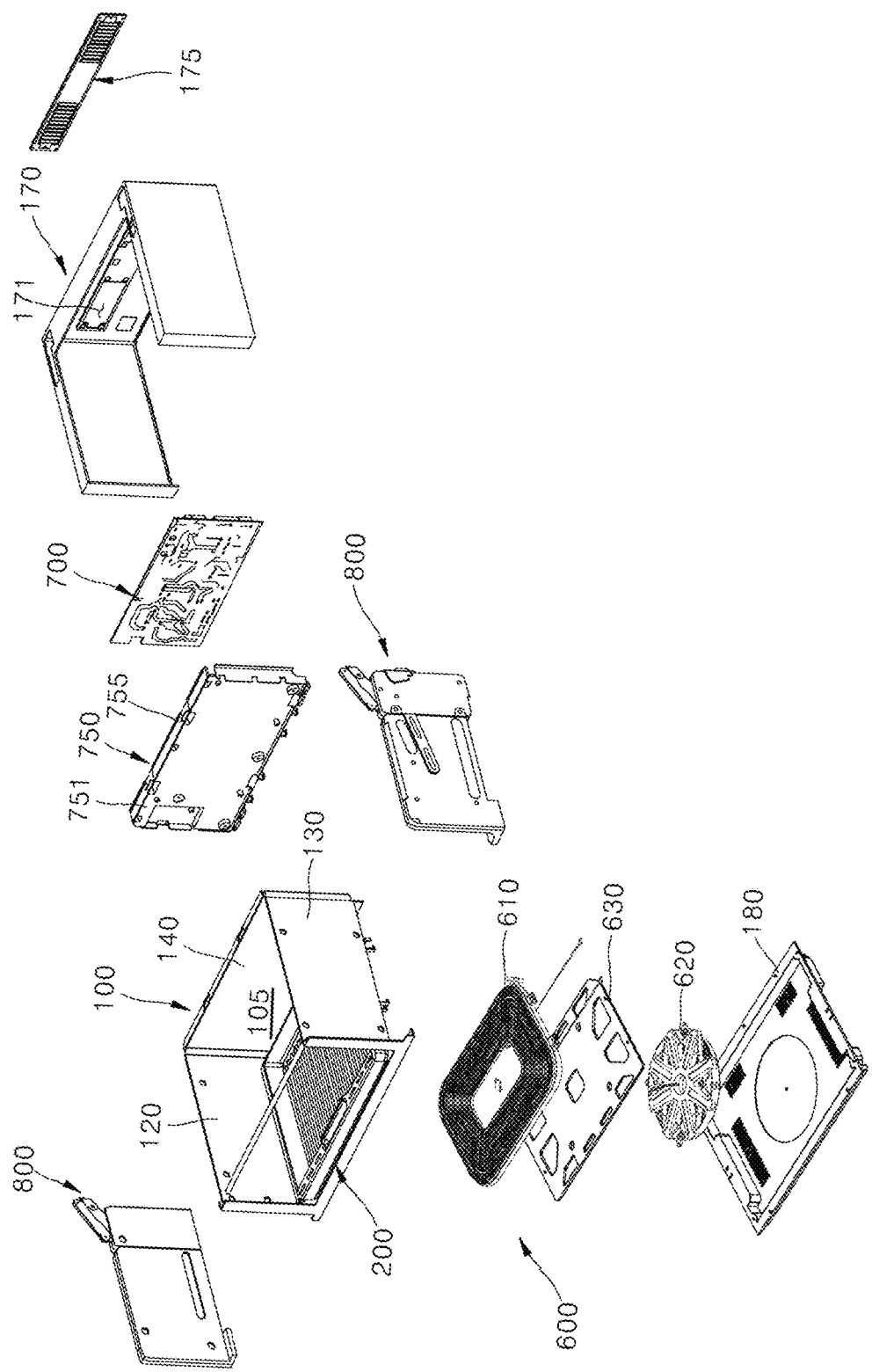
FIG. 3 is an exploded perspective view showing the cooking appliance in FIG. 1.

FIG. 1 is a perspective view showing a cooking appliance in one embodiment, FIG. 2 is a perspective view showing a state in which a door of the cooking appliance in FIG. 1 is open, and FIG. 3 is an exploded perspective view showing the cooking appliance in FIG. 1.

Referring to FIGS. 1 to 3, the cooking appliance according to an embodiment of the present disclosure may include a housing 100, a door 300, a tray 200, and heating parts 400 and 600.

The housing 100 forms a frame of the cooking appliance in this embodiment. According to this, various components constituting the cooking appliance are installed in the housing 100. A cooking space 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of lateral surfaces 120 and 130, and a rear surface 140, which forms a space therein, and is provided in a form in which the upper surface and the front surface may open. The cooking space 105 surrounded by the bottom surface 110, both the lateral surfaces 120 and 130, and the rear surface 140 of the housing 100 is formed inside the housing 100.

The tray 200 is disposed in the cooking space 105 inside the housing 100. The tray 200 is provided so that an object to be cooked is seated thereon. The tray 200 may be detachably installed inside the cooking space 105.

The tray 200 has a lower surface being formed into a shape corresponding to the bottom surface 110 of the housing 100. In the embodiment, the tray 200 is formed into a box the upper portion of which is open and which is flat in the up-down direction, for example. The lower surface of the tray 200 may be formed into a shape corresponding to the bottom surface 110 of the housing 100, e.g., a rectangular plate. Additionally, four lateral surfaces of the tray 200 may be formed in a way that extends upward from the edges of the lower surface of the tray 200 respectively.

The door 300 is provided to open or close the open upper and front surfaces of the housing 100. In the present embodiment, the housing 100 forms an exterior of a bottom surface, lateral surfaces, and a rear surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to a component which covers the open upper surface of the housing 100 when the door 300 closes the cooking space 105 inside the housing 100. Also, the door front surface part 350 forms a front surface of the door 300 and corresponds to a component which covers the open front surface of the housing 100 when the door 300 closes the cooking space 105.

In the present embodiment, the door 300 is illustrated as being formed in an L-shape. That is, at the door 300, the door upper surface part 310 forming the upper surface of the door 300 and the door front surface part 350 forming the front surface of the door 300 are formed in the form of being connected to each other in an L-shape. The door 300 formed in this way opens or closes the cooking space 105 as the door upper surface part 310 and the door front surface part 350 connected to each other in an L-shape rotate together when the door 300 rotates for opening or closing the cooking space 105.

The door 300 is rotatably installed at an upper portion of the housing 100 and is rotatably coupled to the housing 100 via the hinge assemblies 800 installed at the housing 100. In this case, the hinge assemblies 800 are disposed at each lateral portion of the housing 100, and a rear side of the door upper surface part 310 is rotatably coupled to the hinge assemblies 800.

Also, a handle 305 may be provided at the front surface of the door 300, and a user may open or close the cooking space 105 by holding the handle 305 and rotating the door 300 in an up-down direction.

The heating parts 400 and 600 may be installed at the housing 100 and/or the door 300 to heat the tray 200 disposed in the cooking space 105. In the present embodiment, the heating parts 400 and 600 are illustrated as including a first heating part 400 disposed at the door 300 and a second heating part 600 disposed in the housing 100.

The first heating part 400 is installed at the door 300 such that, when the door 300 closes the cooking space 105, the first heating part 400 is housed inside the cooking space 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated in the tray 200 from an upper portion of the object.

The second heating part 600 is installed at the housing 100, and is disposed at a lower portion of the tray 200. The second heating part 600 is provided in the form of a heating part which heats the tray 200 using a different heating method from the first heating part 400, e.g., an induction heating part.

The second heating part 600 may be provided in the form including a working coil 610 installed at a lower portion of the bottom surface 110 of the housing 100 and may induce heating of the tray 200 from the lower portion of the bottom surface 110. To this end, the tray 200 may be formed of a material which may be inductively heated by the second heating part 600.

In summary, the cooking appliance in this embodiment includes a housing 100 in which the cooking space 105 is formed, the door 300 provided to be able to simultaneously open the front and the top of the cooking space 105, the first heating part 400 provided to be able to heat the inside of the cooking space 105 from the top, and the second heating part 600 provided to be able to inductively heat the tray 200 inside the cooking space 105, wherein the withdrawal and insertion of the tray 200 may be performed in association with the operation of opening or closing the door 300.

Detailed descriptions of the above-mentioned components and other components not mentioned yet will be sequentially given below.

[Structure of Housing]

Figure 4:
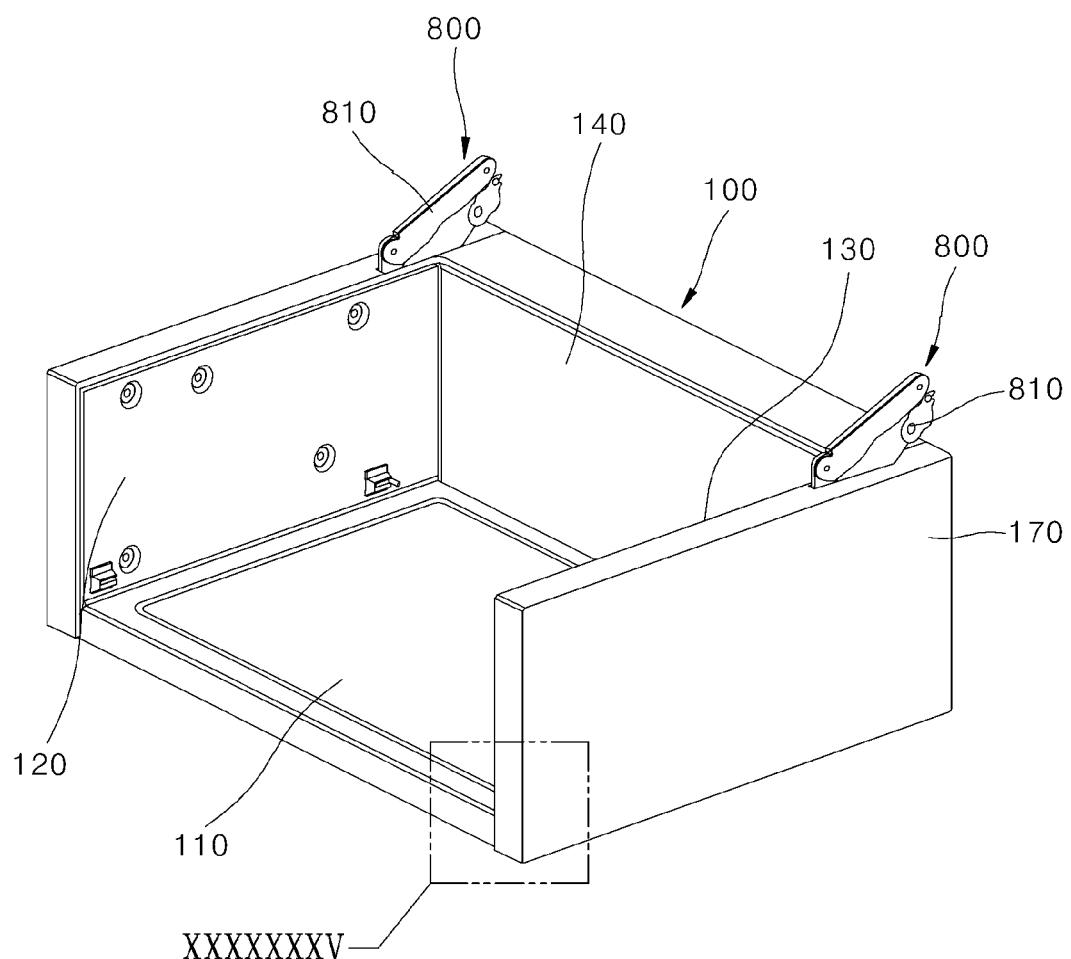
FIG. 4 is a perspective view separately showing the housing and the hinge assemblies in FIG. 1.

FIG. 4 is a perspective view separately showing the housing and the hinge assemblies in FIG. 1.

Referring to FIGS. 3 and 4, as described above, the housing 100 includes a bottom surface 110, a pair of lateral surfaces 120 and 130, and a rear surface 140, which forms a space therein, and is provided in the form in which the upper surface and the front surface are open.

The cooking space 105 may be formed in the inner space surrounded by the bottom surface 110, both the lateral surfaces 120 and 130, and the rear surface 140 of the housing 100, and the tray 200 may be installed in the cooking space 105 so as to be withdrawable therefrom.

Also, the second heating part 600 may be installed at the lower portion of the bottom surface of the housing 100, and an electronic component, e.g., a second control board 700 which will be described below, related to operation of the second heating part 600 may be installed at the rear of the rear surface of the housing 100.

Further, the hinge assemblies 800 may be installed at outer sides of the lateral surfaces 120 and 130 of the housing 100, and the door 300 may be rotatably installed at the housing 100 by being coupled to the hinge assemblies 800 installed as above.

As one example, the housing 100 may be produced in such a form that a metal plate is bent in a U-shape and the metal plate bent in this way forms the bottom surface and both lateral surfaces of the housing 100. When the housing 100 is produced in this form, the bottom surface 110 of the housing 100 may be integrally connected to both lateral surfaces 120 and 130 of the housing 100 without a joint.

Thereby, internal aesthetic of the cooking space 105 may be improved, and an effect of preventing foreign materials from being jammed in gaps between the bottom surface 110 and both lateral surfaces 120 and 130 of the housing 100 or preventing the foreign materials from coming out through the gaps to contaminate the second heating part 600 may be obtained.

As another example, the housing 100 may be produced in such a form that a metal plate includes left and right protrusion portions forming a T-shape which are bent upward to form the bottom surface 110 and both the lateral surfaces 120 and 130 of the housing 100, and a rear protrusion portion is bent upward to form the rear surface 140 of the housing 100. When the housing is produced in this form, the bottom surface 110, both the lateral surfaces 120 and 130, and the rear surface 140 of the housing 100 may be integrally formed without joints between the bottom surface 110 and both the lateral surfaces 120 and 130 of the housing 100, and between the bottom surface 110 and the rear surface 140 of the housing 100.

Thereby, when viewed from the front and the top, an inner surface of the cooking space 105 may maintain a smooth surface where internal joints of the cooking space 105 are nearly not seen. Thus, the internal aesthetic of the cooking space 105 may be further improved, and an effect of easily removing contaminants attached to the inner surface of the cooking space 105 may be additionally obtained.

Meanwhile, the bottom surface 110 of the housing 100 may include a ceramic glass. The ceramic glass may have the shape of a rectangular flat plate having a prescribed thickness.

For example, the ceramic glass may be disposed at a cut middle portion of the bottom surface 110 formed of a metal material. The ceramic glass may be disposed between the second heating part 600 and the tray 200.

Also, a rear surface case 150 which houses the second control board 700 which will be described below is disposed at the rear of the rear surface 140 of the housing 100. The second control board 700 is housed in the rear surface case 150 and installed at the rear of the housing 100, and an insulating plate 160 is disposed between the rear surface 140 of the housing 100 and the rear surface case 150.

The insulating plate 160 serves to block transfer of hot air from the inside of the cooking space 105 to the second control board 700 via the rear surface 140 of the housing 100 and insulate the housing 100 and the rear surface case 150, in which the second control board 700 is installed, from each other.

Further, the housing 100 of the present embodiment may further include a cabinet 170. The cabinet 170 is provided to cover both the lateral surfaces 120 and 130 and the rear surface 140 of the housing 100. The cabinet 170 may surround and protect the hinge assemblies 800 installed at both the lateral surfaces 120 and 130 of the housing 100 and the second control board 700 installed at the rear surface 140 of the housing 100 from the outside and form an exterior of the lateral portions and the rear of the cooking appliance.

[Structure of Door]

Figure 5:
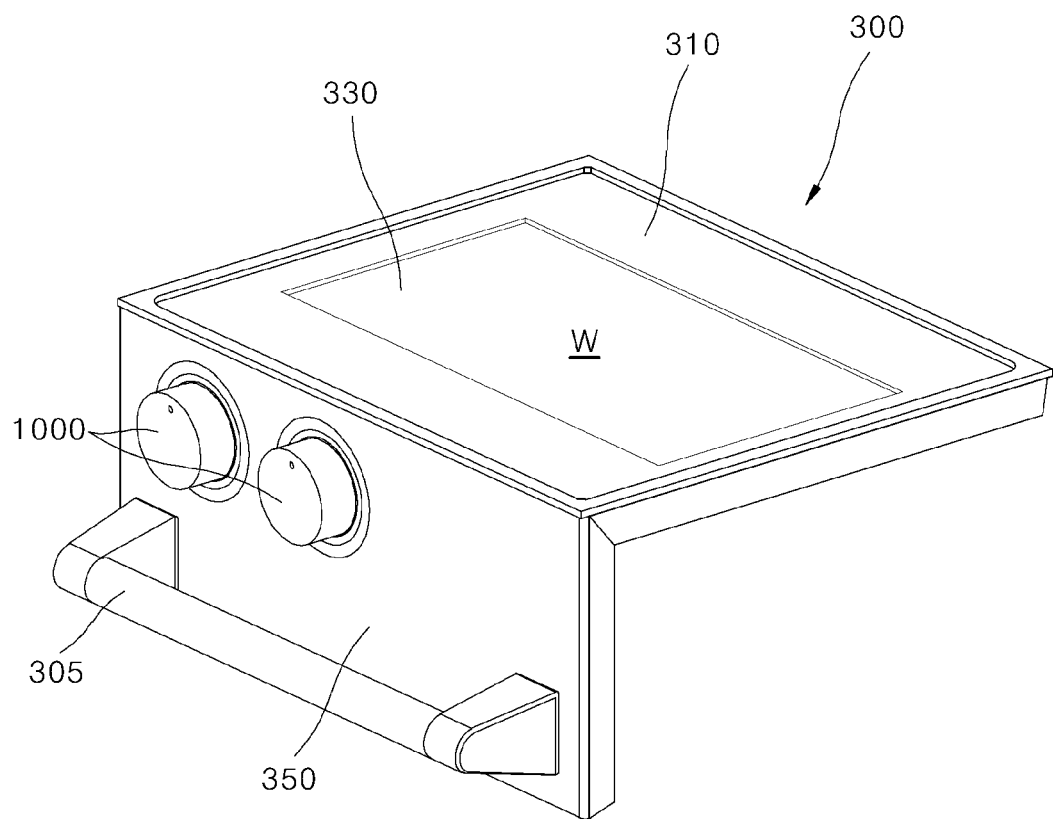
FIG. 5 is a perspective view separately showing a door in one embodiment.
Figure 6:
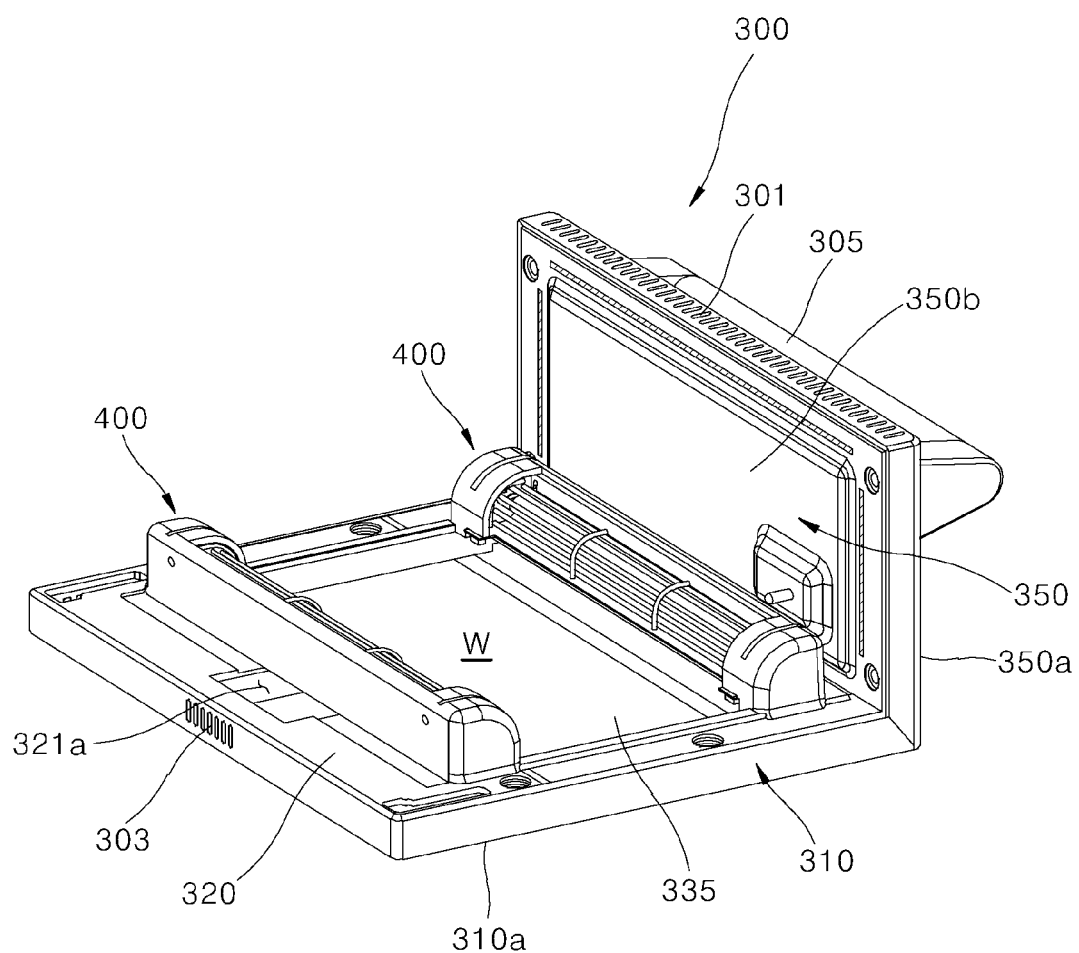
FIG. 6 is a bottom perspective view showing a bottom surface side of the door in FIG. 5.
Figure 7:
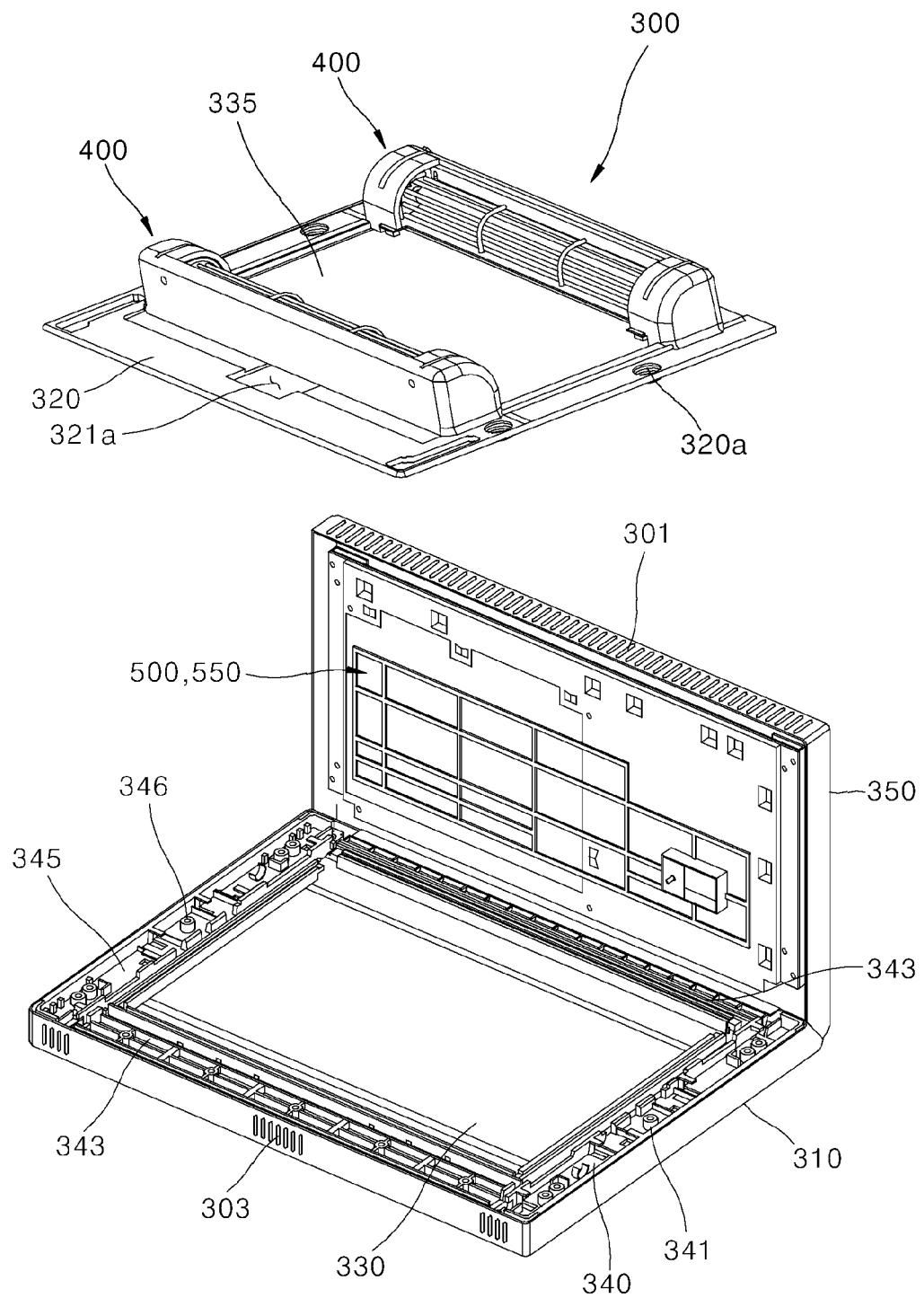
FIG. 7 is an exploded perspective view showing a configuration of the door in FIG. 6.
Figure 8:
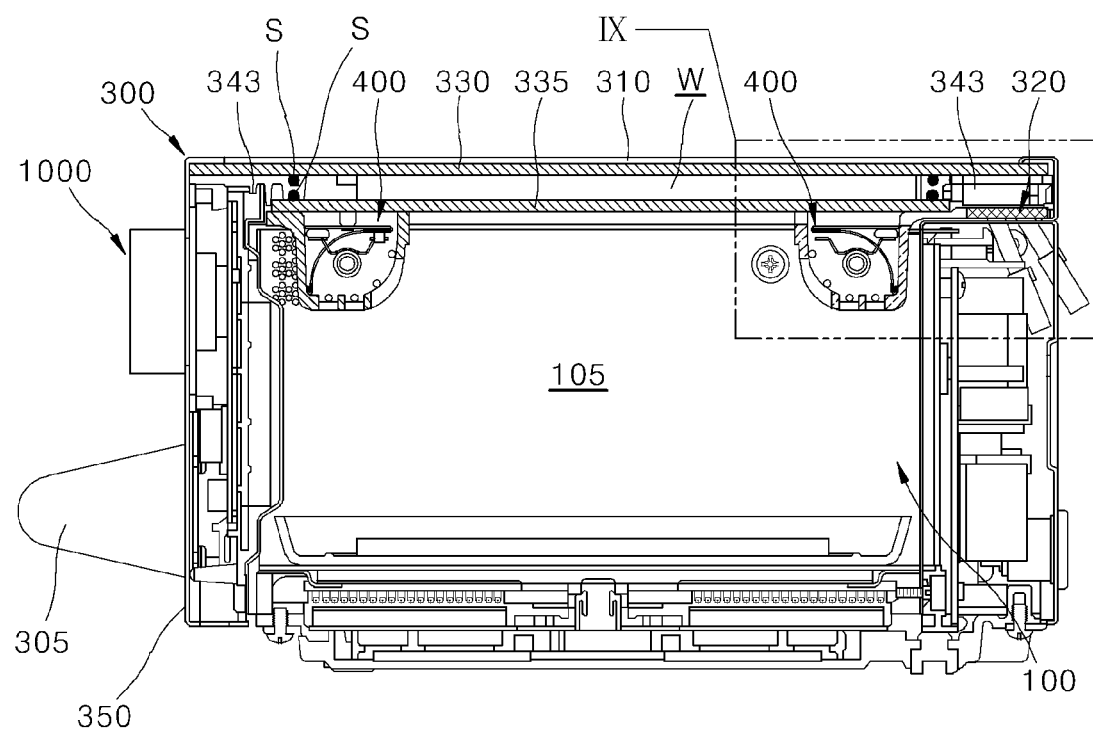
FIG. 8 is a cross-sectional view taken along line "VIII-VIII" of FIG. 1.
Figure 9:
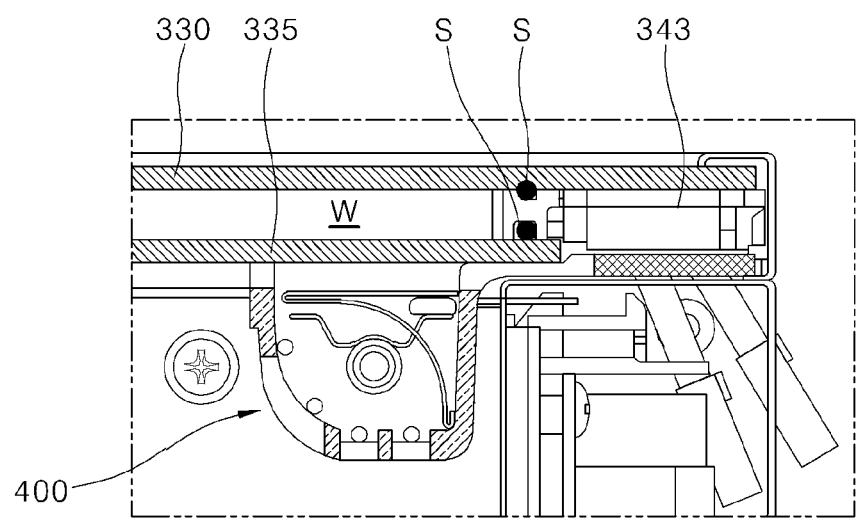
FIG. 9 is an enlarged view showing portion "IX" in FIG. 8.
Figure 10:
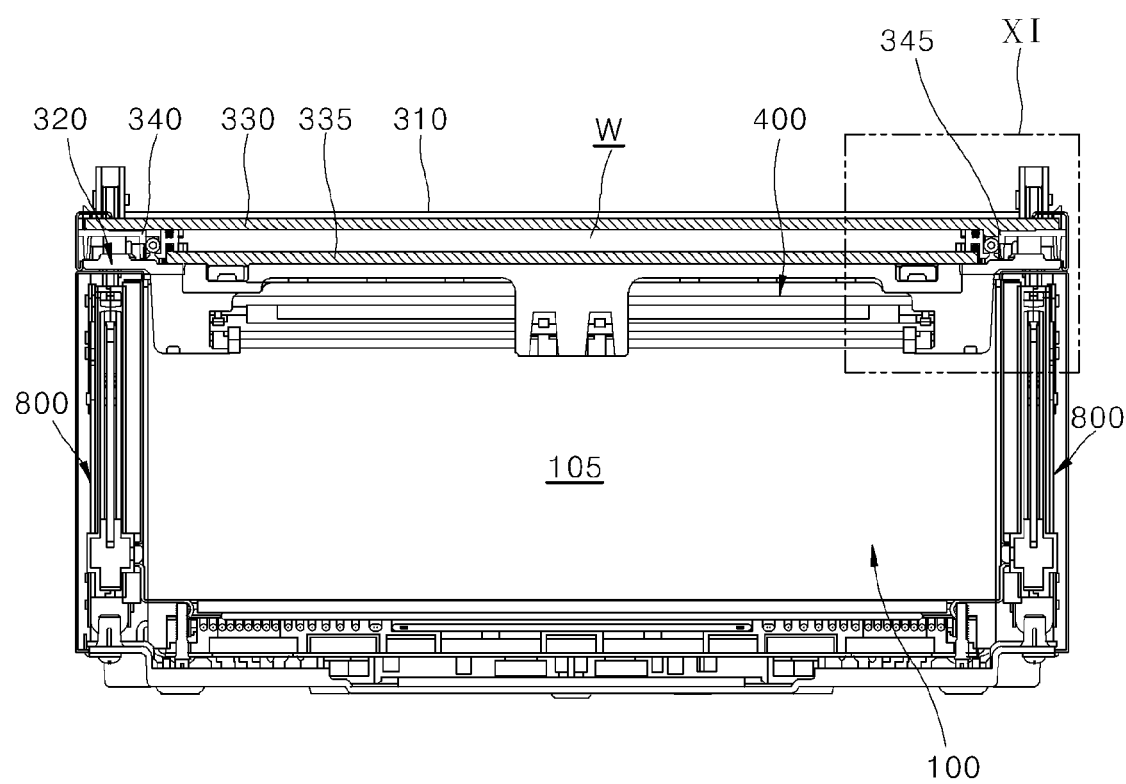
FIG. 10 is a cross-sectional view taken along line "X-X" of FIG. 1.
Figure 11:
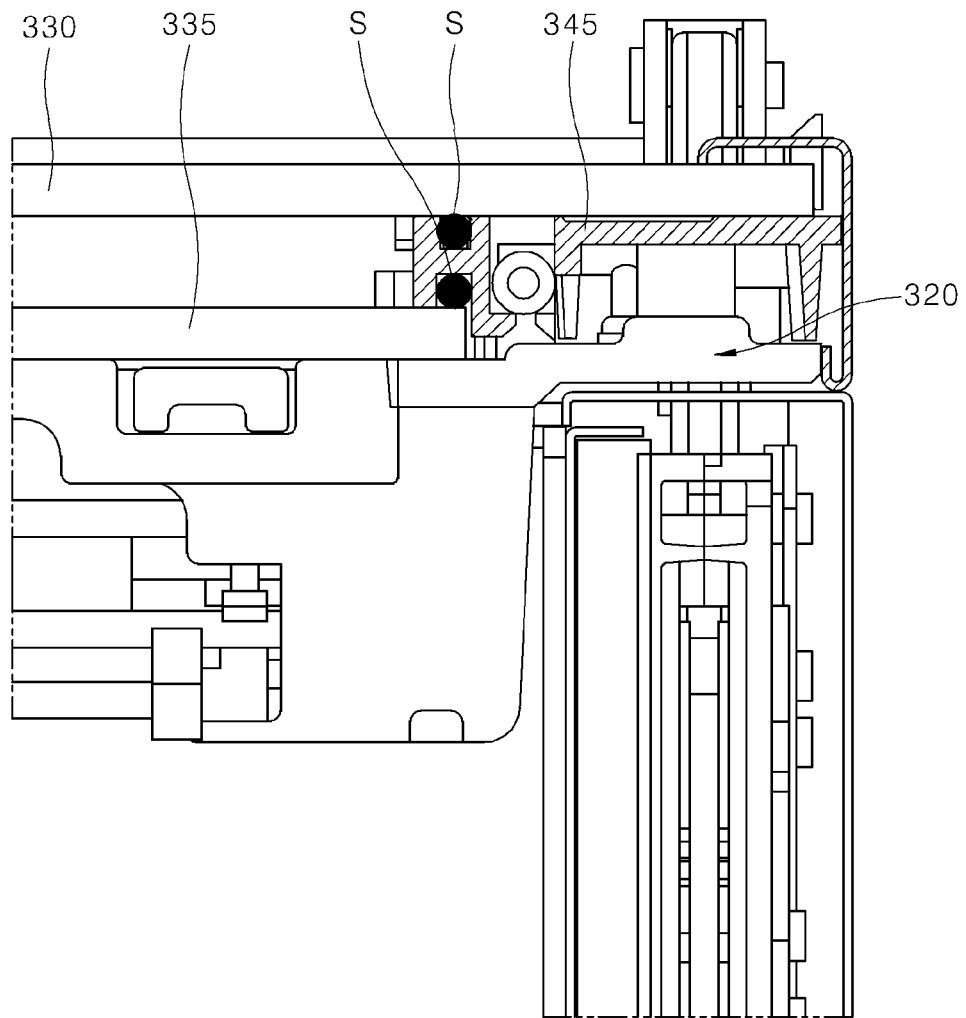
FIG. 11 is an enlarged view showing portion "XI" in FIG. 10.

FIG. 5 is a perspective view separately showing a door in one embodiment, FIG. 6 is a bottom perspective view showing a bottom surface side of the door in FIG. 5, FIG. 7 is an exploded perspective view showing a configuration of the door in FIG. 6, FIG. 8 is a cross-sectional view taken along line "VIII-VIII" of FIG. 1, FIG. 9 is an enlarged view showing portion "IX" in FIG. 8, FIG. 10 is a cross-sectional view taken along line "X-X" of FIG. 1, and FIG. 11 is an enlarged view showing portion "XI" in FIG. 10.

Referring to FIGS. 5 to 11, the door 300 is provided in the form in which the door upper surface part 310 forming the upper surface of the door 300 and the door front surface part 350 forming the front surface of the door 300 are integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction.

The see-through window W may include a pair of glasses 330 and 335 which are disposed to be spaced a predetermined distance apart from each other in the up-down direction so that a space portion is formed inside the see-through window W. For example, of the glasses 330 and 335, the glass 330 (hereinafter referred to as "first glass") may be installed at the door upper surface part 310, and the other glass 335 (hereinafter referred to as "second glass") may be installed at the door frame 320.

A through hole may be formed in each of the door upper surface part 310 and the door frame 320. The through holes may be formed at the center of the door upper surface part 310 in the planar direction and at the center of the door frame 320 in the planar direction, respectively.

In this embodiment, the first glass 330 is installed in the door upper surface part 310 in such a way that the through hole formed in the door upper surface part 310 is covered by the first glass 330 from the top, and the second glass 335 is installed in the door frame 320 in such a way that the through hole formed in the door frame 320 is covered by the second glass 335 from the top.

The first glass 330 and the second glass 335 may be formed of glass formed of a transparent or translucent material. The see-through window W may be formed at portions of the through holes covered by the first glass 330 and the second glass 335.

The user may view the inside of the cooking space 105 from the top through the see-through window W formed as above, and in this way, a cooking state of food inside the cooking space 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering their posture or bending their waist forward.

Further, the pair of glasses 330 and 335 forming the see-through window W are coupled to different components, that is, one is coupled to the door upper surface part 310 and the other is coupled to the door frame 320, and are disposed to be spaced a predetermined distance apart from each other. Accordingly, a separation space between the two glasses 330 and 335 is formed inside the see-through window W.

For example, a first glass 330 may be disposed in an upper portion of the door upper surface part 310, and a second glass 335 may be disposed in the door frame 320. Accordingly, the first glass 330 and the second glass 335 may be spaced from each other by at least a thickness of the door upper surface part 310.

That is, a separation space, which is at least as thick as the door upper surface part 310, may be formed between the first glass 330 and the second glass 335 forming the see-through glass W. Accordingly, the separation space formed by the two glasses 330 and 335 may be formed in the see-through glass W. Air may flow into the separation space formed as describe above, and the air introduced into the separation space may form an air layer in the separation space.

The air layer formed in the separation space formed in this way may serve to block transfer of heat, which has heated the second glass 335 directly exposed to the cooking space 105, to the first glass 330 disposed at the door upper surface part 310.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Additionally, a through hole formed in the door upper surface part 310 may have a width less than a width of a through hole formed in the door frame 320. Further, when seen from above, the through hole formed in the door upper surface part 310 may be formed in a way that the through hole is disposed in an area inside the through hole formed in the door frame 320.

That is, the through hole may be formed in the door upper surface part 310 such that an inner edge of the door frame 320 is not exposed through the see-through window W. In this case, since the door frame 320 is not exposed through the see-through window W, aesthetic qualities may be ensured.

The first heating part 400 is installed at the door upper surface part 310 in such a way that the first heating part 400 is disposed in a region not exposed through the see-through window W when viewed from the top. The first heating part 400 is disposed at a front outer side and a rear outer side of the see-through window W on a plane in a horizontal direction corresponding to the door upper surface part 310. In other words, the first heating part 400 may be respectively disposed outside the through holes formed in the door upper surface part 310 and the door frame 320. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable. Also a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected in proportion to the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving the thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed extending downward from a front end portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

A manipulation device 1000 and a first control board 500 may be disposed in the door front surface part 350. In this embodiment, a space portion may be formed inside the door front surface part 350, for example (see FIG. 9). In the space portion, at least a portion of the manipulation device 1000 and the first control board 500 may be housed.

The manipulation device 1000 may include various manipulation switches for controlling and manipulating operation of the cooking appliance in this embodiment. The manipulation device 1000 may be provided to be exposed to a front surface of the door front surface part 350, and the user may directly manipulate the manipulation device 1000 to control operation of the cooking appliance.

The first control board 500 is installed inside the door front surface part 350. Various components and circuits related to reception of manipulation signals input via the manipulation device 1000, generation of control signals for controlling operations of the first heating part 400 and the second heating part 600, and the like are provided on the first control board 500.

The first control board 500 may be electrically connected to the manipulation device 1000, the first heating part 400, and the second heating part 600. The first control board 500 is disposed in the door front surface part 350 like the manipulation device 1000 and may be disposed at a position very close to the manipulation device 1000. The first control board 500 may be disposed at a position which is also very close to the first heating part 400 disposed on the door 300.

In this embodiment, the manipulation device 1000 may be electrically connected to the first control board 500 in the state of being directly mounted on the first control board 500. In this case, each of the manipulation switches included in the manipulation device 1000 may pass through the door front surface part 350 and connect to the first control board 500. Additionally, the first heating part 400 may be electrically connected to the manipulation device 1000 and the first control board 500 via a cable installed through the inside of the door front surface part 350 and the inside of the door upper surface part 310 which are connected to each other.

That is, since the first control board 500, the manipulation device 1000, and the first heating part 400 which need to be electrically connected to one another are disposed at positions very close and spatially connected to one another, not only is it possible to easily and promptly perform a task for electrically connecting the first control board 500, the manipulation device 1000, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down direction, in such a way that the cable mounting parts 340 and 345 are disposed at both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a square shape surrounding the see-through window W from the outside.

An assembly of the cable mounting parts 340 and 345 and the connecting members 341 provided as above is installed in the door upper surface part 310 in the form of being inserted into the space portion formed between the door upper surface part 310 and the door frame 320.

The inside of the door upper surface part 310 in which the cable mounting parts 340 and 345 are installed as described above is connected to the inside of the door front surface part 350. Also, cables C1 and C2 which connect the first control board 500 and the first heating part 400 through the inside of the door upper surface part 310 and the inside of the door front surface part 350, which are connected to each other, are installed at the cable mounting parts 340 and 345 installed in the door upper surface part 310.

A power cable C2 which supplies power to the first heating part 400 and the first control board 500 may be installed at any one of the cable mounting parts 340 and 345 disposed at both outer sides of the see-through window W. Also, a signal cable C1 which transmits a control signal generated in the first control board 500 to the first heating part 400 may be installed at the other one of the cable mounting parts 340 and 345 disposed at both outer sides of the see-through window W.

That is, in the door 300, the first heating part 400 is respectively disposed on both sides of the see-through window W in the front-rear direction, and the power cable C2 and the signal cable C1 are respectively disposed on both sides of the see-through window W in a left-right direction.

As a result, the first heating part 400, the power cable C2, and the signal cable C1 are disposed considering the disposition structure of the first heating part 400 and the hinge assembly 800.

In this embodiment, each first heating part 400 is disposed in the form in which a heating element thereof extends longitudinally in the left-right direction. Also, the hinge assembly 800 (see FIG. 3) is disposed at both sides of the see-through window W in the left-right direction.

Figure 68:
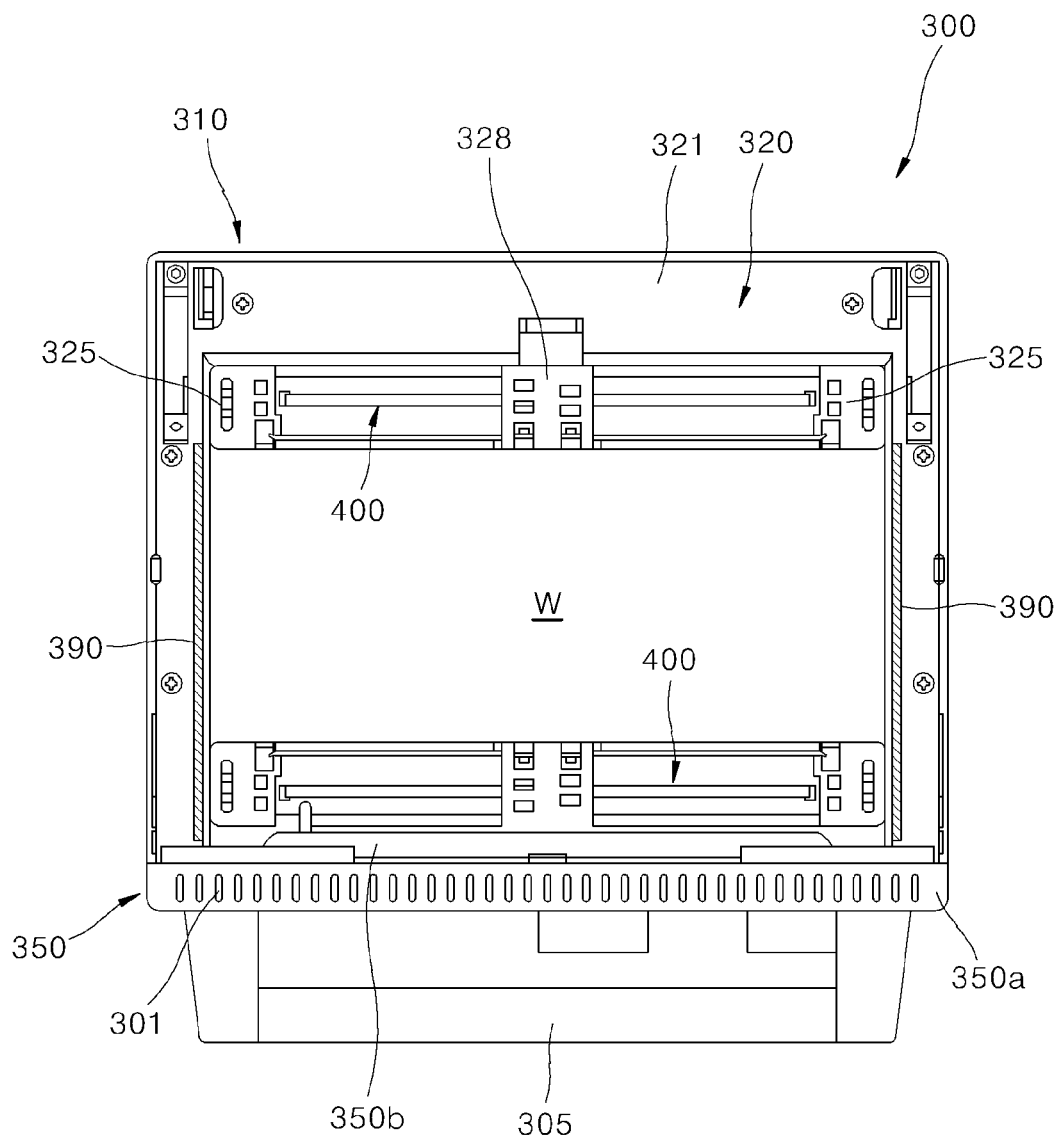
FIG. 68 is a bottom view showing a lower surface of the door in FIG. 67.

The power cable C2 and the signal cable C1 are not only connected to the components disposed in the door 300 such as the first heating part 400 and the first control board 500, but also connected to the components disposed in the housing 100 such as the second control board 700 (see FIG. 68).

In order to pass through a portion between the door 300 and the housing 100 with the least possible exposure to the outside, the power cable C2 and the signal cable C1 may pass through the portion in which the hinge assembly 800 is disposed, which is a connecting portion between the door 300 and the housing 100.

For example, sections of the power cable C2 and the signal cable C1 connecting the housing 100 and the door 300 to each other may be disposed in the form of passing through the inside of the hinge assembly 800. In this way, exposure of the power cable C2 and the signal cable C1 to the outside of the cooking appliance may be suppressed in a section between the housing 100 and the door 300, and the power cable C2 and the signal cable C1 may be protected from the risk of damage.

Further, considering that the heating element of the first heating part 400 extends longitudinally in the left-right direction, the power cable C2 and the signal cable C1 may be disposed at the farthest possible side from the heating element and disposed to extend in a direction different from a direction in which the heating element extends.

This is a result of designing to avoid an influence of heat generated in the first heating part 400 on the power cable C2 and the signal cable C1. Also, considering that a plurality of first heating parts 400 are disposed to be spaced apart from each other in the front-rear direction, a structure in which the power cable C2 and the signal cable C1 are disposed at both sides of the first heating parts 400 in the left and right direction may be advantageous for connecting the first heating parts 400 using the power cable C2 and the signal cable C1.

Also, in the present embodiment, the power cable C2 and the signal cable C1 may be disposed to be spaced apart from each other in the left-right direction with the see-through window W disposed therebetween and may be installed at the cable mounting parts 340 and 345 different from each other.

In this case, the power cable C2 passes through the inside of any one of the hinge assemblies 800 disposed at both lateral surfaces of the housing 100 and is installed at the cable mounting parts 340 and 345 adjacent thereto. Also, the signal cable C1 passes through the inside of the other one of the hinge assemblies 800 disposed at both lateral surfaces of the housing 100 and is installed at the cable mounting parts 340 and 345 adjacent thereto.

For example, the power cable may pass through the inside of the hinge assembly 800 disposed at the left side of the housing 100 and be installed at the cable mounting parts 340 and 345 disposed at the left side of the door 300. Also, the signal cable C1 may pass through the inside of the hinge assembly 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

The cable mounting part 340 and 345 and the connecting member 343 may be disposed between the first glass 330 and the second glass 335 that are spaced from each other in the up-down direction. That is, the cable mounting part 340 and 345 and the connecting member 343 may be mounted onto the second glass 335, and the first glass 330 may be mounted onto the cable mounting part 340 and 345 and the connecting member 343 the cable mounting part 340 and 345 and the connecting member 343.

A mounting groove may be formed respectively on the upper surface of the cable mounting part 340 and 345, contacting the first glass 330, and the lower surface of the cable mounting part 340 and 345, contacting the second glass 335.

Additionally, a mounting groove may be respectively formed on the upper surface of the connecting member 343, contacting the first glass 330, and an upper surface of the connection member 343, contacting the second glass 335.

A sealing member S may be respectively installed in the each of the mounting grooves. That is, the sealing member S may be disposed respectively between the cable mounting part 340 and 345 and the first glass 330, between the cable mounting part 340 and 345 and the second glass 335, between the connecting member 343 and the first glass 330, and between the connecting member 343 and the second glass 335.

Accordingly, a sealing structure may be formed among the cable mounting part 340 and 345, the connecting member 343 and the first glass 330, and among the cable mounting part 340 and 345, the connecting member 343, and the second glass 335, using the sealing member S.

The sealing structure, formed as described above, may prevent moisture from permeating between the glasses 330 and 335, and as a result, may prevent formation of humidity or dew on the glasses 330 and 335.

[Structure of Manipulation Device]

Referring to FIG. 5, the manipulation device 1000 may include various manipulation switches for controlling and manipulating operation of the cooking appliance in this embodiment.

The manipulation device 1000 may be exposed to the front surface of the door front surface part 350, and the user may manipulate the manipulation device 1000 directly to control operation of the cooking appliance.

In an example, the manipulation device 1000 may include a manipulation switch for selecting the sort and a state of an object to be cooked, a manipulation switch for selecting a cooking degree or cooking time, and the like.

In another example, the manipulation device 1000 may include a manipulation switch for controlling the turn-on/off or adjusting thermal power of the first heating part 400 (see FIG. 3), a manipulation switch for controlling the turn-on/off or adjusting thermal power of the second heating part 600 (see FIG. 3), a timer manipulation switch for adjusting operation time of the first heating part 400 or the second heating part 600, and the like.

In this embodiment, the manipulation device 1000 includes two manipulation switches, for example. One may be a manipulation switch for selecting the sort and a state of an object to be cooked, and the other may be a manipulation switch for selecting a cooking degree or cooking time.

At least one of the manipulation switches may be rotated and pressed for manipulation. In this embodiment, each manipulation switch is rotated and pressed for manipulation, for example.

Additionally, in this embodiment, the manipulation device 1000 includes manipulation switches that respectively have identical or similar components, for example. In this case, each of the manipulation switches may be configured to provide different functions using the identical or similar components.

For example, all the two manipulation switches may be rotated and pressed for manipulation, and one may be a manipulation switch for selecting the sort and a state of an object to be cooked, and the other may be a manipulation switch for selecting a cooking degree or cooking time.

Hereunder, one of the two manipulation switches is provided as an example to describe a configuration of the manipulation device 1000.

Figure 12:
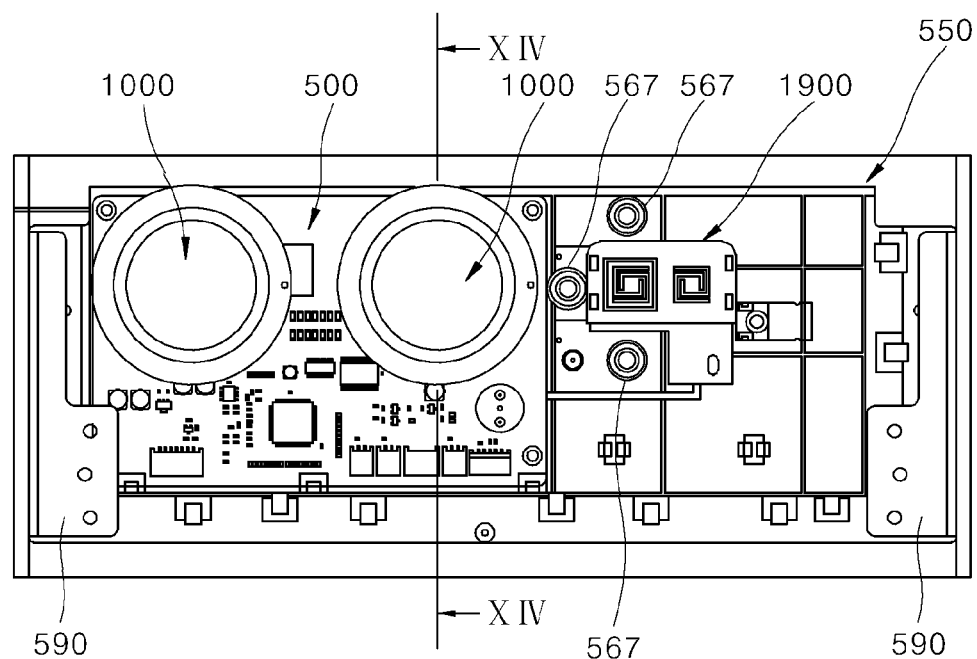
FIG. 12 is a a perspective view showing a state in which a portion of the door in FIG. 5 is removed.
Figure 13:
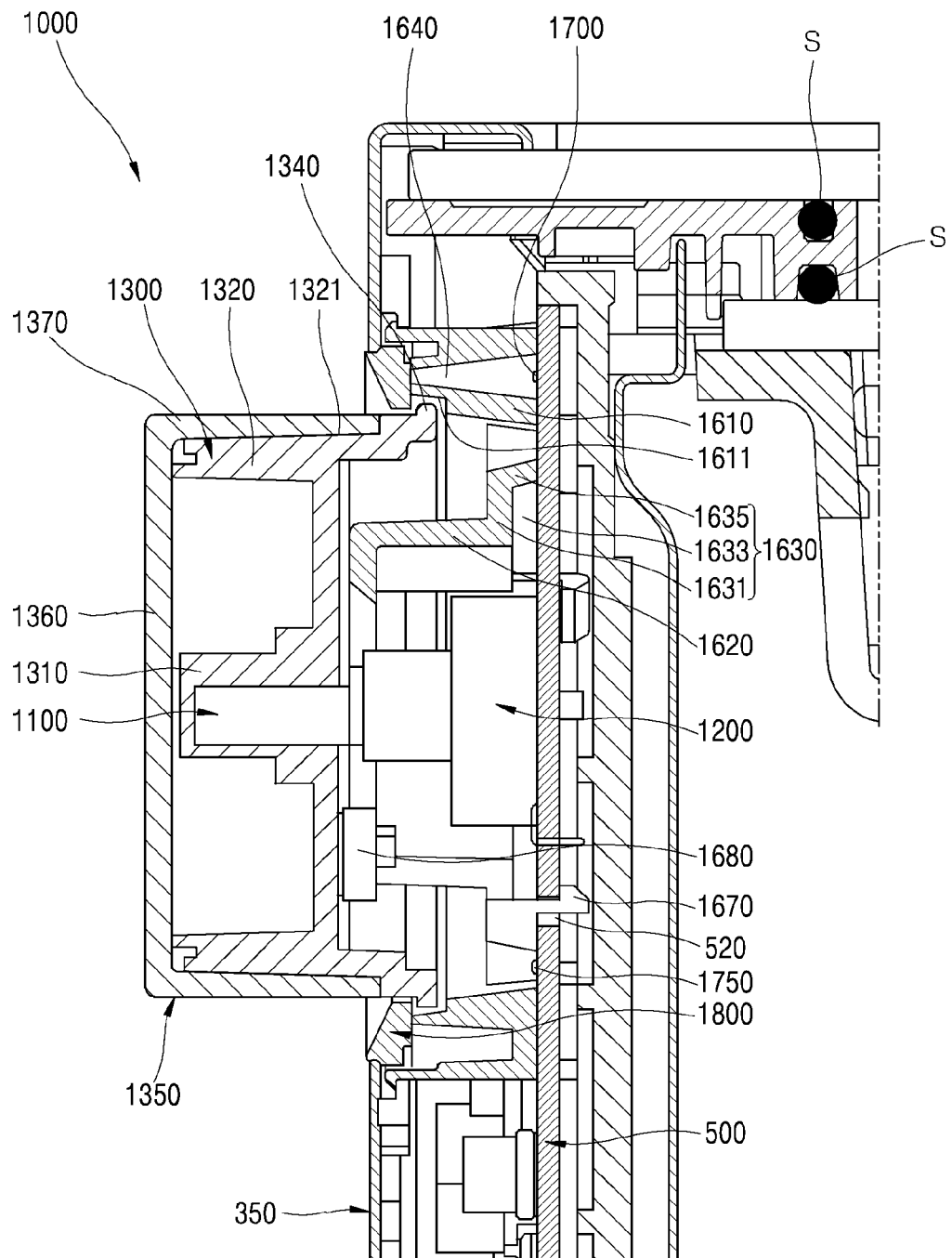
FIG. 13 is a cross-sectional view taken along line "XIII-XIII" of FIG. 12.
Figure 14:
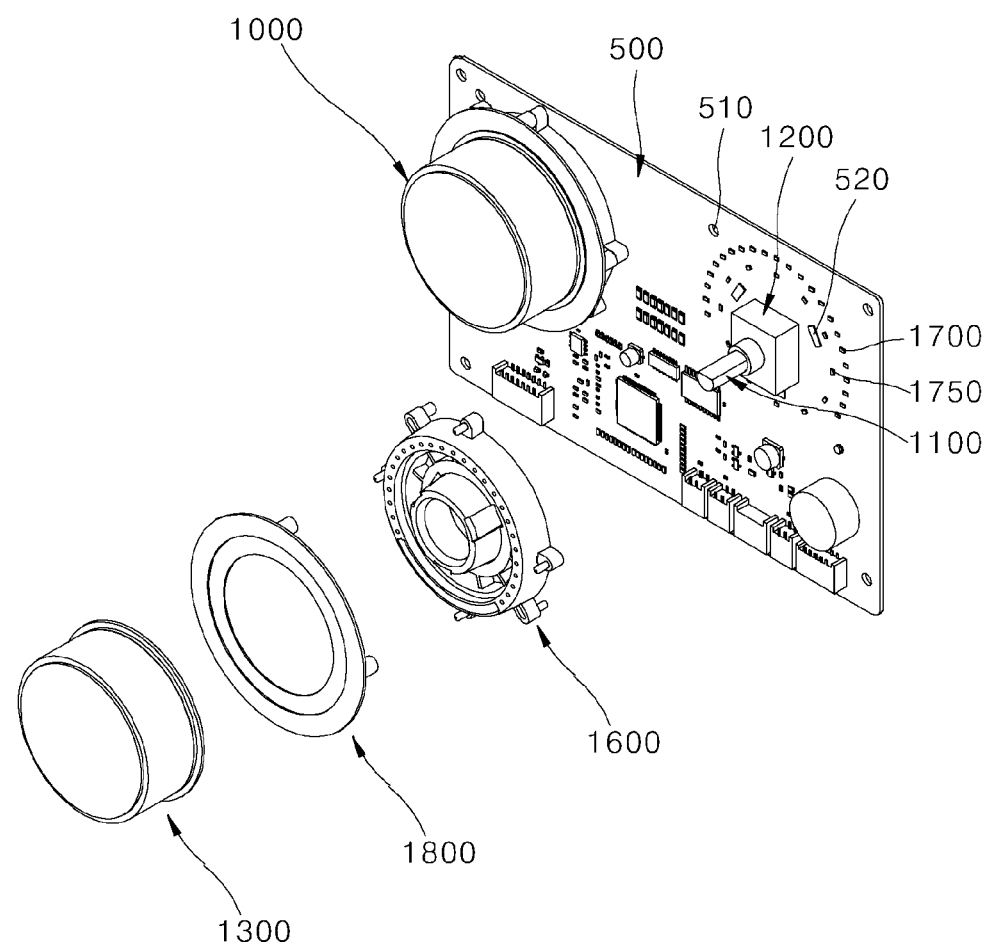
FIG. 14 is an exploded perspective view showing a configuration of the manipulation device in FIG. 13.
Figure 15:
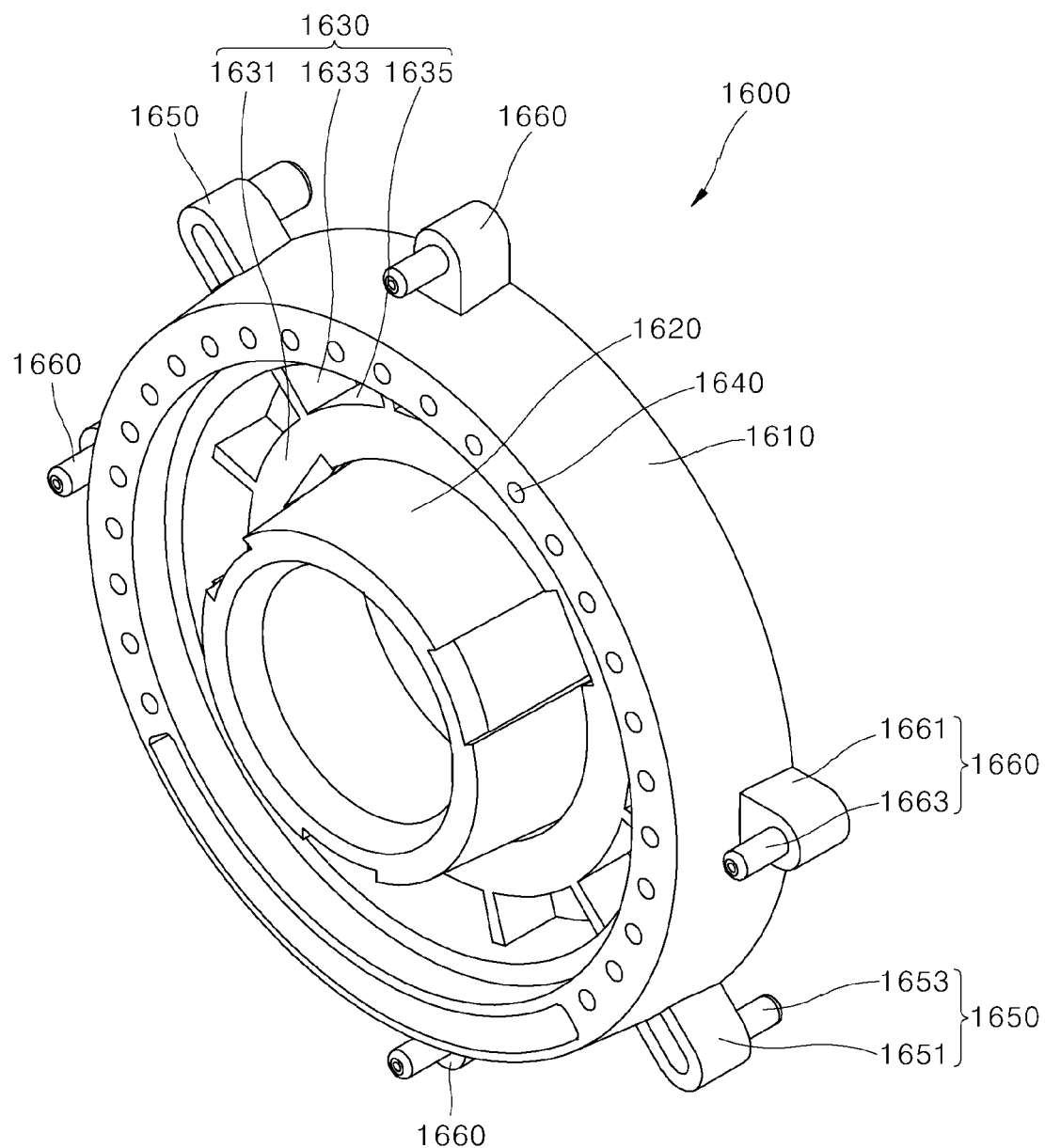
FIG. 15 is an exploded perspective view separately showing the socket member in FIG. 14.

FIG. 12 is a perspective view showing a state in which a portion of the door in FIG. 5 is removed, FIG. 12 is a cross-sectional view taken along line "XIII-XIII" of FIG. 13, and FIG. 15 is an exploded perspective view showing a configuration of the manipulation device in FIG. 14.

Referring to FIGS. 13 to 15, the manipulation device 1000 may include a manipulation switch and the manipulation switch may include a shaft 1100 and a knob 1300.

The shaft 1100 may be arranged in an encoder 1200 included in the manipulation device 1000. The shaft 1100 may be formed into a shaft that extends in the front-rear direction. Additionally, the shaft 1100 may make one rotation around the shaft in the front-rear direction.

The encoder 1200 may sense a rotation angle of the shaft 1100. In this embodiment, the encoder 1200 is disposed on the first control board 500, for example. The encoder 1200 may be disposed on the first control board 500 and may be disposed in the door front surface part 350.

The encoder 1200 may electrically connect to the first control board 500. The encoder 1200 may sense a rotation angle or an axial movement of the shaft 1100, and may transmit a signal corresponding to results of the sensing to the first control board 500. The first control board 500 may generate a control signal for controlling operation of the first heating part 400 (see FIG. 3), the second heating part 600 (see FIG. 3), and a light emitting member 1700 described below, based on a signal received from the encoder 1200.

The knob 1300 may be a component rotated by the user for manipulation. The knob 1300 may be coupled to the shaft 1100, and as a result, connected to the shaft 1100. The knob 1300 may connect to the shaft 1100 to make a rotation and an axial movement along with the shaft 1100.

The knob 1300 may include a shaft coupling part 1310. The shaft coupling part 1310 may be formed into a lying cylinder. A shaft coupling hole 1311 may be formed in the shaft coupling part 1310. The shaft coupling hole 1311 may be concavely formed in the shaft coupling part 1310, and may be formed into a shape corresponding to the shape of the shaft 1100.

The shaft coupling hole 1311 may be open toward a rear of the shaft coupling part 1310. Additionally, a front of the shaft coupling hole 1311 may be closed by a front surface of the shaft coupling part 1310. A position at which the shaft 1100 coupled to the shaft coupling part 1310 is installed and a depth at which the shaft 1100 is inserted may be guided thanks to the shape of the shaft coupling part 1310.

The manipulation device 1000 in this embodiment may further include a socket member 1600. The socket member 1600 may be provided to allow the door 300 to support the knob 1300 in a rotatable manner and an axially movable manner. The socket member 1600 may be installed in the door 300, specifically, in the door front surface part 350.

The socket member 1600 may be installed in the door front surface part 350 in a way that accommodates the encoder 1200, installed in the door front surface part 350, in a diameter direction from the outside. The shaft 1100 connected to the encoder 1200 may protrude forward from the socket member 1600, passing through an approximate center in the diameter direction of the socket member 1600.

The socket member 1600 may accommodate the encoder 1200 therein, protect the encoder 1200, support the knob 1300 coupled to the shaft 1100 in the diameter direction from the outside, support the knob 1300 from a rear, define a path of light emitted from a light emitting member 1700 described hereunder, and the like.

The manipulation device 1000 in this embodiment may further include a light emitting member 1700. The light emitting member 1700 may be disposed on the first control board 500, and may be lit and emit light as a result of control of operations performed through the first control board 500.

The light emitting member 1700 may be disposed at a rear of the socket member 1600. Additionally, the socket member 1600 may have a passage for allowing light emitted from the light emitting member 1700 to pass through the front of the socket member 1600.

The path of light emitted from the light emitting member 1700 may be defined by the socket member 1600, and the light may play a role of displaying information on state of the manipulation device 1000, a state of control over operations performed as a result of manipulation of the manipulations device 1000, and the like.

The manipulation device 1000 in this embodiment may further include a light emitting member 1750 for mood lighting. Each light emitting member 1750 for mood lighting may be disposed on the first control board 500, and may be disposed at the rear of the socket member 1600. The light emitting member 1750 may be disposed further inward in a diameter direction than the light emitting member 1700.

Light emitted from each light emitting member 1750 may pass through the socket member 1600 through the passage formed in the socket member 1600 and be emitted from a rear of the knob 1300. In this case, the passage may be formed in a way that passes through a first connecting and supporting part 1630. Specifically, the passage may be disposed radially, and may be a hole formed among a plurality of rib-shaped parts 1633 spaced a predetermined distance apart from one another.

The mood lighting performed by the light emitting member 1750 may provide indirect lighting that lights up a rear of the manipulation device 1000 instead of directly emitting light to the front of the cooking appliance. The mood lighting may provide welcome lighting that indicates the manipulation device is ready to be manipulated in an operation standby state of the cooking appliance.

The mood lighting performed by the light emitting member 1750 may provide mood lighting capable of improving an aesthetic quality of the manipulation device and provide lighting enabling manipulation of the manipulation device even in the dark.

[Structure of Socket Member]

Figure 16:
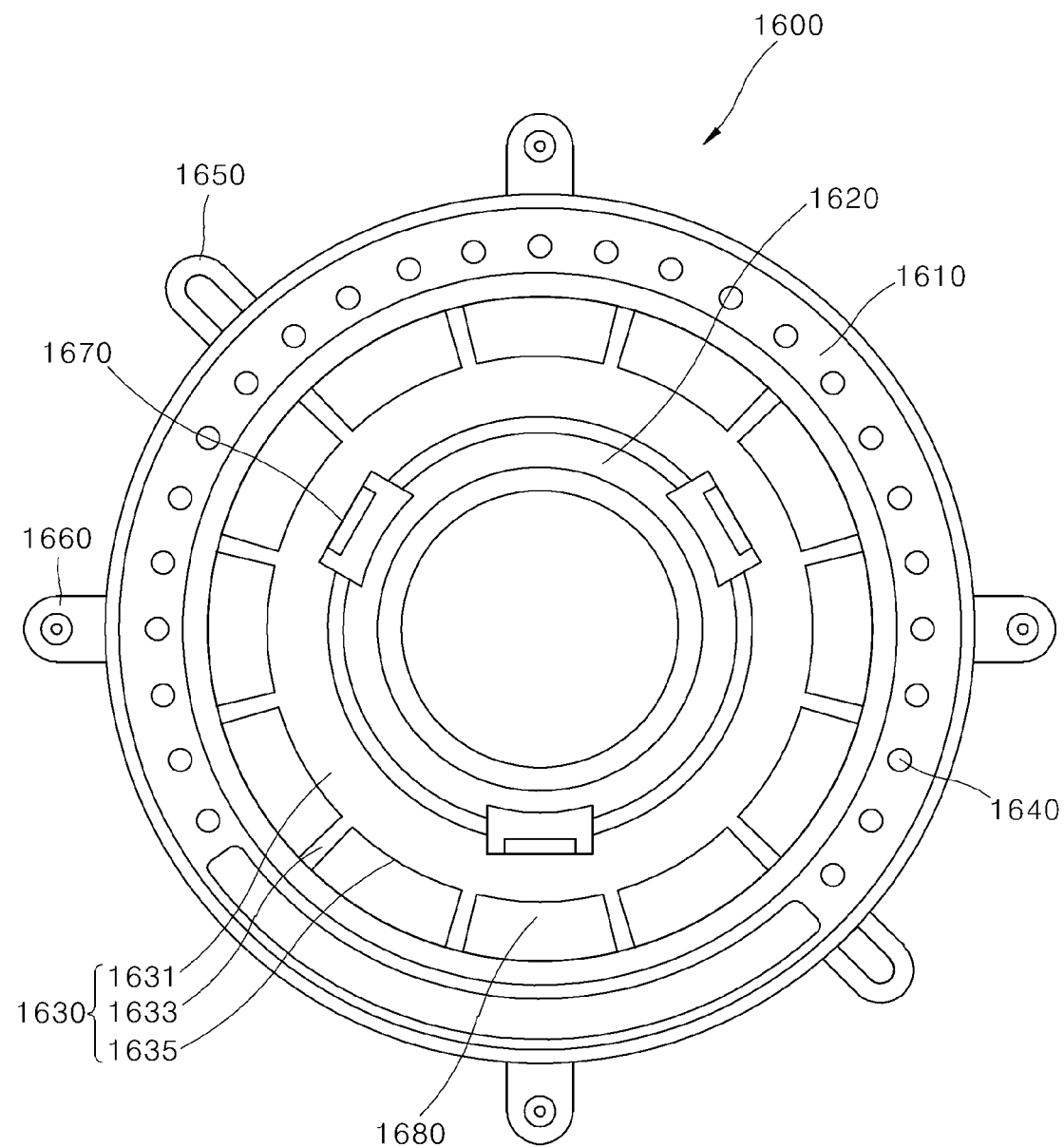
FIG. 16 is s a front view showing the socket member in FIG. 15.
Figure 17:
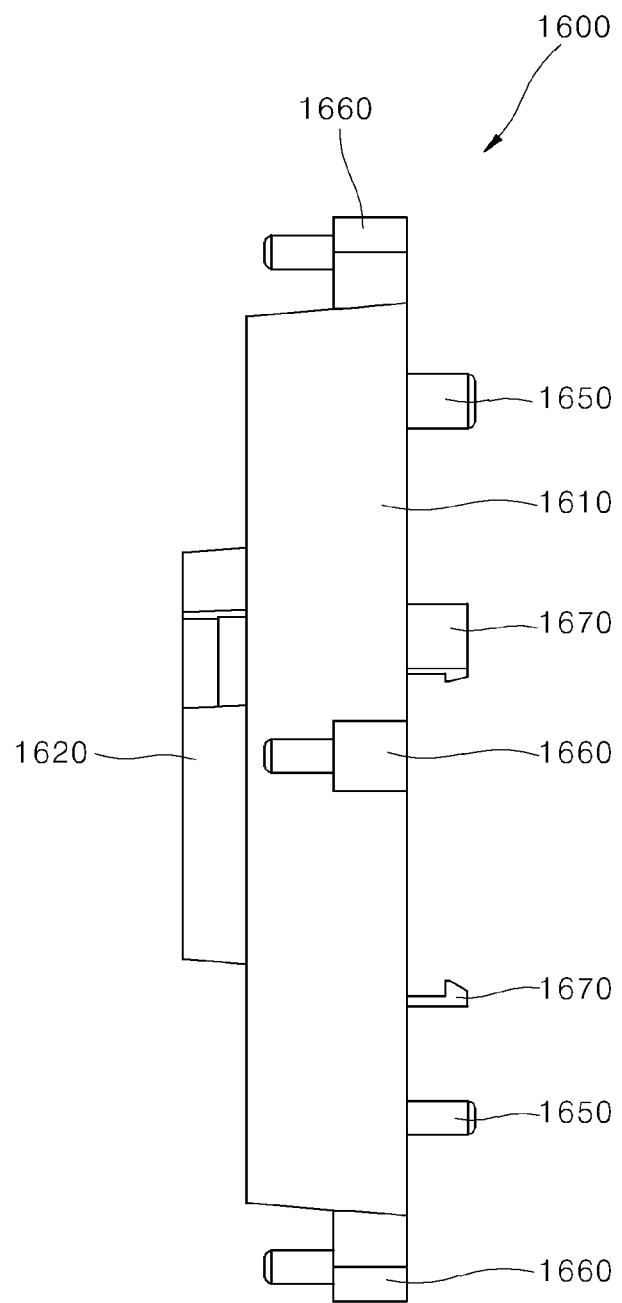
FIG. 17 is a side view showing the socket member in FIG. 15.
Figure 18:
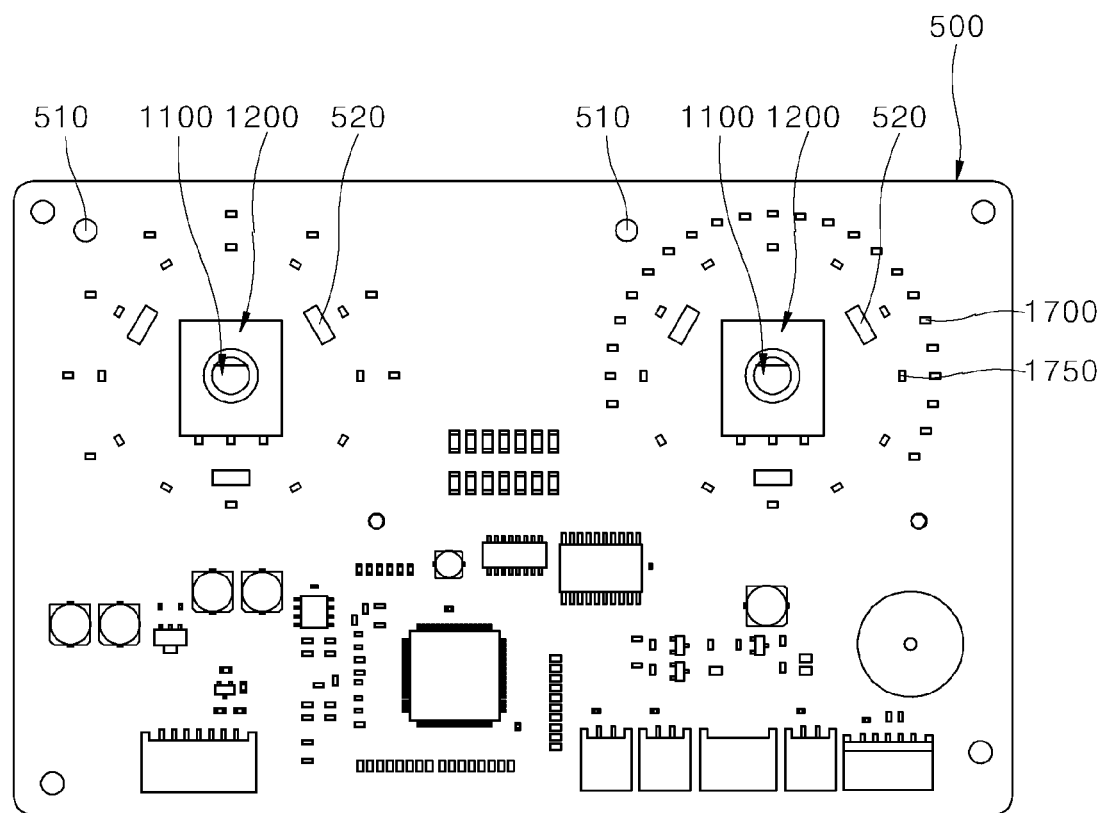
FIG. 18 is a front view schematically showing a configuration of the first control board in FIG. 14.
Figure 19:
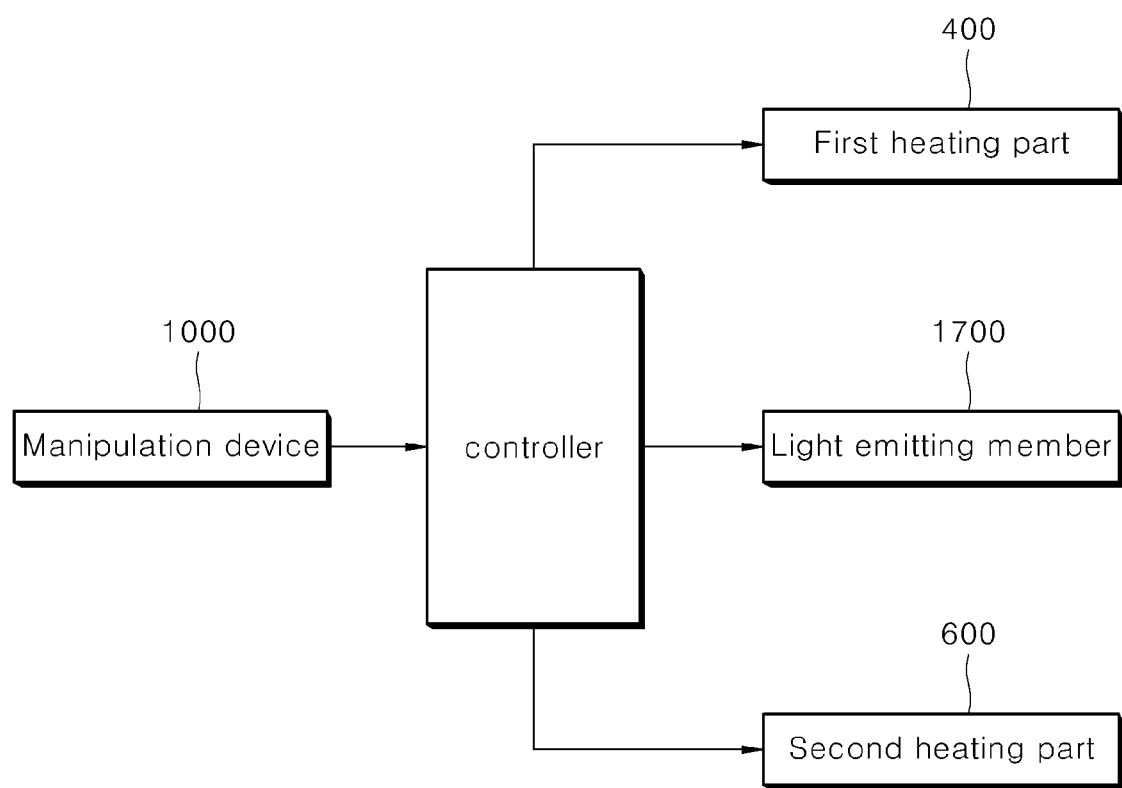
FIG. 19 is a block diagram schematically showing a configuration of the cooking appliance in one embodiment.

FIG. 15 is an exploded perspective view separately showing the socket member in FIG. 14, and FIG. 16 is a front view showing the socket member in FIG. 15. FIG. 17 is a side view showing the socket member in FIG. 15, FIG. 18 is a front view schematically showing a configuration of the first control board in FIG. 14, and FIG. 19 is a block diagram schematically showing a configuration of the cooking appliance in one embodiment.

Referring to FIGS. 14 to 19, the socket member 1600 may include an outer supporter 1610. The outer supporter 1610 may include a surface extending in the front-rear direction. In this embodiment, the outer supporter 1610 is formed into an approximately lying cylinder, for example. The outer supporter 1610 may be disposed outside the knob 1300 in a diameter direction of the knob, and at least a portion of the knob 1300 may be inserted into an area encircled by the outer supporter 1610.

The knob 1300 may be coupled to the outer supporter 1610 in a way that an end on a rear side of the knob 1300 contacts an inner circumferential surface of the outer supporter 1610. In this case, the end on the rear side of the knob 1300 may be coupled to the inner circumferential surface of the outer supporter 1610 in a slidable manner. Accordingly, the knob 1300 may be supported by the socket member 1600 in a rotatable manner and an axial movable manner.

The outer supporter 1610 may be provided with an inserting groove 1611 on the inner circumferential surface thereof, i.e., an inner surface thereof adjacent to the end on the rear side of the knob 1300. The inserting groove 1611 may be concavely formed on the inner circumferential surface of the outer supporter 1610 in a centrifugal direction. The end on the rear side of the knob 1300 may be inserted into the inserting groove 1611. Accordingly, the knob 1300 and the socket member 1600 may be coupled. Description in relation to this is provided hereunder.

Additionally, the socket member 1600 may further include an inner supporter 1620. The inner supporter 1620 may include a surface extending in the front-rear direction. In this embodiment, the inner supporter 1620 is formed into an approximately lying cylinder, for example. The inner supporter 1620 may be disposed inside the outer supporter 1610 in a diameter direction of the outer supporter 1610.

The inner supporter 1620 may be disposed between the encoder 1200 and the outer supporter 1610. The encoder 1200 may be inserted into an area encircled by the inner supporter 1620. That is, the inner supporter 1620 may be provided in a way theta the inner supporter 1620 encircles the encoder 1200 in the outer supporter 1610.

The socket member 1600 may further include a first connecting and supporting part 1630 that supports the outer supporter 1610 and the inner supporter 1620. The first connecting and supporting part 1630 may connect the outer supporter 1610 and the inner supporter 1620 and support the outer supporter 1610 and the inner supporter 1620.

The first connecting and supporting part 1630 may be disposed at rears of the outer supporter 1610 and the inner supporter 1620. The first connecting and supporting part 1630 may form a rear surface of the socket member 1600, and support the outer supporter 1610 and the inner supporter 1620 at the rears of the outer supporter 1610 and the inner supporter 1620.

In this embodiment, the socket member 1600 may be coupled to the first control board 500 installed in the door front surface part 350 while being installed in the door front surface part 350. In this case, the first connecting and supporting part 1630 forming the rear surface of the socket member 1600 may be a coupling surface in contact with the first control board 500 when the socket member 1600 is mounted onto the first control board 500.

The first connecting and supporting part 1630 may include a flange-shaped part 1631 and a rib-shaped part 1633. The flange-shaped part 1631 may protrude from the inner supporter 1620 in the centrifugal direction. The flange-shaped part 1631 may be formed into a flange that protrudes from the inner supporter 1620.

The rib-shaped part 1633 may connect the flange-shaped part 1631 and the outer supporter 1610. The rib-shaped part 1633 may be formed into a rib that protrudes from the flange-shaped part 1631 in the centrifugal direction, A plurality of rib-shaped parts 1633 may be radially disposed between the flange-shaped part 1631 and the outer supporter 1610. The rib-shaped parts 1633 formed as described above may effectively increase the entire strength of the socket member 1600 while suppressing an increase in the entire weight of the socket member 1600.

The inner supporter 1620 may be disposed at the rear of the shaft coupling part 1310 of the knob 1300. The inner supporter 1620 may support the shaft coupling part 1310 of the knob 1300, which moves rearward, from the rear to suppress an excessive movement of the knob 1300, thereby preventing an excessive load applied to the shaft 1100 and the encoder 1200.

Additionally, while the inner supporter 1620 may be supported by the first connecting and supporting part 1630, a certain degree of elasticity may be applied between the inner supporter 1620 and the first connecting and supporting part 1630.

In this embodiment, the socket member 1600 may be made of a plastic material, and the outer supporter 1610, the inner supporter 1620 and the first connecting and supporting part 1630 may be integrally formed.

A skirt-shaped part 1635 may connect between the flange-shaped part 1631 and the rib-shaped part 1633 of the first connecting and supporting part 1630. The skirt-shaped part 1635 may protrude rearward from an outer circumferential surface of the flange-shaped part 1631. Accordingly, the flange-shaped part 1631 and the rib-shaped part 1633 may connect in a "H" shape, and elasticity may be applied between the inner supporter 1620 and the first connecting and supporting part 1630 and between the outer supporter 1610 and the first connecting and supporting part 1630.

Thus, when the inner supporter 1620 is pressed rearward as a result of pressing the knob 1300, the inner supporter 1620 may stably suppress a rearward movement of the knob 1300 while elastically supporting the knob 1300. Further, the inner supporter 1620 may apply a force, needed to return the knob 1300 to a primary position, to the knob 1300 while the inner supporter 1620 returns to a primary state when the knob 1300 is released from a force of pressing the knob 1300.

The socket member 1600 may be provided with a light passing hole 1640. The light passing hole 1640 may be formed in a way that passes through the socket member 1600, specifically, the outer supporter 1610 in the front-rear direction. The light passing hole 1640 may be disposed at a position where the light passing hole 1640 and the light emitting member 1700 disposed on the first control board 500 overlap in the front-rear direction.

In this embodiment, a plurality of light emitting members 1700 may be disposed on the first control board 500. The light emitting member 1700 may be disposed at a position where the light emitting member 1700 and the outer supporter 1610 overlap in the front-rear direction while being disposed behind the outer supporter 1610. That is, the plurality of light emitting members 1700 may be disposed behind the outer supporter 1610 along a perimeter direction of the outer supporter 1610.

The outer supporter 1610 may be provided with a plurality of light passing holes 1640, and the plurality of light passing holes 1640 may be disposed at a position where the plurality of light passing holes 1640 and the plurality of light emitting members 1700 overlap in the front-rear direction. The light emitting members 1700 and the light passing holes 1640 may be arranged in a way that one light emitting member 1700 is inserted into one light passing hole 1640.

Accordingly, light emitted from each of the light emitting members 1700 may pass through the socket member 1600 through each of the light passing holes 1640 disposed in front of each of the light emitting members 1700 and may be emitted forward. That is, a path of movement of the light emitted by each of the light emitting members 1700 may be led by each of the light passing holes 1640 disposed in front of each of the light emitting members 1700. Accordingly, a brightened light emitting member 1700 of the plurality of light emitting members 1700 may be surely ascertained outside the manipulation device 1000.

Additionally, the socket member 1600 may further include a first coupling part 1420. The first coupling part 1420 may include a first protruding projection 1651 and a first coupling projection 1653. The first protruding projection 1651 may protrude from the outer supporter 1610 in the centrifugal direction. The first coupling projection 1653 may protrude rearward from the first protruding projection 1651.

The first coupling projection 1653 may be fitted-coupled to a fitting hole 510 formed on the first control board 500, and accordingly, the socket member 1600 and the first control board 500 may be coupled.

A position of the first coupling part 1420 on the socket member 1600 may be determined considering the position of the light passing hole 1640 and the position of the light emitting member 1700. That is, when the first coupling projection 1653 is fitted-coupled to the fitting hole 510 of the first control board 500, the first coupling part 1420 may be preferably disposed at a position where the positions of the plurality of light passing holes 1640 and the positions of the plurality of light emitting members 1700 are aligned in the front-rear direction.

Thus, the first coupling part 1420 may guide the socket member 1600 on the first control board 500 to a position at which the socket member 1600 is installed. That is, the socket member 1600 may be guided to a predetermined position only by fitted-coupling the first coupling part 1420 to the first control board 500.

The socket member 1600 may further include a second coupling part 1660. The second coupling part 1660 may include a second protruding projection 1661 and a second coupling projection 1663. The second protruding projection 1661 may protrude from the outer supporter 1610 in the centrifugal direction. The second coupling projection 1663 may protrude from the second protruding projection 1661 forward.

The second coupling part 1660 may be provided for a coupling between a front surface cover member 1800 described below and the socket member 1600. The second protruding projection 1661 may be fitted-coupled to the front surface cover member 1800. Accordingly, the front surface cover member 1800 and the socket member 1600 may be coupled.

The socket member 1600 may be provided with a plurality of first coupling parts 1420 and a plurality of second coupling parts 1660. In this embodiment, the socket member 1600 may be provided with two first coupling parts 1420 and four second coupling parts 1660, for example, but not limited. The number of the first coupling parts 1420 and the second coupling parts 1660 may increase or decrease when necessary.

Additionally, the socket member 1600 may further include a third coupling part 1670. The third coupling part 1670 may protrude from the first connecting and supporting part 1630, specifically, the flange-shaped part 1631 rearward. The third coupling part 1670 may be formed into a hook.

The third coupling part 1670 may be fitted-coupled to the first control board 500 through a fastening hole 520 formed on the first control board 500, and accordingly, the socket member 1600 may be fixed to the first control board 500.

The socket member 1600 may be provided with a plurality of third coupling parts 1670. The plurality of third coupling parts 1670 may be spaced a predetermined distance apart from each other along a perimeter direction of the flange-shaped part 1631. The plurality of third coupling parts 1670 disposed as described above may be coupled to the first control board 500 at a plurality of points, such that the socket member 1600 and the first control board 500 may be stably coupled.

[Structure of Knob]

Referring to FIGS. 12 to 14, the knob 1300 may be a component for the user to rotate for manipulation, and connect to the shaft 1100 through the shaft coupling part 1310. The knob 1300 may further include a skirt part 1320.

The skirt part 1320 may be disposed outside the shaft coupling part 1310 in the diameter direction. The skirt part 1320 may include a surface extending in the front-rear direction. In this embodiment, the skirt part 1320 is formed in to a cylinder having a hollow hole. The knob 1300 including the shaft coupling part 1310 and the skirt part 1320 may be formed in a way that the shaft coupling part 1310 and the skirt part 1320 form a concentric circle.

The knob 1300 may further include a second connecting and supporting part 1330. The second connecting and supporting part 1330 may be disposed at the rear of the shaft coupling part 1310 and formed into a circular plate connecting between the shaft coupling part 1310 and the skirt part 1320 from the rear of the shaft coupling part 1310.

The second connecting and supporting part 1330 formed as described above may enable the shaft coupling part 1310 and the skirt part 1320 to connect to each other, and support the skirt part 1320 such that the skirt part 1320 is not dent in a radial direction.

The second connecting and supporting part 1330 may be disposed near the front of the inner supporter 1620 included in the socket member 1600, and when the knob 1300 moves rearward, may be a portion pressing the inner supporter 1620 rearward.

The manipulation device 1000 in this embodiment may further include a knob cover 1350. The knob cover 1350 may be formed into a cylinder having a rear open. The knob cover 1350 may be coupled to an outer circumferential surface of the skirt part 1320 and encircle the knob 1300 from the outside in the diameter direction.

In this embodiment, a coupling groove 1321 may be formed on the outer circumferential surface of the skirt part 1320. The coupling groove 1321 may be concave from the outer circumferential surface of the skirt part 1320 in the radial direction. The knob cover 1350 may be mounted onto the skirt part 1320 in a state of being inserted into the coupling groove 1321.

In this case, the knob cover 1350 may be disposed at the knob 1300 in a way that the knob cover 1350 is not exposed from the skirt part 1320 in the centrifugal direction. That is, the knob cover 1350 may be formed at the skirt part 1320 in a way that the knob cover 1350 forms the same flat surface as a centrifuge-wise outer most surface of the skirt part 1320 adjacent to the knob cover 1350.

The knob cover 1350 may include a front surface part 1360 and a lateral surface part 1370. The front surface part 1360 may include a surface crossing a shaft extending in the front-rear direction.

A front surface of the front surface part 1360 may be disposed at the same height as the front surface of the door front surface part 350. A rear surface of the front surface part 1360 may contact ends on front sides of the shaft coupling part 1310 and the skirt part 1320 when the knob cover 1350 is disposed at the knob 1300. As the rear surface of the front surface part 1360 contacts the ends on the front sides of the shaft coupling part 1310 and the skirt part 1320, a front-rear position of the knob cover 1350 disposed at the knob 1300 may be guided.

The knob cover 1350 may be a portion held by the user's hand to manipulate the knob 1300 and forming an exterior of the knob 1300. Accordingly, the knob cover 1350 needs to be made of a material appropriate for the user to hold and manipulate the knob and needs to provide aesthetic qualities.

In this embodiment, an outer circumferential surface of the lateral surface part 1370, forming an exterior of the lateral surface of the knob cover 1350, may be disposed at the same height as the outer circumferential surface of the skirt part 1320, which is not covered by the knob cover 1350. Additionally, the front surface of the front surface part 1360, forming an exterior of the front surface of the knob cover 1350, may be disposed at the same height as a front surface of a pressing part 1410 of a button 1400.

Thus, the manipulation device 1000 in this embodiment may have a simple and smooth exterior since the manipulation device 1000 itself has no portion protruding convexly or being dent concavely, thereby ensuring aesthetic qualities that can improve the user's satisfaction.

[Structure of Front Surface Cover Member]

The manipulation device 1000 in this embodiment may further include a front surface cover member 1800. The front surface cover member 1800 may be disposed outside the knob 1300 in the diameter direction of the knob 1300. Additionally, the front surface cover member 1800 may be disposed in front of the door front surface part 1360 to be exposed to the front of the door 300.

The front surface cover member 1800 may be disposed outside the knob 1300 in the diameter direction of the knob 1300 in a way that encircles the knob 1300 from the outside in the diameter direction thereof. In this embodiment, the front surface cover member 1800 is formed into a ring that encircles the knob 1300 from the outside in the diameter direction, for example.

The front surface cover member 1800 may be disposed at the front of the socket member 1600, and coupled to the front of the socket member 1600. The front surface cover member 1800 may shield the socket member 1600, specifically, an outer support portion 1610 at the front of the socket member 1600.

The front surface cover member 1800, formed into a ring, may have a shape corresponding to a shape of the outer support portion 1610 seen from the front. The front surface cover member 1800 may be coupled to the socket member 1600 and cover the outer support portion 1610 from the front. Accordingly, a front of the light passing hole 1640 formed in the outer support portion 1610 may be shielded by the front surface cover member 1800, such that the light passing hole 1640 and the light emitting member 1700 at the rear of the light passing hole 1640 may be covered by the front surface cover member 1800 and not be seen from the outside.

Additionally, the front surface cover member 1800 may be made of a light transmitting material or a semi-light transmitting material. In this embodiment, the front surface cover member 1800 is made of a semi-light transmitting material having metal texture, for example. The front surface cove member 1800 may prevent the socket member 1600, the light passing hole 1640 formed at the socket member 1600, and the light emitting member 1700 from being exposed to the outside, and may allow light emitted from the light emitting member 1700 to have a softly diffused glow.

That is, the front surface cover member 1800 may be used as a finishing material that covers a portion, which would otherwise be exposed to the outside of the door 300 and deteriorate an aesthetic quality, to provide an aesthetic quality, may have metal texture to make the finishing portion look more exquisite, and may allow light shining through the portion to have a softly diffused glow.

The front surface cover member 1800 may provide an aesthetic quality to the manipulation device 1000 and the area around the manipulation device, and may make a display light of the manipulation device 1000 look more soft and beautiful.

Each of the light emitting members 1700 may be lit in association with a rotation of the shaft 1100.

In an example, as a result of rotation of the shaft 1100, a light emitting member 1700 in response to the rotation may be lit, and when the shaft 1100 continues to rotate, another light emitting member 1700 in response to the rotation may be lit.

The rotation of the shaft 1100 may be detected by the encoder 1200. Information on the rotation of the shaft 1100, obtained by the encoder 1200, may be generated as a manipulation signal, and a controller on the first control board 500 may receive the information and control the turn-on of the light emitting member 1700.

The front surface cover member 1800 and the socket member 1600 may be fitted-coupled. To this end, the front surface cover member 1800 may be provided with a coupling boss 1810. The coupling boss 1810 may protrude from the front surface cover member 1800 rearward.

The second coupling part 1660, specifically, the second protruding projection 1661 of the socket member 1600 may be fitted-coupled to the coupling boss 1810. Based on the coupling between the coupling boss 1810 and the second coupling part 1660, the front surface cover member 1800 and the socket member 1600 may be coupled.

The front surface cover member 1800 may be provided with a plurality of coupling bosses 1810. In this case, the number and positions of the coupling bosses 1810 may be determined to correspond to the number and positions of the second coupling parts 1660.

The socked member 1600, coupled to the front surface cover member 1800, may be provided with an inserting groove 1611. The inserting groove 1611 may be concavely formed on the inner circumferential surface of the outer supporter 1610 in the centrifugal direction.

In response, the knob 1300 may be provided with a projection 1340. The projection 1340 may protrude from the end of the rear side of the skirt part 1320 in the centrifugal direction. The projection 134, formed as described above, may be inserted into the inserting groove 1611, and thus, may be coupled to the inner circumferential surface of the outer supporter 1610 in a slidable manner.

In this embodiment, the inserting groove 1611 may be open toward the inside and the front of the socket member 1600. Additionally, the front surface cover member 1800 may be disposed at the front of the socket member 1600 and shield the open front of the inserting groove 1611. The projection 1340 may be inserted into a space encircled by the inserting groove 1611 and the front surface cover member 1800.

The projection 1340 may be inserted into the inserting groove 1611 through the open front of the inserting groove 1611, and the knob 1300 may be disposed at the socket member 1600 in a way that the knob can move in the front-rear direction. Additionally, the front surface cover member 1800 may be disposed at the front of the socket member 1600 at which the knob 1300 is disposed such that the knob 1300 is prevented from moving forward and from escaping.

[Structure of Hinge Assembly]

Referring to FIG. 3, the hinge assembly 800 may be disposed respectively in both lateral portions of the housing 100. In other words, the hinge assembly 800 may be disposed respectively on both sides of the housing 100 in the left-right direction thereof such that the hinge assembly 800 is disposed respectively on both outer sides of the tray 200 in the left-right direction thereof. The rear side of the door upper surface part 310 may be swivably coupled to the hinge assembly 800 being respectively disposed in both lateral portions of the housing 100.

That is, the left edge and right edge portions at the rear side of the door upper surface part 310 are swivably coupled respectively to the hinge assembly 800 being respectively disposed in both of the lateral portions of the hosing 100. The door 300 opens and closes the upper surface and the front surface of the housing 100, swiveling in the up-down direction with respect to the rear side of the door upper surface part 310, which is swivably coupled to the hinge assembly 800 as described above.

Each hinge assembly 800 may include a hinge case 830, a hinge part 810 and a holding projection 820.

The hinge case 830 forms the exterior of the hinge assembly 800. Additionally, the hinge case 830 may accommodate a portion of the hinge part 810. In the hinge case 830, various types of structures for supporting the hinge part 810, a cooling channel 850 (see FIG. 53) described below and the like may be formed.

The hinge part 810 may be installed in the hinge case 830 in a way that the hinge part 810 changes its position. The hinge part 810 may be installed in the hinge case 830 in a way that the hinge part 810 can swivel along a trajectory corresponding to a swivel trajectory of the door 300. The upper end of the hinge part 810 may be coupled to the door 300. The hinge part 810 being coupled to the door 300 as described above may change its posture by interlocking with the swivel of the door 300. The swivel trajectory and range of the door 300 being coupled to the hinge part 810 may be guided by the hinge part 810.

[Structure for Suppressing Fall of Cooking Appliance]

The cooking appliance of the present embodiment includes various forms of configurations for preventing the cooking appliance from falling over.

Hereinafter, configurations for preventing the cooking appliance from falling over when the door 300 is opened will be described in detail.

Figure 20:
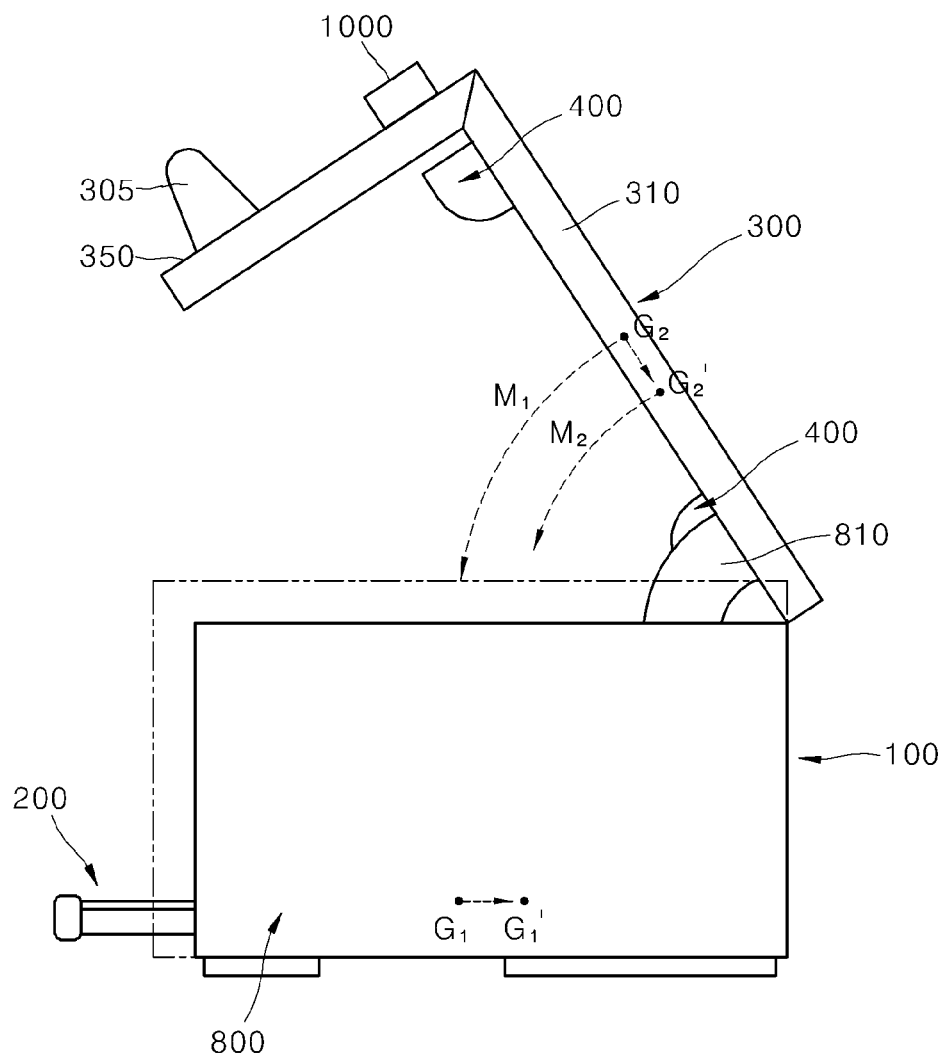
FIG. 20 is a view showing a change in center of gravity in a state in which a door of a cooking appliance is open.

FIG. 20 is a view illustrating a center-of-mass change state in the door-opened state of the cooking appliance.

Referring to FIG. 3 and to 20, the hinge part 810 is disposed at both the lateral surfaces 120 and 130 of the housing 100 in such a way that the hinge part 810 is disposed at sides adjacent to the rear surface 140 of the housing 100. That is, the hinge part 810 is disposed at the rear of both sides of the housing 100.

The hinge part 810 is coupled to the door 300 in such a way that the hinge part 810 is coupled to the rear side of the door upper surface part 310. That is, the hinge part 810 is coupled to the rear of each sides of the door upper surface part 310, and the door 300 may open or close the cooking space 105 by rotating in the up-down direction about the rear side of the door upper surface part 310 coupled to the hinge part 810 as described above.

The door 300 may rotate about the rear side of the door upper surface part 310 such that, in a state in which the front surface and the upper surface of the housing 100 are opened (hereinafter referred to as "opened state"), the door 300 is located further behind than in a state in which the front surface and the upper surface of the housing 100 are closed (hereinafter referred to as "closed state").

By the door 300 rotating about the rear side of the door upper surface part 310 as described above, the position of the door 300 may be further biased toward the rear in the opened state than in the closed state.

The door 300 whose position is relatively further biased toward the rear in the opened state as described above may cause the center of gravity of the cooking appliance to be biased toward the rear from the center of the cooking appliance in the front-rear direction when the door 300 is in the opened state.

That is, the first configuration provided for preventing the cooking appliance from falling over when the door 300 is opened is allowing the door 300 to rotate about the rear side of the door upper surface part 310. Accordingly, the position of the door 300 may be further biased toward the rear in the opened state than in the closed state, and, in this way, the center of gravity of the cooking appliance may be formed to be biased toward the rear from the center of the cooking appliance in the front-rear direction ($G_1 \rightarrow G_1'$) when the door 300 is in the opened state.

Meanwhile, when looking at the configuration of the door 300 itself, the door 300 is provided in which the up-down length of the door front surface part 350 is shorter than the front-rear length of the door upper surface part 310. That is, when the door 300 is in the closed state, the up-down length of the door front surface part 350 is shorter than the front-rear length of the door upper surface part 310.

Accordingly, in the door 300, the proportion occupied by the volume of the door upper surface part 310 is larger than the proportion occupied by the volume of the door front surface part 350. Accordingly, in the total weight of the door 300, the proportion occupied by the weight of the door upper surface part 310 is larger than the proportion occupied by the weight of the door front surface part 350. Accordingly, the center of gravity of the door 300 may be placed more eccentrically to the rear than to the front-rear center of the door 300 ($G_2 \rightarrow G_2'$).

When the door 300 is rotated rearward to be opened, the center of gravity of the door 300 gradually moves rearward. In the door 300, the door front surface part 350 is disposed at the front side, and the door upper surface part 310 is disposed behind the door front surface part 350.

Accordingly, the larger the proportion occupied by the weight of the door upper surface part 310 with respect to the total weight of the door 300, the greater the extent to which the center of gravity of the door 300 moves rearward when the door 300 rotates rearward.

In other words, the greater the proportion occupied by the weight of the door upper surface part 310 with respect to the total weight of the door 300, the easier it is for the center of gravity of the door 300 to promptly move rearward when the door 300 rotates rearward. Since the center of gravity of the door 300 moves to the rear, the center of gravity of the cooking appliance may entirely move to the rear more rapidly.

That is, the second configuration provided for preventing the cooking appliance from falling over when the door 300 is opened is providing the door 300 in which the up-down length of the door front surface part 350 is shorter than the front-rear length of the door upper surface part 310. Accordingly, when the door 300 rotates rearward, the center of gravity of the door 300, and thus the center of gravity of the cooking appliance may move further rearward more promptly.

Meanwhile, the first heating part 400 and the see-through window W are provided in the door 300, and the first heating part 400 and the see-through window W are disposed in the door upper surface part 310.

As described above, the see-through window W may include a pair of glasses 330 and 335 (see FIG. 11). Generally, glasses are formed of a heavyweight material. Therefore, when the see-through window W formed of glass is disposed in the door upper surface part 310, the weight of the door upper surface part 310 is inevitably increased as much as the weight of the see-through window W.

Furthermore, the see-through window W of the present embodiment may include a pair of glasses 330 and 335, i.e., two layers of glasses. Therefore, the weight of the door upper surface part 310 is inevitably increased as much as the weight of the see-through window W.

Since the see-through window W is disposed in the door upper surface part 310 as described above, the proportion occupied by the weight of the door upper surface part 310 with respect to the total weight of the door 300 is increased as much as the weight of the glasses forming the see-through window W.

Accordingly, when the door 300 rotates rearward, the center of gravity of the door 300, and thus the center of gravity of the cooking appliance may more promptly move further rearward as much as the increase in the weight of the door upper surface part 310 due to the see-through window W.

Further, the pair of first heating parts 400 are disposed at the bottom surface side of the door upper surface part 310. In this case, the first heating part 400 is disposed at each of the front outer side and the rear outer side of the see-through window W. One of the pair of first heating parts 400 is disposed at the rear side of the door upper surface part 310 adjacent to the hinge part 810.

Since the first heating part 400 is disposed in the door upper surface part 310 as described above, the proportion occupied by the weight of the door upper surface part 310 with respect to the total weight of the door 300 is further increased as much as the weight of the first heating part 400.

Accordingly, when the door 300 rotates rearward, the center of gravity of the door 300, and thus the center of gravity of the cooking appliance may more promptly move further rearward as much as the increase in the weight of the door upper surface part 310 due to the first heating part 400.

Furthermore, due to the first heating part 400 disposed at the rear side of the door upper surface part 310 adjacent to the hinge part 810, the center of gravity of the door 300 may move further rearward. In this way, when the door 300 rotates rearward, the center of gravity of the door 300, and thus the center of gravity of the cooking appliance may more promptly move further rearward.

That is, the third configuration provided for preventing the cooking appliance from falling over when the door 300 is opened is placing the first heating part 400 and the see-through window W in the door upper surface part 310. Accordingly, when the door 300 rotates rearward, the center of gravity of the door 300 may more promptly move further rearward.

In summary, the door 300 of the present embodiment is provided in which the position of the door 300 moves rearward when the door 300 rotates rearward, the up-down length of the door front surface part 350 is shorter than the front-rear length of the door upper surface part 310, and the first heating part 400 and the see-through window W are disposed in the door upper surface part 310.

The door 300 is provided so that, when the cooking space 105 is opened and the tray 200 is withdrawn forward as a result, the door 300 itself is moved toward the rear of the cooking appliance, and the center of gravity of the door 300 promptly moves rearward according to the rearward rotation of the door 300.

Since the door 300 provided as described above causes the center of gravity of the cooking appliance to be biased toward the rear from the center in the front-rear direction when the cooking space 105 is opened and the tray 200 is withdrawn forward as a result, the door 300 may contribute to significantly lowering the risk of the occurrence of the cooking appliance's falling over.

Meanwhile, the door 300 rotates about the rear side of the door upper surface part 310 coupled to the hinge part 810. When the door 300 is in the opened state, most of the load of the door 300 acts toward the hinge part 810.

Since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of gravity of the cooking appliance moves toward the rear side of the cooking appliance to the extent that most of the load of the door 300 is concentrated on the rear side of the cooking appliance.

In other words, when the door 300 is in the opened state, in addition to the influence of the change in the position of the door 300 itself and the change in the center of gravity of the door 300 itself, an additional influence is caused by most of the load of the door 300 being concentrated on the rear side of the cooking appliance. In this way, the center of gravity of the cooking appliance may be further biased toward the rear side.

That is, the fourth configuration provided for preventing the cooking appliance from falling over when the door 300 is opened is a configuration in which a coupling point between the door 300 and the hinge part 810 is disposed at the rear side of the cooking appliance so that an additional influence is caused by most of the load of the door 300 being concentrated on the rear side of the cooking appliance.

The size of the moment acting from the door 300 may be determined by a force acting on the door 300 and a distance between a position on which the force acts and a rotation shaft (portion where the door and the hinge part are coupled to each other). In this case, only gravity acts on the door 300 unless a separate force is applied thereto. Since gravity acts on the entire part of the door 300, it can be seen that gravity acts on the center of gravity of the door 300. Therefore, the moment increases ($M_1$) as the center of gravity of the door 300 moves away from the portion where the door 300 and the hinge part 810 are coupled to each other and decreases ($M_2$) as the center of gravity of the door 300 approaches the portion where the door 300 and the hinge part 810 are coupled to each other.

In this embodiment, as the door 300 rotates rearward to open the cooking space 105, the center of gravity of the door 300 also moves rearward, and, as a result, the size of the moment acting from the door 300 may be decreased together ($M_1 \rightarrow M_2$).

That is, when the door 300 is in the opened state, the moment acting from the door 300 may relatively decrease.

In this way, since the cooking appliance of the present embodiment allows the size of the moment acting on the cooking appliance due to the door 300 to be decreased, the risk of the cooking appliance's falling over may be significantly lowered.

That is, the fifth configuration provided for preventing the cooking appliance from falling over when the door 300 is opened is a configuration in which the center of gravity of the door 300 is allowed to be more biased toward the rear so that the size of the moment acting on the cooking appliance due to the door 300 is decreased.

[Disposition Structure of Components of Door]

In this embodiment, the manipulation device 1000 and the first control board 500 may be disposed in the door front surface part 350, and the see-through window W and the first heating part 400 may be disposed in the door upper surface part 350.

The above disposition structure is designed to improve the convenience and safety of the cooking appliance as much as possible rather than selected in an arbitrary manner.

Accordingly, the manipulation device 1000 may be disposed in the door front surface part 350 rather than the door upper surface part 310. The see-through window W may be disposed in the door upper surface part 310. Since the see-through window W takes up most of the area of the door upper surface part 310, there is not enough space for the manipulation device 1000 in the door upper surface part 310.

Considering most of the area of the door upper surface part 310 is covered by the glass 330, there is not enough space for the manipulation device 1000 in the door upper surface part 310.

The first heating part 400 may be disposed in the door upper surface part 310 in addition to the see-through window W. The first heating part 400 may be a heat-generating component that generates high-temperature heat, and most of the area of the door upper surface part 310 may be covered with the glass 330 to suppress an increase in the temperature of an outer surface of the door upper surface part contacted by the user.

Since the glass 330 has a thermal conductivity lower than that of a metallic material forming the skeleton of the exterior of the door 300, when most of the area of the upper surface of the door upper surface part 310 is covered with the glass 330, an increase in the temperature of the outer surface of the door upper surface part 310 contacted by the user, which is caused by heat generated by the first heating part 400 and the like, may be suppressed as much as possible.

Even if the glass 330 only covers the see-through widow W instead of covering most of the area of the door upper surface part 310, the manipulation device 1000 may be limitedly installed in the outer area of the see-through window W in the direction of the flat surface of the see-through window W.

However, when the manipulation device 1000 is installed in the outer area, the manipulation device 1000 may be exposed to high-temperature heat since the outer area is right above the first heating part 400.

The manipulation device 1000, installed in such an environment, may adversely affect each of the manipulation switches constituting the manipulation device 1000, a cable electrically connected to each of the manipulation switches or various types of electronic components.

Additionally, the temperature of the door upper surface part 310 may be higher than that of the door front surface part 350 due to the feature in which heat goes up. Further, considering that the first heating part 400 is disposed in the door upper surface part 310, the temperature of most of the area of the door upper surface part 310 may be higher than that of the door front surface part 350.

In this case, the manipulation device 1000, disposed in the door upper surface part 310, may adversely affect the manipulation device 1000 itself, and may cause burns of the user who contacts the door upper surface part 310 during the user's manipulation.

The first heating part 400 may be disposed in the door upper surface part 310. Specifically, the first heating part 400 may be disposed in the upper portion to face the second heating part 600 with the tray 200 between the first heating part 400 and the second heating part 600. When the first heating part 400 is disposed over the tray 200, the first heating part may evenly heat a food item on the tray 200 from above. To this end, the first heating part 400 needs to be disposed in the door upper surface part 310.

When the see-through window W is disposed in the upper portion of the cooking appliance, the user may look into the cooking space 105 from above through the see-through window W formed in the upper portion of the cooking appliance. Accordingly, the user may check the state in which the food item is cooked conveniently and readily with no need to bend the user's knees or lean forward. To this end, the see-through window W needs to be disposed in the door upper surface part 310.

That is, considering various factors, the first heating part 400 and the see-through window 400 may be preferably disposed in the door upper surface part 310, and thus, most of the area of the door upper surface part 310 may be occupied by the first heating part 400 and the see-through window 400.

Accordingly, the manipulation device 1000 may be disposed in the door front surface part 350 rather than the door upper surface part 310. The user ordinarily uses the cooking appliance in the state in which the user faces the cooking appliance. When the manipulation device 1000 is disposed in the door front surface part 350 that is a surface facing the user, the user may recognize the manipulation device 1000 more readily and may manipulate the manipulation device 1000 more conveniently and readily.

Components of great volume may not be installed in the door front surface part 350 unlike the door upper surface part 310. That is, parts such as the see-through window 400 or the first heating part 400, which are heavy and have a large size, may not be installed in the door front surface part 350. Accordingly, the inside of the door front surface part 350 has a greater spared space than the door upper surface part 310 does.

The first control board 500 may be disposed in a space portion in the door front surface part 350. Advantages of the structure, in which the first control board 500 is installed in the door front surface part 350, are described as follows.

The first control board 500 may be provided with various components, circuits and the like in relation to receipt of a manipulation signal input through the manipulation device 1000, generation of a control signal for controlling operations of the first heating part 400 and the second heating part 600, and the like.

When the first control board 500 is installed in the door front surface part 350, the manipulation device 1000 and the first control board 500 may be very close to each other. The first control board 500 is a component that has to electrically connect to the manipulation device 1000 to receive a manipulation signal input through the manipulation device 1000.

When the first control board 500 is disposed very close to the manipulation device 1000, the first control board 500 and the manipulation device 1000 may electrically connect effectively and readily. In this embodiment, the manipulation device 1000 may electrically connect to the first control board 500 in a way that the manipulation device 1000 is directly mounted onto the first control board 500. Accordingly, the manipulation device 1000 and the first control board 500 may connect to each other efficiently.

Additionally, the first control board 500 installed in the door front surface part 350 may also be disposed very close to the first heating part 400. Accordingly, the first heating part 400 and the first control board 500 may electrically connect to each other efficiently and readily.

When the manipulation device 1000 is disposed in the door front surface part 500 as illustrated in this embodiment, the size, number, position and the like of the manipulation device 1000 may be freely designed since the manipulation device 1000 is disposed in the portion that has a greater space than that of the door upper surface part 310 which does not have enough space for installing the manipulation device 1000, and the manipulation device 1000 may be less affected by high-temperature, thereby ensuring improvement in the reliability in the operation and use of the cooking appliance and electrically connecting the manipulation device 1000 and the first control board 500 and the first heating part 400 efficiently and readily.

When the see-through window W and the first heating part 400 are disposed in the door upper surface part 310 and the manipulation device 1000 and the first control board 500 are disposed in the door front surface part 350, as described above, relatively heavy parts may be disposed in the door upper surface part 310, and relatively lightweight parts may be disposed in the door front surface part 350.

That is, the relatively heavy see-through window W and first heating part 400 may be disposed in the door upper surface part 310, and the relatively lightweight manipulation device 1000 and first control board 500 may be disposed in the door front surface part 350. Accordingly, the door upper surface part 310 may be heavier than the door front surface part 350, and the center of gravity of the door 300 may shift to the rear side of the door 300.

Further, in the door 300, the up-down length of the door front surface part 350 may be less than the front-rear length of the door upper surface part 310. Accordingly, the center of gravity of the door 300 may shift to the rear side of the door 300 definitely.

Additionally, when the door 300 is open, most of the load of the door 300 may be applied intensively to the rear side of the cooking appliance since the hinge part 810 is disposed on the rear side of the cooking appliance.

Accordingly, in the state in which the door 300 is open, the center of gravity of the cooking appliance may shift to the rear side of the cooking appliance as much as the load of the door 300 intensively applied to the rear side of the cooking appliance.

Thus, even when the door is opened, it is unlikely that the center of gravity of the cooking appliance shifts forward, the cooking appliance may be prevented from falling, thereby ensuring improvement in safety and usability of the cooking appliance.

In this embodiment, the manipulation device 1000 may be disposed at the door 300 rather than in the housing 100, as described above.

In this embodiment, the door 300 may include a door upper surface part 310 disposed on the upper side thereof and the door front surface part 350 disposed on the front side thereof. Additionally, the see-through window W, which is a component taking up most of the area of the door in a cooking appliance of the related art, may be disposed in the door upper surface part 310. Accordingly, the door front surface part 350 may have enough space for installing the manipulation device 100.

Additionally, since components such as the see-through window W and the first heating part 400 may not be disposed in the door front surface part 350, an enough space portion for installing the first control board 500, a component that needs to be disposed close to the manipulation device 1000, may be formed in the door front surface part 350.

The cooking appliance in this embodiment may create an environment in which the manipulation device 1000 is disposed at the door 300, and accordingly, the manipulation device 1000 may be efficiently disposed at the door 300.

Since the manipulation device 1000 and the first control board 500 are disposed at the door 300 as described above, the first heating part 400, the manipulation device 1000 and the first control board 500 disposed at the door 300 may electrically connect to one another more efficiently.

That is, the electric connection among the first heating part 400, the manipulation device 1000 and the first control board 500 may be done in the door 300, and the length of wires for the electric connection may decrease. Thus, the wiring may be simplified and the wires may tidy up, and the wiring may be done in the door 300 such that wires are not exposed outward.

Further, when the manipulation device 1000 is disposed at the door 300 as in this embodiment, a space for installing the manipulation device 1000 and the first control board 500 may not be prepared in the housing 100.

As a result, the housing 100 may be designed to have a size and shape based on the size of the cooking space 105 and the size of the door 300 without considering a space for installing the manipulation device 1000 and the first control board 500.

Thus, the housing 100 may be scaled down by the space for installing the manipulation device 1000 and the first control board 500, and the door 300 may be scaled up by the size of the hosing 100.

The cooking appliance in this embodiment may have an entrance large enough for the tray 200 and a food item to come in and out while the housing 100 is scaled down, thereby ensuring a compact exterior and improvement in the usability of the cooking appliance.

[Structure in Door Front Surface Part]

Figure 21:
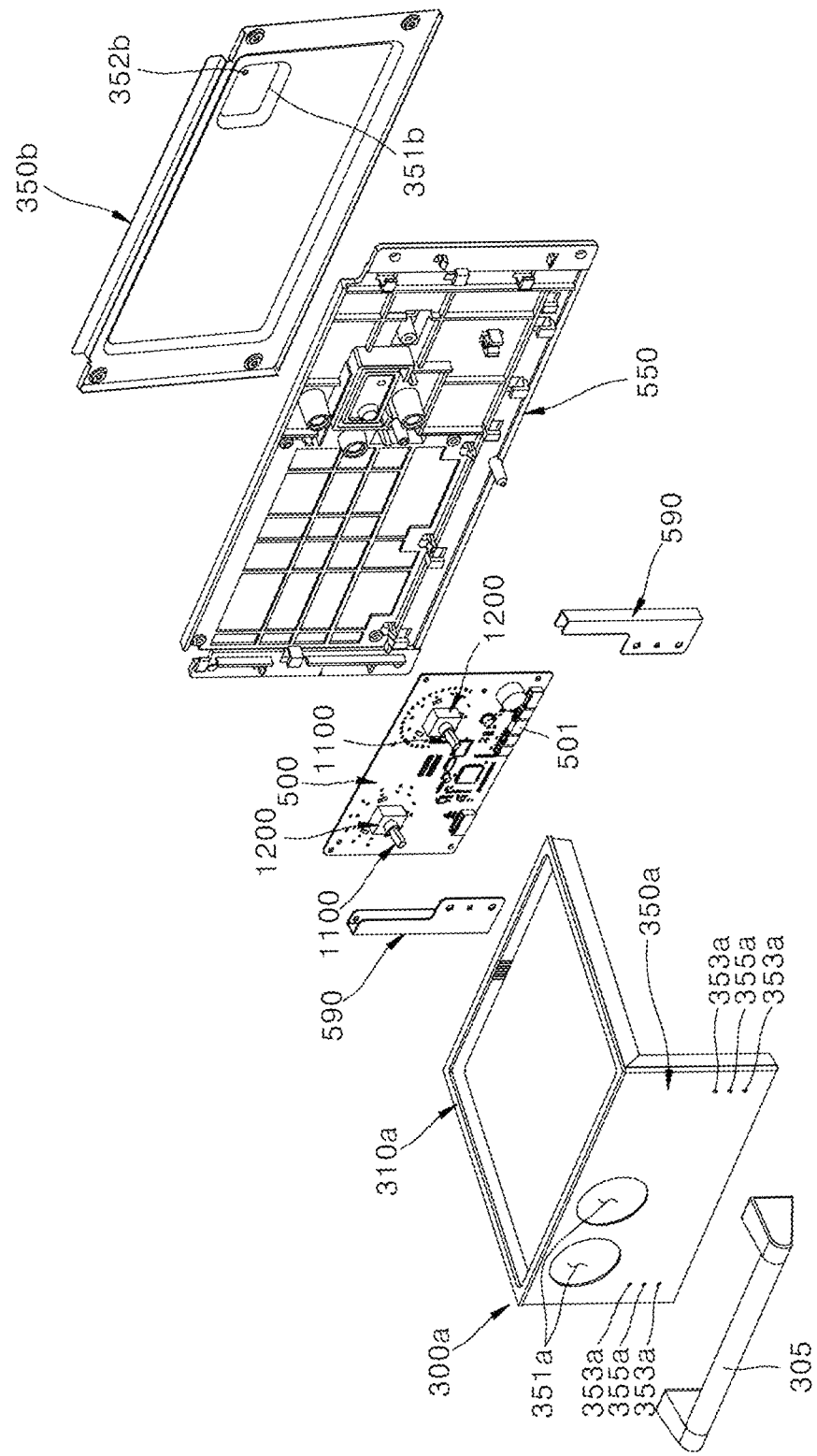
FIG. 21 is a perspective view separately showing components constituting a door front surface part.

FIG. 21 is a perspective view separately showing components constituting a door front surface part.

In FIG. 21, the first cooling fan is excluded.

Referring to FIGS. 13 and 21, the door 300 may include a door main body part 300*a*. The door main body part 300*a* may form the exterior of the door 300. The door main body part 300*a* may be formed in a way that a portion forming the exterior of the door upper surface part 310 and a portion forming the exterior of the door front surface part 350 integrally connect to each other in an L-shape. Hereunder, the portion of the door main body part 300*a*, forming the exterior of the door upper surface part 310, is referred to as a first door main body part 310*a*, and the portion of the door main body part 300*a*, forming the exterior of the door front surface part 350, is referred to as a second door main body part 350*a*.

The door main body part 300*a* may be provided with an accommodating space therein. A supporting panel 550 described below, and electronic components such as the first control board 500, a temperature sensor 580 and the like disposed on the supporting panel and the like may be accommodate, in the accommodating space.

An accommodating space in the door main body part 300*a* may be open toward one side. An accommodating space formed in a first door main body part 310*a* of the door main body part 300*a* may be open toward a lower portion. Additionally, an accommodating space formed in a second door main body part 350*a* of the door main body part 300*a* may be open toward a rear.

A door rear surface cover 350*b* may cover one side open of the door main body part 300*a*. In this embodiment, the door rear surface cover 350*b* is disposed at a rear of the second door main body part 350*a*, for example. The door rear surface cover 350*b* may be disposed at the rear of the second door main body part 350*a* and cover the rear open of the second door main body part 350*a*.

Though described hereunder, the door rear surface cover 350*b* may be coupled to the door main body part 300*a* by a bracket 590. The door rear surface cover 350*b* coupled to the door main body part 300*a* may cover the rear open of the second door main body part 350*a* such that various electronic components accommodated in the second door main body part 350*a* are protected in a space encircled by the door main body part 300*a* and the door rear surface cover 350*b*.

The supporting panel 550 may be installed in the space encircled by the second door main body part 350*a* and the door rear surface cover 350*b*. That is, the supporting panel 550 may be disposed in the door front surface part 350. The supporting panel 550 may be coupled to any one of the door main body part 300*a* and the door rear surface cover 350*b* and fixed to an inside of the door main body part 300*a*.

For example, the supporting panel 550 may be coupled to the second door main body part 350*a* and the door rear surface cover 350*b* by a bracket 590. The supporting panel 550 coupled to the second door main body part 350*a* and the door rear surface cover 350*b* may be fixed to a position spaced a predetermined distance apart from the second door main body part 350*a* and the door rear surface cover 350*b*, specifically, a front surface of the second door main body part 350*a*. Description in relation this is provided hereunder.

The first control board 500 may be fixed to the supporting panel 550. That is, the first control board 500 may be fixed to the supporting panel 550 and fixed to an inside of the second door main body part 350*a*. The encoder 1200 and the shaft 110 may be disposed on the first control board 500, and the manipulation device 1000 may connect to the shaft 110.

A through hole 351*a*, which forms a passage needed to allow the manipulation device 1000 to connect to the shaft 110, may be formed at the second door main body part 350*a*. A portion of the manipulation device 1000 disposed on the front surface of the door 300 may be inserted into the second door main body part 350*a* through the through hole 351*a*.

[Structure of Supporting Panel—Area Regarding First Control Board]

Figure 22:
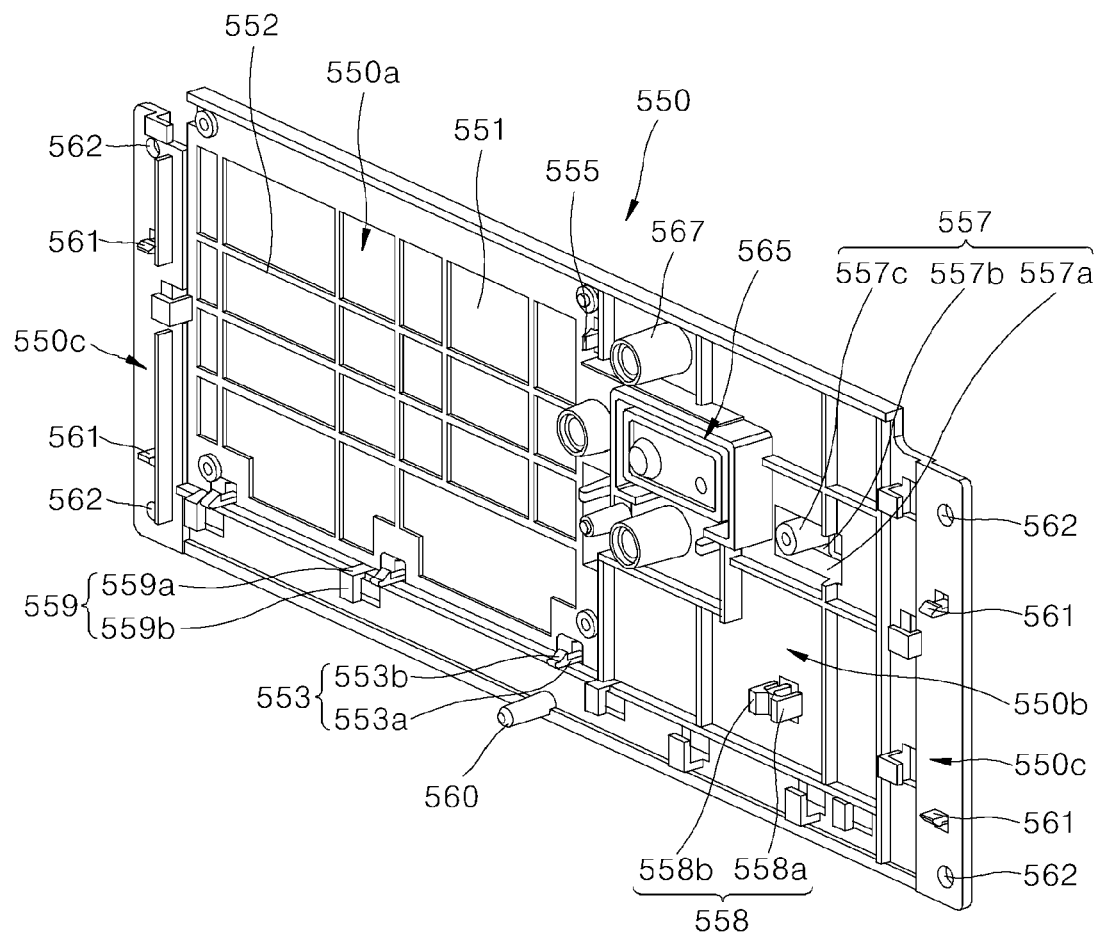
FIG. 22 is a front perspective view separately showing the supporting panel in FIG. 21.

FIG. 22 is a front perspective view separately showing the supporting panel in FIG. 21.

In FIG. 22, the first cooling fan is excluded.

Referring to FIGS. 13, 20 to 22, the supporting panel 550 may have a shape similar to a shape of the front surface of the second door main body part 350*a*. For example, a front surface of the second door main body part 350*a* may have a rectangular shape, and similarly, the supporting panel 550 may have a rectangular shape. The supporting panel 550 may include a main panel part 551 and a portion regulating part.

The main panel part 551 may form a skeleton of the supporting panel 550. The main panel part 551 may form a supporting surface that supports the first control board 500. In this embodiment, the main panel part 551 has a shape, e.g., a rectangular shape, similar to the shape of the front surface of the second door main body part 350*a*, for example.

The main panel part 551 may be made of a hard plastic material. The main panel part 551 may be made of a lightweight insulating material and have enough strength to support the first control board 500 and various electronic components disposed on the first control board.

The position regulating part may be disposed at the main panel part 551. The position regulating part may regulate a position of the first control board 500 supported by the main panel part 551 and may be provided as a structure protruding from the main panel part 551.

The position regulating part may include at least one of a lower portion supporting part 553, a lateral portion supporting part 555. In this embodiment, the position regulating part includes both of the lower portion supporting part 533 and the lateral portion supporting part 555, for example.

The lower portion supporting part 553 may be disposed in a lower portion of the first control board 500, and the lateral portion supporting part 555 may be disposed in a lateral portion of the first control board 500. In this embodiment, the supporting panel 550 may include a first area 550*a* and a second area 550*b*.

The first area 550*a* may be an area in which the first control board 500 is installed, and the second area 550*b* may be an area in which the first control board 500 is not installed. The lower portion supporting part 553 may be disposed in a lower portion of the first area 550*a* while being disposed in the second area 550*b*. The lateral portion supporting part 555 may be disposed in the lower portion of the first area 550*a* while being disposed in the second area 550*b*.

A position of the first control board 500 in the up-down direction and a lateral direction may be regulated by the lower portion supporting part 553 and the lateral portion supporting part 555. The position of the first control board 500 in the up-down direction may be regulated by the lower portion supporting part 553 in the lower portion of the first area 550*a*, and the position of the first control board 500 in the lateral direction may be regulated by the lateral portion supporting part 555 in a lateral portion of the first area 550*a*. Accordingly, the position at which the first control board 500 is disposed may be guided into the first area 550*a*.

At least one of the lower portion supporting part 553 and the lateral portion supporting part 555 may include a hook. The hook may include a body part 553*a* and a protruding part 553*b*. The body part 553*a* may be formed in a way that protrudes forward from the main panel part 551.

In this case, the body part 553*a* may be formed in a way that the body part 553*a* is elastically deformed in the lateral direction or the up-down direction. The protruding part 553*b* may protrude from a position spaced a predetermined distance apart from the main panel part 551 while protruding from the body part 553*a* toward the first control board 500.

In this embodiment, both of the lower portion supporting part 553 and the lateral portion supporting part 555 may include a hook, for example. A protruding part 553*b* of the hook included in the lower portion supporting part 553 may protrude upward from the body part 553*a*, and a protruding part 553*b* of the hook included in the lateral portion supporting part 555 may protrude laterally from the body part 553*a*.

In this case, each protruding part 553*b* may protrude from a position spaced apart from the main panel part 551 by a thickness of the first control board 500 while protruding from a position spaced a predetermined distance apart from the main panel part 551. A portion of the first control board 500 may be inserted into a space that is formed between the main panel part 551 and the protruding part 553*b* as a result of the protrusion of the protruding part 553*b*. That is, a lower end of the first control board 500 may be inserted into the lower portion supporting part 553, and a lateral end of the first control board 500 may be inserted into the lateral portion supporting part 555.

Accordingly, a front-rest position of the first control board 500 may be regulated by the lower portion supporting part 553 and the lateral portion supporting part 555. That is, a rear of the first control board 500 may be supported by the main panel part 551, and the front of the first control board 500 may be supported by the protruding part 553*b*. Thus, the front-rear position of the first control board 500 may be regulated.

In summary, the position of the first control board 500 in the lateral direction may be regulated by the lower portion supporting part 553 and the lateral portion supporting part 555, and the position of the first control board 500 in the front-rear direction may be regulated by the main panel part 551 and the protruding part 553*b*.

As a result, the first control board 500 may be exactly disposed in the first area 550*a*, i.e., at a position at which the first control board 500 is designed to seat, and may be stably fixed onto the supporting panel 550.

The lower portion supporting part 553 may include a plurality of hooks spaced a predetermined distance apart in a left-right direction. Accordingly, the lower portion of the first control board 500 may be supported by the lower portion supporting part 553 more stably, and the first control board 500 may be fixed onto the supporting panel 550 more stably.

The supporting panel 550 may further include a rib 552. The rib 552 may protrude forward from the main panel part 551 and be disposed between the main panel part 551 and the first control board 500. The rib 552 may be provided as a structure for improving rigidity of the supporting panel 550 structurally. Additionally, a predetermined gap may be formed between the first control board 500 and the main panel part 551 by the rib 552 such that the rib 552 serves as a passage needed to emit heat of the first control board 500.

[Structure of Supporting Panel—Area Regarding Electronic Component Except for First Control Board]

Figure 23:
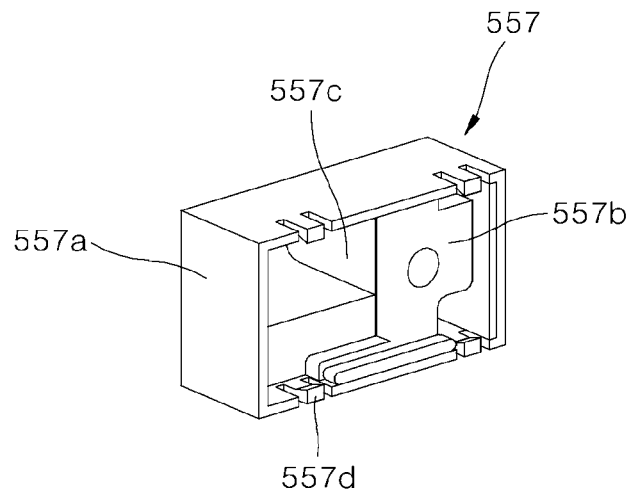
FIG. 23 is a rear perspective view showing a rear surface of the supporting panel in FIG. 22.
Figure 24:
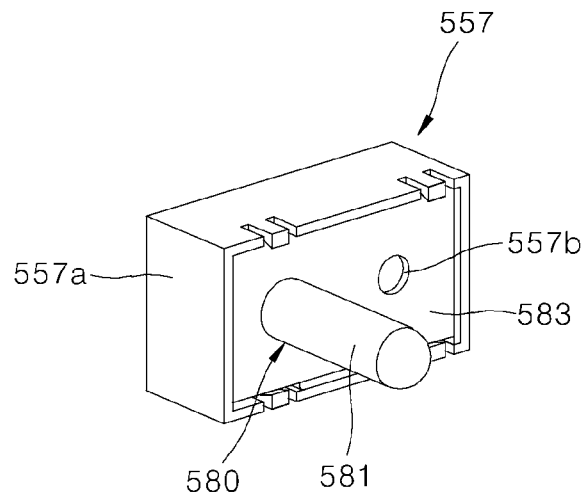
FIG. 24 is a rear perspective view showing a state in which a temperature sensor is installed.

FIG. 23 is a rear perspective view showing a rear surface of the supporting panel in FIG. 22, and FIG. 24 is a rear perspective view showing a state in which a temperature sensor is installed.

The cooking appliance in this embodiment may further include a temperature sensor 580 as illustrated in FIGS. 21 to 24.

The temperature sensor 580 may be provided to measure a temperature in the cooking space 105. The temperature sensor 580 may include a sensor main body 581 having a long thin rod shape and a flange 583 protruding from the sensor main body 581. The flange 583 may be formed into a rectangular plate protruding from the sensor main body 581 in the centrifugal direction.

The temperature sensor 580 may be disposed inside the door front surface part 350 in a state of being fixed onto the supporting panel 550. To this end, the supporting panel 550 may further include a temperature sensor supporting part 557.

The temperature sensor supporting part 557 may be disposed in the second area 550*b*, i.e., an area in which the first control board 550 is not installed. The temperature sensor supporting part 557 may support the temperature sensor 580, and the temperature sensor 580 may be supported by the temperature sensor supporting part 557 and disposed in the second area 550*b*.

The temperature sensor supporting part 557 may include a second lateral wall part 557*a*. The second lateral wall part 557*a* may protrude rearward from the main panel part 551. An inside of the second lateral wall part 557*a* may penetrate in the front-rear direction. For example, the second lateral wall part 557*a* may be formed into a rectangular pillar which protrudes rearward from the main panel part 551 and the inside of which penetrates in the front-rear direction.

The temperature sensor 580 may be inserted into the second lateral wall part 557*a*. In this case, a position of the flange 583 of the temperature sensor 580 in the upward, downward, left and right directions may be regulated by a first lateral wall part 556*a*.

The temperature sensor supporting part 557 may further include a second supporting surface part 557*b*. The second supporting surface part 557*b* may protrude from the second lateral wall part 557*a* to the inside of the second lateral wall part 557*b*, and may form a flat surface crossing the front-rear direction. For example, the second supporting surface part 557b may be formed into a shape in which a flat surface parallel with the main panel part 551 protrudes to the inside of the second lateral wall part 557a.

The flange 583 inserted into the second lateral wall part 557a may contact the second supporting surface part 557b disposed at a rear of the flange 583. Thus, a rearward movement of the temperature sensor 580 may be regulated.

That is, the position of the temperature sensor 580, inserted into the second lateral wall part 557a, in the upward, downward, left and right directions may be regulated as a result of interference between the second lateral wall part 557a and the flange 583, and the position of the temperature sensor 580 in the front-rear direction may be regulated as a result of interference between the second supporting surface part 557b and the flange 583. Thus, the temperature sensor 580 may be stably mounted onto the temperature sensor supporting part 557.

Additionally, the temperature sensor supporting part 557 may further include a boss part 557c. The boss part 557c may protrude forward from the second supporting surface part 557b. That is, the second supporting surface part 557b may be disposed further rearward than the main panel part 551, and the boss part 557c may protrude forward from the second supporting surface part 557b. In this case, the boss part 557c may not protrude further forward than the main panel part 551.

A fastening hole in the form of a hollow hole extending in the front-rear direction may be formed in the boss part 557c. The fastening hole may be open to the rear of the second supporting surface part 557b. Additionally, a fastening hole may also be formed at the flange 583. In this case, the fastening hole of the flange 583 may be formed at a position where the fastening hole of the flange 583 and the fastening hole of the boss part 557c overlap in the front-rear direction.

When a screw passes though fastening holes from the rear of the flange 583 and is coupled to the boss part 557c in a state in which the flange 583 contacts the second supporting surface part 557b such that the fastening hole of the flange 583 and the fastening hole of the boss part 557c overlap, the flange 583 may be fixed to the temperature sensor supporting part 557 while closely contacting the second supporting surface part 557b. Accordingly, the temperature sensor 580 may be stably fixed onto the supporting panel 550.

The temperature sensor supporting part 557 may further include a hook 557d. The hook 557d may protrude from the first lateral wall part 557a to an inside of the temperature sensor supporting part 557, i.e., the inside of the second lateral wall part 557a in the upward direction or the downward direction.

For example, a hook 557d disposed on a lower side of the second lateral wall part 557a may protrude in the upward direction, and a hook 557d disposed on an upper side of the second lateral wall part 5567a may protrude in the downward direction. In this embodiment, one or more hooks 557d are disposed respectively on the lower side and the upper side of the second lateral wall part 557a, for example. The hook 557d may be disposed at the front of the second supporting surface part 557b.

In this case, each hook 557d may be disposed at a position spaced from a first supporting surface part 557b by a thickness of a portion of the temperature sensor 580, specifically, a thickness of the flange 583, while being disposed at a position spaced a predetermined distance from the second supporting surface part 557b. A portion of the temperature sensor 580, i.e., the flange 583, may be inserted into a space that is formed between the second supporting surface part 557b and the hook 557d as a result of the disposition of the hook 557d.

Thus, the temperature sensor 580 may be primarily fixed, and the fastening of the temperature 580 may be performed more readily.

In the temperature sensor 580 installed as described above, a rear of the sensor main body 581 may pass through the door rear surface cover 350b and be exposed to the outside of the door 300. That is, the temperature sensor 580 may protrude from the inside of the door front surface part 350 to the rear of the door front surface part 350, and be exposed to the cooking space 105. The temperature sensor 580, in which the rear of the sensor main body 581 is exposed to the outside of the door 300, may measure a temperature of the cooking space 105 in the cooking space 105 (see FIG. 63).

Additionally, a front of the sensor main body 581 may be exposed to the inside of the door 300 and connect to the first control board 500. That is, the front of the sensor main body 581 may electrically connect to the first control board 500 through a cable.

Accordingly, results of measurement of the temperature sensor 580 may be transmitted to the first control board 500, and based on the results, the first control board 500 may control an operation of the first heating part 400 and the like to adjust the temperature in the cooking space 105.

The temperature sensor supporting part 557 may be formed in a way that protrudes rearward from the supporting panel 550. In response, the door rear surface cover 350b may be provided with a dent part 351b. The dent part 351b may be formed in a way that a portion of the door rear surface cover 350b, disposed at the rear of the temperature sensor supporting part 557, is dented rearward. When seen from the front, the dent part 351b may be dented rearward, and when seen from the rear, may protrude rearward.

The temperature sensor supporting part 577 may be accommodated in a space encircle by the dent part 351b. A passage hole 352b needed for the sensor main body 581 to pass through the door rear surface cover 350b may be formed at the dent part 351b.

The supporting panel 550 in this embodiment may further include a cable fixing part 558. The cable fixing part 558 may protrude forward from the main panel part 551 and may be disposed between the first control board 500 and the temperature sensor supporting part 557. The cable fixing part 558 may fix a cable for connecting between the first control board 500 and the temperature sensor supporting part 557 onto the supporting panel 550.

The cable fixing part 558 may include a pair of hooks. Each of the hooks may include a body part 558a and a protruding part 558b. The body part 558a may protrude forward from the main panel part 551.

In this case, the body part 558a may be formed in a way that the body part 558a is elastically deformed in the lateral direction. The protruding part 558b may protrude from the body part 558a to another adjacent hook.

That is, the protruding parts 558b of the hooks protrude toward each other while the pair of hooks is disposed to face each other. Accordingly, a gap between front portions of the two hooks, in which the protruding parts 558b are disposed, may be much less than a gap between rear portions of the two hooks, in which the body parts 558a are disposed. Preferably, a gap between the two protruding parts 558b may be less than a diameter of the cable or the hooks may disposed such that the two protruding parts 558b contact each other.

Accordingly, the cable may be inserted into the cable fixing part 558 from a front of the cable fixing part 558. The cable inserted into the cable fixing part 558 may not escape from the cable fixing part 558 easily.

Further, a plurality of cable fixing parts 558 may be spaced a predetermined distance from each other on the supporting panel 550.

In this embodiment, the first control board 500 may be provided with a terminal 501 for connecting between the cable and the first control board 500. The terminal 501 may be disposed on a side eccentric to the lower portion on the first control board 500.

Referring to FIGS. 13, 21 and 22, components, i.e., the shaft 110 and the encoder 1200, in relation to the manipulation device 1000 may be disposed on a side eccentric to an upper portion of the first control board 500 on the first control board 500. Since the manipulation device is disposed on a side eccentric to an upper portion of the door front surface part 350 on the door front surface part 350, the shaft 110, the encoder 1200 and the like connected to the manipulation device need to be disposed on a side eccentric to the upper portion of the first control board 500 on the first control board 500.

The handle 305 may be disposed at a position eccentric to a lower portion of the door front surface part 350 on the door front surface part 350. Accordingly, there is difficulty in ensuring a space appropriate for installing the manipulation device 1000 in the door front surface part 350. Additionally, when the manipulation device 1000 is disposed in the upper portion of the door front surface part, the user may manipulate the manipulation device 1000 easily.

If the handle 305 is disposed at a position eccentric to the upper portion of the door front surface part 350 on the door front surface part 350, the manipulation device 1000 needs to be disposed below the handle. In this case, the user may have difficulty in manipulating the manipulation device 1000 due to the handle 305 and the handle may deteriorate the aesthetic quality of the cooking appliance.

If the handle 305 is disposed at a position eccentric to the upper portion of the door front surface part 350 on the door front surface part 350, a large force needs to be applied to open and close the door 300, and it is not easy for the user to manipulate the manipulation device.

For this reason, the manipulation device 1000 may be disposed at a position eccentric to the upper portion of the door front surface part 350 on the door front surface part 350.

Since the manipulation device 1000 may be disposed at a position eccentric to the upper portion of the door front surface part 350 on the door front surface part 350 as described above, the shaft 110, the encoder 1200 and the like may be disposed on a side eccentric to the upper portion of the first control board 500 on the first control board 500. Additionally, most of the upper area of the first control board 500 is occupied by the shaft 110, the encoder 1200 and the like, the terminal 501 may be disposed at a position eccentric to the lower portion of the first control board 500 on the first control board 500.

The temperature sensor supporting part 557 and the temperature sensor 580 mounted thereon may be disposed at a position eccentric to an upper portion of the supporting panel 550 on the supporting panel 550. The temperature sensor 580 may be disposed further upward than a communication module 570, and may be disposed at a height closer to the shaft 110 and the encoder 1200 than to the terminal 501. The reason why the temperature sensor 580 is disposed at a position eccentric to the upper portion of the supporting panel 550 on the supporting panel 550 is described hereunder.

Since there is a difference in heights of the temperature sensor 580 and the terminal 501 as described above, a distance between the temperature sensor 580 and the terminal 501 may become great. As the temperature sensor 580 becomes far from the terminal 501, a cable for connecting between the temperature sensor 580 and the terminal 501 needs to be elongated. Accordingly, the inside of the door 300 may be untidy due to the cable.

To solve the problem, in this embodiment, a plurality of cable fixing parts 558 may be disposed in a lower portion of the temperature sensor supporting part 557. The plurality of cable fixing parts 558 may fix a cable, which is disposed to extend in the up-down direction considering the positions of the temperature sensor 580 and the terminal 501, at a plurality of points.

Accordingly, the cable connecting between the temperature sensor 580 and the first control board 500 may be fixed stably onto the supporting panel 550, and the inside of the door 300 may become neat and tidy.

The supporting panel 550 in this embodiment, may further include a cable supporting part 559. The cable supporting part 559 may protrude forward from the main panel part 551 and may be disposed outside the first control board 500.

The cable fixing part 558 may support a cable connected to the first control board 500. The cable supported by the cable supporting part 559 may be a cable connecting between the first control board 500 and the first heating part or between the first control board 500 and the second control board.

The cable supporting part 559 may include a first projection 559*a* and a second projection 559*b*. The first projection 559*a* may protrude forward from the main panel part. The second projection 559*b* may protrude from the first projection 559*a* in a direction parallel with the main panel part 551. In this case, the second projection 559*b* may be spaced a predetermined distance apart from the main panel part 551.

The supporting panel 550 may be provided with a plurality of cable supporting parts 559. The plurality of cable supporting parts 559 may be disposed near an edge of the supporting panel 550. Some of the plurality of cable supporting parts 559 may be disposed near a lower edge of the supporting panel 550, and the others may be disposed near lateral edges of the supporting panel 550.

In this embodiment, the cable supporting parts 559 disposed near the lower edge of the supporting panel 550 and the cable supporting parts 559 disposed near the lateral edges of the supporting panel 550 may have different shapes. For example, in the cable supporting parts 559 disposed near the lower edge of the supporting panel 550, the second projection 559*b* may protrude upward or downward. In the cable supporting parts 559 disposed near the lateral edges of the supporting panel 550, the second projection 559*b* may protrude in the lateral direction.

A cable may be supported by the cable supporting part 559 in a way that the cable is inserted into a space encircles by the first projection 559*a* and the second projection 559*b*. Accordingly, the cable may be guided into an area near the edges of the supporting panel 550. The cable guided as described above may connect to the first control board 500 while being disposed near the edges of the supporting panel 550.

As a result, the cable connected to the first control board 500 may be stably fixed onto the supporting panel 550 in a state of being disposed near the edges of the supporting panel 550. Thus, the inside of the door 300 may become more neat and tidy, and unnecessary contact between various components mounted onto the first control board 500 and cables may be prevented.

The supporting panel 550 may further include a supporting projection 560. The supporting projection 560 may protrude from the main panel part 551 toward the door main body part 300a facing the main panel part 551, specifically, toward the front surface of the second door main body part 350a.

The supporting projection 560 may be disposed further downward than the first control board 500. For example, the supporting projection 560 may be disposed at a position near the lower edge of the supporting panel 550.

The supporting projection 560 may guide a gap between the front surface of the second door main body part 350a and the supporting panel 550 by interfering with the front surface of the second door main body part 350a. Additionally, the supporting projection 560 may maintain the gap between the front surface of the second door main body part 350a and the supporting panel 550.

In this embodiment, the shaft 110 and the encoder 1200 may be disposed in the upper area of the first control board 500. Additionally, the socket member 1600 encircling the shaft 110 and the encoder 1200 may also be disposed in the upper area of the first control board 500.

A rear side of the socket member 1600 may be coupled to the first control board 500, and a front side of the socket member 1600 may contact the front surface of the second door main body part 350a. That is, the socket member 1600 may be interposed between the front surface of the second door main body part 350a and the supporting panel 550, and the gap between the front surface of the second door main body part 350a and the supporting panel 550 may be maintained by the socket member 1600.

Thus, the upper area of the supporting panel 550 may be supported by the socket member 1600 not to bend toward the front surface of the second door main body part 350a. Also, the front surface of the second door main body part 350a may be supported by the socket member 1600 not to bend toward the supporting panel 550.

However, a lower area of the supporting panel 550 on which a structure such as the socket member 1600 is not disposed is likely to bend toward the front surface of the second door main body part 350a. Also, a lower area of the front surface of the second door main body part 350a may bend toward the supporting panel 550.

For example, when the front surface of the second door main body part 350a is pressed and bent or the door rear surface cover 350b is pressed and bent, the gap between the front surface of the second door main body part 350a and the supporting panel 550 may be excessively narrowed. In this case, the components mounted onto the first control board 500 may be broken, or the front surface of the second door main body part 350a may be deformed, thereby causing deterioration of an aesthetic quality of the door 300.

To solve the problem, in this embodiment, the supporting projection 560 may be disposed on a lower side of the supporting panel 550. The supporting projection 560 may support the front surface of the second door main body part 350a to prevent the front surface of the second door main body part 350a from bending rearward while maintaining the gap between the front surface of the second door main body part 350a and the supporting panel 550.

In summary, the socket member 1600 may be disposed on an upper side of the supporting panel 550 to support between the front surface of the second door main body part 350a and the upper side of the supporting panel 550, and the supporting projection 560 may be disposed on the lower side of the supporting panel 550 to support between the front surface of the second door main body part 350a and the upper side of the supporting panel 550.

Accordingly, the supporting panel 550 and the first control board 500 mounted onto the supporting panel 550 may be fixed to the inside of the door 300 while stably maintaining the gap between the front surface of the second door main body part 350a, and the supporting panel 550 and the first control board 500. Additionally, the deformation of the front surface of the second door main body part 350a, caused by an impact or pressure, may be suppressed. As a result, the structural reliability of the door 300 may improve effectively.

[Coupling Structure Among Door, Supporting Panel and Door Rear Surface Cover]

Figure 25:
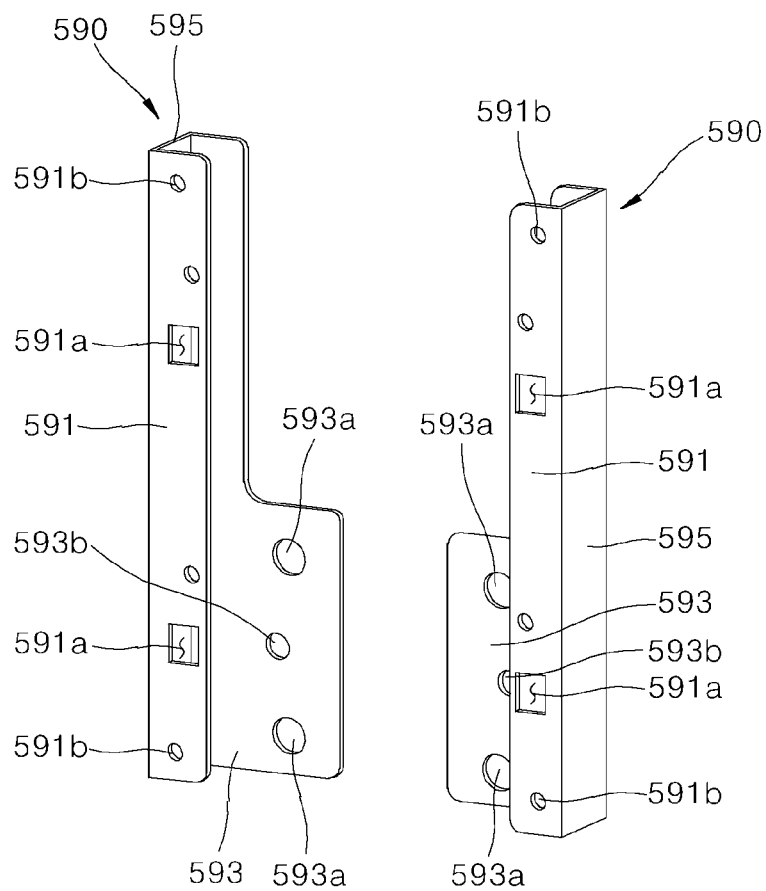
FIG. 25 is a perspective view separately showing the bracket in FIG. 21.
Figure 26:
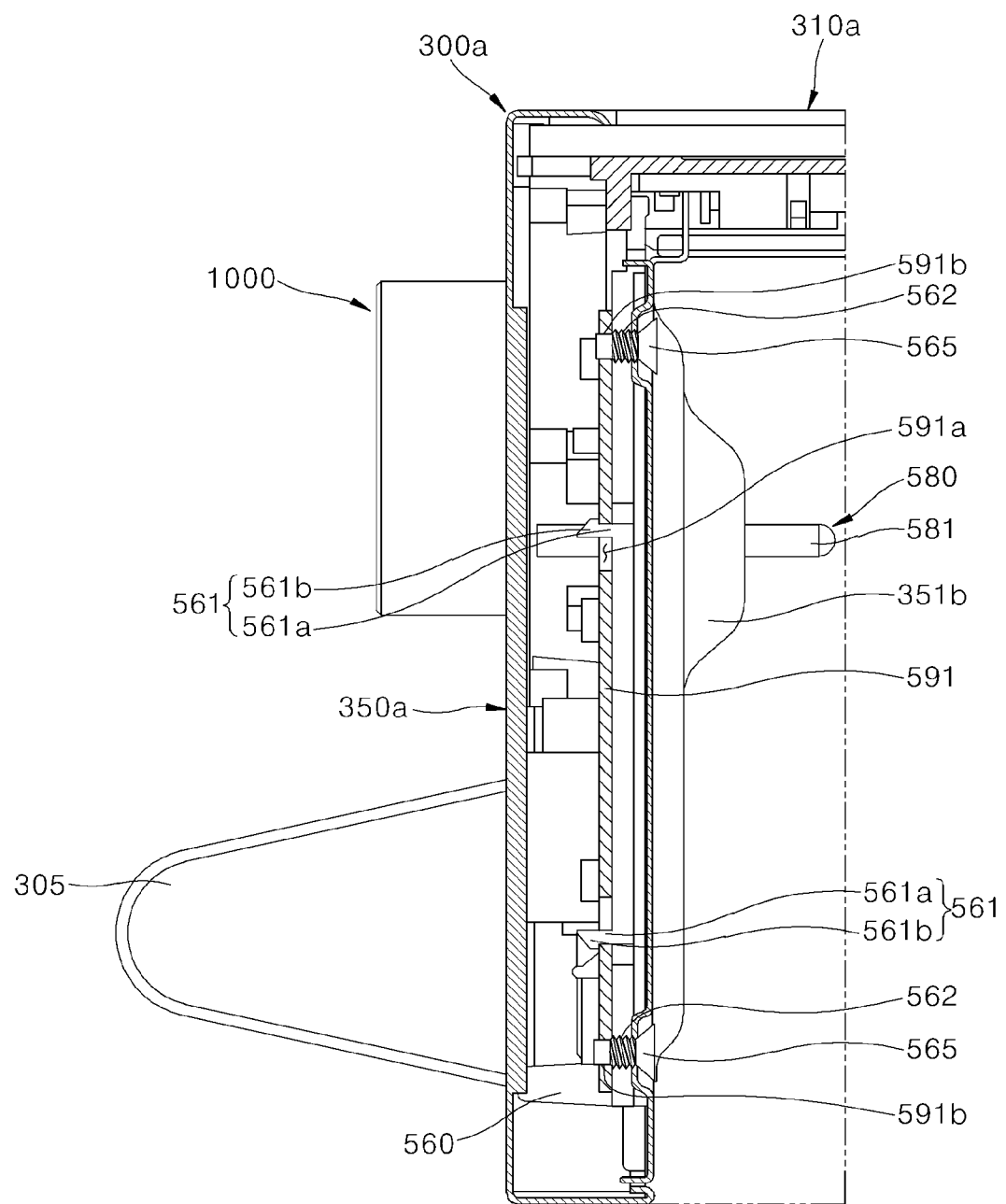
FIG. 26 is a cross-sectional view showing a coupling structure between a supporting panel and a door rear surface cover.

FIG. 25 is a perspective view separately showing the bracket in FIG. 21, and FIG. 26 is a cross-sectional view showing a coupling structure between a supporting panel and a door rear surface cover. Additionally, FIG. 27 is a cross-sectional view showing a coupling structure between a front surface of a door main body part and a supporting panel, and FIG. 28 is an enlarged view showing a portion of a configuration in a door front surface part.

Figure 27:
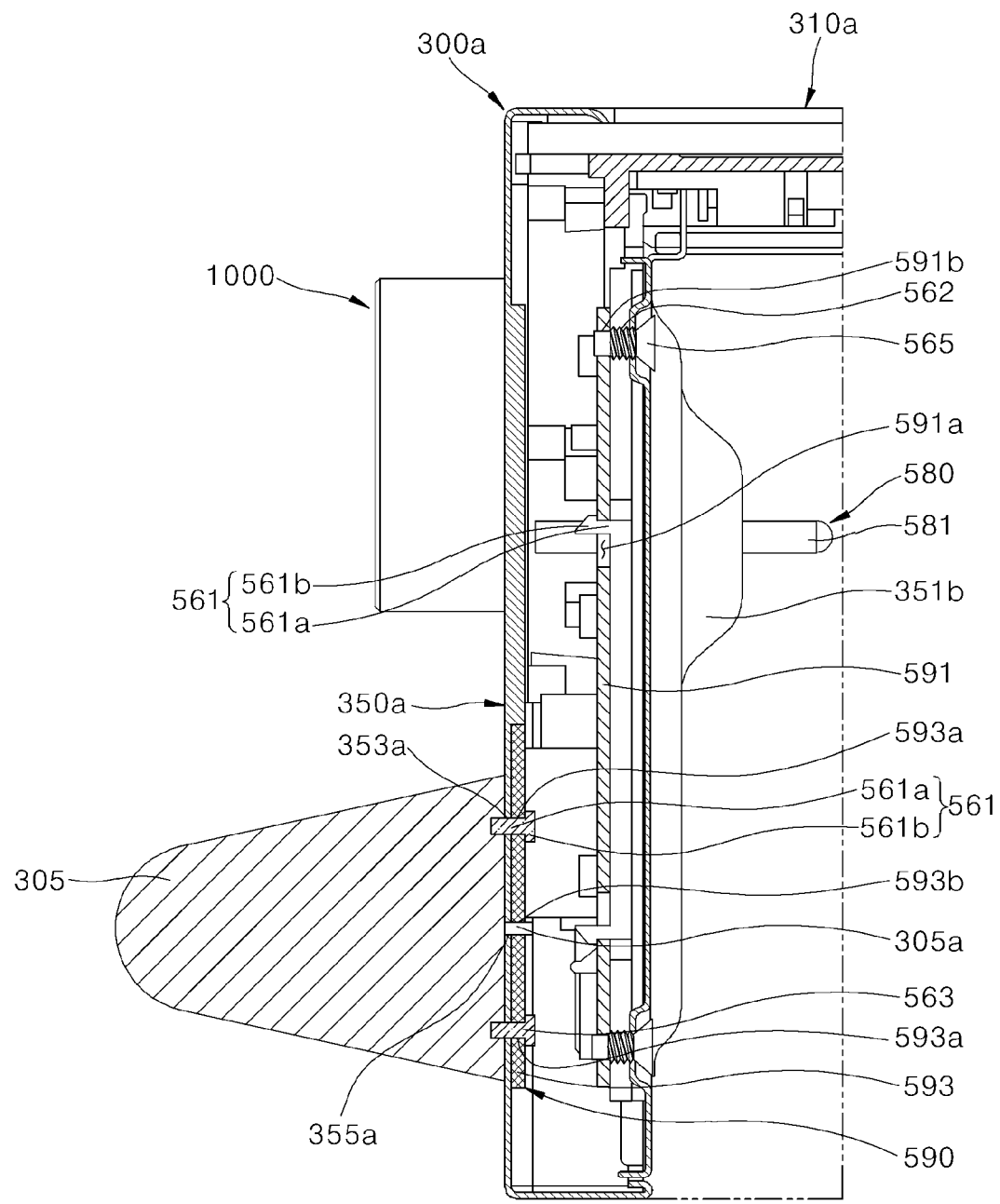
FIG. 27 is a cross-sectional view showing a coupling structure between a front surface of a door main body part and a supporting panel.
Figure 28:
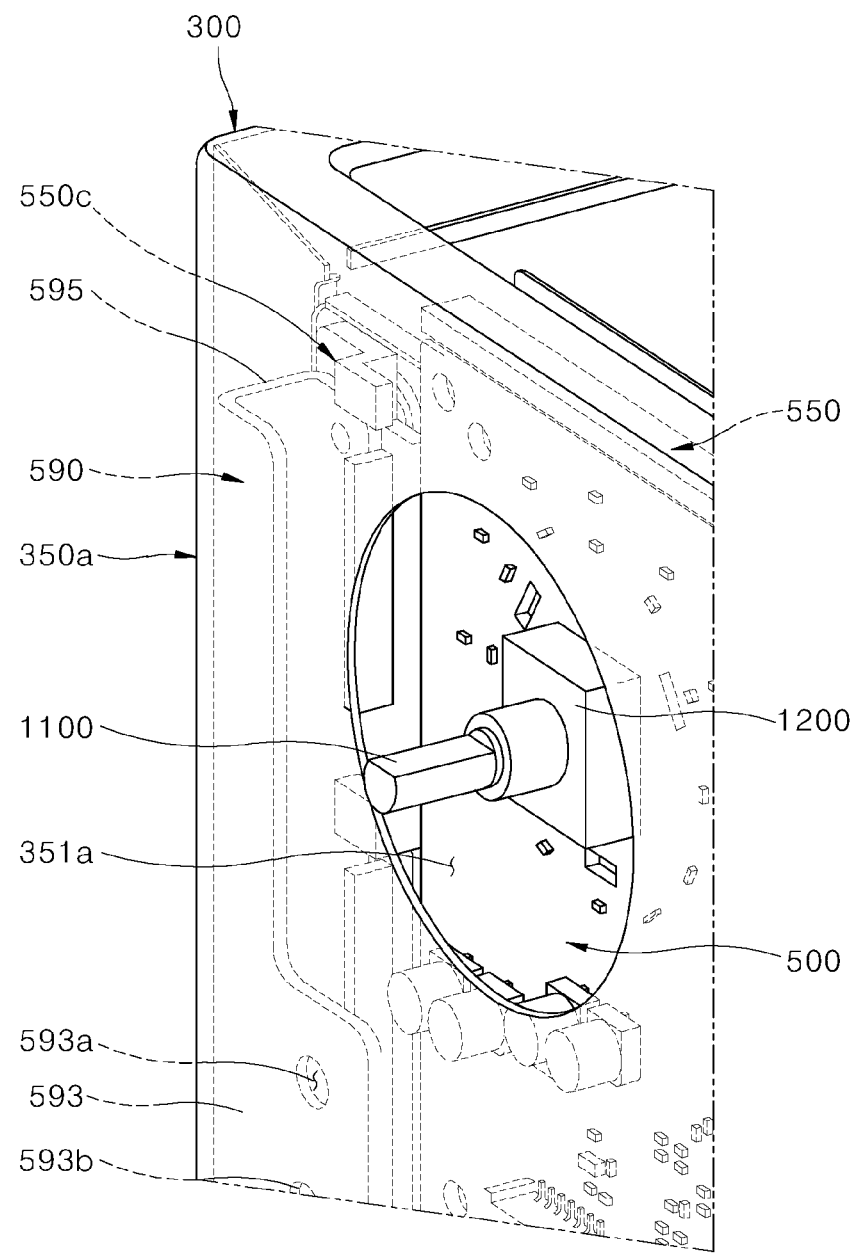
FIG. 28 is an enlarged view showing a portion of a configuration in a door front surface part.

In FIGS. 26 and 27, the first cooling fan is excluded.

Referring to FIGS. 21 and 22, and 25 to 28, the cooking appliance in this embodiment may further include a bracket 590. The bracket 590 may be disposed between the front surface of the second door main body part 350a and the supporting panel 550. The bracket 590 may space the supporting panel 500 from the front surface of the second door main body part 350a by a predetermined distance in the front-rear direction, and couple the supporting panel 550 to the door main body part 300a.

The supporting panel 550 may further include a coupling area 550c in addition to the first area 550a and the second area 550b. The coupling area 550c may be respectively disposed outside both sides of an area including the first area 550a and the second area 550b in the left-right direction. For example, the coupling area 550c may be disposed in both lateral edge portions of the supporting panel 550 in the lateral direction thereof.

The bracket 590 may be respectively disposed between the front surface of the second door main body parts 350a, and each coupling area 550c. Each bracket 590 may be coupled to the coupling area 550c. Each bracket 590 may include a first coupling part 591, a second coupling part 593 and a connecting part 595.

The first coupling part 591 may form a coupling surface parallel with the coupling area 550c. For example, the first coupling part 591 may be formed into a flat surface having a rectangular shape in which an up-down length is greater than a left-right length.

The second coupling part 593 may form a coupling surface parallel with the front surface of the second door main body part 350a. For example, the second coupling part 593 may be formed into a flat surface having a rectangular shape similar to that of the first coupling part 591. In this case, unlike the first coupling part 591, the second coupling part 593 may be formed into a shape in which a left-right length is greater than an up-down length.

In this embodiment, the front surface of the second door main body part 350a is disposed in parallel with the coupling area 550c in the front-rear direction, for example. Accordingly, the first coupling part 591 and the second coupling part 593 may also be disposed in parallel with each other in the front-rear direction.

The connecting part 595 may connect the first coupling part 591 and the second coupling part 593 in a way that the first coupling part 591 is spaced a predetermined distance apart from the second coupling part 593 in the front-rear direction. The connecting part 595 may be disposed between the first coupling part 591 and the second coupling part 593. For example, the connecting part 595 may be formed into a flat surface having a rectangular shape crossing the first coupling part 591 and the second coupling part 593, preferably, orthogonal to the first coupling part 591 and the second coupling part 593.

The bracket 590 may be formed in a way that the first coupling part 591, the second coupling part 593 and the connecting part 595 described above integrally connect. When seen from above, the bracket 590 may be formed in a way that the first coupling part 591, the connecting part 595 and the second coupling part 593 connect in a "=" shape.

In this embodiment, a pair of brackets 590 is disposed between the front surface of the second door main body part 350*a* and the supporting panel 550, for example. On the supporting panel 550, the coupling area 550*c* may be disposed respectively on the left side and the right side of the first area 550*a* and the second area 550*b*, and the bracket 590 may be respectively disposed between the front surface of the second door main body part 350*a* and the left coupling area 550*c* and between the front surface of the second door main body part 350*a* and the right coupling area 550*c*.

In this case, in the left bracket 590 of the pair of brackets 590, left ends of the first coupling part 591 and the second coupling part 593 may be connected by the connecting part 595. Additionally, in the right bracket 590 of the pair of brackets 590, right ends of the first coupling part 591 and the second coupling part 593 may be connected by the connecting part 595.

For example, the left bracket 590 may be formed in a way that the first coupling part 591, the connecting part 595 and the second coupling part 593 connect in a " ⊏ " shape, and the left bracket 590 may be formed in a way that the first coupling part 591, the connecting part 595 and the second coupling part 593 connect in a " ⊐ " shape.

A guiding projection 561 may be disposed in any one of the first coupling part 591 and the coupling area 550*c*. Additionally, a guiding hole 591*a* may be disposed in the other of the first coupling part 591 and the coupling area 550*c*.

The guiding projection 561 may protrude from any one of the first coupling part 591 and the coupling area 550*c* to the other of the first coupling part 591 and the coupling area 550*c*. The guiding hole 591*a* may be formed in a way that the guiding hole 591*a* penetrates the other of the first coupling part 591 and the coupling area 550*c*. The guiding projection 561 protruding from any one of the first coupling part 591 and the coupling area 550*c* may be inserted into the guiding hole 591*a* formed in the other of the first coupling part 591 and the coupling area 550*c*.

In this embodiment, the guiding projection 561 is disposed in the coupling area 550*c*, and the guiding hole 591*a* is formed in the first coupling part 591, for example. The guiding projection 561 may protrude forward from the coupling area 550*c*, be inserted into the guiding hole 591*a* disposed in front of the guiding projection 561 and pass through the first coupling part 591.

In this embodiment, a plurality of guiding projections 561 is disposed in each coupling area 550*c*, and a plurality of guiding holes 591*a* is disposed in each first coupling part 591, for example. In each coupling area 550*c*, a pair of guiding projections 561 may be spaced a predetermined distance in the up-down direction, and in each first coupling part 591, a pair of guiding holes 591*a* may be spaced a predetermined distance in the up-down direction.

Additionally, the guiding projection 561 and the guiding hole 591*a* may be disposed at a position where one guiding projection 561 and one guiding hole 591*a* overlap in the front-rear direction. That is, the plurality of guiding projections 561 and the plurality of guiding holes 591*a* may be arranged such that one guiding projection 561 is inserted tin to one guiding hole 591*a*.

Each guiding projection 561 may include a hook. The hook may include a body part 561*a*, and a protruding part 561*b*. The body part 561*a* may protrude forward from the main panel part 551.

In this case, the body part 561*a* may be formed in a way that is elastically deformed in the up-down direction. The protruding part 561*b* may protrude against another hook adjacent to the hook in the up-down direction while protruding from the body part 561*a*.

For example, a protruding part 561*b* of an upper hook of the pair of hooks may protrude upward, and a protruding part 561*b* of a lower hook of the pair of hooks may protrude downward.

The guiding projection 561, disposed as described above, may be coupled to the first coupling part 591 while passing through the first coupling part 591 through the guiding hole 591*a*. As a result of coupling between the guiding projection 561 and the first coupling part 591, the supporting panel 550 and the bracket 590 may be primarily coupled.

The primary coupling may denote a state in which the supporting panel 550 and the bracket 590 is detachably coupled and in which a position, where the supporting panel 550 and the bracket 590 are coupled, is guided.

Fastening holes 562 and 591*b* may be respectively arranged in the coupling area 550*c* and the first coupling part 591. The fastening holes 562 and 591*b* are provided for fastening between the supporting panel 550 and the bracket 590 using a fastening member 565. The fastening member 565 may be provided in the form of a screw identical with or similar to the above fastening member 563.

In a state in which the coupling area 550*c* and the first coupling part 591 contact each other such that the fastening hole 562 of the coupling area 550*c* and the fastening hole 591*b* of the first coupling part 591 overlap in the front-rear direction, a screw may pass through the coupling area 550*c* and the first coupling part 591 through the fastening holes 562 and 591*b* to couple the coupling area 550*c* and the first coupling part 591.

The alignment of the positions of the supporting panel 550 and the bracket 590 to overlap the fastening hole 562 of the coupling area 550*c* and the fastening hole 591*b* of the first coupling part 591 in the front-rear direction may be led as a result of the coupling between the guiding projection 561 and the first coupling part 591.

That is, as long as the guiding projection 561 is fitted into the first coupling part 591, the supporting panel 550 and the bracket 590 may be aligned such that the fastening hole 562 of the coupling area 550*c* and the fastening hole 591*b* of the first coupling part 591 overlap in the front-rear direction.

In this embodiment, the fastening holes 562 and 591*b* are disposed further outward than the guiding projection 561 in the up-down direction, for example. The supporting panel 550 and the bracket 590 may be coupled by a screw. As a coupling position of the screw becomes closer to ends on the upper side and the lower side of the supporting panel 550 and the bracket 590, the coupling between the supporting panel 550 and the bracket 590 may become more reliable. To this end, the fastening holes 562 and 591b may be disposed further outward than the guiding projection 561 in the up-down direction.

That is, the positions adjacent to the upper ends of the supporting panel 550 and the bracket 590, and the positions adjacent to the lower ends of the supporting panel 550 and the bracket 590 may be firmly fixed by the screw such that the upper ends or the lower ends of the supporting panel 550 and the bracket 590 are firmly coupled to each other without separating from each other.

Additionally, since a hook coupling using the guiding projection 561 may be done in central portions of the supporting panel 550 and the bracket 590, which are not fastened using a screw, to suppress the separation between the central portions of the supporting panel 550 and the bracket 590.

Hereunder, the effect of the coupling structure between the coupling area 550c and the first coupling part 591 are described hereunder.

The supporting panel 550 and the bracket 590 may be primarily coupled as a result of coupling between the guiding projection 561 and the first coupling part 591. When the supporting panel 550 and the bracket 590 are primarily coupled, the positions of the supporting panel 550 and the bracket 590 may be aligned. Accordingly, the conditions for the coupling between the supporting panel 550 and the bracket 590 using a screw may be set out. When the supporting panel 550 and the bracket 590 are primarily coupled, the supporting panel 550 and the bracket 590 may be temporarily fixed to ease screw fastening.

Then the portions adjacent to the upper ends of the supporting panel 550 and the bracket 590, and the portions adjacent to the lower ends of the supporting panel 550 and the bracket 590 may be firmly fixed by the screw, and the supporting panel 550 and the bracket 590 may be coupled by the guiding projection 561 in the central portions of the supporting panel 550 and the bracket 590 in the up-down direction.

Accordingly, the supporting panel 550 and the bracket 590 may be firmly coupled without separating from each other, and the screw fastening between the supporting panel 550 and the bracket 590 may be performed more readily.

The second coupling part 593 may be coupled to the door main body part 300a, specifically, a front surface of the second door main body part 350a. To this end, fastening holes 353a and 593a may be respectively disposed on the front surface of the second door main body part 350a and in the second coupling part 593. The fastening holes 353a and 593a may be provided to fasten the door main body part 300a and the bracket 590 using a fastening member 563 described below.

In a state in which the front surface of the second door main body part 350a and the second coupling part 593 contact each other such that the fastening hole 353a of the front surface of the second door main body part 350a and the fastening hole 593a of the second coupling part 593 overlap in the front-rear direction, the fastening member 563 may pass through the front surface of the second door main body part 350a and the second coupling part 593 through the fastening holes 353a and 593a such that the front surface of the second door main body part 350a and the second coupling part 593 are coupled.

The fastening member 563 may be provided in a screw form. Specifically, the fastening member 563 may include a body part 553a and a head part 563b. The body part 553a may be formed into an approximately circular rod, and a screw thread may be formed on an outer circumferential surface of the body part 553a. The head part 563b may protrude in a centrifugal direction of the body part 553a at a length-wise end of the body part 553a.

In this embodiment, the coupling between the second coupling part 593 of the bracket 590 and the front surface of the second door main body part 350a, and the coupling between the front surface of the second door main body part 350a and the handle 305 may be performed together by a single fastening member 563.

That is, the fastening member 563 may be inserted into the handle 305 while passing through the second coupling part 593 and the front surface of the second door main body part 350a. Accordingly, the handle 305 and the second coupling part 593 may be coupled to the front surface of the second door main body part 350a. That is, the handle 305 and the second coupling part 593 may be coupled with the front surface the second door main body part 350a therebetween.

To this end, the fastening member 563 may be inserted into the handle 503 from a rear of the second coupling part 593 while passing through the second coupling part 593 and the front surface of the second door main body part 350a such that the heat part 563b is disposed behind the second coupling part 593.

If the coupling between the bracket 590 and the door main body part 300a and the coupling between the door main body part 300a and the handle 305 are performed at different positions, a coupling portion between the bracket 590 and the door main body part 300a is exposed to the outside of the door 300.

For example, when the bracket 590 and the door main body part 300a are coupled from the front of the door 300 using the fastening member 563, the head part 563b of the fastening member 563 is exposed to the outside of the door 300.

Additionally, when the bracket 590 and the door main body part 300a are coupled from a rear of the bracket 590 using the fastening member 563, the body part 553a of the fastening member 563 is exposed to the outside of the door 300. Thus, an additional structure needs to be added to the outside of the door 300 to cover the fastening member 563.

Further, since the front surface of the second door main body part 350a and the second coupling part 593 are not that thick, coupling strength between the door main body part 300a and the bracket 590 may not be sufficiently ensured. When the coupling between the bracket 590 and the door main body part 300a and the coupling between the door main body part 300a and the handle 305 are performed at different positions, man hours for the fastening procedure may increase.

To solve the problem, in this embodiment, the bracket 590, the door main body part 300a and the handle 305 may be coupled together using a single fastening member 563 as a result of one-time fastening.

In this case, the bracket 590 may pass through the door main body part 300a, and a portion of the fastening member 563, protruding to the outside of the door main body part 300a, may be inserted into the handle 305, such that bracket 590 and the door main body part 300a are coupled.

Thus, the bracket 590 and the door main body part 300a may be coupled while no portion of the fastening member 563 is exposed to the outside of the door 300. Additionally, although the front surface of the second door main body part 350a and the second coupling part 593 are not that thick, a depth, to which the fastening member 563 is inserted, may be ensured by the handle 305. Thus, the coupling strength between the door main body part 300a and the bracket 590 may be sufficiently ensured.

As a result of one-time fastening, the bracket 590, the door main body part 300a, and the handle 305 may be coupled together, and man hours for the fastening procedure may be reduced.

The fastening member 563 may couple the bracket 590 and the door main body part 300a while passing through the second coupling part 593, and the front surface of the second door main body part 350a through the fastening hole 593a of the second coupling part 593 and the fastening hole 353a of the front surface of the second door main body part 350a.

In this case, the fastening hole 593a of the second coupling part 593 may be disposed at a position where the second coupling part 593 and the first coupling part 591 do not overlap in the front-rear direction or a position where a rear of the fastening hole 593a is not covered by the first coupling part 591. That is, the fastening hole 593a of the second coupling part 593 may be disposed at a position where the fastening hole 593a of the second coupling part 593 is exposed to the outside of the first coupling part 591 when seen from the rear.

In this embodiment, the second coupling part 593 has an up-down length less than a left-right length unlike the first coupling part 591, for example. The second coupling part 593 of the bracket 590 disposed on the left side may protrude further rightward than the first coupling part 591, and the second coupling part 593 of the bracket 590 disposed on the right side may protrude further leftward than the first coupling part 591.

The fastening hole 593a of the second coupling part 593 may be disposed at a position protruding further rightward and leftward than the first coupling part 591. That is, the fastening hole 593a of the second coupling part 593 of the bracket 590 on the left side may be disposed at a position protruding further rightward than the first coupling part 591, and the fastening hole 593a of the second coupling part 593 of the bracket 590 on the right side may be disposed at a position protruding further leftward than the first coupling part 591.

Accordingly, the fastening procedure using the fastening member 563 may be performed more readily.

That is, since the coupling procedure using the fastening member 563 is performed at a rear of the bracket 590, it may be difficult for the fastening procedure to be performed when the fastening hole 593a of the second coupling part 593 is covered by the first coupling part 591.

To solve the problem, in this embodiment, the fastening hole 593a of the second coupling part 593 may be disposed at a position where the fastening hole 593a of the second coupling part 593 is exposed to the outside of the first coupling part 591. Accordingly, the fastening procedure using the fastening member 563 may be performed more readily with no interference by another structure such as the first coupling part 591.

Figure 29:
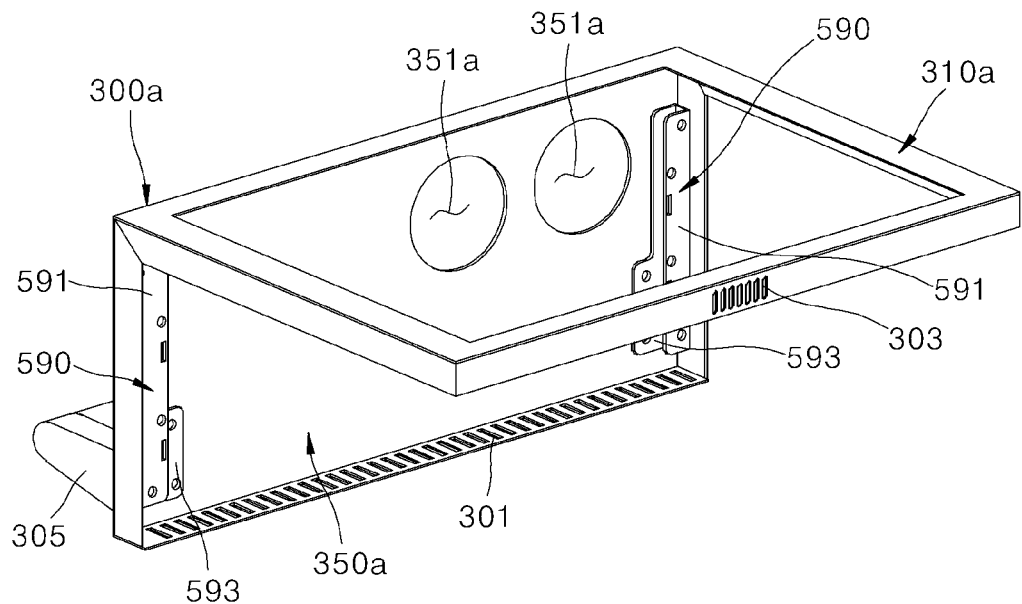
FIGS. 29 to 31 are rear perspective views showing a procedure for assembly of a door front surface part.
Figure 30:
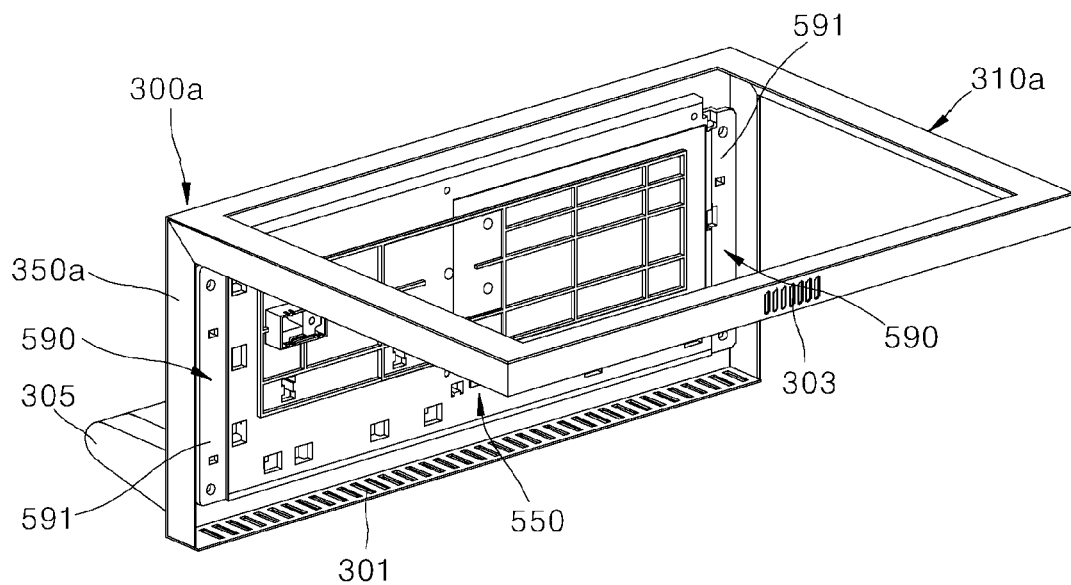
Figure 31:
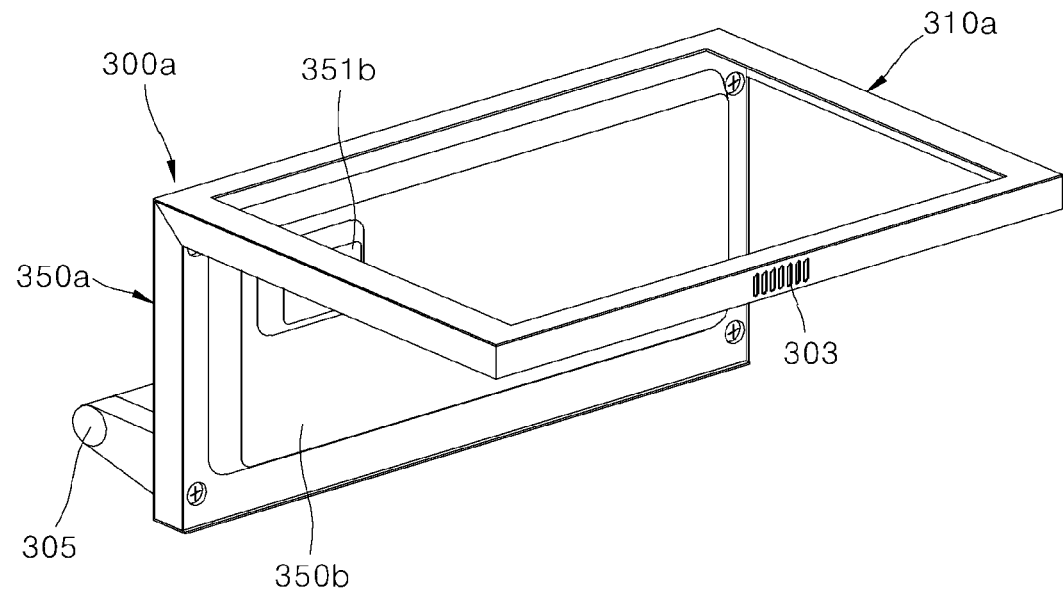

FIGS. 29 to 31 are rear perspective views showing a procedure for assembly of a door front surface part.

Hereunder, a procedure for assembly of the door front surface part is described with reference to FIGS. 26 to 31.

Referring to FIGS. 26 and 29, to assemble the door front surface part 350, the bracket 590 and the door main body part 300a may be coupled first. The bracket 590 and the door main body part 300a may be coupled as follows.

The handle 305 may be disposed at a front of the front surface of the second door main body part 350a, and the bracket 590 may be disposed at a rear of the front surface of the second door main body part 350a. In this case, a fastening hole formed in the handle 305, the fastening hole 353a formed on the front surface of the second door main body part 350a, and the fastening hole 593a formed in the second coupling part 593 of the bracket 590 need to overlap in the front-rear direction.

In this state, the fastening member 563 may be coupled to the second coupling part 593 and the front surface of the second door main body part 350a from the rear to the front of the second coupling part 593. Accordingly, the fastening member 563 may be inserted into the handle 305 while passing through the second coupling part 593 and the front surface of the second door main body part 350a from the rear of the second coupling part 593.

Thus, the bracket 590, the door main body part 300a and the handle 305 may be coupled together using a single fastening member 563 as a result of one-time fastening.

In this embodiment, each bracket 590 has two points for the fastening using the fastening member 563, for example. In each second coupling part 593, a pair of fastening holes 593a may be spaced from each other in the up-down direction, and fastening holes 353a may be disposed respectively on the front surface of the second door main body part 350a at positions corresponding to those of the fastening holes 593a. In this case, the handle 305, the door 300 and the bracket 590 may be completely coupled as a result of four-time fastening using the fastening member 563.

Additionally, a fitting hole 593b may be formed between the pair of fastening holes 593a, on the second coupling part 593. A fitting hole 355a may also be formed on the front surface of the second door main body part 350a.

The handle 305 may be provided with a fitting projection 305a. The fitting projection 305a may protrude from ends at rears of both sides of the handle to the rear. The fitting projection 305a may be inserted into the fitting holes 355a and 593b and coupled to the front surface of the second door main body part 350a and the second coupling part 593.

The position of the coupling between the handle 350 and the door front surface part 350 may be guided as a result coupling among the fitting projection 305a, the front surface of the second door main body part 350a and the second coupling part 593. That is, when the fitting projection 305a is inserted into the fitting holes 355a and 593b, the handle 305, the door front surface part 350 and the fastening holes of the second coupling part 593 may be aligned and may overlap in the front-rear direction.

Accordingly, the coupling among the handle 305, the door 300 and the bracket 590 may be performed more accurately and readily.

The handle 305, the door 300 and the bracket 590 may be coupled as described above, and then the supporting panel 550 and the bracket 590 may be primarily coupled as illustrated in FIGS. 26 to 27 and 30. The supporting panel 550 and the bracket 590 may be primarily coupled as a result of coupling between the guiding projection 561 and the first coupling part 591.

Thus, the supporting panel 550 and the bracket 590 may be detachably coupled, and the positions of the supporting panel 550 and the bracket 590 may be aligned such that the fastening hole 562 of the supporting panel 550 and the fastening hole 591b of the first coupling part 591 overlap in the front-rear direction.

Then, as illustrated in FIGS. 26, 27 and 31, the open rear of the door main body part 300a may be covered with the door rear surface cover 350b. In this state, a screw may be coupled to the door rear surface cover 350b from the rear to the front of the door rear surface cover 350b.

Accordingly, the door rear surface cover 350b, the coupling area 550c, and the first coupling part 591 may be coupled by a single screw. That is, the door rear surface cover 350b, the supporting panel 550 and the bracket 590 may be coupled by a single screw at a time.

In this embodiment, each bracket 590 has two points for the fastening using the screw, for example. In each first coupling part 591, a pair of fastening holes 591b may be spaced from each other in the up-down direction, and fastening holes 562 may be disposed respectively on the door rear surface cover 350b and the supporting panel 550 at positions corresponding to those of the fastening holes 591b. In this case, the door rear surface cover 350b, the supporting panel 550 and the bracket 590 may be completely coupled as a result of four-time fastening using the screw.

In summary, the handle 305, the door 300 and the bracket 590 may be completely coupled during a total of four fastening procedures, and the door rear surface cover 350b, the supporting panel 550 and the bracket 590 may be completely coupled during a total of four fastening procedures. The door front surface part 350 may be completely assembled during a small number of fastening procedures.

Thus, man hours for assembly of the door 300 may be significantly reduced and the door 300 may be assembled more easily and rapidly.

[Disposition Structure of Temperature Sensor]

Figure 32:
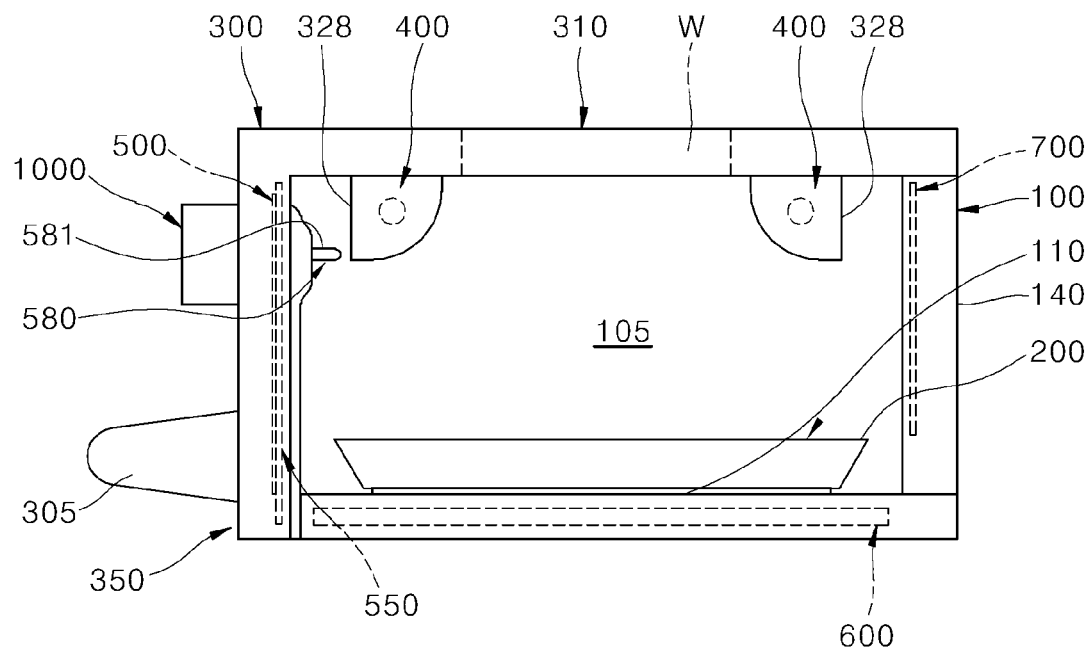
FIG. 32 is a cross-sectional view schematically showing a structure in a cooking appliance.

FIG. 32 is a cross-sectional view schematically showing a structure in a cooking appliance.

As illustrated in FIGS. 30 and 32, the cooking appliance in this embodiment may include a temperature sensor 580. The temperature sensor 580 may be provided to measure a temperature in the cooking space 105. In this embodiment, the temperature sensor 580 is provided in a thermostat form, for example.

The temperature sensor 580 may be used to maintain the temperature of the cooking space 105 at a predetermined temperature. The temperature sensor 580 may be used to maintain the temperature of the cooking space 105 to prevent the inside of the cooking space 105 from being excessively heated.

The temperature sensor 580 may be disposed in the door front surface part 350, and a height of the temperature sensor 580 may be determined between the bottom surface 110 of the housing 100 and the first heating part 400. For example, the temperature sensor 580 may be biased toward the first heating part 400 than to the bottom surface 110 of the housing 100. That is, the temperature sensor 580 may be disposed at a height eccentric to the upper portion in the cooking space 105.

Specifically, the temperature sensor 580 may be disposed between the tray 200 and the first heating part 400. More specifically, the temperature sensor 580 may be biased toward the first heating part 400 than to the tray 200.

The temperature sensor 580 may be disposed as described above considering the distribution of temperature in the cooking space 105 and the possibility of interference between an object to be cooked and the temperature sensor 580 in the cooking space 105.

In the cooking appliance, a food item may be cooked in the cooking space 105. To this end, the food item may be mounted onto the tray 200. That is, a food item may ordinarily be cooked in a state of being mounted onto the tray 200 as a result of heating of the inside of the cooking space 105, performed by any one of the first heating part 400 and the second heating part 600.

In the state in which a food item is mounted onto the tray 200, the possibility of interference between the food item mounted onto the tray 200 and the temperature sensor 580 may not be excluded. When the food item interferes with the temperature sensor 580, the temperature sensor 580 may not produce measurement results accurately or operational errors of the temperature sensor 580 may occur. Accordingly, the temperature sensor 580 needs to be disposed at a position where the interference between a food item and the temperature sensor 580 does not occur.

The temperature in the cooking space 105 may increase toward the upper portion of the cooking space 105 since heated air goes up or the first heating part 400, which heats the inside of the cooing space 105, is disposed in the upper portion of the cooking space 105.

The cooking space 105 may also be provided with the second heating part 600 (see FIG. 64) in the lower portion thereof. Unlike the first heating part 400 performing direct heating, the second heating part 600 may not perform direct heating. Accordingly, in the cooking space 105, the temperature tends to be higher in the upper portion than in the lower portion.

In this embodiment, the temperature sensor 580 is used to maintain the temperature of the cooking space 105 at a predetermined temperature or to prevent the cooking space from overheating, for example. For the temperature sensor 580 to play the above role effectively, the temperature sensor 580 disposed at a position of the cooking space 105, having a relatively high temperature, may have an advantage over the temperature sensor 580 disposed at a position having a relatively low temperature.

Ordinarily, the effect of the cooking space's temperature higher than an intended temperature on an object to be cooked may be greater than the effect of the cooking space's temperature lower than the intended temperature on the object to be cooked. Accordingly, it would be good to measure a temperature of a point having a high temperature. In particular, when the temperature sensor 580 is used to prevent the cooking space from overheating, it is preferable to measure a temperature of a point having a high temperature.

Further, since a temperature measuring module 640 (see FIG. 50) is disposed near a lower portion of the cooking space 105 and measures a temperature, the temperature sensor 580 may be preferably disposed at a position spaced a certain distance from the temperature measuring module 640 rather than a position very close to the temperature measuring module 640.

In this case, in this embodiment, the temperature sensor 580 may be disposed at a height eccentric to the upper portion further in the cooking space 105. Accordingly, the temperature sensor 580 may play its role effectively such that the temperature of the cooking space 105 is maintained at a predetermined temperature or the cooking space is prevented from overheating.

As illustrated in FIGS. 21, 22, 26 and 31, the second area 550b may be disposed outside the first area 550a in the lateral direction, and the temperature sensor 580 may be disposed in the second area 550b.

As described above, the first control board 500 may be disposed in the first area 550a, and components such as the shaft 110, the encoder 1200 and the like in relation to the manipulation device 1000 may be disposed on the first control board 500. Accordingly, the first control board 500 may have a size large enough to take up a wide area on the supporting panel 550. That is, the first control board 500 may occupy more than half of the area of the supporting panel 550.

In this embodiment, the manipulation device 1000 is disposed at a position eccentric to the upper portion on the door front surface part 350. Accordingly, the first control board 500 needs to be disposed at a position eccentric to the upper portion on the door front surface part 350 such that the components in relation to the manipulation device 1000 are disposed on the first control board 500.

Thus, most of the upper portion of the supporting panel 550 may be occupied by the first control board 500. Further, there is not enough space for installing the temperature sensor 580, i.e., the temperature sensor supporting part 557, in the upper portion of the first control board 500.

To solve the problem, in this embodiment, the temperature sensor 580 may be disposed on one side of the first control board 500 in the lateral direction thereof such that the temperature sensor 580 and the first control board 500 do not overlap in the front-rear direction. That is, the temperature sensor 580 may be disposed eccentrically on one side in the lateral direction while being disposed at a position eccentric to the upper portion in the cooking space 105. For example, the temperature sensor 580 may be disposed at a position adjacent to an edge on an upper side of the door front surface part 350 having a rectangular shape.

Accordingly, the temperature sensor 580 may be disposed at a position where the temperature sensor avoids interference with another component such as the first control board 500 and the like and plays its role effectively.

Considering a food item is ordinarily disposed at the center of the cooking space 105, when the temperature sensor 580 is disposed at a position adjacent to the edge on the upper side of the door front surface part 350, as described above, the temperature sensor 580 is less likely to contact the food item.

In this embodiment, the cooking appliance may further include a shielding plate 328. The shielding plate 328 may be disposed in the lower portion of the door upper surface part 310. The shielding plate 328 may be formed into a plate having a length extending along a length-wise direction of the first heating part 400.

In this embodiment, a pair of first heating parts 400 may be disposed in the lower portion of the door upper surface part 310, and a pair of shielding plates 328 may be provided to correspond to the pair of first heating parts 400. Each of the shielding plates 328 may be disposed near the first heating part 400, and guide a direction in which the first heating part 400 emits heat.

For example, a shielding plate 328, which is disposed near a first heating part 400, adjacent to the door front surface part 350, of the pair of first heating parts 400, may be disposed between the door front surface part 350 and the first heating part 400, and a shielding plate 328, which is disposed near a first heating part 400, disposed relatively rearward, of the pair of first heating parts 400, may be disposed between the rear surface of the housing 100 and the first heating part 400.

The shielding plate 328, disposed as described above, may guide the heat emitted by the first heating part 400 to a central side of the cooking space. The shielding plate 328 may block the heat of the first heating part 400 from being emitted toward the door front surface part 350 or the rear surface 140 of the housing 100.

The first heating part 400 may be disposed near the door front surface part 350 or the rear surface 140 of the housing 100. Accordingly, the door front surface part 350 and the rear surface 140 of the housing 100 may be directly heated by the first heating part 400.

Various electronic components may be disposed in the door front surface part 350 and at the rear of the housing 100. Accordingly, intensive heat emitted toward the door front surface part 350 and the rear surface 140 of the housing 100 needs to be avoided.

Thus, in this embodiment, the shielding plate 328 may be respectively disposed between the door front surface part 350 and the first heating part 400 and between the rear surface of the housing 100 and the first heating part 400. The shielding pate, disposed as described above, may block the heat of the first heating part 400 from being emitting to the door front surface part 350 or the rear surface 140 of the housing 100, thereby preventing thermal degradation of the electronic components.

Additionally, the shielding plate 328 near the door front surface part 350 may be disposed between the temperature sensor 580 and the first heating part 400. In this case, the temperature sensor 580 may be disposed in a state in which the shielding plate 328 blocks the temperature sensor 580 from the first heating part 400.

Accordingly, the temperature sensor 580 may be disposed in an area that is not directly affected by the heat of the first heating part 400. That is, the temperature sensor 580 may be disposed in an area that is adjacent to the first heating part 400 and is not directly affected by the heat of the first heating part 400.

As a result, the temperature sensor 580 may provide reliable measurement results close to an actual temperature in the cooking space 105 even through the temperature sensor 580 is disposed at a position adjacent to the first heating part 400.

[Structure of Touch Manipulation Part]

Figure 33:
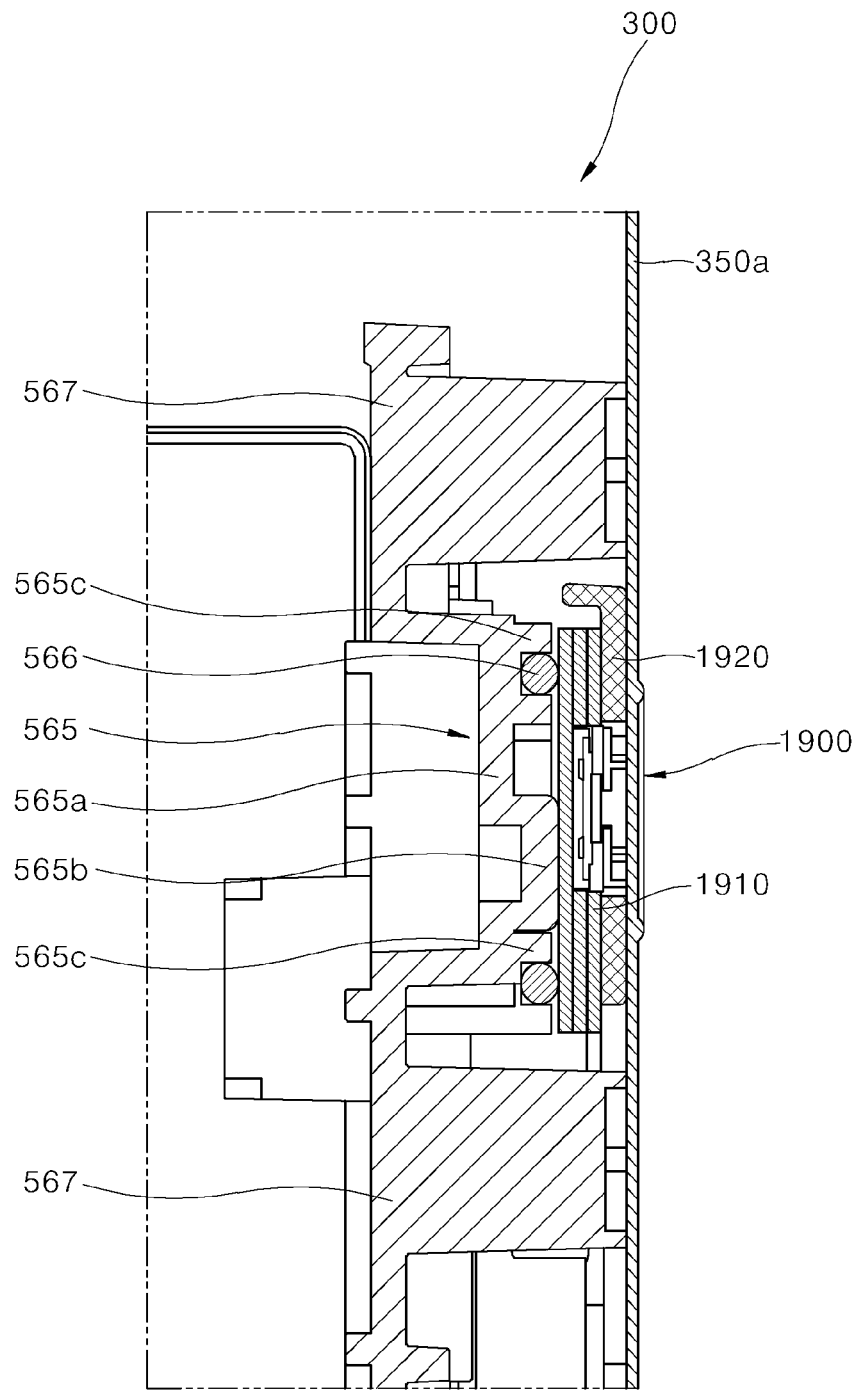
FIG. 33 is a cross-sectional view showing a structure of a touch manipulation part in FIG. 27.

FIG. 33 is a cross-sectional view showing a structure of a touch manipulation part in FIG. 27.

Referring to FIGS. 1, 13 and 33, the cooking appliance in this embodiment may further include a touch manipulation part 1900. The touch manipulation part 1900 may be disposed on a front surface of the door front surface part 350 along with the manipulation device 1000. In this embodiment, the touch manipulation part 1900 is disposed in a lateral portion of the manipulation device 1000 while being disposed near the manipulation device 1000, for example. The user may directly manipulate the touch manipulation part 1900 together with the manipulation device 1000 to control an operation of the cooking appliance.

In an example, the touch manipulation part 1900 may include at least one of a manipulation switch for controlling the turn-on/off of the first heating part 400, and a manipulation switch for selecting the sort and state of an object to be cooked.

The touch manipulation part 1900 may include a board 1910 and a booster 1920.

The board 1910 may be disposed in the door front surface part 350 in a state of being fixed to the supporting panel 550. To this end, the supporting panel 550 may further include a touch panel supporting part 565.

The touch panel supporting part 565 may be disposed in the second area 550b, i.e., in an area where the first control board 550 is not installed. The touch panel supporting part 565 may support the touch manipulation part 1900, and accordingly, the touch manipulation part 1900 may be supported by the touch panel supporting part 565 and disposed in the second area 550b.

The touch panel supporting part 565 may include a protruding surface part 565a, a protruding and supporting surface part 565b and a protruding rib part 565c.

The protruding surface part 565a may protrude forward from the main panel part 551 and form a flat surface parallel with the main panel part 551.

The protruding and supporting surface part 565b may protrude forward from the protruding surface part 565a and form a flat surface parallel with the main panel part 551. The protruding and supporting surface part 565b may support the board 1910 at a position which is further forward than the main panel part 551 and the protruding surface part 565a.

Since the board 1910 is supported by the protruding and supporting surface part 565b, the touch manipulation part 1900 may be fixed to the inside of the door front surface part 350, in close contact with the front surface of the first door main body part 350a.

The protruding rib part 565c may be disposed near the protruding and supporting surface part 565b. In the touch panel supporting part 565, a pair of protruding rib parts 565c may be spaced from each other with the protruding and supporting surface part 565b therebetween. In this embodiment, the pair of protruding rib parts 565c is spaced from each other in the up-down direction with the protruding surface part 565a therebetween, for example.

Each of the protruding rib parts 565c may protrude forward from the protruding surface part 565a. For example, each of the protruding rib parts 565c may protrude forward to the degree that the protruding and supporting surface part 565b protrudes.

Each of the protruding rib parts 565c may have a fixing groove. A packing member 566 may be inserted into the fixing groove. The packing member 566 may be inserted into the fixing groove, and fixed to the protruding rib part 565c.

The packing member 566 may be disposed between the touch panel supporting part 565 and the board 1910, specifically, between the protruding surface part 565a and the board 1910. When the packing member 566 is inserted into the fixing groove, the packing member 566 may protrude further forward than the protruding rib part 565c and the protruding and supporting surface part 565b. Additionally, the packing member 566 may be formed in a way that the packing member 566 is elastically deformed.

The packing member 566 may be disposed between the protruding surface part 565a and the board 1910 such that the packing member 566 and the board 1910 overlap. The packing member 566 may apply a force of pushing the board 1910 forward to the board 1910, and accordingly, the touch manipulation part 1900 may come into close contact with the front surface of the first door main body part 350a effectively.

Additionally, the supporting panel 550 may further include an outer support projection 567. In this embodiment, a plurality of outer support projections 567 is disposed outside the touch panel supporting part 565 and the touch manipulation part 1900, for example.

In this case, the outer support projection 567 may be disposed respectively outside the touch panel supporting part 565 and the touch manipulation part 1900 in the up-down direction and outside the touch panel supporting part 565 and the touch manipulation part 1900 in the left-right direction. Additionally, each of the outer support projections 567 may protrude forward from the main panel part 551 of the supporting panel 550.

Each of the outer support projections 567 may protrude to contact the front surface of the first door main body part 350a. The outer support projections 567 formed as described above may support the front surface of the first door main body part 350a from the rear around the touch manipulation part 1900.

The user needs to press the front surface of the first door main body part 350a to manipulate the touch manipulation part 1900. When the manipulation of the touch manipulation part 1900 is repeated, the front surface of the first door main body part 350a may be deformed as a result of repetitive press of the front surface of the first door main body part 350a. Since the outer support projection 567 supports the front surface of the first door main body part 350a around the touch manipulation part 1900, the deformation of the door 300, caused by the repetitive manipulation of the touch manipulation part 1900, may be effectively suppressed.

Additionally, the outer support projection 567 may support the front surface of the first door main body part 350a such that the front surface of the first door main body part 350a is pressed only in a front area of the touch manipulation part 1900, thereby ensuring improvement in reliability of the manipulation of the touch manipulation part 1900.

In an example, the touch manipulation part 1900 installed in the touch panel supporting part 565, having the above structure, may be a metal touch switch to which a capacitive sensor is applied. One or more capacitive parts may be formed on the board 1910 of the touch manipulation part 1900.

The board 1910 may be provided with a booster 1920 at a front thereof. The booster 1920 may be disposed between the front surface of the first door main body part 350a and the board 1910. The booster 1920 may be disposed in close contact with the front surface of the first door main body part 350a.

An area of the front surface of the first door main body part 350a, closely contacting the booster 1920, may be provided with function icons corresponding functions of the touch manipulation part 1900, and the function icons may be formed using raised relief or sunken relief. When the area of the front surface of the first door main body part 350a is pressed, the booster 1920 may also be pressed, and move rearward. Accordingly, a gap between the booster 1920 and the capacitive part may change, and accordingly, a touch on the touch manipulation part 1920 may be recognized based on a change in electric capacity caused by the change in the gap.

When the booster 1920 closely contacts the front surface of the first door main body part 350a, a recognition rate of a touch on the touch manipulation part 1900 may increase. In this embodiment, the packing member 566 installed in the protruding rib part 565c may apply a force of pushing the board 1910 forward to the board 1910, and accordingly, the booster 1920 may come into close contact with the front surface of the first door main body part 350a effectively.

[Structure of Second Heating Part, Receiver Coil and Second Control Board]

Figure 34:
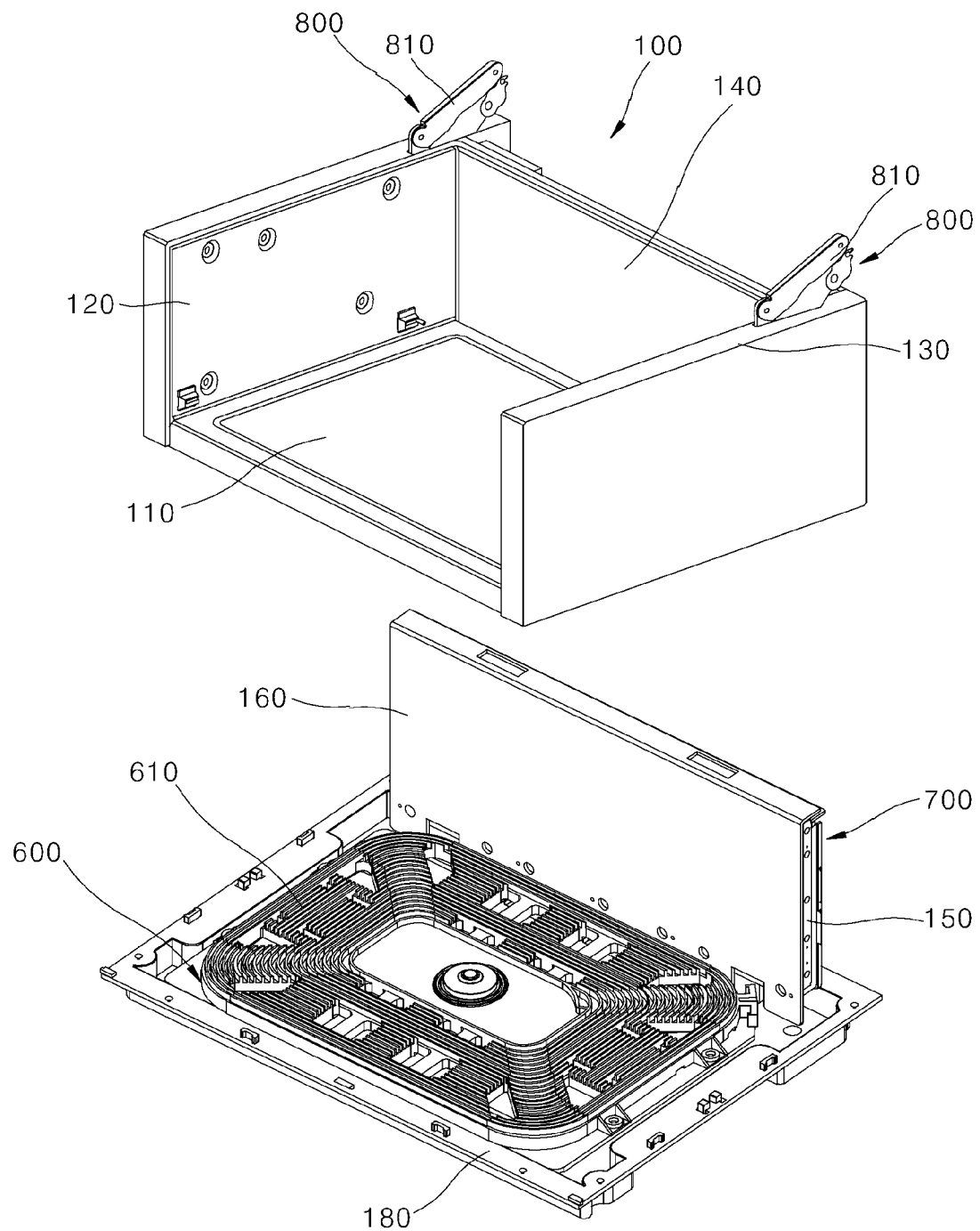
FIG. 34 is an exploded perspective view separately showing a housing and a second heating part in one embodiment.
Figure 35:
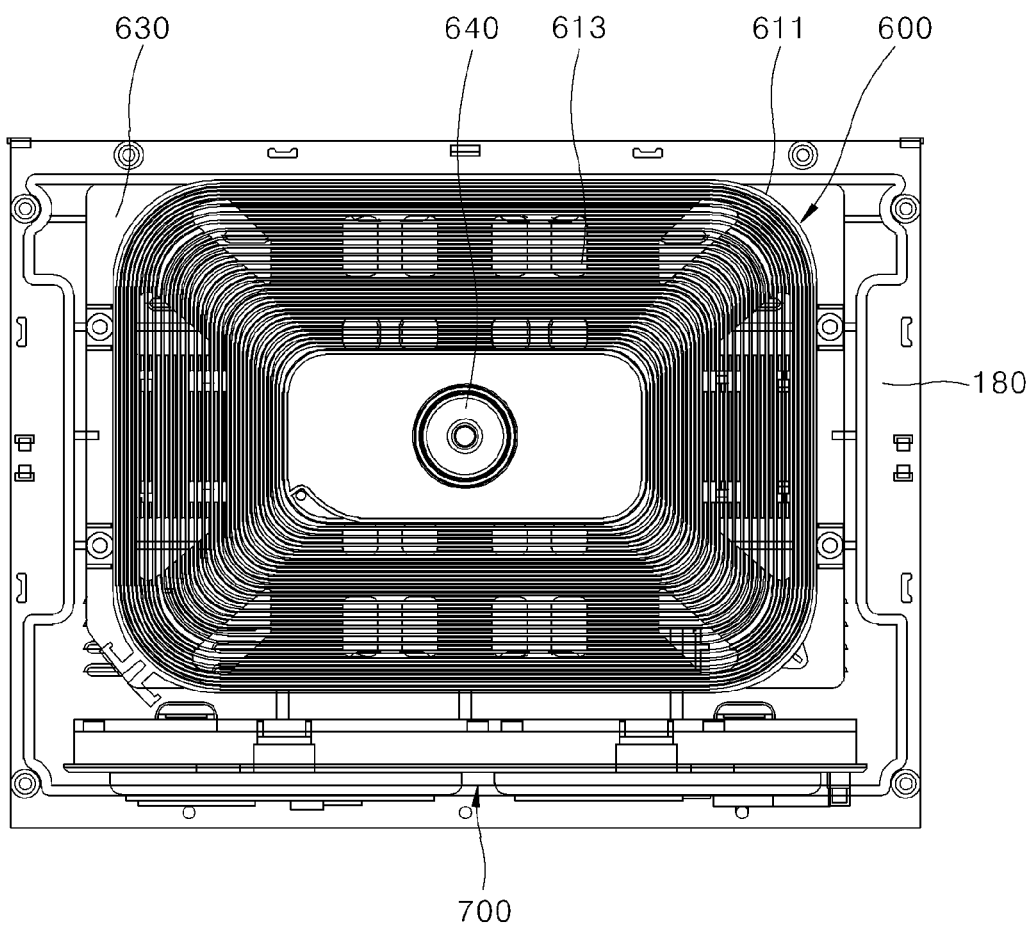
FIG. 35 is a plan view showing the second heating part in FIG. 34.
Figure 36:
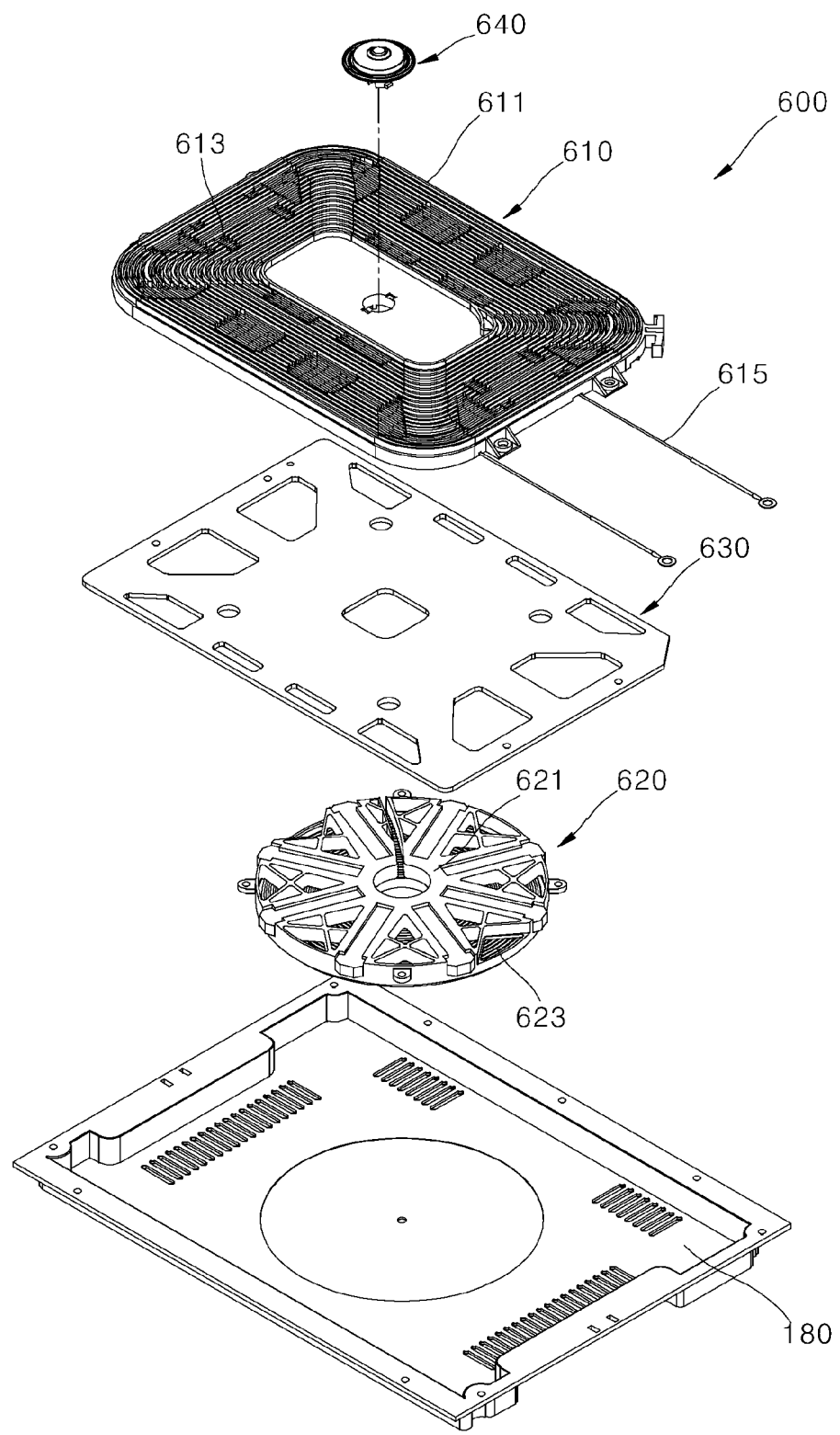
FIG. 36 is an exploded perspective view separately showing the second heating part, the receiver coil and the electromagnetic shielding plate in FIG. 34.
Figure 37:
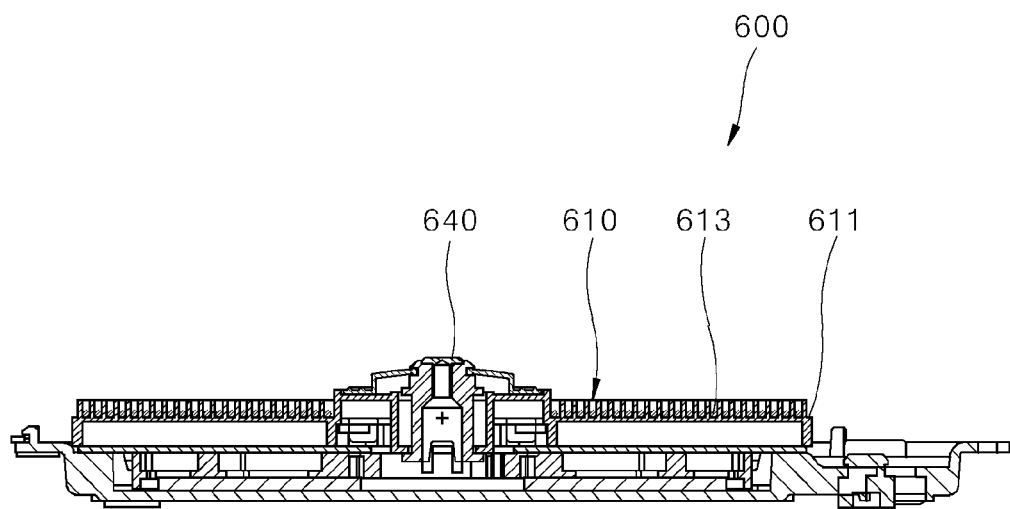
FIG. 37 is a cross-sectional view showing a coupling between the second heating part and the temperature sensor, and a coupling between the receiver coil and the electromagnetic shielding plate in FIG. 34.
Figure 38:
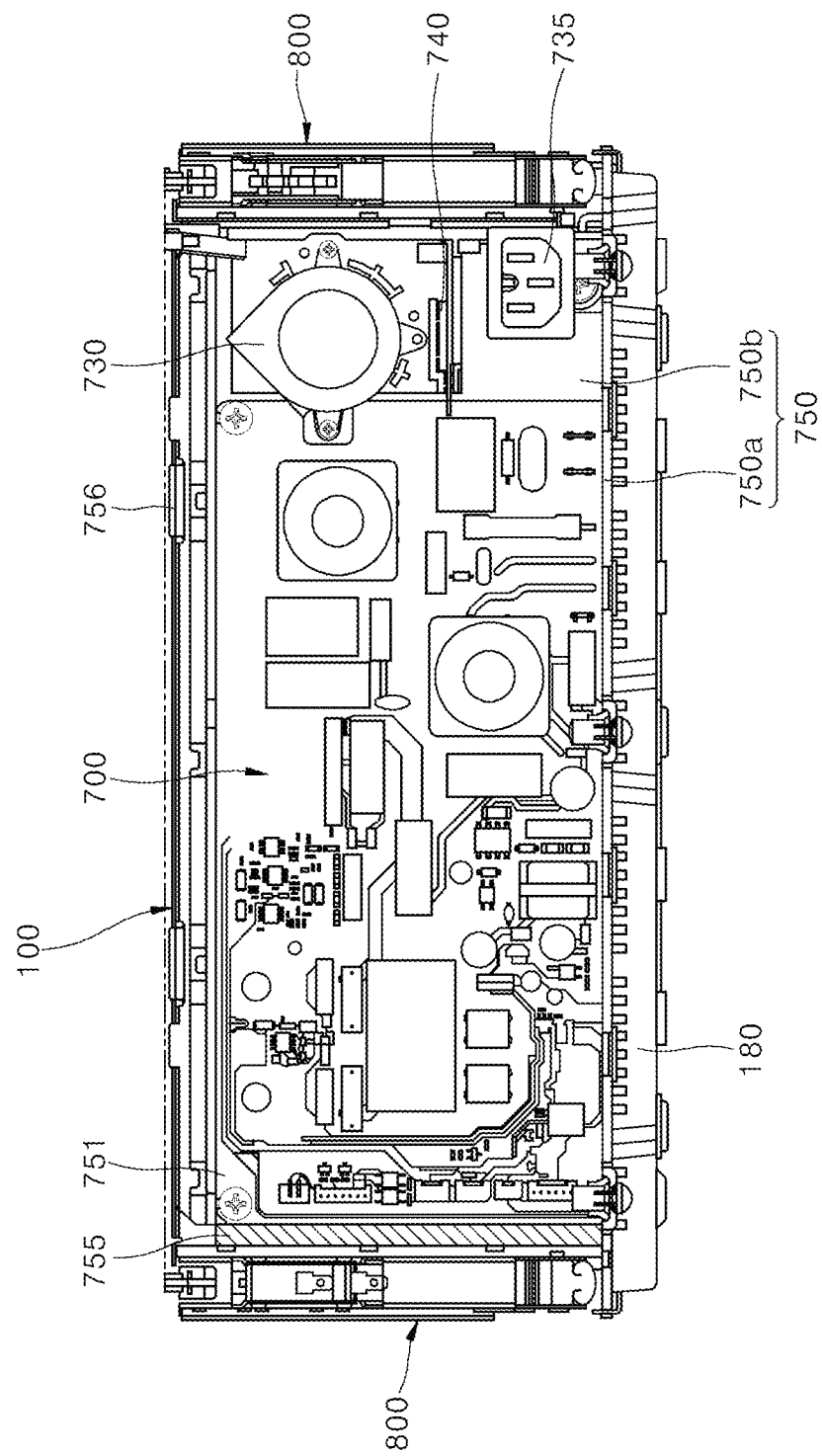
FIG. 38 is a rear view showing the second control board in FIG. 37.
Figure 39:
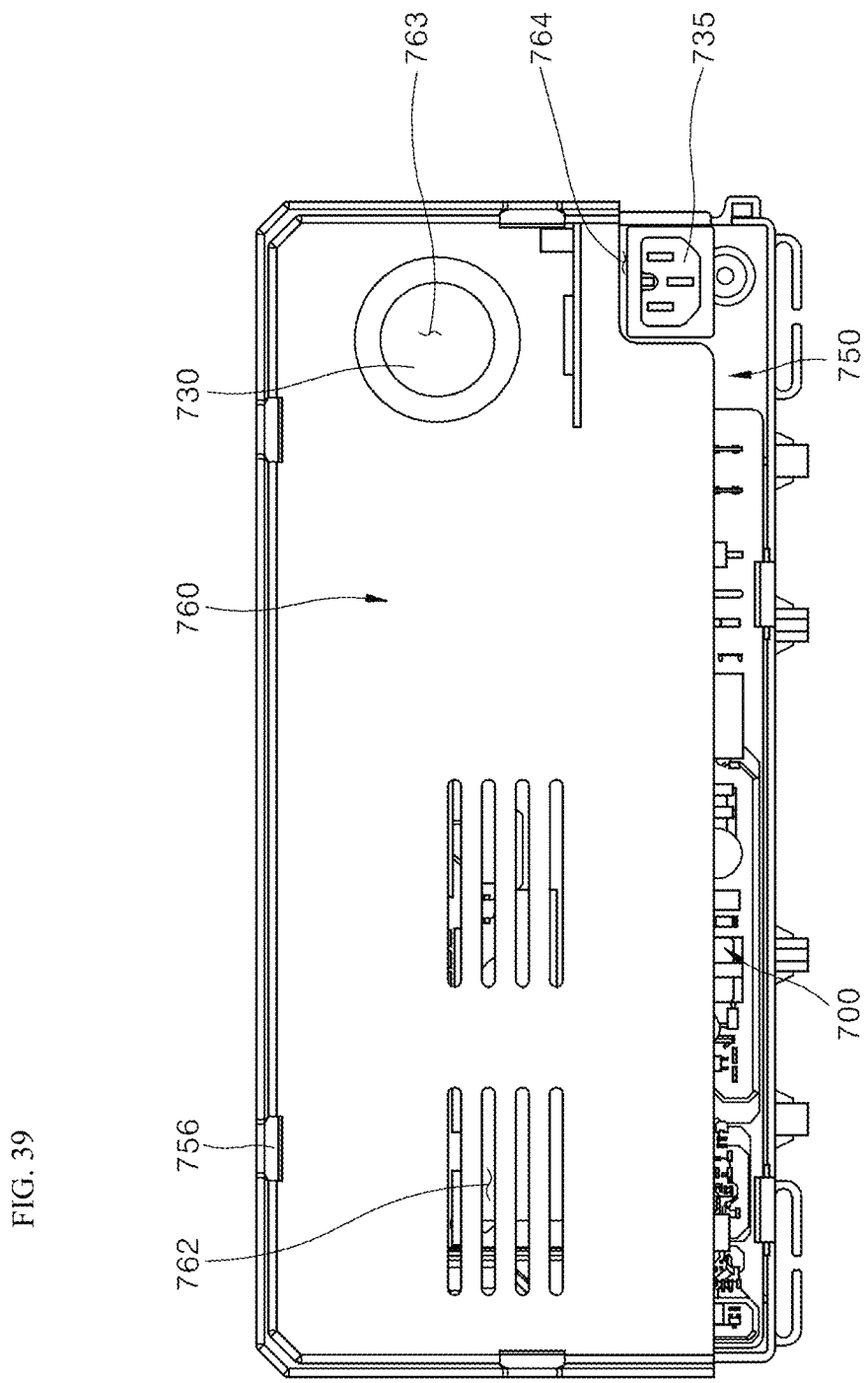
FIG. 39 is a rear view showing a state in which a rear surface cover is disposed on a rear surface of the second control board in FIG. 38.

FIG. 34 is an exploded perspective view separately showing a housing and a second heating part in one embodiment, FIG. 35 is a plan view showing the second heating part in FIG. 34. Additionally, FIG. 36 is an exploded perspective view separately showing the second heating part, the receiver coil and the electromagnetic shielding plate in FIG. 34, and FIG. 37 is a cross-sectional view showing a coupling between the second heating part and the temperature sensor, and a coupling between the receiver coil and the electromagnetic shielding plate in FIG. 34. Further, FIG. 38 is a rear view showing the second control board in FIG. 34, and FIG. 39 is a rear view showing a state in which a rear surface cover is disposed on a rear surface of the second control board in FIG. 38.

Referring to FIG. 3 and FIGS. 34 and 35, the second heating part 600 is disposed in the lower portion of the tray 200. The second heating part 600 is installed in the lower portion of the bottom surface 110 of the housing 100 and is provided in the form of a heating part which heats the tray 200 using a heating method different from that of the first heating part 400, e.g., in the form of an induction heating part. The induction heating part may include a working coil 610 installed in the lower portion of the bottom surface 110 of the housing 100 and may induce heating of the tray 200 in the lower portion of the tray 200.

The working coil 610 includes a coil installation base 611. In this embodiment, the coil installation base 611 is illustrated as being formed in a rectangular shape similar to the shape of the tray 200. Accordingly, the size and shape of the working coil 610 is similar to those of the tray 200 such that the entire area of the tray 200 is heated by the working coil 610.

As illustrated in FIGS. 35 to 37, the coil installation base 611 has a spiral groove, in which a coil 613 is installed. The coil 613 is housed in the spiral groove and fixed by being densely wound in an upper portion of the coil installation base 611. A coil connection wiring 615 connected to a coil control printed circuit board (PCB) for controlling the coil 613 is provided at an end of the coil 613.

Further, the second heating part 600 may further include a receiver coil 620. The receiver coil 620 is a component provided to receive wirelessly-transmitted power and is disposed in a lower portion of the second heating part 600. Also, a base 180 is disposed in a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may include a coil installation base 621 and a coil 623. Unlike the coil installation base 611 of the working coil 610, the coil installation base 621 of the receiver coil 620 is formed in an approximately circular shape. Accordingly, the shape of the receiver coil 620 is similar to the shape of a working coil of an induction heating part provided at a cooktop.

In this embodiment, the receiver coil 620 is provided to receive power from an induction heating part of another cooking appliance, i.e., a cooktop, which is provided in addition to the cooking appliance in this embodiment.

For example, the cooking appliance in this embodiment may be used in a state of being placed on a cooktop. In this case, power required for operation of the cooking appliance may be received from an induction heating part of the cooktop.

In an example, when the working coil of the cooktop and the cooking appliance in this embodiment are operated together while the cooking appliance in this embodiment is placed on the cooktop, power supplied through the cooktop may be delivered to the receiver coil 620.

In this case, a current is induced toward the receiver coil 620 through a magnetic field which changes in the working coil of the cooktop due to magnetic induction phenomenon. In this way, power supplied through the cooktop may be delivered to the receiver coil 620. In this procedure, in order to improve power reception efficiency of the receiver coil 620, the cooking appliance in this embodiment may be placed on the cooktop such that the position of the receiver coil 620 overlaps with the position of the working coil provided in the induction heating part of the cooktop in the up-down direction.

Further, the induction heating part may further include an electromagnetic shielding plate 630 disposed between the working coil 610 and the receiver coil 620. The electromagnetic shielding plate 630 may be provided in the form of a metal plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

The cooking appliance in this embodiment including the receiver coil 620 may be driven by wirelessly receiving power from the induction heating part of the cooktop. Since the cooking appliance does not require untidy power cables, the cooking appliance may be provided with a simple and neat exterior, and may be operated by wirelessly receiving power just by being placed on the cooktop, and thus the user's satisfaction may be further met.

As illustrated in FIGS. 34 to 38, the receiver coil 620 is electrically connected to the second control board 700 disposed behind the working coil 610 and the receiver coil 620. The power wirelessly delivered from the working coil of the cooktop to the receiver coil 620 is transmitted to the second control board 700 electrically connected to the receiver coil 620.

In this embodiment, the inner space in the lower portion of the bottom surface 110 of the housing 100 and the inner space at the rear of the rear surface 140 of the housing 100 are connected to each other. The working coil 610 of the induction heating part disposed at the lower portion of the bottom surface 110 of the housing 100 and the second control board 700 disposed at the rear of the rear surface 140 of the housing 100 may be electrically connected to each other by a cable. The cable connects the working coil 610 and the second control board 700 through the inner space at the lower portion of the bottom surface 110 of the housing 100 and the inner space at the rear of the rear surface 140 of the housing 100 which are connected to each other.

A power processing part provided at the second control board 700 supplies power required for operation of the induction heating part and the like of the second heating part 600. The power processing part is connected to the receiver coil 620 and receives power from the receiver coil 620 and processes the received power to a form suitable for use in the second heating part 600 and the like. The power processing part may include a noise filter PCB, and a coil control PCB for controlling operation of the working coil 610 may be provided on the second control board 700.

The noise filter PCB serves to remove noise from power to be supplied to the working coil 610, and the coil control PCB controls the operation of the working coil 610. A chip for controlling the operation of the working coil 610, e.g., an insulated gate bipolar transistor (IGBT) chip, may be mounted on the coil control PCB.

The IGBT chip is a kind of high heat generation chip that may require temperature management. When the IGBT chip is overheated to a predetermined temperature or more, the IGBT chip is unable to control the working coil 610.

In consideration of such an aspect, a second cooling fan 730 is installed at the second control board 700. The second cooling fan 730 may be a sirocco fan which sucks air from an outside environment of the housing 100 and discharges the air toward the IGBT chip.

The second cooling fan 730 may be disposed at the side of the IGBT chip and may suck air from the rear side of the housing 100 and discharge the air sideward toward the IGBT chip.

The air introduced into the space portion at the rear of the rear surface of the housing 100 through the second cooling fan 730 may first come into contact with the IGBT chip and a heat sink for cooling the IGBT chip, cool the IGBT chip and the heat sink, cool a portion of the noise filter PCB, and then be discharged to the outside environment.

The second control board 700 and the second cooling fan 730 may be fixed to a rear surface supporting panel 750, and fixed to the rear surface 140 of the housing 100.

Figure 51:
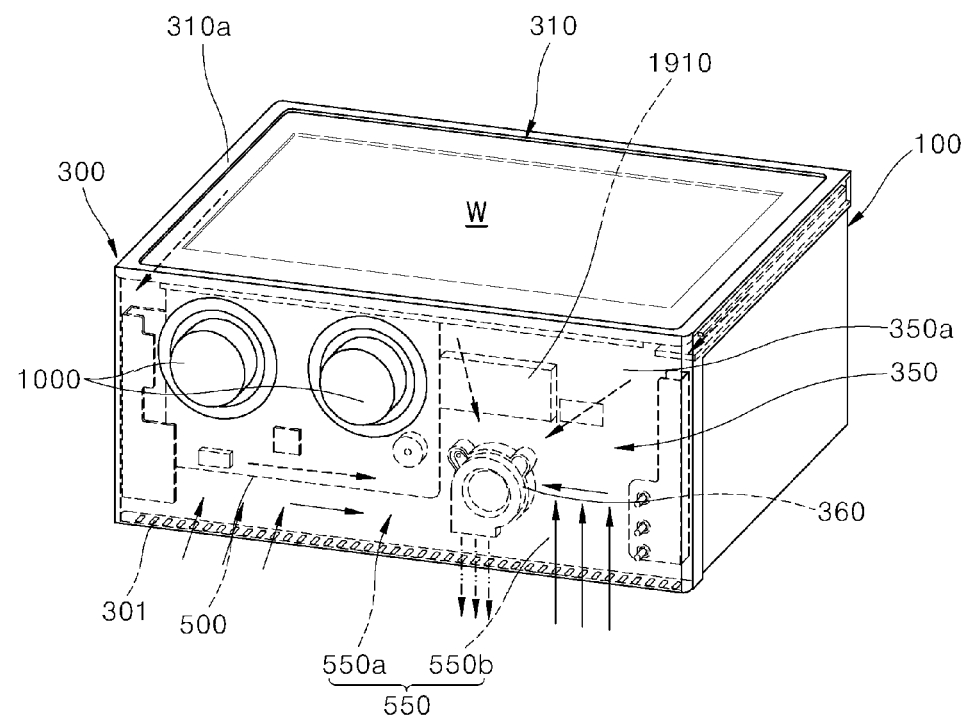
FIG. 51 is a view showing flows of steam and air inside the door front surface part in FIG. 50.

The rear surface supporting panel 750, as illustrated in FIGS. 3 and 51, may be disposed at the rear of the housing 100. The rear surface supporting panel 750 may be coupled to the rear surface 140 of the housing 100, and fixed to the rear of the housing 100. The rear surface supporting panel 750 may include a main panel part 751 and a first protruding edge part 755.

The main panel part 751 may form a supporting surface supporting the second control board 700. In this embodiment, the main panel part 751 has a shape, e.g., a rectangular shape, similar to the shape of the rear surface 140 of the housing 100, for example.

The main panel part 751 may be made of a lightweight insulating material, and have enough strength to support the second control board 700 and various electronic components disposed on the second control board.

The first protruding edge part 755 may be disposed on an edge of the main panel part 751. The first protruding edge part 755 may protrude rearward from the edge of the main panel part 751. Accordingly, a space encircled by the main panel part 751 and the first protruding edge part 755 may be formed at the rear of the main panel part 751. Additionally, the second control board 700 and the second cooling fan 730 may be disposed in the space.

The rear surface supporting panel 750 may include a first area 750a and a second area 750b. The first area 750a may be an area in which the second control board 700 is disposed, and the second area 750b may be an area in which the second control board 700 is not disposed. In this embodiment, the first area 750a and the second area 750b are disposed in the left-right direction, for example. The first area 750a may be disposed on the left side, and the second area 750b may be disposed on the right side. The first area 750a may occupy most of the area of the rear surface supporting panel 750.

The second cooling fan 730 may be disposed in the second area 750b. Additionally, a power source connecting part 735 and a communication module 740 may be disposed in the second area 750b.

The power source connecting part 735 may be installed in the second area 750b while being disposed on the rear surface supporting panel 750. The power source connecting part 735 may be disposed in a lateral portion of the second control board 700 and electrically connected to the second control board 700.

In an example, the power source connecting part 735 may be provided in an inlet power socket form. The power source connecting part 735 may connect to a plug of a power cable connected to an external power source, to connect to the external power source. Power supplied through the power source connecting part 735 may be processed by the power processing part of the second control board 700 in an appropriate form to be used by the second heating part 60 and the like.

The power source connecting part 735 may be disposed further downward than the second cooling fan 730 while being disposed in the lateral portion of the second control board 700. When the power source connecting part 735 is disposed further upward than the second cooling fan 730, the power source connecting part 735 and a power cable connected to the power source connecting part may be exposed as much as the power source connecting part 735 is disposed further upward than the second cooling fan 730.

When the power cable connected to the power source connecting part 735 is disposed upward, the power cable may act as an obstacle and may be a cause for the fall of the cooking appliance while the cooking appliance is used.

Accordingly, in this embodiment, the power source connecting part 735 may be disposed at a position wherein the power source connecting part 735 is hardly exposed, e.g., on an edge of the lower end of the rear surface of the cooking appliance. Thus, deterioration of aesthetic qualities of the cooking appliance, caused due to the power source connecting part 735 and the power cable connected to the power source connecting part 735, may be effectively prevented, or safety issues, caused by the power cable, may be effectively dealt with.

The communication module 740 may be a communication module enabling wireless communication between an external device, e.g., a smartphone, and the cooking appliance.

In an example, the communication module 740 may be a short-range communication module. For example, the communication module 740 may be a communication module assisting with low power wireless communication such as Bluetooth Low Energy (BLE). In addition, the communication module 740 may include a module such as a Bluetooth communication module, an NFC communication module and the like, assisting with various types of short-range communication.

In another example, the communication module 740 may be a mobile communication module. For example, the communication module 740 may include a module assisting with wireless communication such as Long Term Evolution (LTE), Wi-Fi and the like.

The communication module 740 may be disposed in the lateral portion of the second control board 700. Additionally, the communication module 740 may be disposed in a lower portion of the second cooling fan 730 and in an upper portion of the power source connecting part 735. That is, the communication module 740 may be disposed between the second cooling fan 730 and the power source connecting part 735 while being disposed in the lateral portion of the second control board 700.

In the disposition structure of the communication module 740, while the power source connecting part 735 is disposed at a lowest position among the second cooling fan 730, the communication module 740 and the power source connecting part 735, the communication module 740 may be disposed at a position where a length of wire between the communication module 740 and the second control board 700 is shortest.

Figure 52:
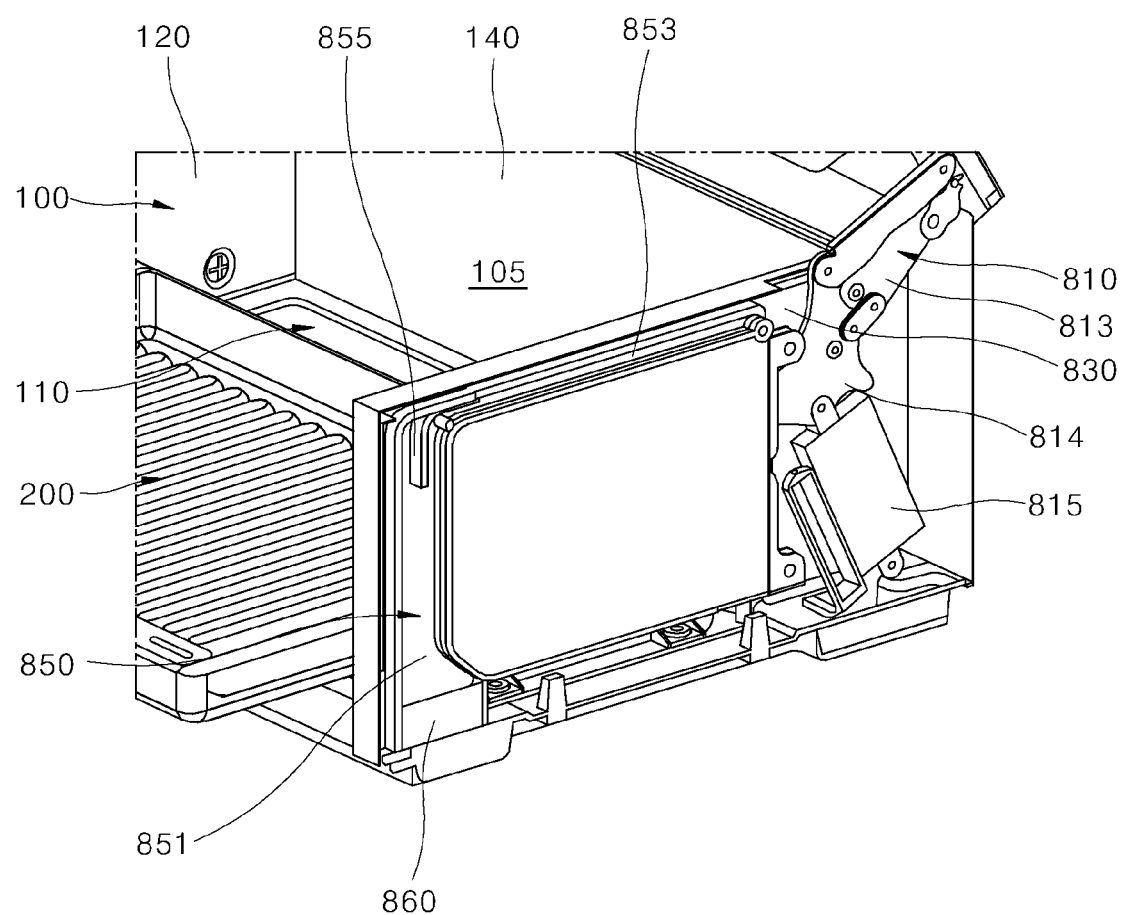
FIG. 52 is a cross-sectional perspective view showing a cross section of the cooking appliance along line "XXXXX-XXXXX" in FIG. 1.

The cooking appliance in this embodiment, as illustrated in FIGS. 3, 51 and 52, may further include a rear surface cover 760. The rear surface cover 760 may be disposed behind the rear surface supporting panel 750 and coupled to the rear surface supporting panel 750. The rear surface cover 760 may include a main cover part 761 and a second protruding edge part 765.

The main cover part 761 may form a flat surface parallel with the rear surface supporting panel 750, specifically, the main panel part 751. In this embodiment, the main cover part 761 is formed into a shape, e.g., a rectangle, similar to the shape of the main panel part 751, for example. The main cover part 761 may be made of a lightweight insulating material.

The main cover part 761 and the rear surface cover 760 including the main cover part may be disposed between a rear surface of the cabinet 170 and the second control board 700. The rear surface cover 760 disposed as described above may be provided as an insulating structure for insulating the cabinet 170 made of metal from the second control board 700.

Additionally, the rear surface cover 760 may be provided with a vent hole 762. The vent hole 762 may be formed on the main cover part 761 in a way that penetrates in the front-rear direction. The vent hole 762 may form a passage allowing air to come in and out on the main cover part 761.

The vent hole 762 may be spaced a predetermined distance from the second cooling fan 730. For example, when the second cooling fan 730 is disposed at a position eccentric to the right side on the rear surface of the cooking appliance, the vent hole 752 may be disposed at a position eccentric to the left side.

Accordingly, air discharged from the second cooling fan 730 may be prevented from leaking out of the rear of the rear surface cover 760 too early.

The rear surface cover 760 may have a fan installing hole 763. The fan installing hole 763 may form a passage allowing a portion of the second cooling fan 730, disposed between the rear surface supporting panel 750 and the rear surface cover 760, to be exposed to the rear of the rear surface cover 760. The fan installing hole 763 may be formed on the main cover part 761 in a way that penetrates in the front-rear direction and have a shape corresponding to a shape of the second cooling fan 730.

Most of the area of the second cooling fan 730, specifically, a portion of the second cooling fan 730 exposed to the outside, may be made of an insulating material. Accordingly, even when the portion of the second cooling fan 730 is exposed to the rear of the rear surface cover 760 or contacts the cabinet 170, there is little possibility of an electric problem.

Among components disposed on the rear surface supporting panel 750, the second cooling fan 730 may protrude farthest toward the rear. When a portion of the second cooling fan 730 is exposed to the rear of the rear surface cover 760 as described above, the rear surface cover 760 may be disposed on the rear surface of the cooking appliance such that the rear surface cover 760 does not protrude rearward as much as the portion of the second cooling fan 730 is exposed to the rear of the rear surface cover 760.

That is, a size of the cooking appliance in the front-rear direction may be reduced as much as the portion of the second cooling fan 730 is exposed to the rear of the rear surface cover 760 or the rear surface cover 760 is disposed on the rear surface of the cooking appliance. Additionally, as a result of fitted-coupling between the second cooling fan 730 and the rear surface cover 760, a position where the rear surface supporting panel 750 and the rear surface cover 760 are coupled may be guided, thereby easing the installation of the rear surface cover 760.

The rear surface cover 760 may have a cut part 764. The cut part 764 may be formed in a way that a portion of the main cover part 761 is cut. The cut part 764 may form a passage, connecting between the power source connecting part 735 and the cabinet 170, on the rear surface cover 760.

A second protruding edge part 765 may be disposed on an edge of the main cover part 761. The second protruding edge part 765 may protrude rearward from the edge of the main cover part 761. The second protruding edge part 765 may be coupled to the first protruding edge part 755 of the rear surface supporting panel 750. As a result of the coupling between the second protruding edge part 765 and the first protruding edge part 755, the rear surface cover 760 and the rear surface supporting panel 750 may be coupled such that a predetermined accommodating space is formed between the rear surface cover 760 and the rear surface supporting panel 750.

In an example, any one of the first protruding edge part 755 and the second protruding edge part 765 may be provided with a hook 756, and the other of the first protruding edge part 755 and the second protruding edge part 765 may be provided with a hook 756 may be provided with a hook groove for a coupling with the hook 756.

A through hole 171 may be formed on the rear surfaces of the second control board 700 and the cabinet 170 in a way that penetrates in the front-rear direction. An intake and exhaust grill 175 may be disposed in the through hole 171. The through hole 171 may form a passage allowing external air to pass through the cabinet 170 and flow into the second control board 700 or allowing air around the second control board 700 to pass through the cabinet 170 and be discharged outward.

The intake and exhaust grill 175 may block a foreign substance from permeating through the through hole 171 while allowing air to be introduced and discharged through the through hole 171. For example, the intake and exhaust grill 175 may include a louver structure.

Meanwhile, as illustrated in FIGS. 34 to 37, the second heating part 600 of the present embodiment may further include a temperature measuring module 640. The temperature measuring module 640 is provided to measure a temperature of the tray or a temperature of the inside of the cooking space 105 in which the tray is disposed.

The temperature measuring module 640 may be disposed at the center of the working coil 610. Specifically, the temperature measuring module 640 may be disposed at a portion where the coil 613 is not disposed on the coil installation base 611, e.g., a central portion of the coil installation base 611.

The temperature measuring module 640 may be fitted and coupled to the working coil 610 via a through hole formed in the central portion of the coil installation base 611. Also, the temperature measuring module 640 installed in this way may include a temperature sensor such as a thermistor and may be disposed at the lower portion of the bottom surface 110 of the housing 100 and measure the temperature of the tray or the temperature of the inside of the cooking space 105 in which the tray is disposed.

[Disposition Relationship Among Hinge Assembly, Second Heating Part, Second Control Board, See-Through Window, First Heating Part, Manipulation Device and First Control Board]

Referring to FIG. 3 and FIGS. 34 to 39, the hinge assemblies 800, the second heating part 600, and the second control board 700 are disposed in the housing 100.

The cooking space 105 may be formed inside the housing 100, and the tray 200 may be installed in the cooking space. The second heating part 600 for heating the tray 200 is disposed at the lower portion of the housing 100. Also, the hinge assembly 800 which rotatably supports the door 300 is disposed at each lateral portion of the housing 100.

The hinge assemblies 800 are disposed at both lateral portions of the housing 100 in order to stably support the door 300 from both sides of the door 300.

Since the upper surface and the front surface of the housing 100 are open and the second heating part 600 is installed at the lower portion of the housing 100, the hinge assemblies 800 are inevitably disposed at the rear or both lateral portions of the housing 100. Due to the above-described reasons, in many ways, it is advantageous for the hinge assemblies 800 to be disposed at both lateral portions of the housing 100.

The receiver coil 620 is disposed at the lower portion of the housing 100, more specifically, at the lower portion of the second heating part 600. Since the receiver coil 620 is disposed at a position most adjacent to a target of wireless power transmission, e.g., the working coil of the cooktop, the receiver coil 620 may be disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such an aspect, the electromagnetic shielding plate 630 may be disposed between the working coil 610 and the receiver coil 620.

Since the second control board 700 is a component closely related to power reception through the receiver coil 620 and the operation of the working coil 610, the second control board 700 may be disposed at a position adjacent to the receiver coil 620 and the working coil 610.

Since the second heating part 600 and the receiver coil 620 are disposed at the lower portion of the housing 100, and the hinge assemblies 800 are disposed at both lateral portions of the housing 100, the rear of the housing 100 may be the most suitable position for arrangement of the second control board 700.

In consideration of such aspect, the second control board 700 may be installed in a space at the rear of the rear surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assemblies 800. Accordingly, when configuring wires for connecting the second control board 700 and the components disposed in the door 300, the wires may be easily concealed inside the hinge assemblies 800. There is an advantage in that it is possible to configure the wires in a neat and simple manner such that the wires are not easily exposed to the outside.

As described above, the second heating part 600 and the receiver coil 620, the hinge assemblies 800, and the second control board 700 are disposed at the lower portion of the housing 100, both lateral portions of the housing 100, and the rear of the housing 100, respectively. The components are those suitable to be disposed in the housing 100 and are disposed at optimal positions that allow the components to function optimally, have high structural stability, have neat and simple wiring configurations, and efficiently avoid interference therebetween.

Meanwhile, referring to FIGS. 3, 5 and 32, the see-through window W, the first heating part 400, the manipulation device 1000, and the first control board 500 are disposed in the door 300. The components are those more suitable to be disposed in the door 300 than in the housing 100 due to functions thereof. Also, in consideration of an aspect that various other components are already disposed in the housing 100 and thus it is difficult for other components to be disposed in the housing 100, the see-through window W, the first heating part 400, the manipulation device 1000, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking space 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed higher than the tray 200.

The first heating part 400 installed in the door upper surface part 310 together with the see-through window W as described above may be disposed at a position at which the first heating part 400 is not exposed through the see-through window W when viewed from the top. When the first heating part 400 is disposed in a region exposed through the see-through window W, it is aesthetically not pleasing, a problem may occur in securing the field of view through the see-through window W, and a problem that the temperature of a portion of the see-through window W rises may also occur.

Also, in consideration of the shape of the door front surface part 350 having a rectangular shape in which a front-rear length is longer than a left-right length, the first heating part 400 may be disposed at the front outer side and the rear outer side of the see-through window W so that a length of the first heating part 400 may be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the manipulation device

1000 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the manipulation device 1000 in the door upper surface part 310. Also, when the manipulation device 1000 is disposed in the door upper surface part 310, in the process of opening the door 300, a collision may occur between the manipulation device 1000 and an obstacle disposed at the upper portion of the cooking appliance, and there is a risk of damage of the manipulation device 1000. Particularly, when the manipulation device 1000 is provided in the form protruding from the door 300, the risk is even greater.

Also, the door upper surface part 310 in which the first heating part 400 is disposed is likely to have a higher temperature than the door front surface part 350. Considering that the manipulation device 1000 is a component held by the user's hand and manipulated, when the manipulation device 1000 is disposed in the door upper surface part 310, the possibility that the user will come into contact with a hot portion of the door upper surface part 310 in the process of manipulating the manipulation device 1000 may be increased. That is, when the manipulation device 1000 is disposed in the door upper surface part 310, a risk that the user will suffer an injury such as a burn in the process of manipulating the manipulation device 1000 may be increased.

In consideration of such aspect, the manipulation device 1000 is disposed in the door front surface part 350 instead of the door upper surface part 310. Since the manipulation device 1000 is disposed in the door front surface part 350, the user may safely and conveniently control the operation of the cooking appliance from the front of the cooking appliance.

In addition to the manipulation device 1000, the first control board 500 is also disposed in the door front surface part 350. Various components and circuits related to reception of manipulation signals input via the manipulation device 1000, generation of control signals for controlling operations of the first heating part 400 and the second heating part 600, and the like may be provided in the first control board 500. Therefore, in particular, the first control board 500 may be electrically connected to the manipulation device 1000.

In this embodiment, like the manipulation device 1000, the first control board 500 is installed in the door front surface part 350 and disposed at a position very close to the manipulation device 1000. Therefore, connection between the manipulation device 1000 and the first control board 500 may be configured in the form in which the manipulation device 1000 is directly connected to the first control board 500, and, accordingly, a very simple and stable connection structure may be provided for the manipulation device 1000 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, and the stability and operational reliability of the cooking appliance may be further improved.

[Structure of Door Frame]

Figure 40:
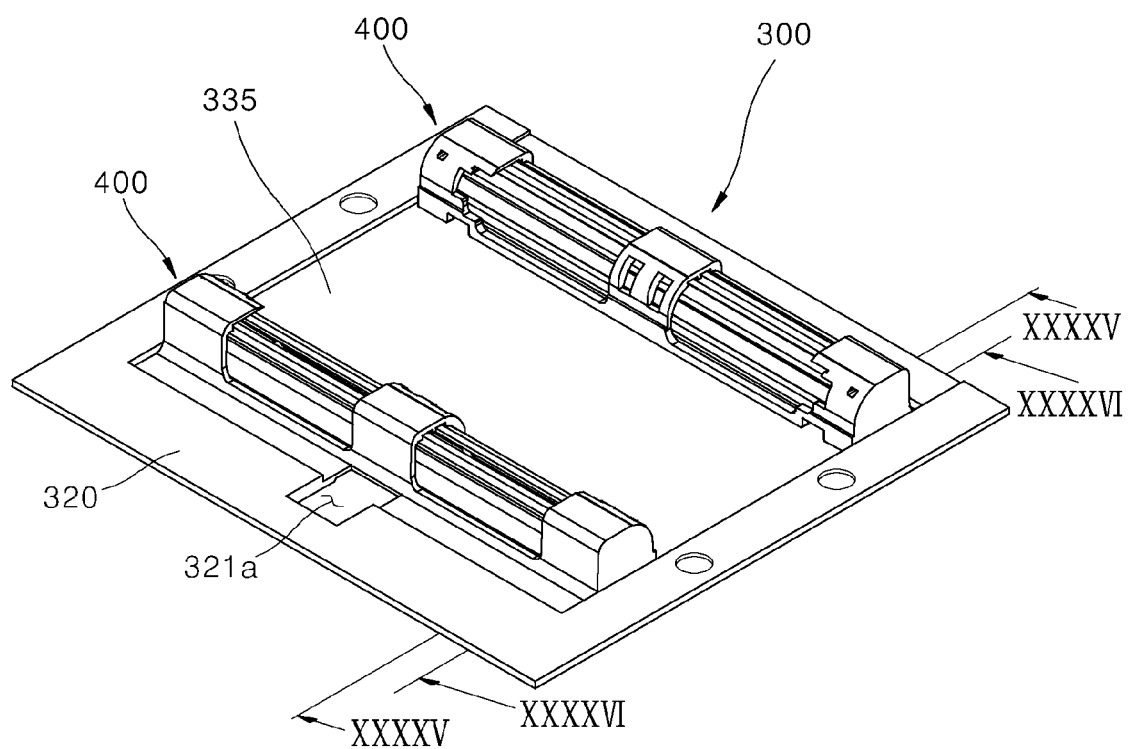
FIG. 40 is a perspective view separately showing a door frame and components installed in the door frame in one embodiment.
Figure 41:
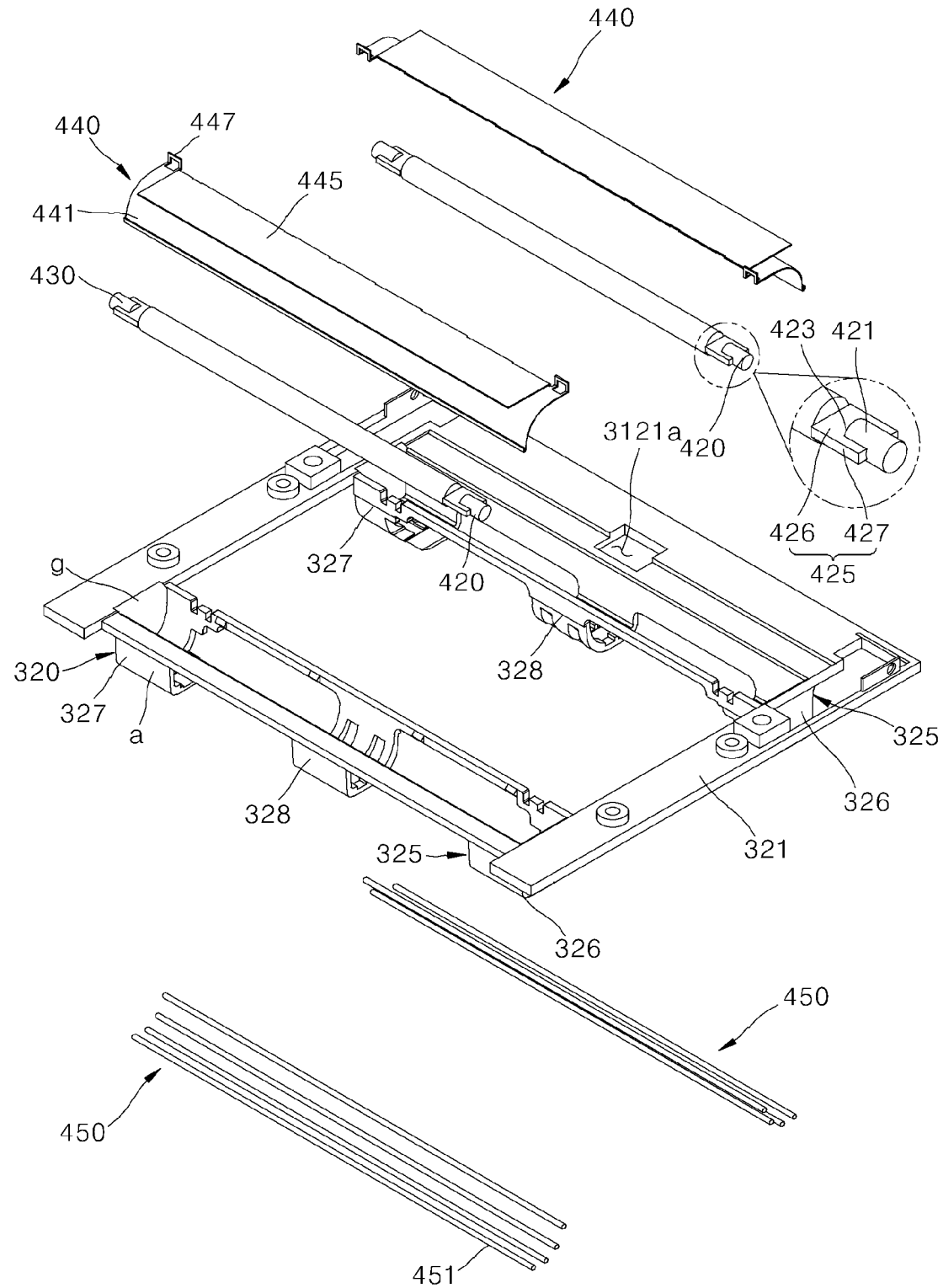
FIG. 41 is an exploded perspective view showing the door frame and the components installed in the door frame in FIG. 40.
Figure 42:
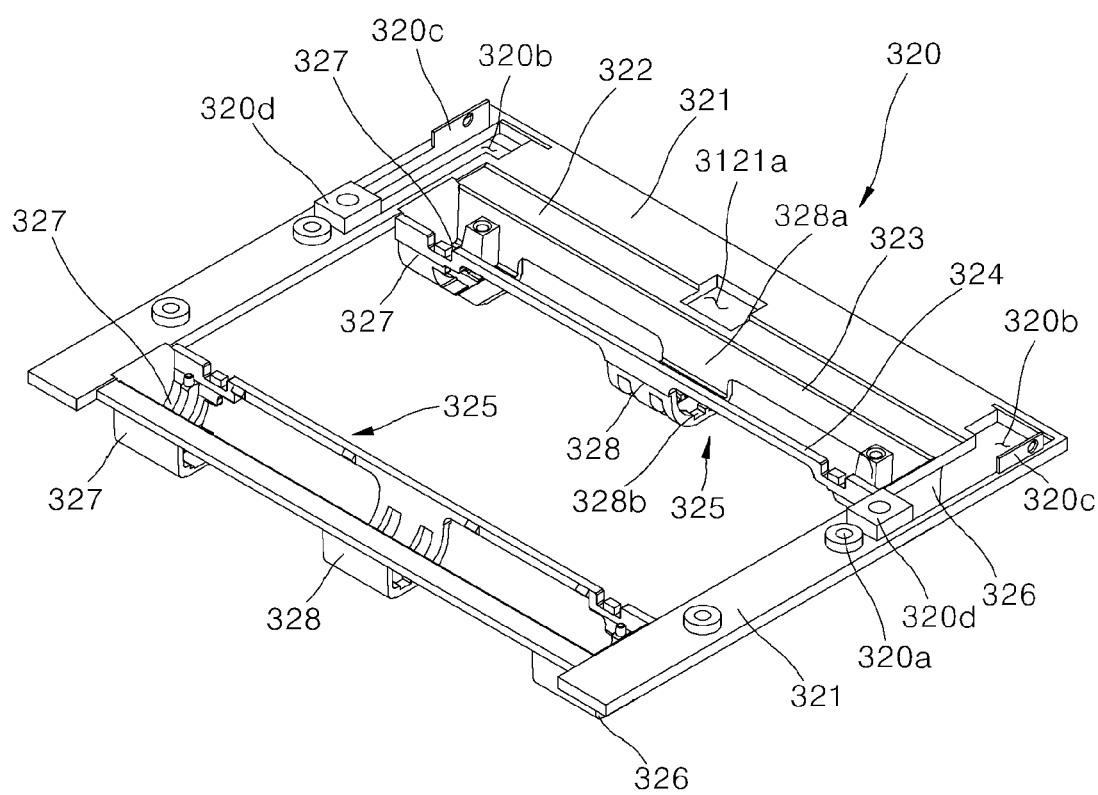
FIG. 42 is a perspective view separately showing the door frame in FIG. 41.
Figure 43:
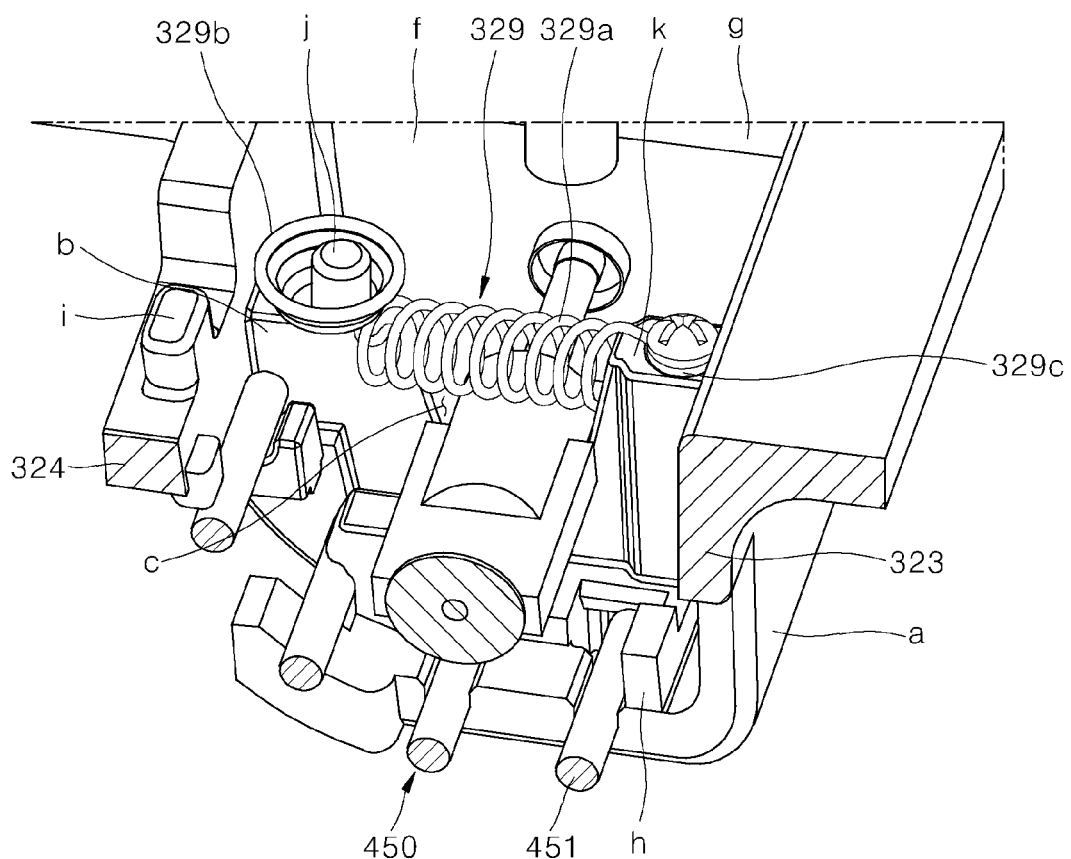
FIG. 43 is a cross-sectional perspective view showing a state in which a door frame, a first heating part and a protective grille are coupled.
Figure 44:
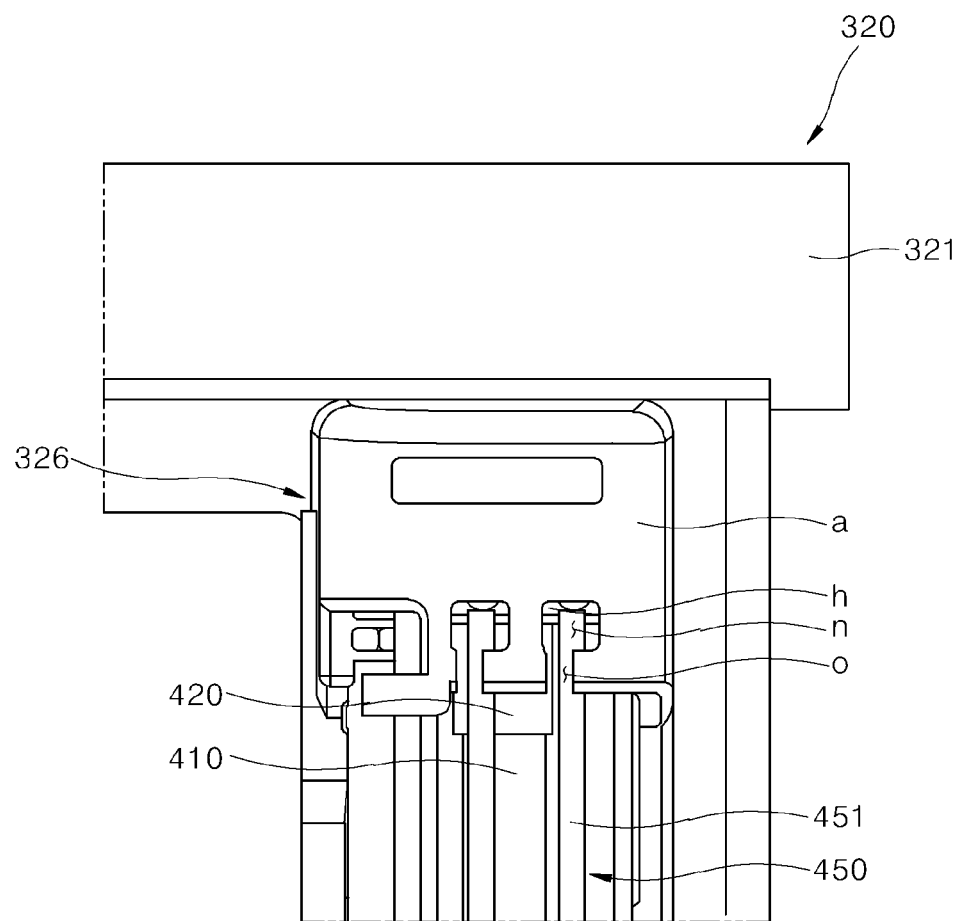
FIG. 44 is a bottom view showing the state in which the door frame, the first heating part and the protective grille are coupled.
Figure 45:
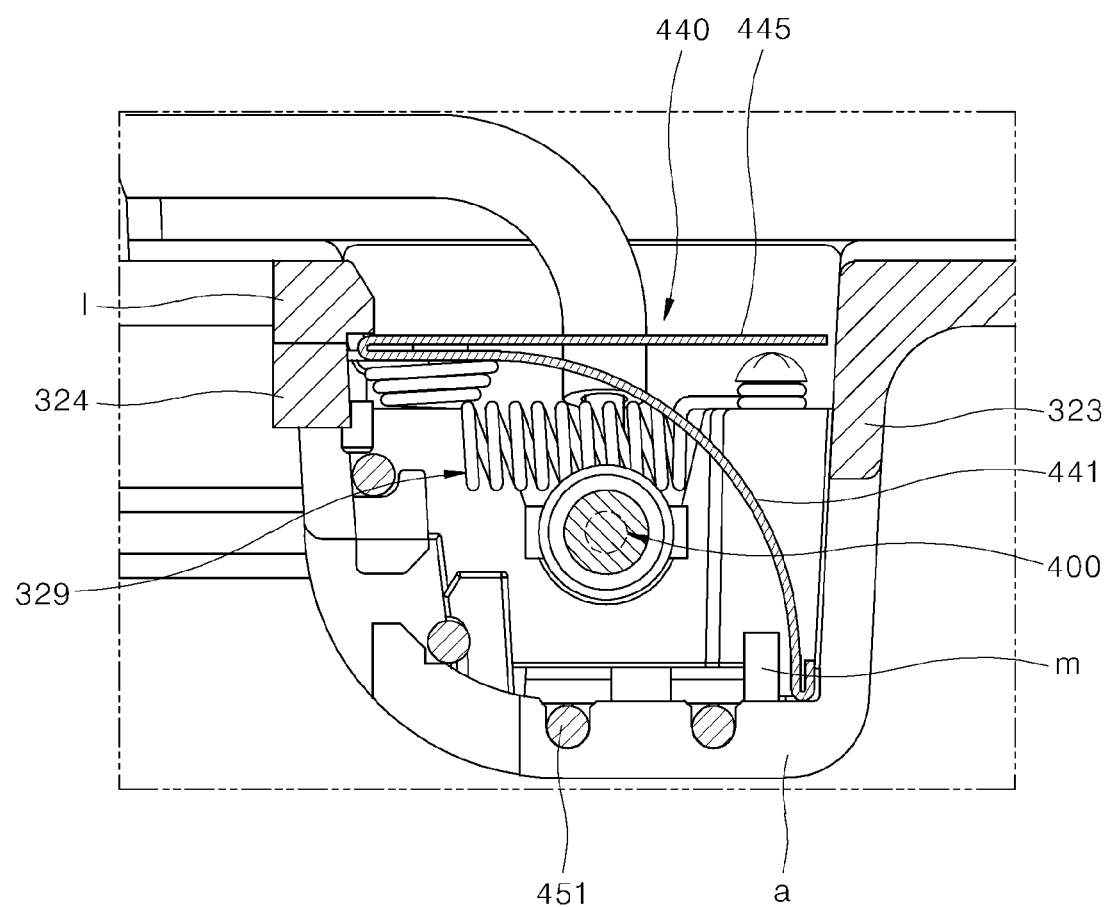
FIG. 45 is a cross-sectional view along line "XXXXV-XXXXV" in FIG. 40.
Figure 46:
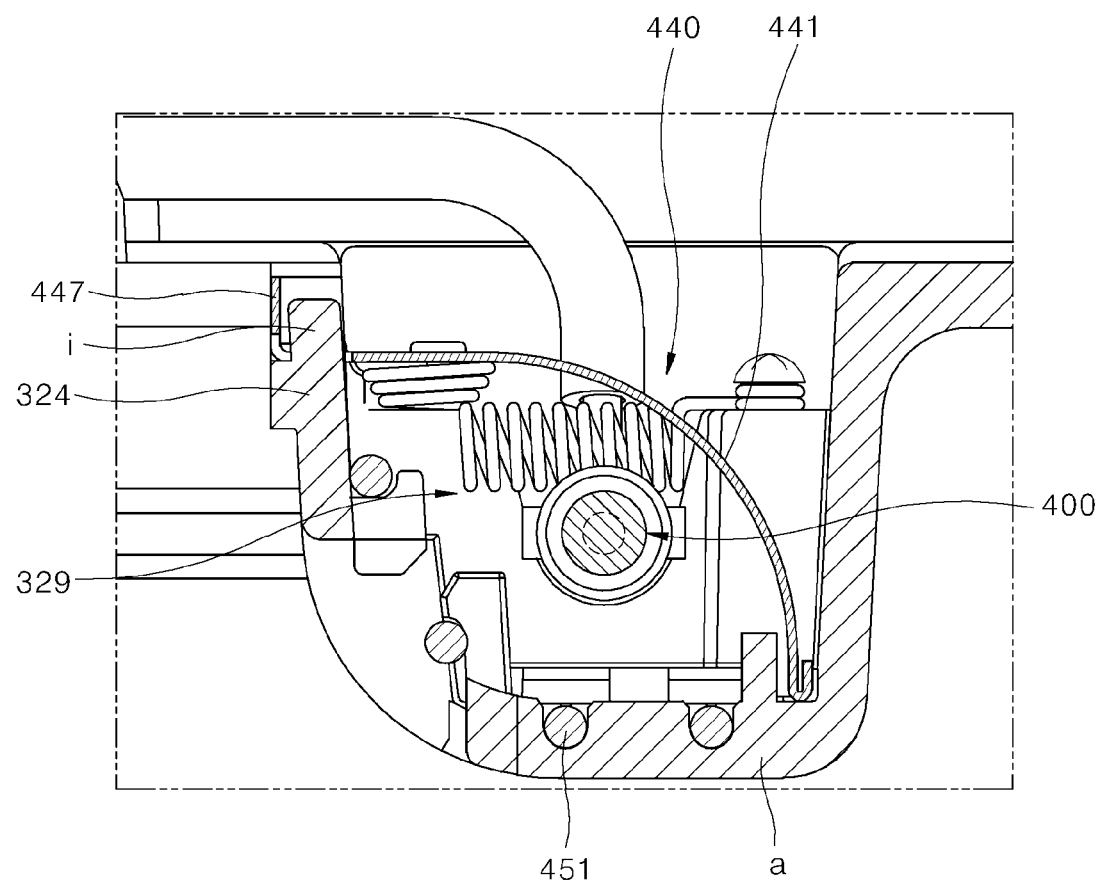
FIG. 46 is a cross-sectional view along line "XXXXVI-XXXXVI" in FIG. 40.
Figure 47:
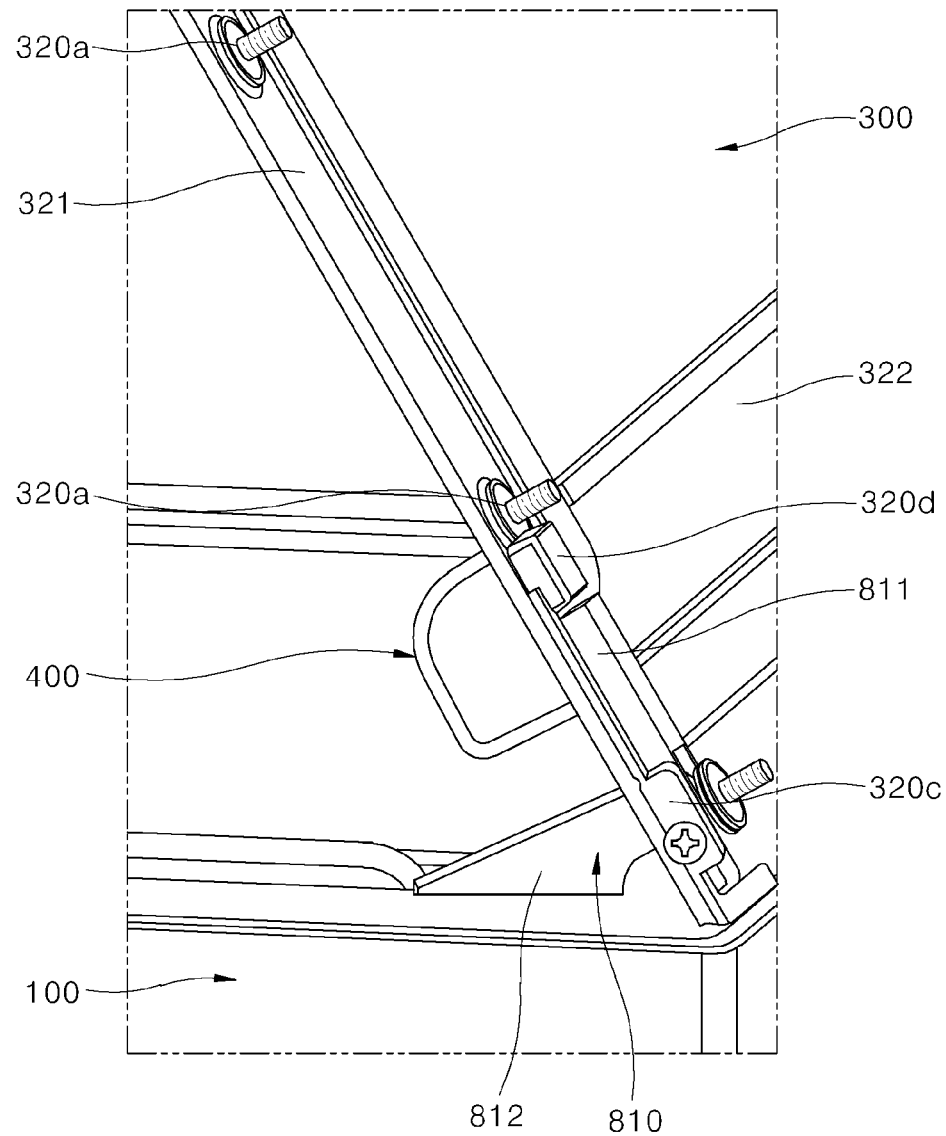
FIG. 47 is a perspective view showing a coupling structure between a door frame and a hinge part.
Figure 48:
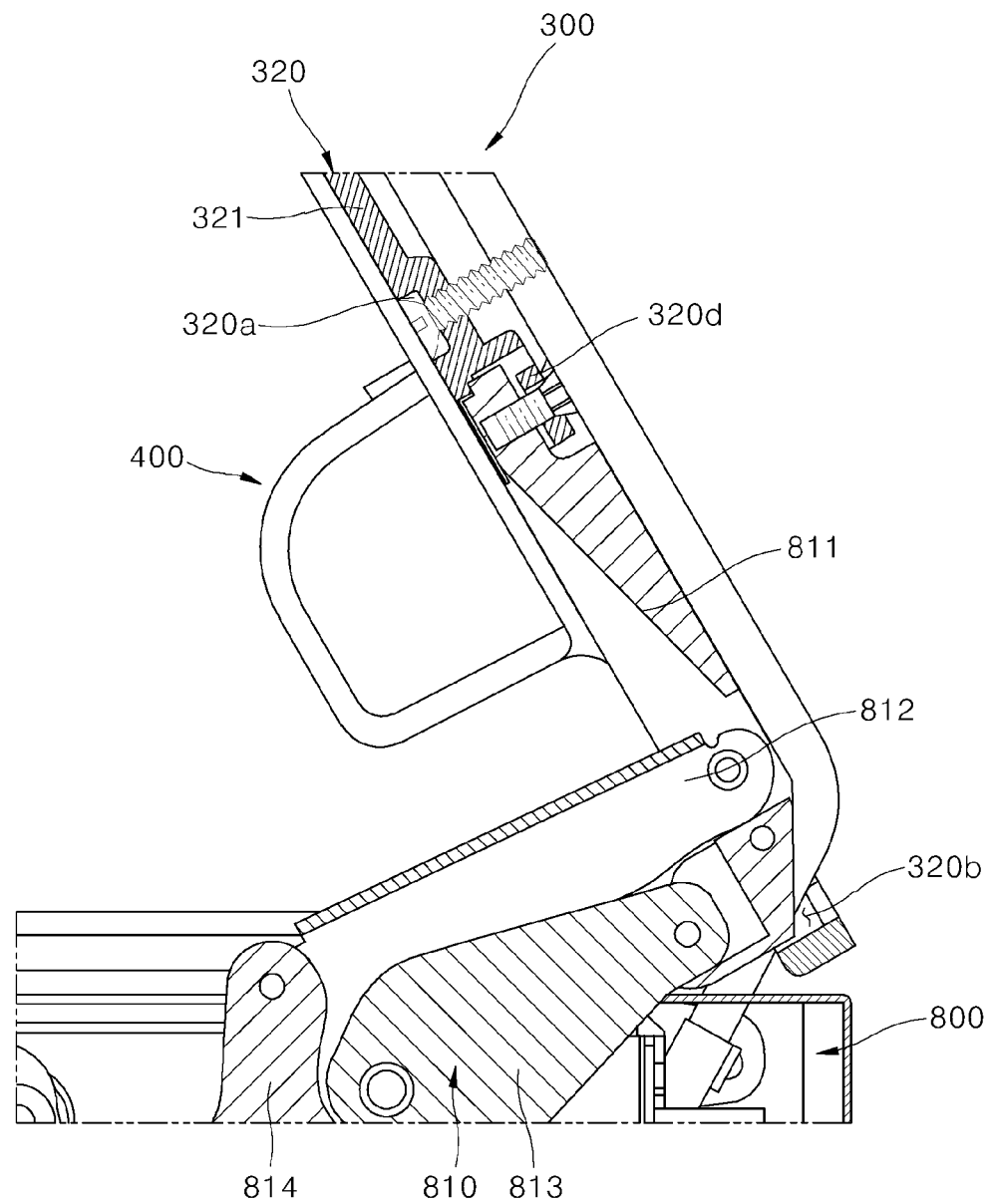
FIG. 48 is a cross-sectional view showing a coupling structure between a door frame and a hinge part.
Figure 49:
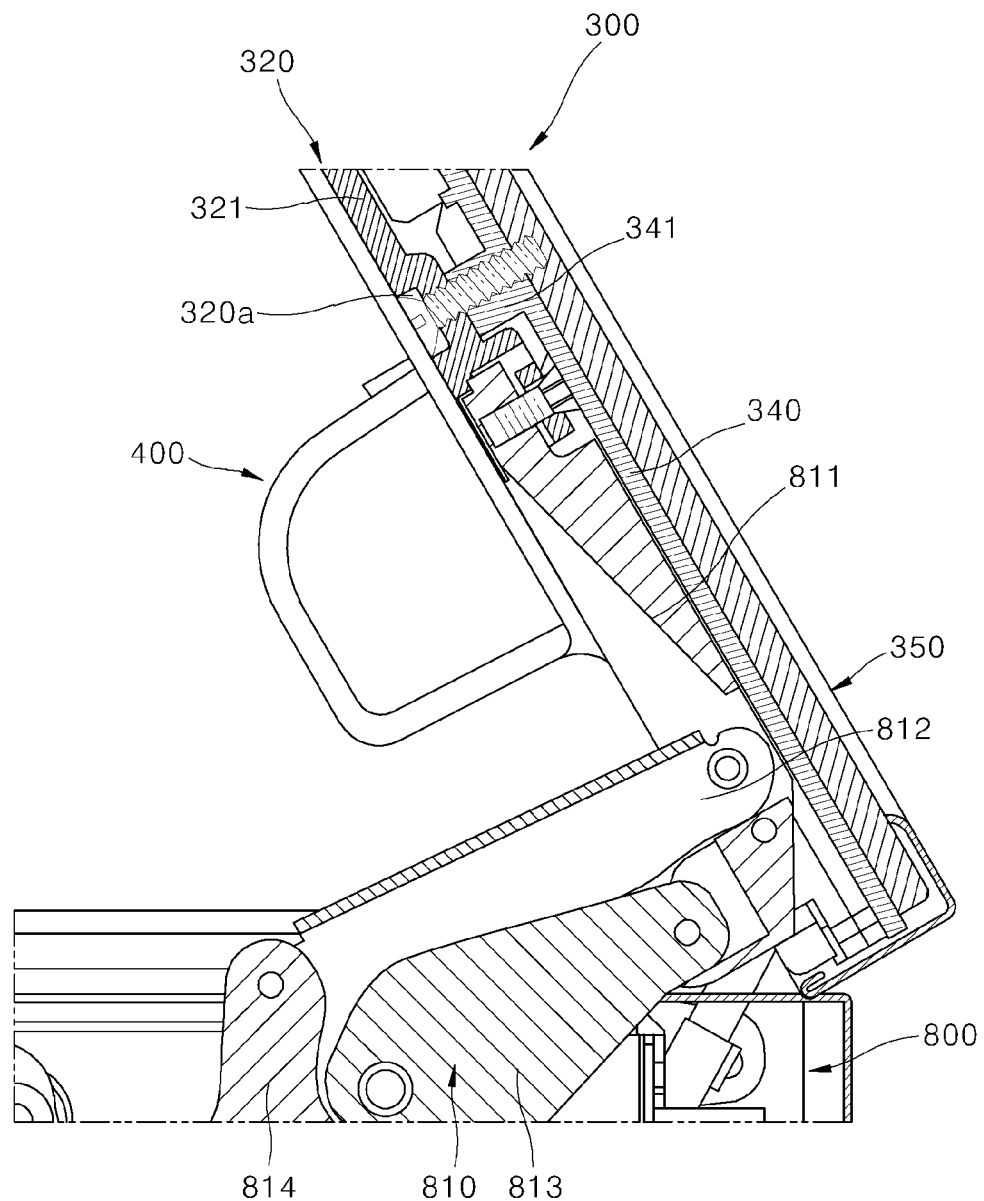
FIG. 49 is a cross-sectional view showing a coupling structure among a door frame, a hinge part and a door.

FIG. 42 is a perspective view separately showing the door frame in FIG. 41, and FIG. 43 is a cross-sectional perspective view showing a state in which a door frame, a first heating part and a protective grille are coupled. Additionally, FIG. 44 is a bottom view showing the state in which the door frame, the first heating part and the protective grille are coupled. Further, FIG. 45 is a cross-sectional view along line "XXXXV-XXXXV" in FIG. 40, and FIG. 46 is a cross-sectional view along line "XXXXVI-XXXXVI" in FIG. 40. Furthermore, FIG. 47 is a perspective view showing a coupling structure between a door frame and a hinge part, FIG. 48 is a cross-sectional view showing a coupling structure between a door frame and a hinge part, and FIG. 49 is a cross-sectional view showing a coupling structure among a door frame, a hinge part and a door.

In FIG. 43, a glass and a reflector are excluded, and in FIGS. 45 to 48, a glass is excluded.

Referring to FIGS. 40 to 43, the door frame 320 is coupled to the door 300 in such a way that the door frame 320 covers the lower portion of the door upper surface part 310. The door frame 320 may be coupled to the door 300 in such a way that the door frame 320 supports the first heating part 400. Also, the first heating part 400 coupled to the door frame 320 may be maintained in a state of being disposed in the door 300, more specifically, at the lower portion of the door upper surface part 310.

The door frame 320 may include a coupling part 321 and a heater mounting part 325. The heater mounting part 325 may be provided in the form protruding from the coupling part 321, and the first heating part 400 may be coupled to the heater mounting part 325.

The coupling part 321 may be coupled to the door upper surface part 310 so that the heater mounting part 325 is supported by the door upper surface part 310. The coupling part 321 may be provided in the form of a square-shaped frame in which a through hole is formed.

A seating surface 322 may be formed at an inner lateral surface of the coupling part 321 adjacent to the through hole. The seating surface 322 may form a plane whose height is lower than that of an upper surface of the coupling part 321, and surrounding portions of edges of the glass 335 may be seated on the seating surface 322.

In this way, the glass 335 seated on the seating surface 322 may be disposed at upper portions of the heater mounting part 325 and the first heating part 400 installed at the heater mounting part 325 in such a way that the glass 335 covers the through hole from the top. In this case, the seating surface 322 may form a plane whose height is lower than that of the upper surface of the coupling part 321. The seating surface 322 may form a plane whose height is lower than that of the coupling part 321 as much as a height substantially corresponding to a thickness of the glass 335. In this way, the glass 335 may be installed in the door frame 320 while being disposed at a position where the glass 335 does not protrude upward past the upper surface of the coupling part 321.

The seating surface 322 may be disposed at both sides of the through hole in the left-right direction. The seating surface 322 may also be disposed at one side or the other side of the through hole in the front-rear direction. In the present embodiment, the seating surface 322 is disposed on both sides of the through hole in the left-right direction and the front-rear direction of the through hole. Accordingly, the glass 335 may be stably installed in the door frame 320 such that surrounding portions of four edges of the glass 335 are supported by the seating surface 322.

Also, since movement of the glass 335 in the left-right direction is restricted by the inner lateral surface of the coupling part 321 surrounding the seating surface 322, an installation position of the glass 335 may be guided in the left-right direction, and shaking of the glass 335 may be suppressed in the left-right direction such that the installation of the glass 335 may be stably performed.

Meanwhile, the first heating part 400 may include a heating element 410, a first connection end 420, and a second connection end 430.

The heating element 410 corresponds to a portion emitting heat in the first heating part 400 provided in the form of an electric heater. The heating element 410 may be formed in the shape of a rod having a predetermined length.

The first connection end 420 is disposed at an end of one side of the heating element 410 in the length-wise direction, and the second connection end 430 is disposed at an end of the other side of the heating element 410 in the length-wise direction.

At least one of the first connection end 420 and the second connection end 430 includes a cylinder-shaped part 421 and a key-shaped part 425. In the present embodiment, both the first connection end 420 and the second connection end 430 are illustrated as including the cylinder-shaped part 421 and the key-shaped part 425.

The cylinder-shaped part 421 is disposed at an end of the heating element 410 in the length-wise direction. The cylinder-shaped part 421 may be formed in a cylindrical shape in which an underside of a circular shape is disposed at the outermost end of the first heating part 410.

The key-shaped part 425 is disposed between the heating element 410 and the cylinder-shaped part 421. That is, the key-shaped part 425 is disposed at both side ends of the heating element 410 in the length-wise direction, and the cylinder-shaped part 421 is disposed at the outermost side of the heating element 410 in the length-wise direction.

The key-shaped part 425 may be formed in a flat hexahedral shape whose thickness is smaller than a diameter of the cylinder-shaped part 421 and whose width is larger than the diameter of the cylinder-shaped part 421. For example, a pair of quadrilateral surfaces 426 (hereinafter referred to as "first surfaces") parallel to a width direction of the key-shaped part 425 may be disposed to be spaced apart from each other in a thickness direction of the key-shaped part 425 and form two lateral surfaces of the key-shaped part 425. Also, two pairs of quadrilateral surfaces 427 (hereinafter referred to as "second surfaces") parallel to the thickness direction of the key-shaped part 425 may be disposed between the pair of first surfaces 426 and form an upper surface and a lower surface of the key-shaped part 425.

In this case, the first surface 426 may be formed of a quadrilateral surface having a side longer than the diameter of the cylinder-shaped part 421, and the second surface 427 may be formed of a quadrilateral surface having a side shorter than the diameter of the cylinder-shaped part 421.

Therefore, when the first connection end 420 or the second connection end 430 is viewed in the length-wise direction of the first heating part 410, the cylinder-shaped part 421 may protrude outward past the key-shaped part 425 in the radial direction of the cylinder-shaped part 421 in most of the region, and the key-shaped part 425 may protrude outward past the cylinder-shaped part 421 in the radial direction of the cylinder-shaped part 421 only in a portion of the region.

The heater mounting part 325 is provided to fix the first connection end 420 and the second connection end 430 as described above. The heater mounting part 325 may include a first connection end fixing part 326 which fixes the first connection end 420 and a second connection end fixing part 327 which fixes the second connection end 430.

At least one of the first connection end fixing part 326 and the second connection end fixing part 327 may include a cover a and a support wall b. In the present embodiment, both the first connection end fixing part 326 and the second connection end fixing part 327 are illustrated as identically including the cover a and the support wall b.

The cover a is provided in the form of surrounding the surrounding portions of the connection end from the outer side of the connection end in the circumferential direction. The cover a may be formed in a curved shape surrounding a lower portion and a lateral portion of the connection end and may be formed in a length corresponding to a length of the connection end or in a length slightly longer than the length of the connection end.

In this embodiment, the cover a has a "U" shape, for example. The cover a may be formed in a way that encircles a lower portion and both lateral portions of a support wall b while encircling the support wall b. The cover a may have an upper portion that is open.

Further, the heater mounting part 325 may further include a first transverse supporter 323. The first transverse supporter 323 is disposed at a side farther from the center of the cooking space in the front-rear direction than the first heating part 400 and connects the first connection end fixing part 326 and the second connection end fixing part 327 to each other. The first transverse supporter 323 may be formed into a plate having a length extending along the length-wise direction of the first heating part 400.

Additionally, the heater mounting part 325 may further include a second transverse supporter 324. The second transverse supporter 324 may be biased toward a center of the cooking space in the front-rear direction thereof than to the first heating part 400 and may connect between the first connection end fixing part 326 and the second connection end fixing part 327. In other words, the second transverse supporter 324 may be disposed to face the first transverse supporter 323 with the cover a between the first transverse supporter 323 and the second transverse supporter 324 and may connect between the first connection end fixing part 326 and the second connection end fixing part 327.

Like the first transverse supporter 323, the second transverse supporter 324 may be formed into a plate having a length extending along the length-wise direction of the first heating part 400

In this embodiment, the first connection end fixing part 326 and the second connection end fixing part 327 may be respectively disposed at ends of both sides of the first heating part 400 in the length-wise direction thereof. Additionally, the first transverse supporter 323 may be disposed farther from a center of the cooking space in the front-rear direction thereof than the first heating part 400. The second transverse supporter 324 may be biased toward the center of the cooking space in the front-rear direction thereof than the first heating part 400.

Additionally, the cover a may be respectively mounted onto the first connection end fixing part 326 and the second connection end fixing part 327, and each cover a may connect respectively to ends of the first transverse supporter 323 and the second transverse supporter 324 in the length-wise direction thereof.

That is, upper sides of each of the covers a may respectively connect to the first transverse supporter 323 and the second transverse supporter 324.

The support wall b is disposed in the space surrounded by the cover a. The support wall b may be formed to protrude toward the space from the cover a. The support wall b formed in this way may divide the space surrounded by the cover a into an inner side space and an outer side space in the length-wise direction of the first heating part 400. Also, the connection end may be fitted and coupled to the support wall b.

The support wall b may have a seating groove c.

The seating groove c may be concavely formed on the support wall b. An entrance of the seating groove c may be open upward. By a cylinder-shaped part a being fitted into the seating groove c, the connection end may be fitted and coupled to the support wall b.

Also, the connection end may further include an extension part 422. The extension part 422 may be formed by the cylinder-shaped part 421 extending toward the key-shaped part 425. The extension part 422 is formed to protrude outward in the thickness direction of the key-shaped part 425 from the first surface 426 of the key-shaped part 425 so that a step 423 is formed at a surface of the extension part 422 parallel to the width direction of the key-shaped part 425, that is, between the extension part 422 and the first surface 426. By having the extension part 422 formed in this way, a region in which the extension part 422 and the key-shaped part 425 overlap with each other is formed in a portion of the key-shaped part 425 adjacent to the cylinder-shaped part 421.

In this region, the extension part 422 protrudes further in the thickness direction of the key-shaped part 425 than the first surface 426 of the key-shaped part 425, and the second surface 427 of the key-shaped part 425 protrudes further in the width direction of the key-shaped part 425 than the extension part 422.

Since the extension part 422 is formed as described above, a strength of a coupling portion between the cylinder-shaped part 421 and the key-shaped part 425 may be further reinforced. When the extension part 422 is not present, the coupling portion between the cylinder-shaped part 421 and the key-shaped part 425 would be limited to an end portion of a lateral surface of the key-shaped part 425. However, since the extension part 422 is formed at the connection end, the coupling portion between the cylinder-shaped part 421 and the key-shaped part 425 may extend to the point where the extension part 422 and the key-shaped part 425 overlap with each other, and thus the strength of the coupling portion between the cylinder-shaped part 421 and the key-shaped part 425 may be further reinforced.

The heater mounting part 325 may further include a connection end supporting member 329. The connection end supporting member 329 may fix a connection end to the support wall b while pressing the connection end seated in the seating groove c in a direction where the connection end closely contacts the support wall b. The connection end supporting member 329 may include a coil spring 329a disposed in upper portions of the seating groove c and the support wall b.

The coil spring 329a may be disposed in a direction across an entrance of the seating groove c in the upper portion of the seating groove c. The coil spring disposed as described above may be disposed to block the entrance of the seating groove c from the connection end.

The coil spring 329a may be provided with a first coupling part 329b at one end of the coil spring 329a in a length-wise direction thereof, and a second coupling part 329c at the other end in the length-wise direction thereof.

The support wall b may be provided with a first spring coupling part j and a second spring coupling part k in the upper portion thereof. The first spring coupling part j and the second spring coupling part k may be spaced a predetermined distance apart from each other with the seating groove c therebetween while being disposed in the upper portion of the support wall b.

The first coupling part 329b may be coupled to the first spring coupling part j, and the second coupling part 329c may be coupled to the second spring coupling part k.

In this embodiment, the first coupling part 329b and the second coupling part 329c are respectively formed into a ring having a hollow hole that is formed in the up-down direction, for example.

Additionally, any one of the first spring coupling part j and the second spring coupling part k may be formed into a projection protruding upward from the support wall b, and the other of the first spring coupling part j and the second spring coupling part k may have a fastening hole that extends in the up-down direction in the support wall b.

In this embodiment, the first spring coupling part j is formed into a projection protruding upward from the support wall b, and the second spring coupling part k has a fastening hole that is formed in the support wall b, for example.

In this case, as a result of fitted-coupling between the first coupling part 329b and the first spring coupling part j, one side of the connection end supporting member 329 in the length-wise direction and the support wall b may be coupled. As a result of screw-coupling between the second coupling part 329c and the second spring coupling part k, the other side of the connection end supporting member 329 in the length-wise direction and the support wall b may be coupled.

The coil spring installed as described above may keep pressing the connection end downward, in the upper portion of the connection end. Accordingly, the connection end may be elastically supported by the coil spring, i.e., the connection end supporting member 329, in the seating groove c.

With the above structure for supporting the connection end, the first heating part 400 is much less likely to be broken. In the above structure for supporting the connection end, when an impact is applied to the first heating part 400 or an impact applied to the door 300 is delivered to the first heating part 400 during opening and closing the door 300, the impact on the first heating part 400 may be significantly buffered.

If the first heating part 400 is firmly fixed to an inside of the seating groove c not to make any movement, the first heating part 400 may be entirely affected by an impact applied to the first heating part 400, and may be highly likely to be broken.

In this embodiment, the first heating part 400 may be elastically supported by the connection end supporting member 329. Accordingly, when an impact is applied to the first heating part 400, the first heating part 400 may not be affected by the impact to a certain degree while moving in the seating groove c, and then return to a primary state and then maintain the state stably.

That is, in this embodiment, the first heating part 400 may be stably disposed on the heater mounting part 325 while being elastically supported by the connection end supporting member 329, and the damage to the first heating part 400, caused by an impact, may be effectively suppressed.

In the above structure for supporting the connection end, the first heating part 400 may be installed simply by screw-coupling the other side of the connection end supporting member 329 in the length-wise direction may be screw-coupled to the second spring coupling part k in a state in which one side of the connection end supporting member 329 in the length-wise direction thereof is held and fixed to the first spring coupling part j.

In summary, with the above structure for supporting the connection end using the connection end supporting member 329, the first heating part 400 may be stably installed, less likely to be broken, and ensure improvement in convenience of installation.

953

Meanwhile, each of the first connection end fixing part 326 and the second connection end fixing part 327 may further include an outer wall f. The outer wall f may be disposed at an outer side of each support wall b in a length-wise direction of the heating element 410 and may be connected to the inner lateral surface of the coupling part 321. The outer wall f forms an outermost side wall of each of the first connection end fixing part 326 and the second connection end fixing part 327 in the length-wise direction of the heating element 410.

A space surrounded by the cover a, the support wall b, and the outer wall f is formed in each of the first connection end fixing part 326 and the second connection end fixing part 327. The corresponding space is a space whose side and lower portions are surrounded by the cover a, the support wall b and the outer wall f. At least a portion of the cylinder-shaped part 421 at a fixing end fixed to the first connection end fixing part 326 or the second connection end fixing part 327 is inserted into the space.

In the space, the cylinder-shaped part 421 may be connected to a cable. The cable connected to the cylinder-shaped part 421 may be a signal cable which transmits a control signal generated in the first control board 500 to the first heating part 400, may be a power cable which supplies power to the first heating part 400, or may be both the signal cable and the power cable.

Referring to FIG. 7, the signal cable and the power cable may be installed at the cable mounting parts 340 and 345 provided in the door upper surface part 310. Also, the coupling between the door upper surface part 310 and the door frame 320 is performed in a state in which the coupling part 321 covers the portions where the cable mounting parts 340 and 345 are disposed.

A plurality of fastening bosses 341 and 346 may be disposed in the cable mounting parts 340 and 345. Also, a plurality of fastening holes 320a may be disposed in the door frame 320 so as to correspond to the fastening bosses. When portions where the fastening holes 320a and the fastening bosses are formed are fastened using a fastening member after matching the positions of the door upper surface part 310 and the door frame 320 so that the positions of the fastening holes 320a and the fastening bosses 341 and 346 match with each other, the coupling between the door upper surface part 310 and the door frame 320 may be performed. In this case, the portions where the cable mounting parts 340 and 345 are disposed are covered by the coupling part 321.

Although the glasses 330 and 335 do not cover the portions where the cable mounting parts 340 and 345 are disposed, the first heating part 400 and the heater mounting part 325 are disposed at a lower portion of a region covered by the glass 335. Therefore, for the cables installed at the cable mounting parts 340 and 345 to be connected to the connection end, as illustrated in FIGS. 53 to 56, a passage should be formed between the region of the coupling part 321 not covered by the glass 335 and the region of the heater mounting part 325 covered by the glass 335.

In consideration of such aspect, in the present embodiment, a concave groove g is provided in a connecting portion between the outer wall f and the coupling part 321. At the connecting portion between the outer wall f and the coupling part 321, the concave groove g forms the upper surface of the coupling part 321, more specifically, a surface more concave than the seating surface 322 of the coupling part 321. The concave groove g formed in this way provides a gap through which the cable may pass to be disposed at a lower portion of the glass 335 seated on the seating surface 322, thereby allowing a passage through which the cable may pass to be disposed between the cable mounting parts 340 and 345 (see FIG. 7) and the space housing the cylinder-shaped part 421 of the connection end.

Meanwhile, the cooking appliance of the present embodiment may further include a reflector 440 and a protective grill 450.

The reflector 440 may be a component configured to reflect heat of the first heating part 400 to concentrate the heat of the first heating part 400 on the tray 200 (see FIG. 1). The reflector 440 may reflect the heat of the first heating part 400 while blocking the first heating part 400 from the first transverse supporter 323 and blocking the first heating part 400 from the glass 335.

The reflector 440, as illustrated in FIGS. 41, 44 and 45, may include a first reflector 441 and a second reflector 445.

The first reflector 441 may be disposed between the first heating part 400 and the glass 335. The first reflector 441 may block the first heating part 400 from the glass 335, and block the first heating part 400 from the first transverse supporter 323.

The first reflector 441 may be formed into a surface that is across among the first heating part 400, the first transverse supporter 323, and the glass 335 at a slant. In this embodiment, the first reflector 441 has a rounded inclined shape, e.g., a shape similar to a "⌒" shape, for example.

The second reflector 445 may be disposed between the first reflector 441 and the glass 335. The second reflector 445 may block the first reflector 441 from the glass 335.

The second reflector 445 may be formed into a flat surface parallel with the glass 335. The second reflector 445 may connect to the first reflector 441 in an upper portion of the first reflector 441.

The reflector 440 may be formed in a way that a single metal plate is bent such that the first reflector 441 and the second reflector 445 integrally connect to each other. For example, the reflector 440 may be formed in a way that a single metal plate is bent such that the first reflector 441 in an upper portion and the second reflector 445 in a lower portion connect to each other in a "ㄷ" shape.

The reflector 440 may be made of an elastically deformable metal material. In the reflector 440, the first reflector 441 rounded of the first reflector 441 and the second reflector 445 may be elastically deformed in the up-down direction or in the front-rear direction.

Between the first reflector 441 and the second reflector 445 disposed in the up-down direction, a space encircled by the first reflector 441 and the second reflector 445 and the first transverse supporter 323 may be formed.

In the space, heat transfer between the first reflector 441 and the second reflector 445 may be suppressed. That is, the space may suppress the transfer of heat of the first heating part 400, which heats the first reflector 441 adjacent to the first heating part 400, to the second reflector 445.

Accordingly, an increase in temperature of the upper surface of the door 300, i.e., the door upper surface part 310, caused by the heat of the first heating part 400, may be suppressed to some degree.

The reflector 440 may be disposed on the door frame 320 as a result of coupling to the second transverse supporter 324 and the cover a.

To this end, the second transverse supporter 324 may be provided with a first reflector supporting projection 1, and the cover a may be provided with a second reflector supporting projection m.

The second reflector supporting projection m may protrude from the cover a. In this embodiment, the cover a may have a "U" shape that encircles the reflector 440 from the front, the rear and the lower portion. The cover a may include a floor surface disposed in a lower portion of the reflector 440, and a lateral wall disposed at a front or a rear of the reflector 440.

The first reflector supporting projection 1 may protrude from the second transverse supporter 324 toward the first transverse supporter 323. The first reflector supporting projection 1 may be disposed further upward than the reflector 440. In this case, the first reflector supporting projection 1 may be disposed near a lateral wall of the lateral walls of the cover a, which is adjacent to the second transverse supporter 324.

The second reflector supporting projection m may be disposed near a lateral wall of the lateral walls of the cover a, which is adjacent to the first transverse supporter 323. The second reflector supporting projection m may protrude at a position spaced a predetermined distance apart from the lateral walls of the cover a while protruding from the floor surface of the cover a.

The first reflector supporting projection 1 disposed further upward than the reflector 440 may interfere with the second reflector 445 to regulate an up-down position of the second reflector 445. That is, an upper surface of the second reflector 445 may contact the first reflector supporting projection 1 disposed further upward than the reflector 440. Accordingly, the up-down position of the second reflector 445 may be regulated to an area further downward than the first reflector supporting projection 1.

An end on a lower side of the first reflector 441 may be inserted into a space between the lateral wall of the cover a and the second reflector supporting projection m. Accordingly, the first reflector 441 and the cover a may be fitted-coupled. As a result of the fitted-coupling between the first reflector 441 the cover a, a front-rear position of the first reflector 441 may be regulated.

As described above, the up-down position of the second reflector 445 may be regulated by the first reflector supporting projection 1, and the front-rear and up-down positions of the first reflector 441 may be regulated by the second reflector supporting projection m. Accordingly, the reflector 440 may be guided and installed into an area between a floor surface of the cover a and the first reflector supporting projection 1 and into an area between both lateral walls of the cover a.

The reflector 440 may have an up-down length greater than a distance between the floor surface of the cover a and the first reflector supporting projection 1, and may be elastically deformed in the up-down and front-rear directions. Accordingly, for the reflector 440, the first reflector 441 may be fitted-coupled to the cover a, and the second reflector 445 may be fixed to an inner area of the cover a in a way that the second reflector 445 is fitted to a lower portion of the first reflector supporting projection 1.

In this case, the reflector 440 may be installed in a way that the reflector 440 contracts in the up-down direction between the floor surface of the cover a and the first reflector supporting projection 1. Thus, the reflector 440 may be firmly fixed to the inner area of the cover a.

The reflector 400 installed as described above may reflect heat of the first heating part 400 while blocking the first heating part 400 from the first transverse supporter 323 and blocking the first heating part 400 from the glass 335, thereby contributing to the concentration of the heat of the first heating part 400 on the tray 200.

The protective grill 450, as illustrated in FIGS. 40 to 43, is provided as a component for protecting the first heating part 400 while allowing the heat of the first heating part 400 to be transmitted to the tray 200. The protective grill 450 is spaced apart from the first transverse supporter 323 with the first heating part 400 between the protective grill 450 and the first transverse supporter 323, or spaced apart from the glass 335 with the first heating part 400 between the protective grill 450 and the glass 335.

The protective grill 450 may include a plurality of steel wires 451. Each steel wire 451 has a length extending in the length-wise direction of the first heating part 400 in such a way that each steel wire 451 has a length substantially corresponding to the length of the first heating part 400 or a length slightly longer than the length of the first heating part 400.

The plurality of steel wires 451 are arranged in the form surrounding the surrounding portion of the first heating part 400 from the outside of the first heating part 400 in the circumferential direction. The plurality of steel wires 451 may be spaced a predetermined distance apart from each other in the circumferential direction of the first heating part 400.

In this embodiment, the surrounding portion of the first heating part 400 in the circumferential direction is surrounded by the reflector 440 and the protective grill 450. That is, one side of the first heating part 400 in the front-rear direction and an upper portion of the first heating part 400 are surrounded by the reflector 440, and the remaining portions of the first heating part 400, that is, the other side of the first heating part 400 in the front-rear direction, and the lower portion of the first heating part 400 are surrounded by the protective grill 450.

Accordingly, the plurality of steel wires 451 are arranged in the form of surrounding the other side of the first heating part 400 in the front-rear direction and the lower portion of the first heating part 400 from the outer side of the first heating part 400 in the circumferential direction.

The protective grill 450 may be installed in the door frame 320 in such a way that ends of both sides of the protective grill 450 in the length-wise direction thereof are respectively fixed to the first connection end fixing part 326 and the second connection end fixing part 327 and disposed on the door frame 320.

To this end, a grill fixing part may be provided in each of the first connection end fixing part 326 and the second connection end fixing part 327. The grill fixing part is provided as a means for fixing the steel wires 451 of the protective grill 450 to the heater mounting part 325. The grill fixing part may include a plurality of fixing ribs h.

The plurality of fixing ribs h are spaced a predetermined distance apart from each other in the direction in which the plurality of steel wires 451 are arranged. Also, each fixing rib h is formed to protrude from the cover a toward the first heating part 400. Accordingly, a fixing groove may be formed between the fixing ribs h. The distance between the fixing ribs h may be determined such that the fixing groove has a width corresponding to a thickness of the steel wire 451.

By fitting and fixing the steel wire 451 to each of the fixing grooves formed among the plurality of fixing ribs h as described above, the protective grill 450 and the grill fixing part may be fitted-coupled. In this way, the protective grill 450 may be easily and rapidly installed in the door frame 320 simply by fitting and fixing the ends of both sides of the protective grill 450 to the grill fixing part formed in each of the first connection end fixing part 326 and the second connection end fixing part 327.

Further, the plurality of fixing ribs h formed to protrude from the cover a as described above may also serve as reinforcing structures for improving the strength of the cover a.

The heater mounting part 325 may further include a grill supporting part 328. The grill supporting part 328 may be disposed between a first connection end fixing part 326 and a second connection end fixing part 327. The grill supporting part 328 may support steel wires between the first connection end fixing part 326 and the second connection end fixing part 327.

The grill supporting part 328 may include a cover 328a and a plurality of fixing ribs 328b. The cover 328a may have a shape identical with or similar to a shape of the cover a of the first connection end fixing part 326 or the second connection end fixing part 327. For example, the cover 328a may have a "U" shape having an upper portion open.

The plurality of fixing ribs 328b may have a shape identical with or similar to a shape of the fixing rib h of the first connection end fixing part 326 or the second connection end fixing part 327. That is, the fixing ribs 328b may be spaced a predetermined distance apart from each other along a direction in which a plurality of steel wires 451 are arranged. Each of the fixing ribs 328b may protrude from the cover 328a, and accordingly, a fixing groove may be formed between the fixing ribs 328b.

The steel wire 451 may be fitted and fixed into each of the fixing grooves formed among the plurality of fixing ribs 328b, such that the protective grill 450 and the grill supporting part 328 are fitted-coupled.

The grill supporting part 328, disposed between the first connection end fixing part 326 and the second connection end fixing part 327 as described above, may support the protective grill 450 between the first connection end fixing part 326 and the second connection end fixing part 327, to suppress sagging of a central portion of the protective grill 450 in a length-wise direction thereof and to ensure stable fixation of the protective grill 450.

Figure 55:
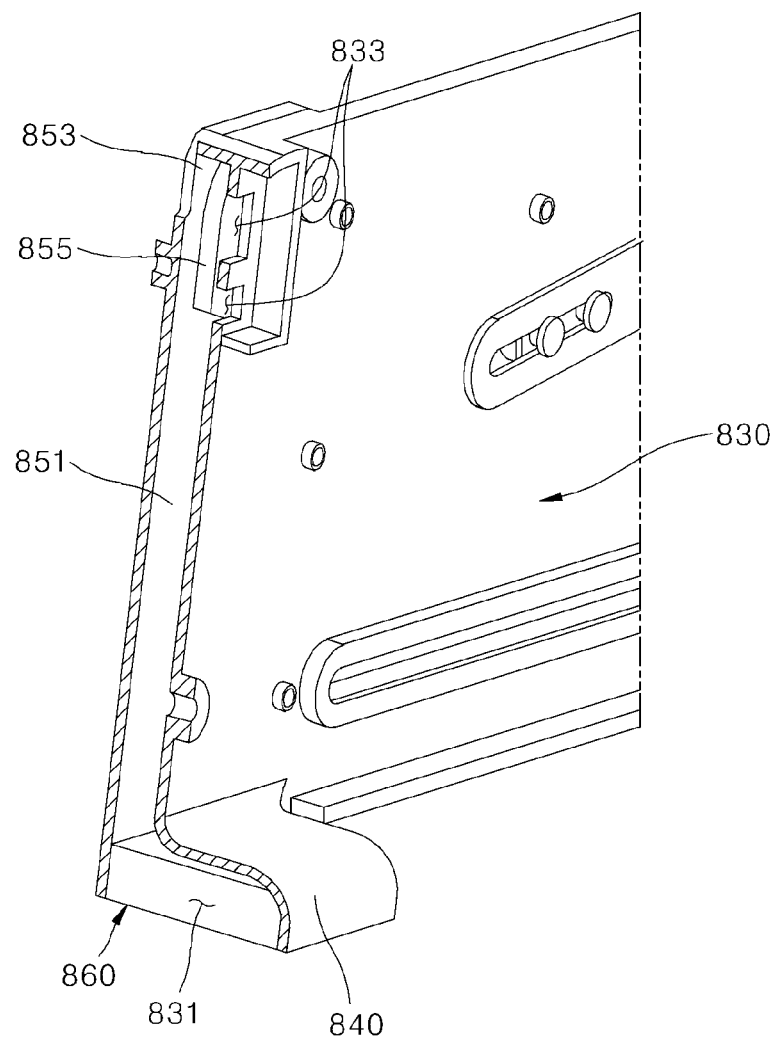
FIG. 55 is a cross-sectional perspective view showing the structure of the cooling channel in FIG. 52.
Figure 59:
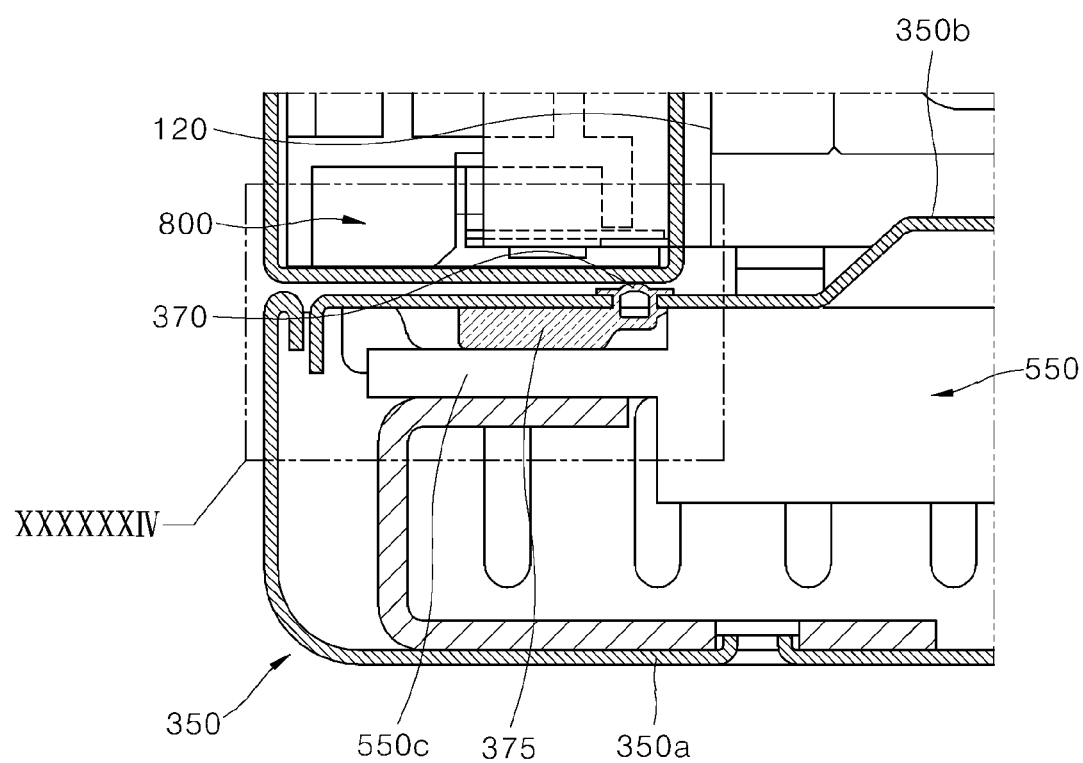
FIG. 59 is an enlarged view showing portion "XXXXXIX" in FIG. 58.

Additionally, the cover a of any one of the first connection end fixing part 326 and the second connection end fixing part 327 may be provided with a grill passing hole, as illustrated in FIGS. 55 and 59. In this embodiment, the cover a of the first connection end fixing part 326 is provided with the grill passing hole, for example. The grill passing hole may form a passage needed for the steel wire 451 of the protective grill 450 to pass through the cover a in the up-down direction.

The grill passing hole may be disposed at an end of the cover a, specifically, at an end of one side of the cover a, facing the second connection end fixing part 327. In this embodiment, the fixing rib h may be disposed between the support wall b and the grill passing hole. The grill passing hole may be open toward the second connection end fixing part 327 and may include a wide width part n and a narrow width part o.

The wide width part n may be disposed at an end of the cover a in a length-wise direction thereof, specifically, between the end of one side of the cover a, facing the second connection end fixing part 327, and the fixing rib h. The wide width part n may be formed in a way that passes through the cover a.

The narrow width part o may be disposed between the wide width part n and the fixing rib h, and formed in a way that passes through the cover a. The narrow width part o may be open toward the second connection end fixing part 327. The narrow width part o may connect to the wide width part n and may have a width less than a width of the wide width part n.

The narrow width part o may have a width less than that of the wide width part n, and may be disposed inside the wide width part n in a width-wise direction thereof. The narrow width part o may have a width corresponding to a thickness of the steel wire 451 while having a width greater than the thickness of the steel wire 451.

At least one of the fixing grooves, formed among the plurality of fixing ribs h disposed in the first connection end fixing part 326, may be disposed at a position where at least one of the fixing grooves does not overlap the narrow width part o in the up-down direction while overlapping the wide width part n in the up-down direction.

Thus, the first connection end fixing part 326 may be provided with a passage needed for the steel wire 451 of the protective grill 450 to pass through the cover a in the up-down direction, and a structure for fixing the steel wire 451 to the first connection end fixing part 326.

In this embodiment, the steel wire 451 may be installed in a way that one side of the steel wire 451 in a length-wise direction thereof is fixed to the second connection end fixing part 327 and then the other side of the steel wire 451 in the length-wise direction thereof is fixed to the first connection end fixing part 326.

If the first heating part 400 or the reflector 450 is first installed, it is difficult for the steel wire 451 to be installed in a way that the steel wire 451 is fitted into the first connection end fixing part 326 and the second connection end fixing part 327 from an upper portion of the door frame 320 to a lower portion thereof.

In this case, the steel wire 451 may be installed in a way that the steel wire 451 is fitted into the first connection end fixing part 326 and the second connection end fixing part 327 in the lateral direction.

To this end, the steel wire 451 may pass through the inner area of the grill supporting part 328 from the first connection end fixing part 326 side in the lateral direction. Then the steel wire 451 may be pushed in the lateral direction, fitted into the second connection end fixing part 327, fitted into the fixing groove of the second connection end fixing part 327 and then fixed.

In a state in which one side of the steel wire 451 in the length-wise direction thereof is fixed, the other side of the steel wire 451 in the length-wise direction thereof may be disposed in the lower portion of the first connection end fixing part 326. For the other side of the steel wire 451 in the length-wise direction thereof to be fitted into the first connection end fixing part 326, the other side of the steel wire 451 in the length-wise direction thereof needs to pass through the cover a in the upward direction.

In this embodiment, the other side of the steel wire 451 in the length-wise direction thereof may pass through the grill passing hole, pass through the cover a, and inserted into the first connection end fixing part 326. The steel wire 451, inserted into the first connection end fixing part 326 as described above, may be fitted into and fixed to the fixing groove of the first connection end fixing part 326.

Though not illustrated, after the first heating part 400 is installed and the connection ends and the cables are connected, upper portions open of the first connection end fixing part 326 and the second connection end fixing part 327 (see FIG. 31) may be covered with caps so that the connection ends are protected. For a coupling between the caps, and the first connection end fixing part 326 and the second connection end fixing part 327, a coupling projection i may protrude from an upper portion of the cover a.

The reflector 440 may further include a fitted-coupling projection 447. The fitted-coupling projection 447 may protrude from the second reflector 445 in the front-rear direction. The fitted-coupling projection 447 may have a fitting hole. The fitted-coupling projection 447 may be fitted-coupled to the coupling projection i such that the coupling projection i is inserted into the fitting hole.

As result of the coupling between the fitted-coupling projection 447 and the coupling projection i, the cover a and the reflector 440 may be coupled. Accordingly, the reflector 440 may be fixed more stably.

The door frame 320 may be provided with a first hinge passing hole 320b, as illustrated in FIG. 42. The first hinge passing hole 320b may be formed in a way that passes through the coupling part 321 in the up-down direction. The first hinge passing hole 320b may form a passage for allowing a hinge part 810 to pass through the door frame 320, on the door frame 320.

Additionally, the door frame 320 may be provided with a first hinge coupling part 320c and a second hinge coupling part 320d, as illustrated in FIGS. 42 and 47 to 49. The first hinge coupling part 320c and the second hinge coupling part 320d may be provided as a structure for coupling between the hinge part 810 of a hinge assembly 800 and the door frame 320.

The first hinge coupling part 320c and the second hinge coupling part 320d may be respectively coupled to the hinge part 810 in different directions. For example, any one of the first hinge coupling part 320c and the second hinge coupling part 320d may be coupled to the hinge part 810 in the lateral direction, and the other of the first hinge coupling part 320c and the second hinge coupling part 320d may be coupled to the hinge part 810 in the up-down direction.

In this embodiment, the first hinge coupling part 320c is coupled to the hinge part 810 in the lateral direction, and the second hinge coupling part 320d is coupled to the hinge part 810 in the up-down direction, for example.

Accordingly, the first hinge coupling part 320c may be disposed in a lateral portion of the first hinge passing hole 320b. The first hinge coupling part 320c may protrude from the door frame 320 at a position very close to the first hinge passing hole 320b. The first hinge coupling part 320b may form a coupling surface facing the hinge part 810 in the lateral direction.

The second hinge coupling part 320d may be disposed at a front of the first hinge passing hole 320b. The second hinge coupling part 320d may form a coupling surface, facing the hinge part 810 in the up-down direction, in the upper portion of the first hinge passing hole 320b. In an example, for the second hinge coupling part 320d, a surface, spaced a predetermined distance apart from the first hinge passing hole 320b and disposed in the upper portion of the first hinge passing hole 320b, may be a coupling surface coupled to the hinge part 810, and the coupling surface may be supported by lateral walls protruding from the door frame 320.

The hinge part 810 and the door frame 320 are coupled as follows. In this embodiment, another coupling between the hinge part 810 of the hinge assembly 800 and the door frame 320 is described. In this case, the hinge part 810 may include a first hinge link 811, a second hinge link 812, a third hinge link 813 and a fourth hinge link 814.

The hinge part 810 may include a plurality of hinge links. Among the hinge links, the first hinge link 811 may be directly coupled to the door frame 320. The first hinge link 811 may be coupled to the door frame 320 and swivel along with the door 300.

The second hinge link 812 and the third hinge link 813 may connect to the first hinge link 811. The second hinge link 812 and the third hinge link 813 may rotatably connect to the first hinge link 811 at different points. The second hinge link 812 and the third hinge link 813 may connect to the fourth hinge link 814.

When the door 300 swivels, postures of the second hinge link 812 and the third hinge link 813 connected to the first hinge link 811 may change.

The fourth hinge link 814 may be connected to a damper 815 (see FIG. 52) provided to the hinge assembly 800. The damper 815 may be installed in the hinge case 830 and reduce the rotation speed of the fourth hinge link 814. Accordingly, the door 300 may open and close the cooking space 105 (see FIG. 52) while smoothly swiveling at a proper speed.

The first hinge link 811 may pass through the first hinge passing hole 320b from the lower portion of the door frame 320 and coupled to the door frame 320 in the upper portion of the door frame 320. In this embodiment, the first hinge link 811 is formed into a rectangular rod including both lateral surfaces and an upper surface, for example.

The lateral surface of the first hinge link 811 may be coupled to the first hinge coupling part 320c. The upper surface of the first hinge link 811 may be coupled to the second hinge coupling part 320d. The lateral surface of the first hinge link 811 may be screw-coupled to the first hinge coupling part 320c, and the upper surface of the first hinge link 811 may be screw-coupled to the second hinge coupling part 320d.

In this embodiment, the lateral surface of the first hinge link 811 and the first hinge coupling part 320c may be coupled in the lateral direction, and the upper surface of the first hinge link 811 and the second hinge coupling part 320d may be coupled in the up-down direction.

Since the hinge part 810 and the door frame 320 are coupled at a plurality of points in different directions as described above, the hinge part 810 and the door frame 320 may be coupled more stably using an increased coupling force.

The door frame 320 may be provided with a plurality of fastening holes 320a, and some of the fastening holes 320a may be disposed near the first hinge passing hole 320b. As a result, the door frame 320 and the door upper surface part 310 may be coupled at a position very close to the first hinge passing hole 320b, thereby suppressing a separation between the door frame 320 and the door upper surface part 310 effectively near the first hinge passing hole 320b.

The door frame 320 with the above-described configuration in this embodiment may provide the following advantageous effects.

First, since the door frame 320 is coupled to the lower portion of the door upper surface part 310, the door frame 320 may cover the lower portion of the door upper surface part 310 so that the cable mounting parts 340 and 345 (see FIG. 7) inside the door upper surface part 310 and the cables in the cable mounting parts 340 and 345 are not exposed to the outside.

The door frame 320 may be coupled to the lower portion of the door upper surface part 310 in a way that the door frame 320 is fastened to the cable mounting parts 340 and 345 and the like using a fastening member in a state in which the portions, where the cable mounting parts 340 and 345 are disposed, are covered by the coupling part 321. The door frame 320 coupled to the lower portion of the door upper surface part 310 may cover the cable mounting parts 340 and 345 (see FIG. 7) disposed inside the door upper surface part 310 and the cables installed in the cable mounting parts 340 and 345 so that the cable mounting parts 340 and 345 and the cables are not exposed to the outside, and the door frame 320 may be easily separated from the door 300 when necessary. Since the door frame 320 may protect the components inside the door upper surface part 310 while being easily detachable when necessary, the door frame 320 may help to maintain and repair the cooking appliance easily and rapidly.

Second, the door frame 320 provides a frame in which the first heating part 400, the components related thereto, and the glass 335 are assembled to a single unit body. In this way, the door frame 320 may help to manufacture and manage the components more efficiently.

In addition to the structures for fixing the glass 335 to the door frame 320, the structures for fixing the first heating part 400, the reflector 440, and the protective grill 450 to the door frame 320 are also provided in the door frame 320.

Accordingly, the glass 335, the first heating part 400, the reflector 440, and the protective grill 450 may be provided as an integrally-assembled unit body coupled to the door frame 320, and the glass 335, the first heating part 400, the reflector 440, and the protective grill 450 may be assembled at a time simply by coupling the door frame 320 to the lower portion of the door upper surface part 310.

Third, since the door frame 320 provides structures that allow the first heating part 400 to be easily and rapidly installed in the door frame 320, the door frame 320 may help to install the first heating part 400 more efficiently.

In this embodiment, the end of one side of the first heating part 400 is fitted to any one of the first connection end fixing part 326 and the second connection end fixing part 327, and the first heating part 400 is moved in the length-wise direction thereof so that the ends of both sides of the first heating part 400 are respectively fitted to the first connection end fixing part 326 and the second connection end fixing part 327 and then fixed by the connection end supporting member 329. During the simple procedures, the first heating part 400 may be installed.

In this case, since the first connection end fixing part 326 and the second connection end fixing part 327 are not intended to have directionality, the first heating part 400 may be installed as long as the end of one side of the first heating part 400 is fitted to any one of the first connection end fixing part 326 and the second connection end fixing part 327.

The door frame 320, as described above, may help to install the first heating part 400 more efficiently, to manufacture a cooking appliance and further to repair and replace the first heating part 400 easily and rapidly.

Fourth, the first heating part 400 may be elastically supported by the connection end supporting member 329 and stably disposed on the heater mounting part 325, thereby installing the first heating part 400 easily and rapidly and suppressing damage to the first heating part 400 effectively.

[Cooling Structure in Door]

Figure 50:
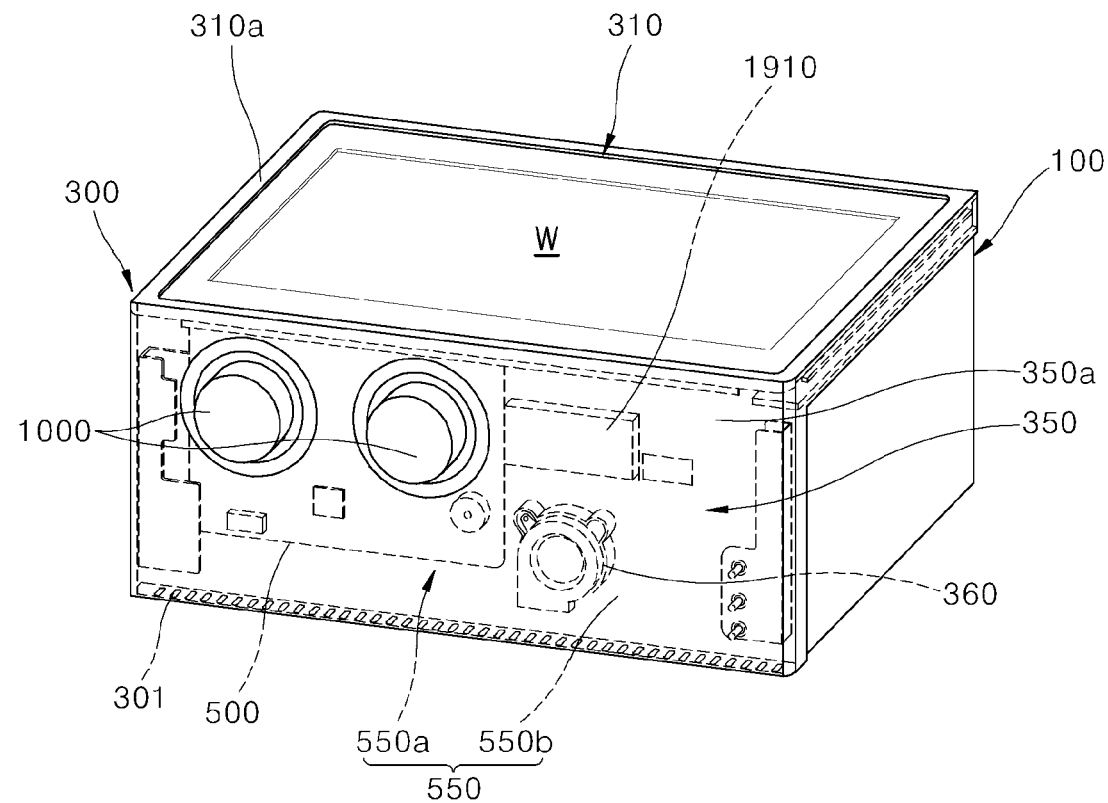
FIG. 50 is a perspective view showing an inner structure of a door front surface part.

FIG. 50 is a perspective view showing an inner structure of a door front surface part, and FIG. 51 is a view showing flows of steam and air inside the door front surface part in FIG. 50.

Referring to FIGS. 6 to 8 and 50, a space part may be formed respectively in the door upper surface part 310 and the door front surface part 350. In particular, a space part may be formed between a pair of glasses 330, 335 being spaced a predetermined distance apart from each other in the up-down direction, in the see-through window W installed in the door upper surface part 310.

A space between the space part in the door upper surface part 310 including the see-through window W and the space part in the door front surface part 350, in other words, the space part surrounded by the first door main body part 310a and the door frame 320, and the space part surrounded by the second door main body part 350a and the door rear surface cover 350b may be shielded by the sealing member S and the like.

A cooling hole 301 may be provided at the lower end of the door front surface part 350. The cooling hole 301 may be formed in a way that penetrates at the lower end of the door front surface part 350, specifically, on the bottom surface of the second door main body part 350a. The cooling hole 301 forms a passage on the door front surface part 350, and the passage opens the space part in the door front surface part 350 to the outside.

In the embodiment, a plurality of cooling holes 301 is formed on the bottom surface of the second door main body part 350a, and arranged in the left-right direction at the lower end of the door front surface part 350, for example.

An air exhaust opening 303 may be provided at the rear end of the door upper surface part 310. The air exhaust opening 303 is formed in a way that penetrates at the rear end of the door upper surface part 310, and forms a passage that opens the space part in the door upper surface part 310 to the outside, on the door upper surface part 310.

Additionally, the cooking appliance in the embodiment may further include a first cooling fan 360 being disposed in the door 300. The first cooling fan 360 may be installed in the door upper surface part 310 or the door front surface part 350.

The first cooling fan 360 may be installed in the space part inside the door front surface part 350. The first cooling fan 360 may be coupled to the supporting panel 550 and supported by the supporting panel 550. In the embodiment, the first cooling fan 360 is disposed in a different area from the area in which the first control board 500 is disposed, i.e., in the second area 550b, for example.

Since the see-through window W, the first heating part 400 and the like are disposed in the door upper surface part 310, there is not enough space in the door upper surface part 310. Compared to the door upper surface part 310, the door front surface part 350 has enough space since components having volume are not disposed on the door front surface part 350 except for the first control board 500. Considering the fact, the first cooling fan 360 may be installed in the door front surface part 350 in terms of design.

Additionally, the first control board 500 is disposed in the first area 550a, and components in relation to the manipulation device 1000 are disposed on the first control board 500. Accordingly, the first area 550a may not have enough space for installing the first cooling fan 360.

Components such as a temperature sensor 580 and a touch manipulation part 1900 are disposed in the second area 550b. The first cooling fan 360 may be disposed in the second area 550b along with the components.

The first cooling fan 360, provided as described above, may create a flow of air in which external air flows into the door 300 through the cooling hole 301 and the air in the door 300 is discharged through the cooling hole 301.

Based on the flow of air created by the first cooling fan 360, external air may flow into the door front surface part 350 through the cooling hole 301. The external air having flown into the door front surface part 350 may cool the first control board 500. The air having cooled the first control board 500 is discharged out of the door 300 through the cooling hole 303.

The sealing member S and the like shields between the space part in the door upper surface part 310 and the cooking space 105, but there is a possibility that heat or steam in the cooking space 105 flows into the space part in the door upper surface part 310 through between the space part in the door upper surface part 310 and the cooking space 105.

Additionally, the sealing member S and the like shields between the space part in the door upper surface part 310 and the space part in the door front surface part 350, but there is a possibility that heat or steam in the door upper surface part 310 flows into the space part in the door front surface part 350 through between the space part in the door upper surface part 310 and the space part in the door front surface part 350.

That is, heat or steam being generated in the cooking space 105 during cooking is highly likely to flow into the space part in the door front surface part 350 through the inside of the door upper surface part 310.

As the heat or the steam, in particular, the steam, flows into the space part in the door front surface part 350, the steam causes an increase in the temperature of the components, i.e., the first control board 500, the manipulation device 1000, the touch manipulation part 1900 and the like, in the door front surface part 350 and exposes them to moisture.

That is, the steam having flown into the space part in the door front surface part 350 may cause deterioration in the performance of the components in the door front surface part 350 or increase the possibility of failure of the components.

In the embodiment, the steam having flown into the space part in the door front surface part 350 may be discharged out of the door 300 by the first cooling fan 360, as illustrated in FIG. 51.

The first cooling fan 360 may create a flow of air in which external air flows into the door front surface part 350 through the cooling hole 301, in the door front surface part 350, and a flow of air in which the air having cooled the first control board 500 and the steam having flown into the door front surface part 350 from the door upper surface part 310 are discharged through the cooling hole 303.

In the embodiment, the first cooling fan 360 is provided in the form of a centrifugal fan, for example. The first cooling fan 360 may suction air in the axial direction and discharge the suctioned air downward.

In this case, one side of the first cooling fan 360 in the lateral direction and the door front surface part 350, specifically, an air intake opening formed at the front side of the first cooling fan 360 and the rear surface of the first door main body part 350a, are spaced a predetermined distance apart from each other. Accordingly, air may be suctioned smoothly through the air intake opening of the first cooling fan 360.

The first cooling fan 360 may be disposed near the cooling hole 303, while being disposed in the second area 550b. For example, the first cooling fan 360 may be disposed under the touch manipulation part 1900 and the temperature sensor 580.

Preferably, the first cooling fan 360 may be biased toward the cooling hole 301 than to the door upper surface part 310 while being disposed between the door upper surface part 310 and the cooling hole 301.

The first cooling fan 360 disposed as described above may discharge air in a position near the cooling hole 301. If the first cooling fan 360 is closer to the door upper surface part 310 than to the cooling hole 301, e.g., between the touch manipulation part 1900 and the door upper surface part 310, it may cause the following problems.

First, since the discharge of air in the first cooling fan 360 is performed in a position far from the cooling hole 301, the high-temperature air and steam discharged from the first cooling fan 360 is highly likely to be suctioned again to the first cooling fan 360.

As the discharge of air in the first cooling fan 360 is performed further away from the cooling hole 301, a distance moved by the air discharged from the first cooling fan 360 in the door front surface part 350 increases.

As the distance moved by the air discharged from the first cooling fan 360 increases in the door front surface part 350, the air is highly likely to flow into the first cooling fan 360 again.

The air flowing in the door front surface part 350 is more likely to flow into the first cooling fan 360 again than the air having passed through the cooling hole 301 and discharged out of the door 300.

Additionally, an increase in the amount of the air re-suctioned into the first cooling fan 360 may lead to a reduction in the efficiency of cooling and the efficiency of removal of steam in the door 300.

Second, if the first cooling fan 360's suction of air is performed in a position so close to the door upper surface part 310, the flow of steam from the inside of the door upper surface part 310 to the inside of the door font surface part 350 may be facilitated.

As a distance between the door upper surface part 310 and the first cooling fan 360 becomes short, the magnitude of suction force of the first cooling fan 360, being applied to a gap between the door upper surface part 310 and the door front surface part 350, increases.

An increase in the magnitude of suction force of the first cooling fan 360, being applied to the gap between the door upper surface part 310 and the door front surface part 350, may result in facilitation of the flow of steam from the inside of the door upper surface part 310 to the inside of the door front surface part 350.

Considering the fact, in the embodiment, the first cooling fan 360 is disposed in a position closer to the cooling hole 301 than to the door upper surface part 310, preferably, under the touch panel supporting part 565 and the temperature sensor 580.

The first cooling fan 360 discharges air toward the cooling hole 301, e.g., in the downward direction, to allow the discharged air to effectively escape from the door front surface part 350 and be discharged out of the door 300 as fast as possible.

Since the first cooling fan 360 is provided as described above, the re-suction of high-temperature air and steam discharged from the first cooling fan 360, and the flow of steam from the inside of the door upper surface part 310 to the inside of the door front surface part 350 may be suppressed.

Thus, the efficiency of cooling and the efficiency of removal of steam in the door 300 may improve, and the possibility of deterioration of the performance of the components in the door 300 and failure in the components may decrease.

[Cooling Channel Structure in Hinge Assembly]

Figure 53:
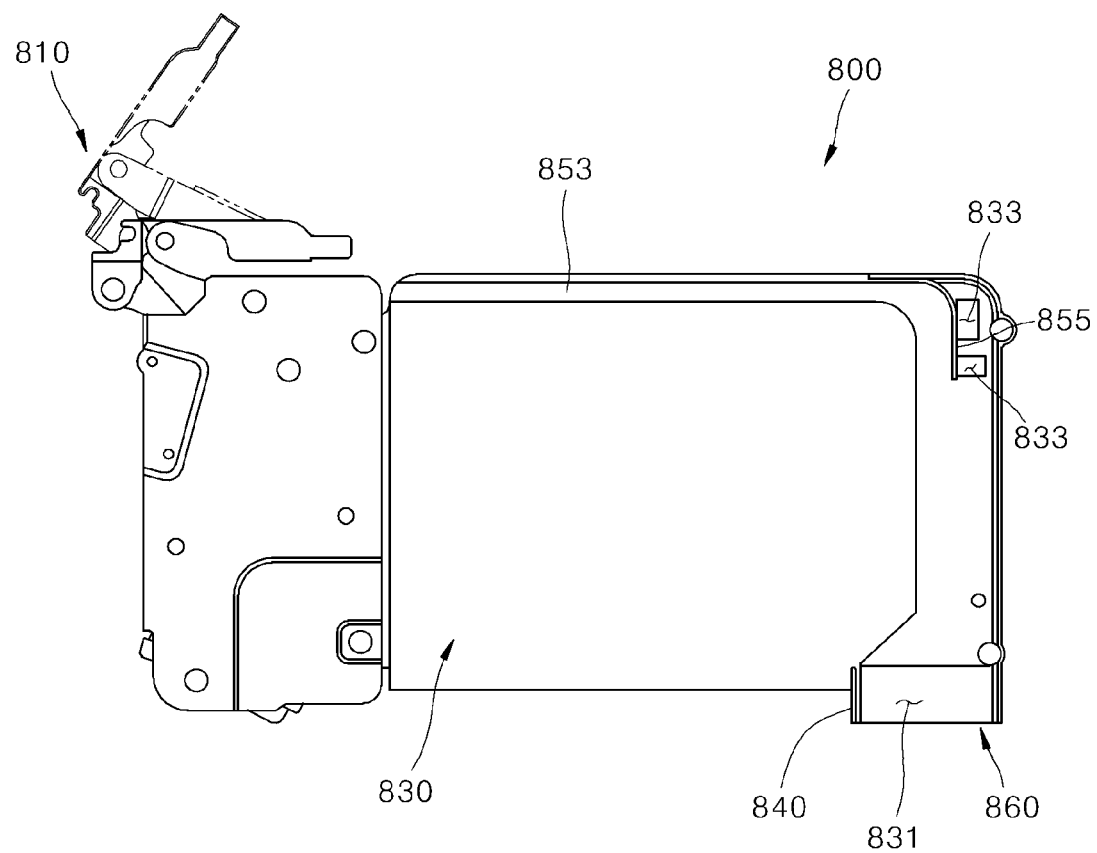
FIG. 53 is a lateral cross-sectional view showing a structure of a cooling channel in FIG. 52.
Figure 54:
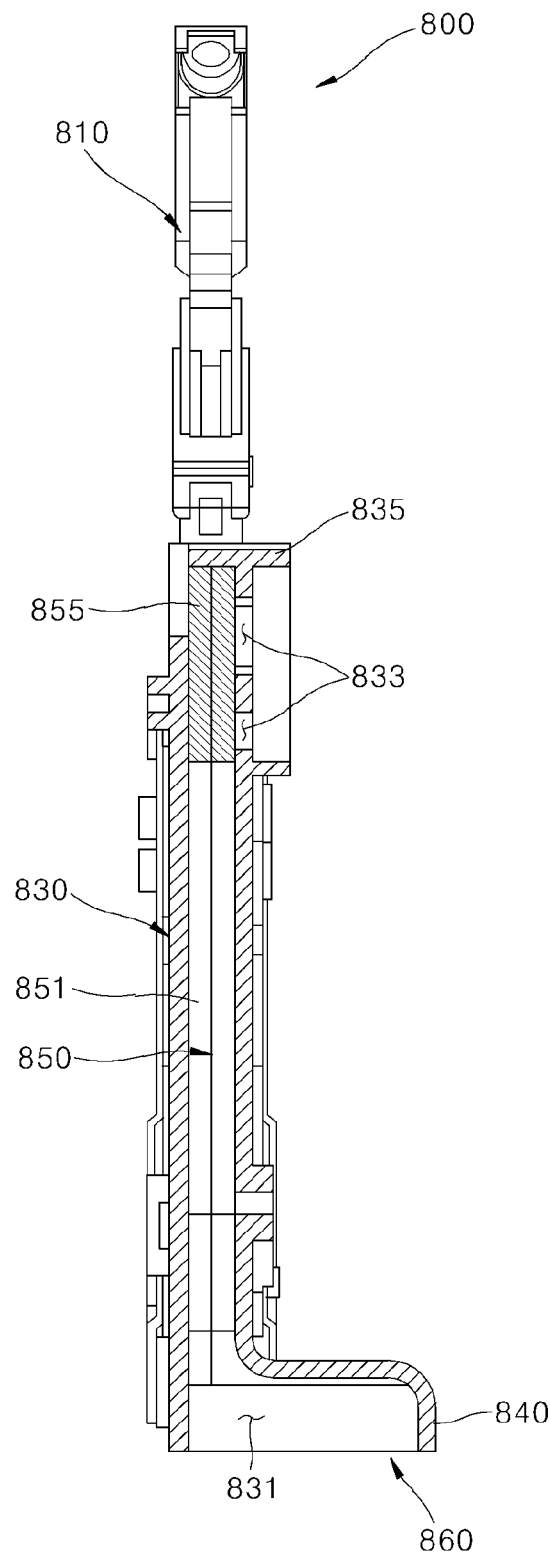
FIG. 54 is a front cross-sectional view showing the structure of the cooling channel in FIG. 52.
Figure 56:
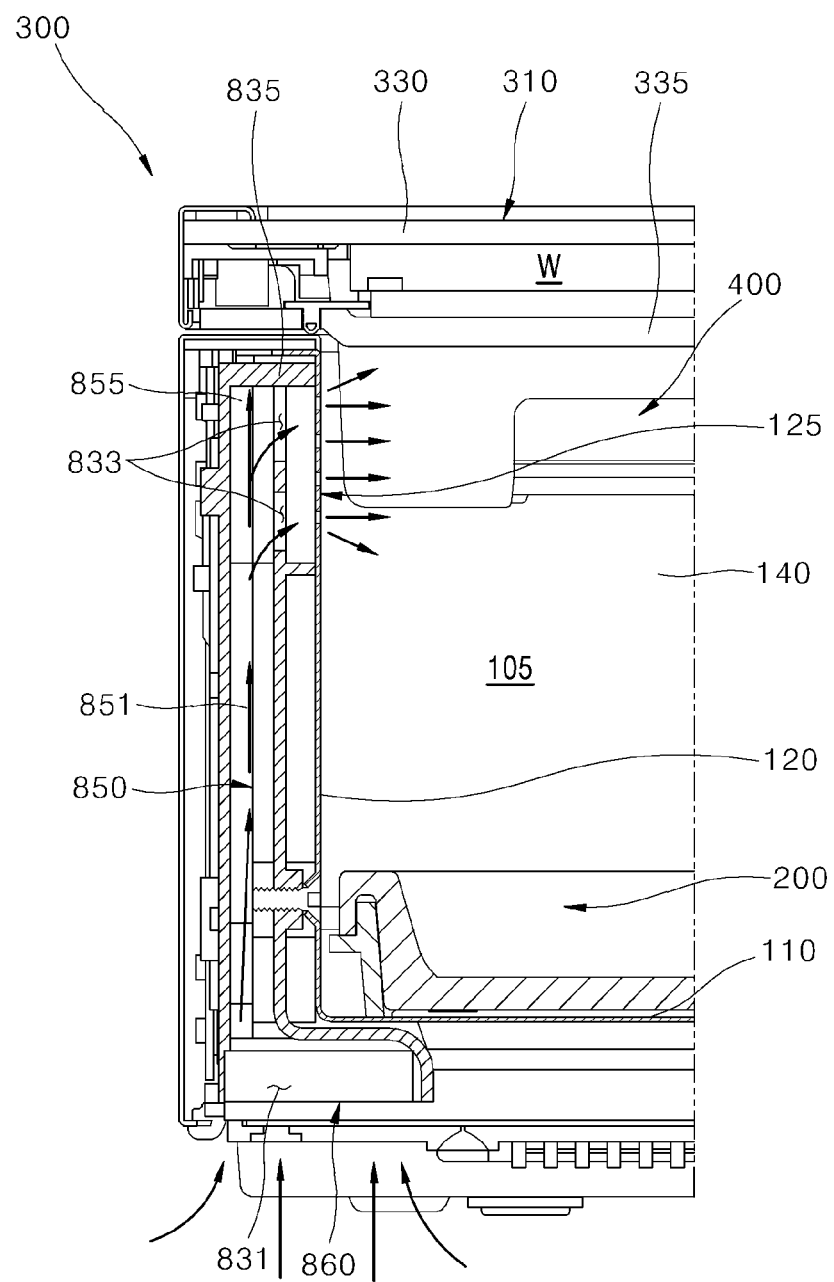
FIG. 56 is a cross-sectional view taken along line "XXXXXIV-XXXXXIV" in FIG. 63.
Figure 57:
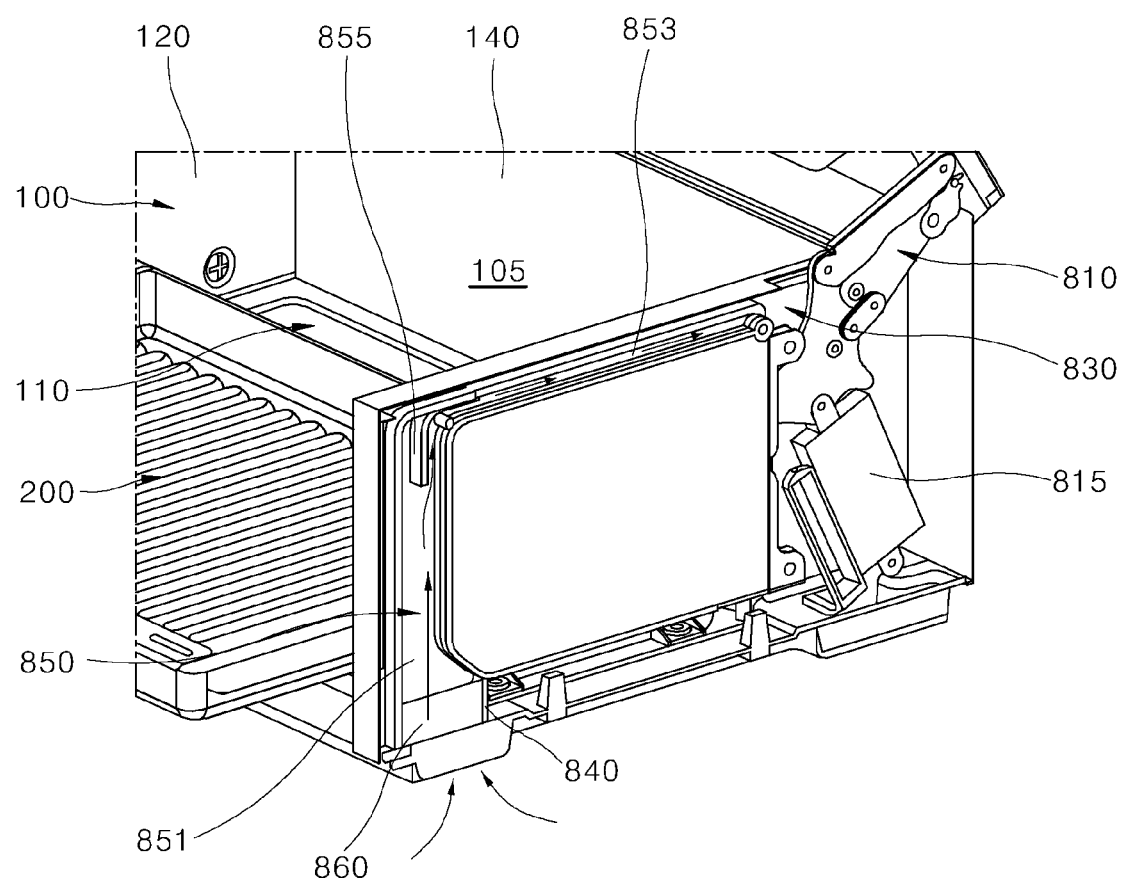
FIG. 57 is a view showing a flow of air in the cooling channel in FIG. 52.

FIG. 52 is a cross-sectional perspective view showing a cross section along line "XXXXX-XXXXX" in FIG. 1, FIG. 53 is a lateral cross-sectional view showing a structure of a cooling channel in FIG. 52, and FIG. 54 is a front cross-sectional view showing the structure of the cooling channel in FIG. 52. FIG. 55 is a cross-sectional perspective view showing the structure of the cooling channel in FIG. 52, FIG. 56 is a cross-sectional view showing a flow of the discharge of air into a cooking space through the cooling channel in FIG. 55, and FIG. 57 is a view showing a flow of air in the cooling channel in FIG. 52.

Referring to FIGS. 3 and 52, the hinge assembly 800 may be disposed respectively on both sides of the housing 100 in the left-right direction thereof such that the hinge assembly 800 is disposed respectively at both outer sides of the tray 200 in the left-right direction thereof. Each of the hinge assemblies 800 may include a hinge case 830, a hinge part 810 and a cooling channel 850, as illustrated in FIGS. 52 to 55.

The hinge case 830 forms the exterior of the hinge assembly 800. The hinge case 830 may have an accommodation space therein to accommodate a portion of the hinge part 810. The cooling channel 850 may be formed in the accommodation space inside the hinge case 830. In the embodiment, the cooling channel 850 may be provided to guide the flow of air flowing into the hinge case 830 from the outside of the hinge case 830.

Additionally, the hinge case 830 may be provided with a channel inlet 831 and a channel outlet 833.

The channel inlet 831 may be open to the outside of the hinge case 830 from the cooling channel 850. The channel inlet 831 may be provided at the lower end of the hinge case 830. In the embodiment, the channel inlet 831 is formed in a way that penetrates in the up-down direction at the lower end of the hinge case 830, for example.

The channel outlet 833 may be open to the inside of the cooking space 105 from the cooling channel 850. The channel outlet 833 may be disposed in the upper portion of the channel inlet 831 and disposed in the lateral portion of the hinge case 830. That is, the channel inlet 831 may be disposed in the lower portion of the cooling channel 850, and the channel outlet 833 may be disposed at the upper side of the cooling channel 850.

In the embodiment, the channel outlet 833 is formed in a way that penetrates in the left-right direction in the lateral portion of the hinge case 830, for example. Specifically, the channel outlet 833 may passes through the lateral surface of the hinge case 830, facing the lateral surface 120, 130 of the housing 100, in the lateral direction. In other words, the channel outlet 833 may be formed in a way that penetrates in the left-right direction on one lateral surface of the hinge case 830 facing the cooking space 105.

That is, the channel inlet 831 is formed at the lower end of the cooling channel 850 in a way that penetrates in the up-down direction, and the channel outlet 833 may be formed on one lateral surface of the cooling channel 850 in a way that penetrates in the left-right direction.

The cooling channel 850 may be defined by a structure being formed in the hinge case 830. The cooling channel 850 may be formed in a way that the cooling channel 850 includes a first section 851 and a second section 853.

The first section 851 of the two sections of the cooling channel 850 corresponds to a section that extends upward from the channel inlet 831. The first section 851 may be disposed in a position adjacent to the front surface of the housing 100 and the door front surface part 350.

The second section 853 of the two sections of the cooling channel 850 corresponds to a section that extends rearward from the upper side of the first section 851. The second section 853 may be disposed in a position adjacent to the upper surface of the housing 100 and the door upper surface part 310.

The channel inlet 831 is disposed in the lower portion of the cooling channel 850, specifically, in the lower portion of the first section 851. The channel inlet 831 may have a greater width than the cooling channel 850. That is, the channel inlet 831 has a greater width than the cooling channel 850 in a parallel direction with the bottom surface 110 of the housing 100.

The hinge case 830 at which the channel inlet 831 is formed has a fan mounting part 835, in the lower portion thereof. The fan mounting part 835 may protrude from the lower portion of the hinge case 830 in the parallel direction with the bottom surface 110 of the housing 100, while surrounding the channel inlet 831. For example, the fan mounting part 835 may protrude from the lower portion of the housing 100 at which the channel inlet 831 is disposed, in the lateral direction. A third cooling fan 860 may be disposed in the fan mounting part 835.

In the embodiment, the fan mounting part 835 protrudes from the lower portion of the hinge case 830 to the bottom surface 110 of the housing 100, for example. Additionally, a space being formed under the bottom surface 110 of the housing 100 may be open to the hinge case 830 in the lateral direction. At least a portion of the fan mounting part 835 may be inserted into the space (hereafter, "lower space") being formed under the bottom surface 110 of the housing 100.

A second heating part 600 (see FIG. 34) is disposed in the lower space. The second heating part 600 being accommodated in the lower space, specifically, a working coil 610 (see FIG. 34), does not fill the lower space completely. For example, the working coil 610 may have a less length than the bottom surface 110 of the housing 100, in the left-right direction.

The left-to-right length of the tray 200 being disposed in the cooking space 105 is less than the left-to-right length of the bottom surface 110 of the housing 100, and the left-to-right length of the working coil 610 does not have to be greater than the left-to-right length of the tray 200. Additionally, the working coil 610 is ordinarily disposed at the center of the housing 100 in the left-right direction.

Accordingly, a space big enough for the fan mounting part 835 to be inserted may be formed in the lateral portion of the lower space. The lower space is open in the lateral direction such that at least a portion of the fan mounting part 835 can be inserted into the lower space. In the embodiment, most of the fan mounting part 835 is inserted into the lower space, for example.

Since the fan mounting part 835 is inserted in this way, the hinge case 830 and the housing 100 can be fitted and coupled to each other, using the fan mount part 835 as a medium. Accordingly, the hinge assembly 800 may be fixed to the housing 100 more reliably.

Additionally, since the fan mounting part 835 is inserted as described above, an increase in the left-to-right length of an area of the cooking appliance occupied by the hinge assembly 800 or an increase in the size of the cooking appliance, caused due to the fan mounting part 835 as a protruding structure, may be prevented.

The third cooling fan 860 may be disposed under the hinge case 830, specifically, in the fan mounting part 835. The third cooling fan 860 may create the flow of air in which external air flows into the cooling channel 850 through the channel inlet 831.

Because of the flow of air created by the third cooling fan 860, external air may flow into the cooling channel 850 through the channel inlet 831. The external air having flown into the cooling channel 850 may cool the hinge case 830 while passing through the first section 851 and the second section 853 of the cooling channel 850.

In the embodiment, the hinge part 810 may be connected to the rear side of the door upper surface part 310. The hinge part 810 is biased toward the rear side in the hinge case 830.

The cooling channel 850 may include the first section 851 and the second section 853. The first section 851 and the second section 853 may be connected to each other in a portion adjacent to the edge at the upper side of the front of the hinge case 830.

Accordingly, the external air, having flown into the cooling channel 850 through the channel inlet 831, may cool surroundings of the front surface of the housing 100 and the door front surface part 350 while passing through the first section 851. Additionally, the air, having passed through the first section 851 and having flown into the second section 853, may cool surrounding s of the upper surface of the housing 100 and the door upper surface part 310 while passing through the second section 853.

Further, the cooling channel 850 may be provided with a channel guide 855. The channel guide 855 may protrude on the cooling channel 850, and be disposed in a portion where the first section 851 and the second section 853 are connected. That is, the channel guide 855 may be provided in a portion inside the cooling channel 850, where the flow of air changes.

The channel guide 855 may guide the flow of air such that the air having passed through the first section 851 flows into the second section 853 smoothly. In an example, the channel guide 855 may include a projection that extends in the up-down direction, and a projection that extends in the front-rear direction, and be formed in a way that a curved surface-shaped projection connects between the two projections.

The upper surface and front surface of the housing 100, and the door upper surface part 310 and the door front surface part 350 are portions that are most likely to be contacted by a user. Additionally, the portions can be easily affected by heat in the cooking space 105.

In the embodiment, considering the fact, a cooling structure is provided, and in the cooling structure, the cooling channel 850 is disposed around the portions and external air flows into the cooling channel 850 with the third cooling fan 860.

By doing so, portions, the temperature of which increases easily due to heat and which are highly likely to be contacted by the user, can cool, thereby preventing safety problems, and damage to the components in the door 300 caused by the overheating of the door 300.

Additionally, the channel outlet 833 may be disposed in the upper portion of the first section 851, i.e., in the portion where the first section 851 and the second section 853 are connected. The channel outlet 833 may be formed on the lateral surface f the hinge case 830, facing the lateral surface 120, 130 of the housing 100, in a way that penetrates in the lateral direction, and form a passage that allows the cooling channel 850 to be open to the outside of the hinge case 830.

Further, a cool air discharge part 125 may be disposed on the lateral surface 120, 130 of the housing 100. The cool air discharge part 125 may communicate with the channel outlet 833. The cool air discharge part 125 may include a plurality of discharge openings.

Each of the plurality of discharge openings may be formed on the lateral surface 120, 130 of the housing 100 in a way that penetrates in the lateral direction. The cool air discharge part 125 may be formed in a way that the plurality of discharge openings is collected around the channel outlet 833.

At least a portion of the air flowing into the cooling channel 850 by the third cooling fan 860 may be discharged into the cooking space 105 through the channel outlet 833 and the cool air discharge part 125, as illustrated in FIGS. 54 to 56.

To this end, the channel outlet 833 and the cool air discharge part 125 may be disposed in the lateral direction. Preferably, the cool air discharge part 125 may be disposed in a position where the cool air discharge part 125 overlaps the channel outlet 833 in the lateral direction. Accordingly, at least a portion of the air flowing into the cooling channel 850 by the third cooling fan 860 may be discharged in the lateral direction through the cool air discharge part 125.

Further, at least any one of the hinge assembly 800 and the housing 100 may further include a discharge projection 835. In the embodiment, the hinge assembly 800 is provided with the discharge projection 835, for example.

In an example, the discharge projection 835 may protrude from the hinge case 830 in the lateral direction. The discharge projection 835 may protrude from the hinge case 830 to the lateral surface 120, 130 of the housing 100 while surrounding the channel outlet 833.

The discharge projection 835 may connect between the channel outlet 833 and the cool air discharge part 125. That is, a passage that connects between the channel outlet 833 and the cool air discharge part 125 may be formed in the discharge projection 835, and the passage may be formed in a space surrounded by the hinge case 830, the discharge projection 835 and the lateral surface 120, 130 of the housing 100.

The air being discharged out of the cooling channel 850 through the channel outlet 833 may be move to the cooling discharge part 125 efficiently, by the passage that is formed by the discharge projection 835 as described above. Accordingly, at least a portion of the air that flows into the cooling channel 850 by the third cooling fan 860 may be effectively discharged into the cooking space 105 through the cool air discharge part 125.

The cooking appliance in the embodiment may include an exhaust inducing part. The exhaust inducing part may be disposed on at least any one of both lateral surfaces 120, 130 of the housing 100 to create the flow of air at the front of the cooking space 105.

The exhaust inducing part may create the flow of air in which air moves from any one of both the lateral surfaces 120, 130 of the housing 100 to the other lateral surface of the housing 100 or flows from the front of the cooking space 105 to the rear surface 140 of the housing 100.

For example, the exhaust inducing part may allow at least a portion of the air flowing into the cooling channel 850 to be discharged into the cooking space 105 through the cool air discharge part 125, as illustrated in FIG. 56, creating the flow of air in which the air moves from any one of both the lateral surfaces 120, 130 of the housing 100 to the other lateral surface of the housing 100.

Additionally, the exhaust inducing part may allow at least a portion of the air flowing into the cooling channel 850 to flow rearward through the second section 853 and to be discharged into the cooking space 105, as illustrated in FIG. 57, to create the flow of air in which the air flows from the front of the cooking space 105 to the rear surface 140 of the housing 100.

Further, the flow of air in which the air flows from the front of the cooking space 105 to the rear surface 140 of the housing 100 may be induced by the flow of air in which the air is discharged into the cooking space 105 through the cool air discharge part 125 being disposed at the front of the housing 100.

In the embodiment, the exhaust inducing part is disposed on both the lateral surfaces 120, 130 of the housing 100 respectively, for example.

In the embodiment, the exhaust inducing part may include a cooling channel 850, a channel inlet 831 and a channel outlet 833. The exhaust inducing part may further include a third cooling fan 860. The exhaust inducing part may further include a discharge projection 835.

The operation and effect of the exhaust inducing part are described below.

[Sealing Structure of Housing and Door]

Figure 58:
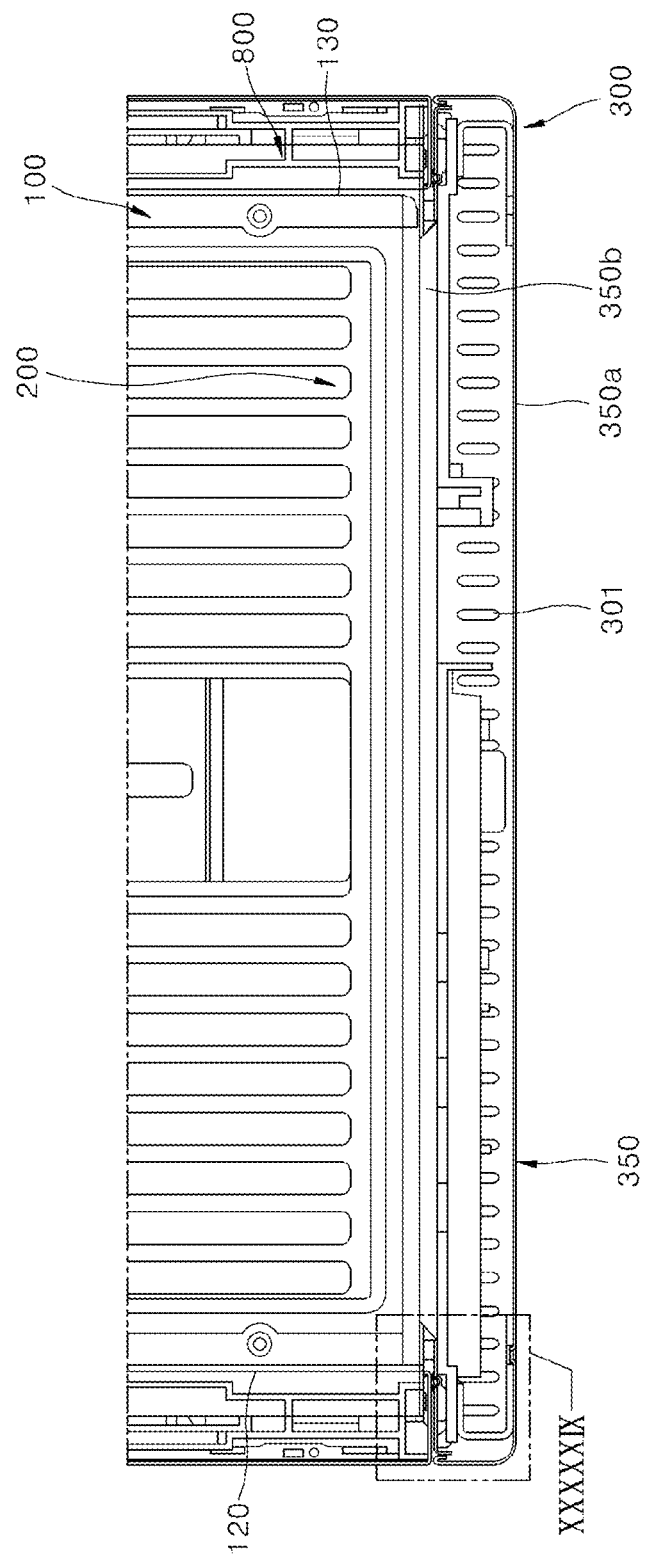
FIG. 58 is a front cross-sectional view showing an inner structure of the cooking appliance in one embodiment.
Figure 60:
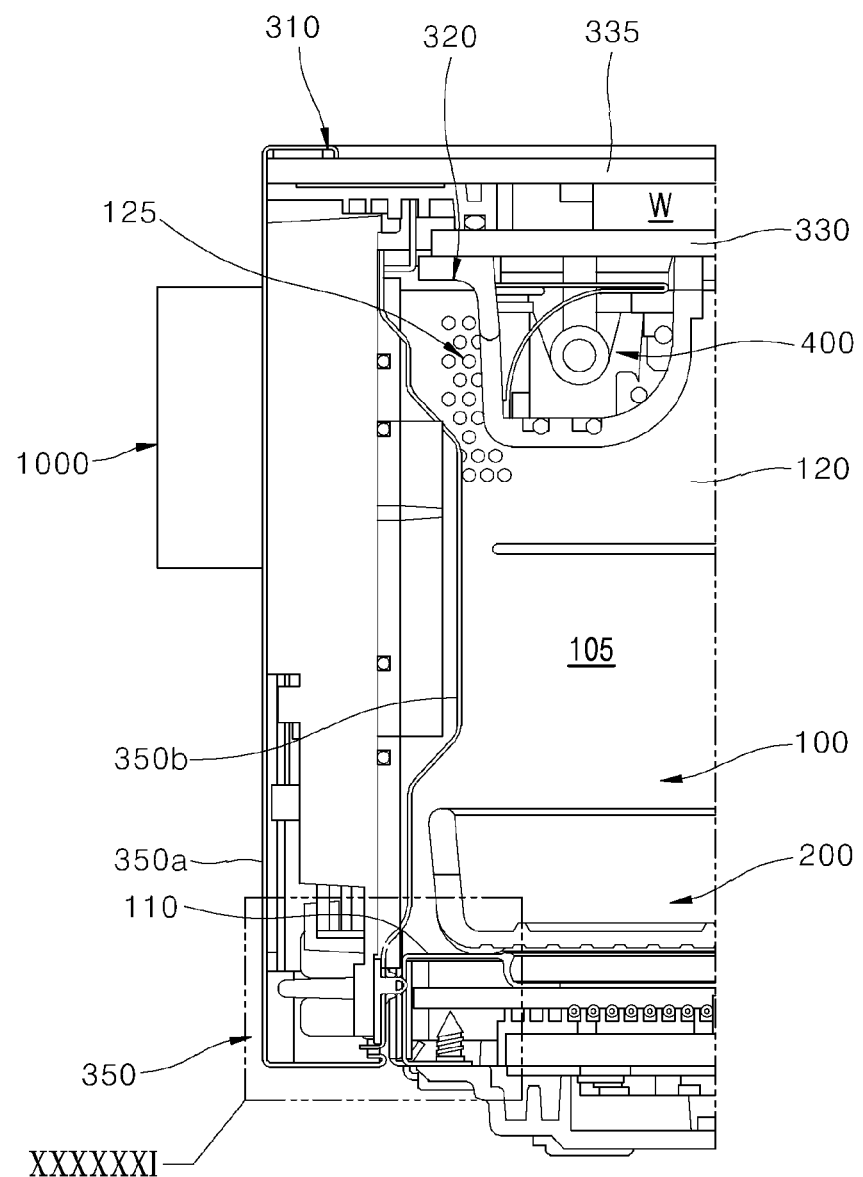
FIG. 60 is a planar cross-sectional view showing the inner structure of the cooking appliance in one embodiment.
Figure 61:
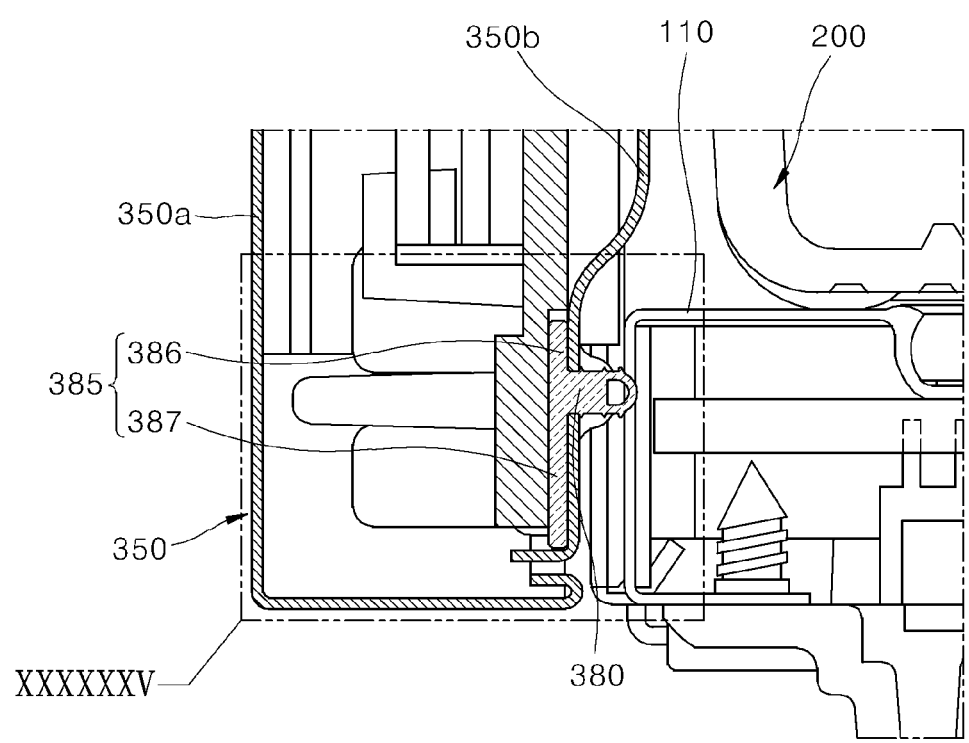
FIG. 61 is an enlarged view showing portion "XXXXXXI" in FIG. 60.
Figure 62:
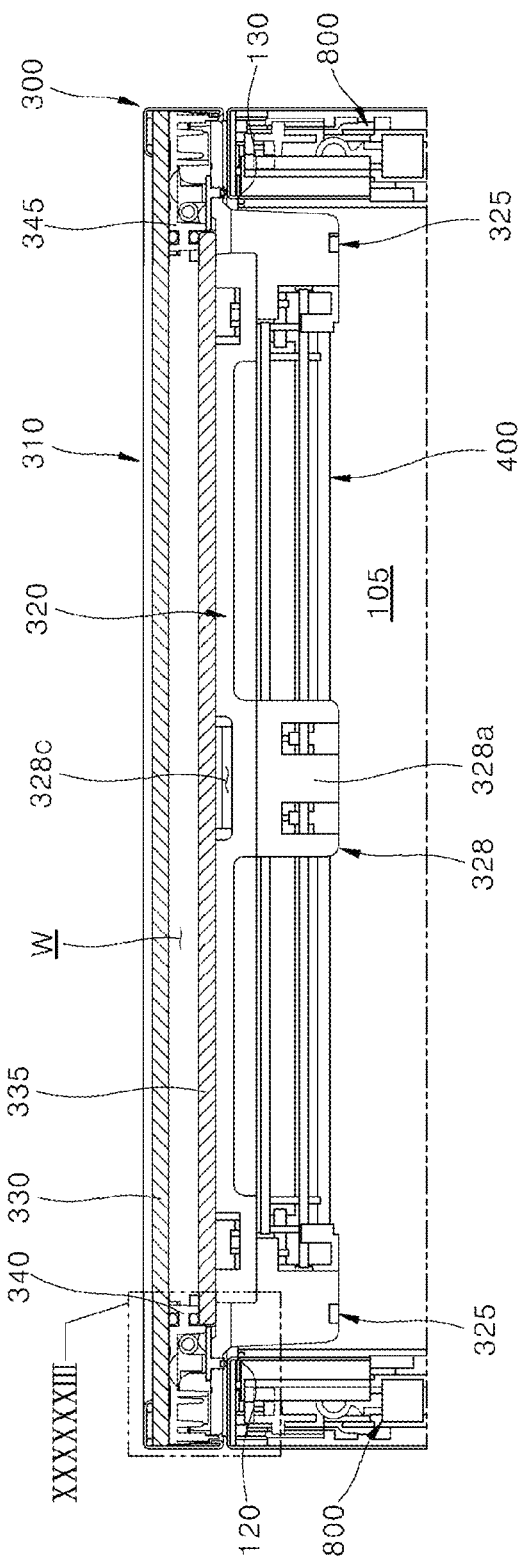
FIG. 62 is a lateral cross-sectional view showing the inner structure of the cooking appliance in one embodiment.
Figure 63:
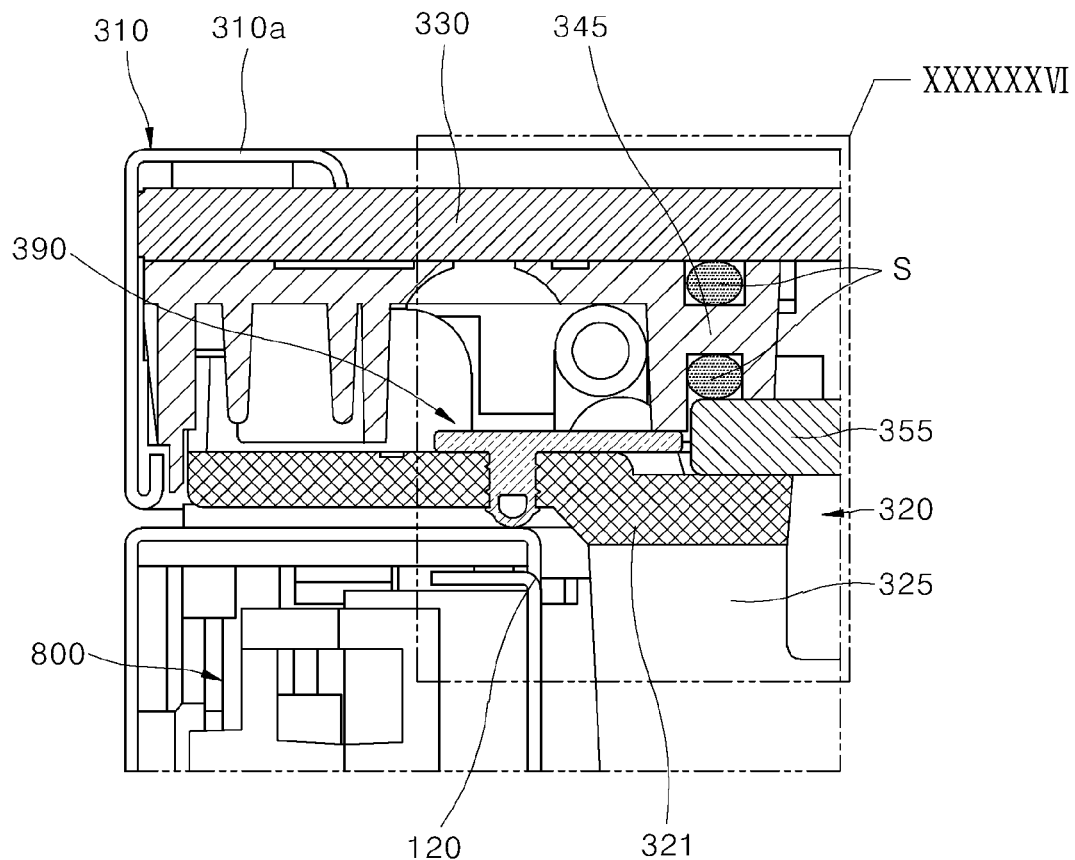
FIG. 63 is an enlarged view showing portion "XXXXXXIII" in FIG. 62.

FIG. 58 is a front cross-sectional view showing an inner structure of the cooking appliance in one embodiment, and FIG. 59 is an enlarged view showing portion "XXXXXIX" in FIG. 58. FIG. 60 is a planar cross-sectional view showing the inner structure of the cooking appliance in one embodiment, and FIG. 61 is an enlarged view showing portion "XXXXXXI" in FIG. 60. FIG. 62 is a lateral cross-sectional view showing the inner structure of the cooking appliance in one embodiment, and FIG. 63 is an enlarged view showing portion "XXXXXXIII" in FIG. 62.

Referring to FIGS. 58 to 63, the cooking appliance in the embodiment may include a gasket. The gasket may be disposed at at least any one of the front side and upper side of the exhaust inducing part. Specifically, the gasket may be disposed at at least one of the front side and the upper side of the cooling channel 850, and include at least one of a first gasket 370, a second gasket 380 and a third gasket 390.

In the embodiment, the cooking appliance includes all the first gasket 370, the second gasket 380 and the third gasket 390, for example, but not be limited.

In another example, the cooking appliance may include only two of the first gasket 370, the second gasket 380 and the third gasket 390 or any one of the first gasket 370, the second gasket 380 and the third gasket 390.

Referring to FIGS. 58 and 59, the first gasket 370 may be disposed between the hinge case 830 or the lateral surface 120, 130 of the housing 100 and the door front surface part 350. The first gasket 370 may seal between the hinge case 830 and the door front surface part 350 or between the lateral surface 120, 130 of the housing 100 and the door front surface part 350, in front of the cooling channel 850.

In the embodiment, the first gasket 370 is disposed on the rear surface of the door front surface part 350, specifically, at the door rear surface cover 350b, for example.

Referring to FIGS. 60 and 61, the second gasket 380 may be disposed between the bottom surface 110 of the housing 100 and the door front surface part 350. The second gasket 380 may seal between the bottom surface 110 of the housing 100 and the door front surface part 350, in front of the cooling channel 850.

In the embodiment, the second gasket 380 may be disposed on the rear surface of the door front surface part 350, specifically, at the door rear surface cover 350b, for example.

Referring to FIGS. 62 and 63, the third gasket 390 may be disposed between the upper surface of the housing 100 and the door upper surface part 310. The third gasket 390 may seal between the hinge case 830 and the door upper surface part 310 or between the lateral surface 120, 130 of the housing 100 and the door upper surface part 310 on the cooling channel 850.

Specifically, the third gasket 390 may seal between the upper surface of the hinge case 830 and the bottom surface of the door upper surface part 310 or between the upper end of the lateral surface 120, 130 of the housing 100 and the bottom surface of the door upper surface part 310.

In the embodiment, the third gasket 390 is disposed on the bottom surface of the door upper surface part 310, specifically, the bottom surface of the door frame 320, for example.

In the embodiment, the first gasket 370 and the second gasket 380 may seal between the housing 100 and the door front surface part 350, as illustrated in FIGS. 58 to 61.

In this case, the first gasket 370 may be disposed respectively at both sides of the cooking space 105 in the left-right direction thereof, to seal between both the lateral surfaces 120, 130 of the housing 100 and the door front surface part 350, in front of the cooking space 105. The first gasket 370 may seal between both the lateral surfaces 120, 130 of the housing 100 and the door front surface part 350 respectively at both the sides of the cooking space 105 in the left-right direction thereof.

Additionally, the second gasket 380 may be disposed in the lower portion of the cooking space 105 and seal between the bottom surface 110 of the housing 100 and the door front surface part 350, in front of the cooking space 105. The second gasket 380 may seal between the bottom surface 110 of the housing 100 and the door front surface part 350, in the lower portion of the cooking space 105.

Additionally, the third gasket 390 may seal between the housing 100 and the door upper surface part 310, as illustrated in FIGS. 62 and 63.

In this case, the third gasket 390 may be disposed at both the sides of the cooking space 105 in the left-right direction thereof respectively and seal between both the lateral surfaces 120, 130 of the housing 100 and the door upper surface part 310, in the upper portion of the cooking space 105. The third gasket 390 may seal between both the lateral surfaces 120, 130 of the housing 100 and the door upper surface part 310 respectively, at both the sides of the cooking space 105 in the left-right direction thereof.

In summary, the first gasket 370 and the second gasket 380 may seal a gap between the door front surface part 350 and the housing 100, and the third gasket 390 may seal a gap between the door upper surface part 310 and the housing 100, as illustrated in FIGS. 58 to 63.

Since a gap between the door 300 and the housing 100 is sealed by the first gasket 370, the second gasket 380 and the third gasket 390 as described above, heat or steam that is generated in the cooking space 105 during cooking hardly leaks out of the cooking appliance through the gap between the door 300 and the housing 100.

That is, the gaskets 370, 380, 390 being disposed between the door 300 and the housing 100 may help to effectively block leakage of heat or steam, which is generated in the cooking space 105 during cooking, out of the cooking appliance through the gap between the door 300 and the housing 100.

The gaskets 370, 380, 390 may effectively suppress problems such as damage to the user caused by the heat or the steam leaking through the gap between the door 300 and the housing 100, or the formation of a droplet on the door 300 caused by the steam leaking through the gap between the door 300 and the housing 100, or the collection of water around the door 300 caused by the droplet being formed on the door 300.

Additionally, as illustrated in FIGS. 57 and 63, the third gasket 390 may be disposed between the center of the housing 100 in the lateral direction thereof and the second section 853 with respect to the lateral direction, while being disposed in a position facing the upper end of the lateral surface 120, 130 of the housing 100. That is, the second section 853 is disposed farther from the center of the housing 100 in the lateral direction thereof than the third gasket 390.

Air flowing along the second section 853 being disposed in the above-described position rearward may serve as an air curtain that blocks air having passed through the third gasket 390 and the housing 100 from the outside in the lateral direction of the third gasket 390.

That is, the gap between the lateral surface 120, 130 of the hosing 100 and the door upper surface part 310 is sealed by the air curtain being formed by the air flowing along the second section 853 as well as the third gasket 390.

[Structure of Gasket—First Gasket]

Figure 64:
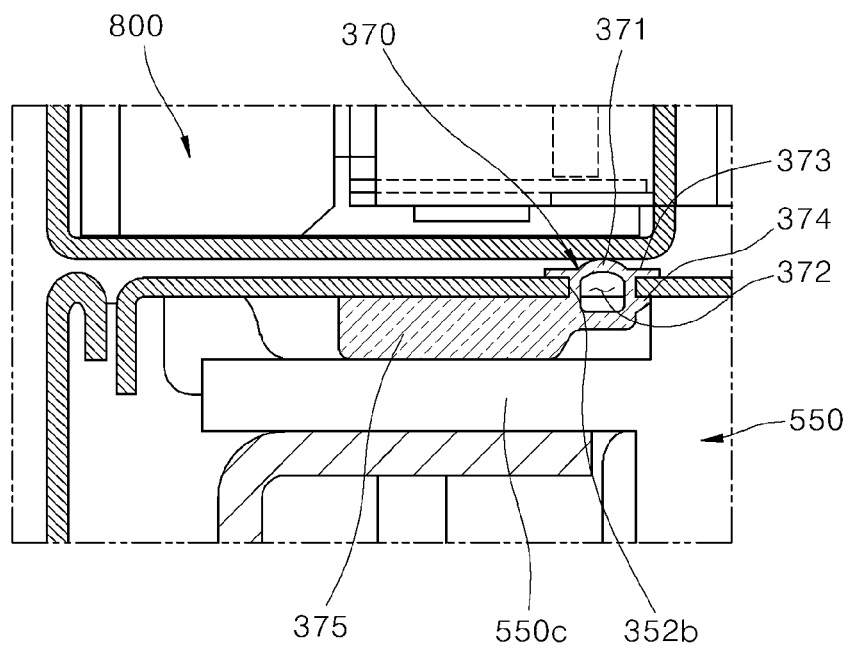
FIG. 64 is an enlarged view showing portion "XXXXXXIV" in FIG. 59.
Figure 65:
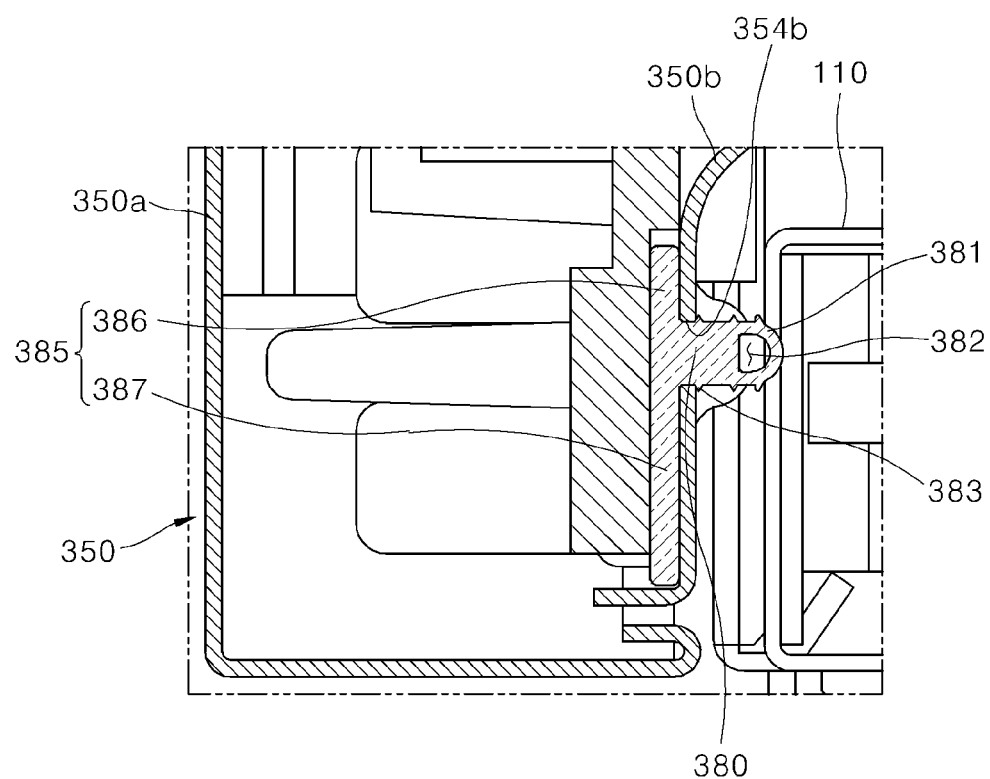
FIG. 65 is an enlarged view showing portion "XXXXXXV" in FIG. 61.
Figure 66:
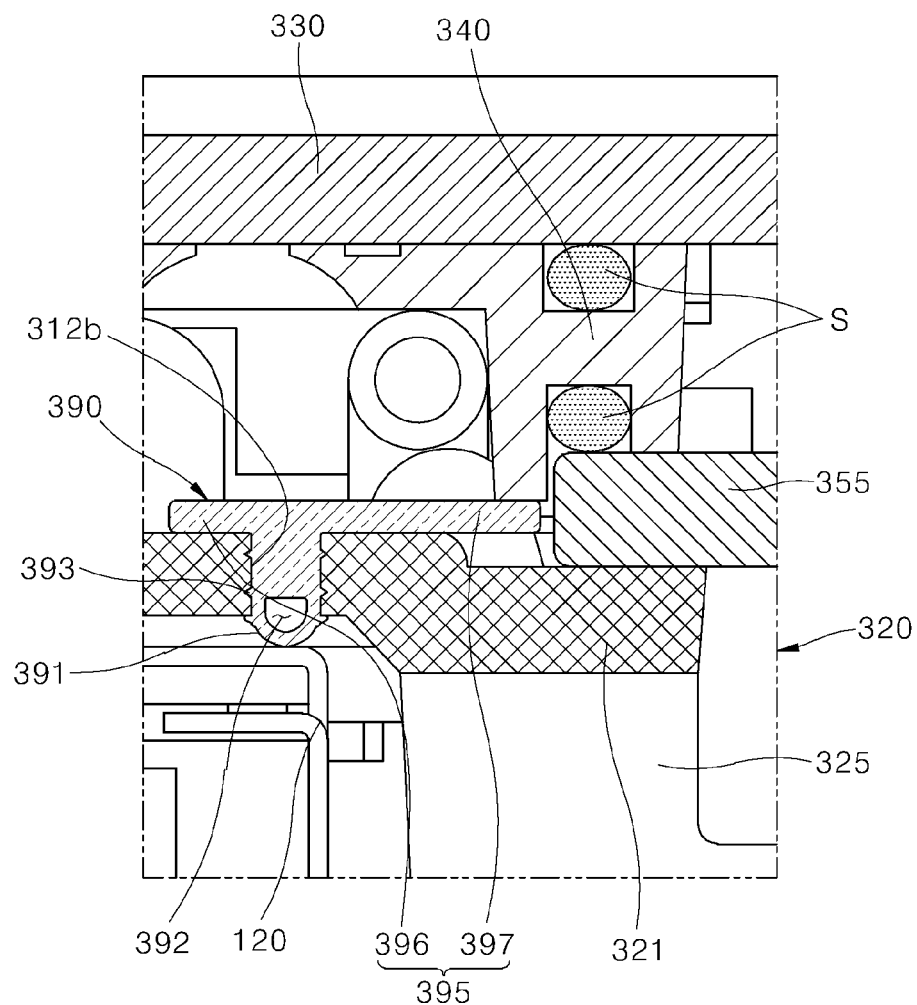
FIG. 66 is an enlarged view showing portion "XXXXXXVI" in FIG. 63.

FIG. 64 is an enlarged view showing portion "XXXXXXIV" in FIG. 59, FIG. 65 is an enlarged view showing portion "XXXXXXV" in FIG. 61, and FIG. 66 is an enlarged view showing portion "XXXXXXVI" in FIG. 63.

Hereafter, the structure of the gasket in the embodiment is described with reference to FIGS. 64 to 66.

Referring to FIGS. 59 and 64, the first gasket 370 may be disposed between the hinge case 830 or the lateral surface 120, 130 of the housing 100 and the door front surface part 350. In the embodiment, the first gasket 370 is disposed at the hinge case 830 or on the rear surface of the door front surface part 350 facing the front surface of the housing 100, for example. Specifically, the first gasket 370 may be disposed at the door rear surface cover 350b.

The first gasket 370 may be made of an elastically deformable material. For example, the first gasket 370 may be made of silicone rubber. The first gasket 370 may include a first sealing body 371.

The first sealing body 371 may be coupled to the door 300 (see FIG. 62), specifically, the door front surface part 350. At least a portion of the first sealing body 371 may pass through the door 300 from the inside of the door 300 and protrude toward the housing 100.

In the embodiment, the first sealing body 371 is coupled to the rear surface of the door front surface part 350 while passing through the rear surface of the door front surface part 350 in the front-rear direction, for example. The first sealing body 371 may be fitted and coupled to the door rear surface cover 350b while passing through the door rear surface cover 350b. The first sealing body 371 may be disposed to face the lateral surface 120, 130 of the housing 100.

The first sealing body 371 being disposed on the rear surface of the door front surface part 350 as described above may protrude toward the lateral surface 120, 130 of the housing 100. In this case, one lateral surface of the first sealing body 371, i.e., the rear surface of the first sealing body 371 facing the lateral surface 120, 130 of the housing 100 may protrude toward the housing 100 in a rounded manner.

In other words, the end portion of the rear side of the first sealing body 371 may be rounded. Since the end portion of the rear side of the first sealing body 371 is rounded, the first sealing body 371 may contact the front surface of the lateral surface 120, 130 of the housing 100 closely and effectively in the state in which the cooking space 105 is closed by the door 300. Thus, the first sealing body 371 may seal the gap between the lateral surface 120, 130 of the housing 100 and the door 300 more effectively.

Additionally, since the end portion of the rear side of the first sealing body 371 is rounded as described above, the first gasket 370 may surface-contact the housing 100. When the first gasket 370 surface-contacts the housing 100, the contact surface between the first gasket 370 and the housing 100 may be greater than when the edge portion and the like of the first gasket 370 contacts the housing 100.

As the contact surface between the first gasket 370 and the housing 100 increases as described above, impact quantity per unit surface area being applied to the first gasket 370 during the opening and closing processes of the door 300 may decrease, thereby reducing the possibility of damage to the first gasket 370, caused by repeated contact between the first gasket 370 and the housing 100.

Further, since an increase in the contact surface between the first gasket 370 and the housing 100 leads to a decrease in the impact quantity per unit surface area being applied to the first gasket 370 during the opening and closing processes of the door 300, magnitude of noise generated during the opening and closing processes of the door 300 may decrease.

The first sealing body 371 may have a first gasket hollow hole part 372 therein. The first gasket hollow hole part 372 may be formed in a way that penetrates in the first sealing body 371.

Since the first gasket hollow hole part 372 is formed in the first sealing body 371, a range of elastic deformation of the first sealing body 371 may expand further. Accordingly, the first sealing body 371 may closely contact the housing, specifically, the front surface of the lateral surface 120, 130 of the housing 100 more definitely and seal the gap between the lateral surface 120, 130 of the housing 100 and the door front surface part 350 effectively.

The first gasket 370 may further include a first sealing cover 373. The first sealing cover 373 may protrude from the first sealing body 371 and form a flat surface parallel with the door rear surface cover 350b. The first sealing cover 373 may closely contact the door rear surface cover 350b from the outside of the door 300.

A first gasket fitting hole 352b may be included in the door rear surface cover 350b. The first gasket fitting hole 352b may be formed in a way that penetrates in the front-rear direction at the door rear surface cover 350b. The first sealing body 371 may be inserted into the first gasket fitting hole 352b and fitted and coupled to the door rear surface cover 350b.

The first sealing body 371 may be formed into a cylinder, and the first gasket fitting hole 352b may be formed into a hole corresponding to the cylinder. Additionally, the first sealing cover 373 may be formed into a projection that protrudes from the first sealing body 371 in the centrifugal direction.

The first sealing cover 373 covers a gap between the first sealing body 371 being inserted into the first gasket fitting hole 352b and the door rear surface cover 350b from behind the door rear surface cover 350b, to seal the gap between the first sealing body and the door rear surface cover 350b.

The first sealing cover 373, provided as described above, may block the flow of heat or steam, leaking from the inside of the cooing space 105 through the gap between the door front surface part 350 and the lateral surface 120, 130 of the housing 100, into the door 300 through the first gasket fitting hole 352b.

Further, the first sealing cover 373 may be disposed in a position adjacent to the rear surface of the first sealing body 371. As the door 300 closes the cooking space, the first sealing body 371 is deformed and becomes flat between the lateral surface 120, 130 of the housing 100 and the door front surface part 350 to seal between the lateral surface 120, 130 of the housing 100 and the door front surface part 350. In this case, the first sealing cover 373 may closely contact the door rear surface cover 350b and the lateral surface 120, 130 of the housing 100 respectively and seal the gap between the door rear surface cover 350b and the lateral surface 120, 130 of the housing 100.

A first support body 375 may support the first sealing body 371, in the door front surface part 350. The first support body 375 may be disposed between the door rear surface cover 350b and the supporting panel 550 while being biased toward the lateral portion of the door front surface part 350.

In the embodiment, the supporting panel 550 may be disposed between the front surface of the first door main body part 350a and the door rear surface cover 350b. The first support body 375 may be disposed at the supporting panel 550, specifically, between the coupling area 550c being disposed on both sides of the supporting panel 550 and the door rear surface cover 350b.

The first support body 375 being disposed as described above may be fitted between the coupling area 550c of the supporting panel 550 and the door rear surface cover 350b. Based on the fit coupling, the first support body 375 and the door front surface part 350 may be coupled.

Based on the fit coupling among the supporting panel 550, the door rear surface cover 350b and the first support body 375, the first support body 375 may be coupled to the door front surface part 350 stably.

As the first support body 375 is coupled to the door front surface part 350 stably, the coupling between the first gasket 370 and the door front surface part 350 may be maintained reliably such that the first gasket 370 is prevented from shaking or being detached from the door front surface part 350.

Additionally, the first gasket 370 may further include a first sealing projection 374. Like the first sealing cover, the first sealing projection 374 may protrude from the first sealing body 371 and form a flat surface parallel with the door rear surface cover 350b. The first sealing cover 373 may closely contact the door rear surface cover 350b, in the door 300.

For example, the first sealing projection 374 may be disposed in front of the first sealing cover 373 with the door rear surface cover 350b between the first sealing projections. The first sealing projection 374 may cover the gap between the first sealing body 371 being inserted into the first gasket fitting hole 352b and the door rear surface cover 350b, in front of the door rear surface cover 350b, to seal the gap between the first sealing body and the door rear surface cover 350b.

That is, the first sealing cover 373 and the first sealing projection 374 are disposed on both sides of the door rear surface cover 350b in the front-rear direction thereof, to seal the gap between the first sealing body and the door rear surface cover 350b, at both the sides of the door rear surface cover 350b in the front-rear direction thereof.

Thus, heat or steam leaking from the inside of the cooking space 105 through the gap between the door front surface part 350 and the lateral surface 120, 130 of the housing 100 may be prevented from flowing into the door 300 through the first gasket fitting hole 352b more effectively.

The first sealing cover 373 provided as described above may block heat or steam leaking from the inside of the cooking space 105 through the gap between the door front surface part 350 and the lateral surface 120, 130 of the housing 100 from flowing into the door 300 through the first gasket fitting hole 352b.

[Structure of Gasket— Second Gasket]

Referring to FIGS. 60 and 65, the second gasket 380 may be disposed between the bottom surface 110 of the housing 100 and the door front surface part 350. In the embodiment, the second gasket 380 is disposed on the rear surface of the door front surface part 350, for example. Specifically, the second gasket 380 may be disposed at the door rear surface cover 350b.

The second gasket 380 may be made of an elastically deformable material. For example, the second gasket 380 may be made of silicone rubber like the first gasket 370 (see FIG. 64). The second gasket 380 may include a second sealing body 381.

The second sealing body 381 may be coupled to the door 300, specifically, the door front surface part 350. At least a portion of the second sealing body 381 may pass through the door 300 from the inside of the door 300 and protrude toward the housing 100.

In the embodiment, the second sealing body 381 is coupled to the rear surface of the door front surface part 350 while passing through the rear surface of the door front surface part 350 in the front-rear direction, for example. Specifically, the second sealing body 381 may be fitted and coupled to the door rear surface cover 350b while passing through the door rear surface cover 350b. The second sealing body 381 may be disposed to face the bottom surface 110 of the housing 100.

The second sealing body 381 being disposed on the rear surface of the door front surface part 350 as described above may protrude toward the bottom surface 110 of the housing 100. In this case, the end portion of the rear side of the second sealing body 381 may be rounded like the first sealing body 371 (see FIG. 64).

Since the end portion of the rear side of the second sealing body 381 is rounded, the second sealing body 381 may contact the end portion of the front of the bottom surface 110 of the housing 100 closely and effectively in the state in which the cooking space 105 is closed by the door 300. Thus, the second sealing body 381 may seal the gap between the bottom surface 110 of the housing 100 and the door 300 more effectively.

Additionally, since the end portion of the rear side of the second sealing body 381 is rounded as described above, damage to the second gasket 380 caused by repetitive contact between the second gasket 380 and the housing 100, and magnitude of noise generated during the opening and closing processes of the door 300 may decrease.

The second sealing body 381 has a second gasket hollow hole part 382 therein. The second gasket hollow hole part 382 may be formed in a way that penetrates in the second sealing body 381.

Since the second gasket hollow hole part 382 is formed in the second sealing body 381, the second sealing body 381 may the bottom surface 110 of the housing 100 more definitely and seal the gap between the bottom surface 110 of the housing 100 and the door front surface part 350 effectively.

The second gasket 380 may further include a second sealing projection 383. The second sealing projection 383 may protrude from the second sealing body 381 and form a flat surface parallel with the door rear surface cover 350*b*.

A second gasket fitting hole 354*b* may be included in the door rear surface cover 350*b*. The second gasket fitting hole 354*b* may be formed in a way that penetrates in the front-rear direction at the door rear surface cover 350*b* like the first gasket fitting hole 352*b* (see FIG. 64). The second sealing body 381 may be inserted into the second gasket fitting hole 354*b* and fitted and coupled to the door rear surface cover 350*b*.

The second sealing body 381 may be formed into a cylinder, and the second gasket fitting hole 354*b* may be formed into a hole corresponding to the cylinder. Additionally, the second sealing projection 383 may be formed into a projection that protrudes from the second sealing body 381 in the centrifugal direction.

The second sealing projection 383 may seal between the bottom surface 110 of the housing 100 and the door front surface part 350 together with the second sealing body 381 that is deformed and becomes flat between the bottom surface 110 of the housing 100 and the door front surface part 350 as the door 300 closes the cooking space. In this case, the second sealing projection 383 may closely contact the bottom surface 110 of the housing 100 and seal the gap between the door rear surface cover 350*b* and the bottom surface 110 of the housing 100.

A second support body 385 may support the second sealing body 381, in the door front surface part 350. The second support body 385 may be disposed between the door rear surface cover 350*b* and the supporting panel 550 while being disposed close to the lower portion of the door front surface part 350.

In the embodiment, the supporting panel 550 may be disposed between the front surface of the first door main body part 350*a* and the door rear surface cover 350*b*. The second support body 385 may be disposed between the supporting panel 550 and the door rear surface cover 350*b*.

The second support body 385 being disposed as described above may be fitted between the supporting panel 550 and the door rear surface cover 350*b*. Based on the fit coupling, the second support body 385 and the door front surface part 350 may be coupled.

Based on the fit coupling among the supporting panel 550, the door rear surface cover 350*b* and the second support body 385, the second support body 385 may be coupled to the door front surface part 350 stably.

As the second support body 385 is coupled to the door front surface part 350 stably, the coupling between the second gasket 380 and the door front surface part 350 may be maintained reliably such that the second gasket 380 is prevented from shaking or being detached from the door front surface part 350.

Additionally, the second gasket 380 may further include a second sealing projection 383. The second sealing projection 383 may protrude from the second sealing body 381 and form a flat surface parallel with the door rear surface cover 350*b*. The second sealing projection 383 may closely contact the door rear surface cover 350*b*, outside the door 300.

A second gasket fitting hole 354*b* may be included in the door rear surface cover 350*b*. The second gasket fitting hole 354*b* may be formed in a way that penetrates in the front-rear direction at the door rear surface cover 350*b*. The second sealing body 381 may be inserted into the second gasket fitting hole 354*b* and fitted and coupled to the door rear surface cover 350*b*.

The second sealing body 381 may be formed into a cylinder, and the second gasket fitting hole 354*b* may be formed into a hole corresponding to the cylinder. Additionally, the second sealing projection 383 may be formed into a projection that protrudes from the second sealing body 381 in the centrifugal direction.

The second gasket 380 may be provided with a plurality of second sealing projections 383. The plurality of second sealing projections 383 may be spaced at predetermined intervals in the lengthwise direction of the second sealing body 381, i.e., in the front-rear direction.

At least any one of the second sealing projections 383 being disposed as described above may closely contact the door rear surface cover 350*b*, outside the door 300. The second sealing projection 383 may cover the gap between the second sealing body 381 being inserted into the second gasket fitting hole 354*b* and the door rear surface cover 350*b* from behind the door rear surface cover 350*b*, to seal the gap between the second sealing body and the door rear surface cover 350*b*.

Thus, heat or steam leaking through the gap between the door front surface part 350 and the lateral surface 120, 130 of the housing 100 from the inside of the cooking space 105 may be effectively prevented from flowing into the door 300 through the second gasket fitting hole 354*b*.

Additionally, the plurality of second sealing projections 383 being included in the second gasket 380 may produce the following effects.

First, the sealing between the door rear surface cover 350*b* and the second sealing body 381 is done at the rear of the door rear surface cover 350*b* as well as the front of the door rear surface cover 350*b*, thereby preventing heat or steam from flowing into the door 300 more effectively through the second gasket fitting hole 354*b*.

Second, a second gasket 380 of one standard may be effectively applied to a door 300 of different standards. For example, even if the thickness of a portion where the second gasket 380 is inserted, specifically, the thickness of the door rear surface cover 350*b*, decreases or increases, the gap between the second sealing body 381 and the door rear surface cover 350*b* may be sufficiently covered with at least any one of the plurality of second sealing projections 383, thereby effectively sealing the gap between the second sealing body 381 and the door rear surface cover 350*b*.

Further, the second support body 385 may include a first protrusion support part 386 and a second protrusion support part 387. The first protrusion support part 396 may protrude from the second sealing body 381 in a parallel direction with the flat surface being formed by the door rear surface cover 350*b*. The second protrusion support part 387 may protrude in a different direction from the direction in which the first protrusion support part 386 protrudes, while protruding in a parallel direction with the first protrusion support part 386.

In the embodiment, the first protrusion support part 386 and the second protrusion support part 387 are disposed to connect to each other in a straight line, and the second sealing body 381 is disposed between the first protrusion support part 386 and the second protrusion support part 387, for example.

In the state in which the second sealing body 381 is fitted into the second gasket fitting hole 354*b*, the first protrusion support part 386 and the second protrusion support part 387 may connect in a straight line with the second gasket fitting hole 354*b* therebetween. The first protrusion support part 386 and the second protrusion support part 387 may be fixed to the inside of the door front surface part 350 while being fitted between the door rear surface cover 350b and the supporting panel 550 at both sides of the second gasket fitting hole 354b in the up-down direction thereof.

Based on the fit coupling among the supporting panel 550, the door rear surface cover 350b and the second support body 385 at both the sides of the second gasket fitting hole 354b in the up-down direction thereof, the up-to-down position of the second support body 385 may be regulated effectively, and the coupling state between the second gasket 380 and the door front surface part 350 may be maintained more stably.

[Structure of Gasket—Third Gasket]

Referring to FIGS. 61 and 66, the third gasket 390 may be disposed between both the lateral surfaces 120, 130 of the housing 100 and the door upper surface part 310. In the embodiment, the third gasket 390 is disposed under the door upper surface part 310, for example. Specifically, the third gasket 390 may be installed in the door frame 120.

The third gasket 390 may be made of an elastically deformable material. For example, the third gasket 390 may be made of silicone rubber like the first gasket 370 (see FIG. 64) and the second gasket 380 (see FIG. 65). The third gasket 390 may include a third sealing body 391.

The third sealing body 391 may be coupled to the door frame 320, specifically, the coupling part 321. At least a portion of the third sealing body 391 may pass through the door frame 320 from the inside of the door 300 and protrude toward the housing 100.

In the embodiment, the third sealing body 391 is coupled to the door frame 320 while passing through the door frame 320 in the front-rear direction, for example. Specifically, the third sealing body 391 may be fitted and coupled to the coupling part 321 while passing through the coupling part 321. The third sealing body 391 may be disposed to face the upper end of the lateral surface 120, 130 of the housing 100.

The third sealing body 391 being installed in the door frame 320 as described above may protrude toward the lateral surface 120, 130 of the housing 100. In this case, the end portion of the lower side of the third sealing body 391 may be rounded like the second sealing body 381 (see FIG. 65)

Since the end portion of the lower side of the third sealing body 391 is rounded, the third sealing body 391 may contact the upper end of the lateral surface 120, 130 of the housing 100 closely and effectively in the state in which the cooking space 105 is closed by the door 300. Thus, the third sealing body 391 may seal the gap between the lateral surface 120, 130 of the housing 100 and the door 300 more effectively.

Additionally, since the end portion of the rear side of the third sealing body 391 is rounded as described above, the possibility of damage to the third gasket 390, caused by repetitive contact between the third gasket 390 and the housing 100, and magnitude of noise being generated during the opening and closing processes of the door 300 may be reduced.

The third sealing body 391 may have a third gasket hollow hole part 392 therein. The third gasket hollow hole part 392 may be formed in a way that penetrates in the third sealing body 391.

Since the third gasket hollow hole part 392 is formed in the third sealing body 391, the third sealing body 391 may closely contact the lateral surface 120, 130 of the housing 100 more definitely and seal the gap between the lateral surface 120, 130 of the housing 100 and the door upper surface part 310 effectively.

The third gasket 390 may further include a third sealing projection 393. The third sealing projection 393 may protrude from the third sealing body 391 and form a flat surface parallel with the door rear surface cover 350b. The third sealing projection 393 may closely contact the door frame 320 from the outside of the door 300.

A third gasket fitting hole 312b may be included in the door frame 320. The third gasket fitting hole 312b may be formed in a way that penetrates in the up-down direction at the coupling part 321 of the door frame 320. The third sealing body 391 may be inserted into the third gasket fitting hole 312b and fitted and coupled to the door frame 320.

The third sealing body 391 may be formed into a cylinder, and the third gasket fitting hole 312b may be formed into a hole corresponding to the cylinder. Additionally, the third sealing projection 393 may be formed into a projection that protrudes from the first sealing body 371 in the centrifugal direction.

The third sealing projection 393 covers the gap between the third sealing body 391 being inserted into the third gasket fitting hole 312b and the door frame 320 from under the door frame 320, to seal the gap between the third sealing body and the door upper surface part 310.

The third sealing projection 393, provided as described above, may block the flow of heat or steam, leaking from the inside of the cooing space 105 through the gap between the door upper surface part 310 and the lateral surface 120, 130 of the housing 100, into the door 300 through the third gasket fitting hole 312b.

Further, the third sealing projection 393 may be disposed in a position adjacent to the bottom surface of the third sealing body 391. As the door 300 closes the cooking space, the third projection 393 may seal between the lateral surface 120, 130 of the housing 100 and the door upper surface part 310 together with the third sealing body 391 that is deformed and becomes flat between the lateral surface 120, 130 of the housing 100 and the door upper surface part 310. In this case, the third sealing projection 393 may closely contact the door frame 320 and the lateral surface 120, 130 of the housing 100 respectively and seal the gap between the door upper surface part 310 and the lateral surface 120, 130 of the housing 100.

Additionally, the third gasket 390 may further include a third sealing projection 393. The third sealing projection 393 may protrude from the third sealing body 391 and protrude in a parallel direction with the flat surface being formed by the coupling part 321 of the door frame 320.

A third gasket fitting hole 312b may be included in the door frame 320. The third gasket fitting hole 312b may be formed in a way that penetrates in the up-down direction at the door frame 320, specifically, at the coupling part 321. The third sealing body 391 may be inserted into the third gasket fitting hole 312b and fitted and coupled to the door frame 320.

The third sealing body 391 may be formed into a cylinder, and the third gasket fitting hole 312b may be formed into a hole corresponding to the cylinder. Additionally, the third sealing projection 393 may be formed into a projection that protrudes from the third sealing body 391 in the centrifugal direction.

The third gasket 390 may be provided with a plurality of third sealing projections 393. The plurality of third sealing projections 393 may be spaced at predetermined intervals in the lengthwise direction of the third sealing body 391, i.e., in the front-rear direction.

At least any one of the third sealing projections 393 being disposed as described above may be fitted between the inner circumferential surface of the door frame 320 and the third sealing body 391, in the third gasket fitting hole 312b. The third sealing projection 393 may improve the strength of the fit coupling between the door frame 320 and the third sealing body 391, while sealing between the inner circumferential surface of the door frame 320 and the third sealing body 391.

That is, the third sealing projection 393 may prevent heat or steam leaking through the gap between the door upper surface part 310 and the lateral surface 120, 130 of the housing 100 from the inside of the cooking space 105 from flowing into the door 300 through the third gasket fitting hole 312b, and maintain the coupling state between the third gasket 390 and the door 300 stably.

Additionally, the plurality of third sealing projections 393 being included in the third gasket 390 may produce the following effects.

First, the sealing between the inner circumferential surface of the door rear surface cover 350b and the third sealing body 391 is done in multiple ways, thereby preventing heat or steam from flowing into the door 300 more effectively through the third gasket fitting hole 312b.

Second, the portion where the strength of the coupling between the door rear surface cover 350b and the third sealing body 391 improves may be formed at a plurality of points, thereby maintaining the coupling state between the third gasket 390 and the door 300 more stably.

A third support body 395 may support the third sealing body 391, in the door upper surface part 310. The third support body 395 may closely contact the upper surface of the door frame 320 while being disposed close to the lower portion of the door upper surface part 310.

The third support body 395 may include a first protrusion support part 396 and a second protrusion support part 397. The first protrusion support part 396 may protrude from the third sealing body 391 in a parallel direction with the flat surface being formed by the coupling part 321 of the door frame 320. The second protrusion support part 397 may protrude in a different direction from the direction in which the first protrusion support part 396 protrudes, while protruding in a parallel direction with the first protrusion support part 396.

In the embodiment, the first protrusion support part 396 and the second protrusion support part 397 are disposed to connect to each other in a straight line, and the third sealing body 391 is disposed between the first protrusion support part 396 and the second protrusion support part 397, for example.

In the state in which the third sealing body 391 is fitted into the third gasket fitting hole 312b, the first protrusion support part 396 and the second protrusion support part 397 may connect in a straight line with the third gasket fitting hole 312b therebetween. The first protrusion support part 396 and the second protrusion support part 397 may be fixed to the inside of the door front surface part 350 while being fitted into the door frame 320 at both sides of the third gasket fitting hole 312b in the lateral direction thereof.

Further, a cable mounting part 340, 345 may be disposed in the door upper surface part 310. The cable mounting part 340, 345 may be disposed respectively outside the see-through window W in both lateral directions thereof, while being disposed between the door upper surface part 310 and the door frame 320 that are disposed in the up-down direction.

The cable mounting part 340, 345 may be disposed between the first glass 330 and the second glass 335 that are spaced in the up-down direction. That is, the cable mounting part 340,345 may be mounted on the second glass 335, and the first glass 330 may be mounted on the cable mounting part 340, 345. In other words, the cable mounting part 340, 345 may be fitted between the first glass 330 and the second glass 335.

A mounting groove may be provided respectively on the upper surface of the cable mounting part 340, 345 contacting the first glass 330, and the lower surface of the cable mounting part 340, 345 contacting the second glass 335.

The sealing member S may be installed in each of the mounting grooves. That is, the sealing member S may be provided respectively between the cable mounting part 340, 345 and the first glass 330 and between the cable mounting part 340, 345 and the second glass 335.

Accordingly, a sealing structure between the cable mounting part 340, 345 and the first glass 330 and between the cable mounting part 340, 345 and the second glass 335 may be formed using the sealing member S.

The end portion of the second glass 335 in the lateral direction thereof may be disposed close to the third gasket 390. One side portion of the mounting groove in the lateral direction thereof, on the lower surface of the cable mounting part 340, 345, may be mounted on the second glass 335, and the other side portion of the mounting groove in the lateral direction there, on the lower surface of the cable mounting part 340, 345, may protrude outward in the lateral direction of the second glass 335.

The first protrusion support part 396 of the third support body 395 may protrude toward the second glass 335 while protruding from the third sealing body 391 in the lateral direction. The first protrusion support part 396 being formed as described above may be fitted between the portion of the cable mounting part 340, 345, protruding outward in the lateral direction of the second glass 335, and the coupling part 321 of the door frame 320, in the state in which the third sealing body 391 is fitted into the third gasket fitting hole 312b.

That is, the first protrusion support part 396 may be fitted and coupled between the door frame 320 and the cable mounting part 340, 345 such that at least a portion of the bottom surface of the first protrusion support part 396 closely contacts the upper surface of the coupling part 321, and a portion of the upper surface of the first protrusion support part 396 closely contacts a portion of the lower surface of the cable mounting part 340, 345.

Based on the fit coupling described above, the up-to-down position of the third support body 395 may be regulated effectively, and the coupling state between the third gasket 390 and the door upper surface part 310 may be maintained more stably.

Additionally, since the third support body 395 is stably coupled to the door upper surface part 310 as described above, the coupling between the third gasket 390 and the door upper surface part 310 may be maintained reliably such that the third gasket 390 is prevented from shaking or being detached from the door upper surface part 310.

[Operation and Effect of Gasket]

Figure 67:
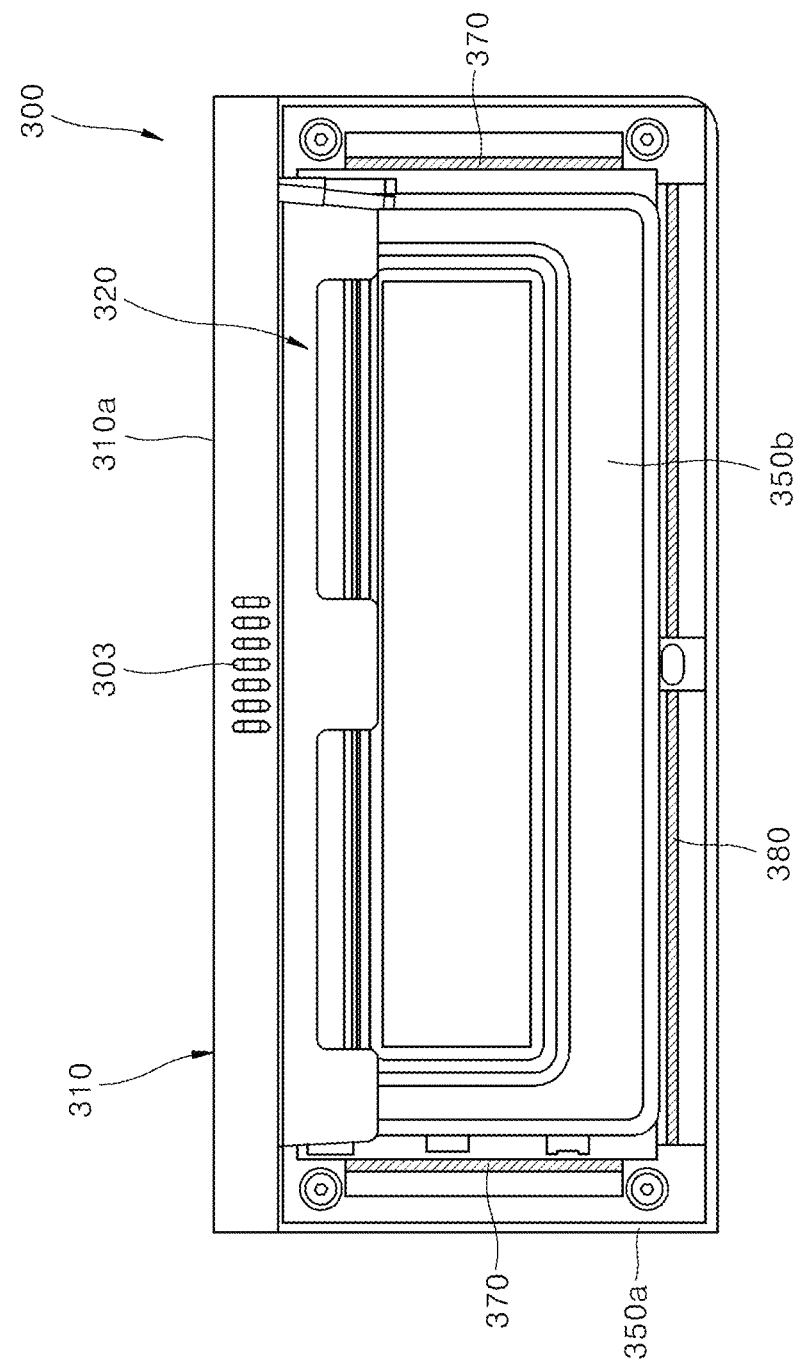
FIG. 67 is a rear view showing a rear surface of the door of the cooking appliance in one embodiment.

FIG. 67 is a rear view showing a rear surface of the door of the cooking appliance in one embodiment, and FIG. 68 is a bottom view showing a lower surface of the door in FIG. 67.

Referring to FIGS. 67 and 68, a pair of first gaskets 370 and a second gasket 380 may be disposed on the rear surface of the door 300, i.e., the rear surface of the door front surface part 350. That is, three gaskets may be disposed on the rear surface of the door 300.

In the embodiment, the second gasket 380 may be disposed between the pair of first gaskets 370 that are spaced from each other in the lateral direction. For example, the pair of first gaskets 370 and the second gasket 380 may be arranged in a way that the pair of first gaskets 370 and the second gasket 380 connect in an approximate "M" form. In this case, the first gasket 370 and the second gasket 380 may connect to each other, or the first gasket 370 and the second gasket 380 may separate from each other and be spaced by a predetermined distance.

In the state in which the cooking space is closed by the door 300, each of the first gaskets 370 may include a straight line shape that extends in the up-down direction, and the second gasket 380 may include a straight line shape that extends in the left-right direction. That is, each of the first gaskets 370 may be provided in the form of a vertically straight line, and the second gasket 380 may be provided in the form of a horizontally straight line that is orthogonal to the first gasket 370.

Additionally, a pair of third gaskets 390 may be disposed on the lower surface of the door 300, i.e., the bottom surface of the door upper surface part 310. That is, two gaskets 390 may be disposed on the bottom surface of the door upper surface part 310.

In the embodiment, the pair of third gaskets 390 may be spaced in the lateral direction with the see-through window W therebetween. In the state in which the cooking space is closed by the door 300, each of the third gaskets 390 may include a straight line shape that extends in the front-rear direction. That is, the third gasket 390 may be provided in the form of a straight line such that the third gasket 390 is orthogonal to the first gasket 370 and the second gasket 380.

Figure 70:
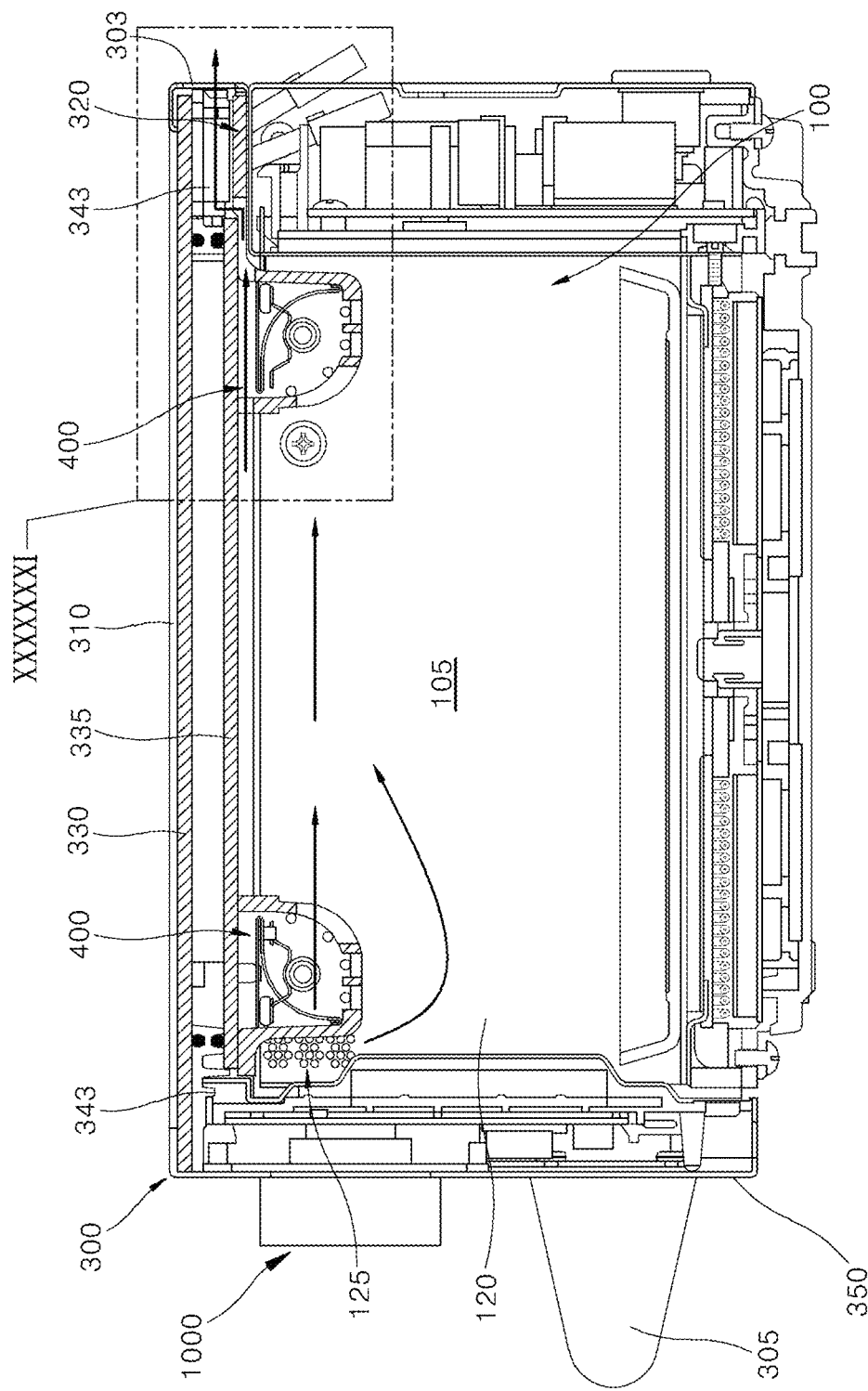
FIG. 70 is a lateral cross-sectional view showing a flow of air inside a cooking appliance.

The first gasket 370, the second gasket 380 and the third gasket 390, which are provided as described above, may be disposed at the point where the door 300 and the housing 100 contact each other when the door 300 closes the cooking space 105 (see FIG. 70).

The gaskets 370, 380, 390, which are disposed as described above, may seal the gap between the door 300 and the housing 100 at the front of or in the upper portion of the cooking space 105. For example, the first gasket 370 and the second gasket 380 may seal the gap between the door 300 and the housing 100 at the front of the cooking space 105, specifically, between the lateral surface 120, 130 and the bottom surface 110 of the housing 100 and the door front surface part 350. Additionally, the third gasket 390 may seal the gap between the door 300 and the housing 100 in the upper portion of the cooking space 105, specifically, between the lateral surface 120, 130 of the housing 100 and the door upper surface part 310.

Since the gaskets 370, 380, 390 seal the gap between the door 300 and the housing 100 at the front of or in the upper portion of the cooking space 105, heat and steam in the cooking space 105 may be prevented from leaking through the gap between the door 300 and the housing 100.

Further, the gaskets 370, 380, 390 may prevent a scratch on the door 300 or the housing 100, caused by contact between the door 300 and the housing 100 that is made while the door 300 opens and closes the cooking space 105.

The gaskets 370, 380, 390, which are provided as described above, may absorb an impact that is applied to the door 300 when the door 300 contacts the housing 100, closing the cooking space. The gaskets 370, 380, 390 may efficiently help to prevent damage to the door 300 itself or the components being installed in the door 300, which is caused by an impact being applied to the door 300 while the door 300 opens and closes the cooking space 105.

[Steam Rearward-Discharge Inducing Structure]

Figure 69:
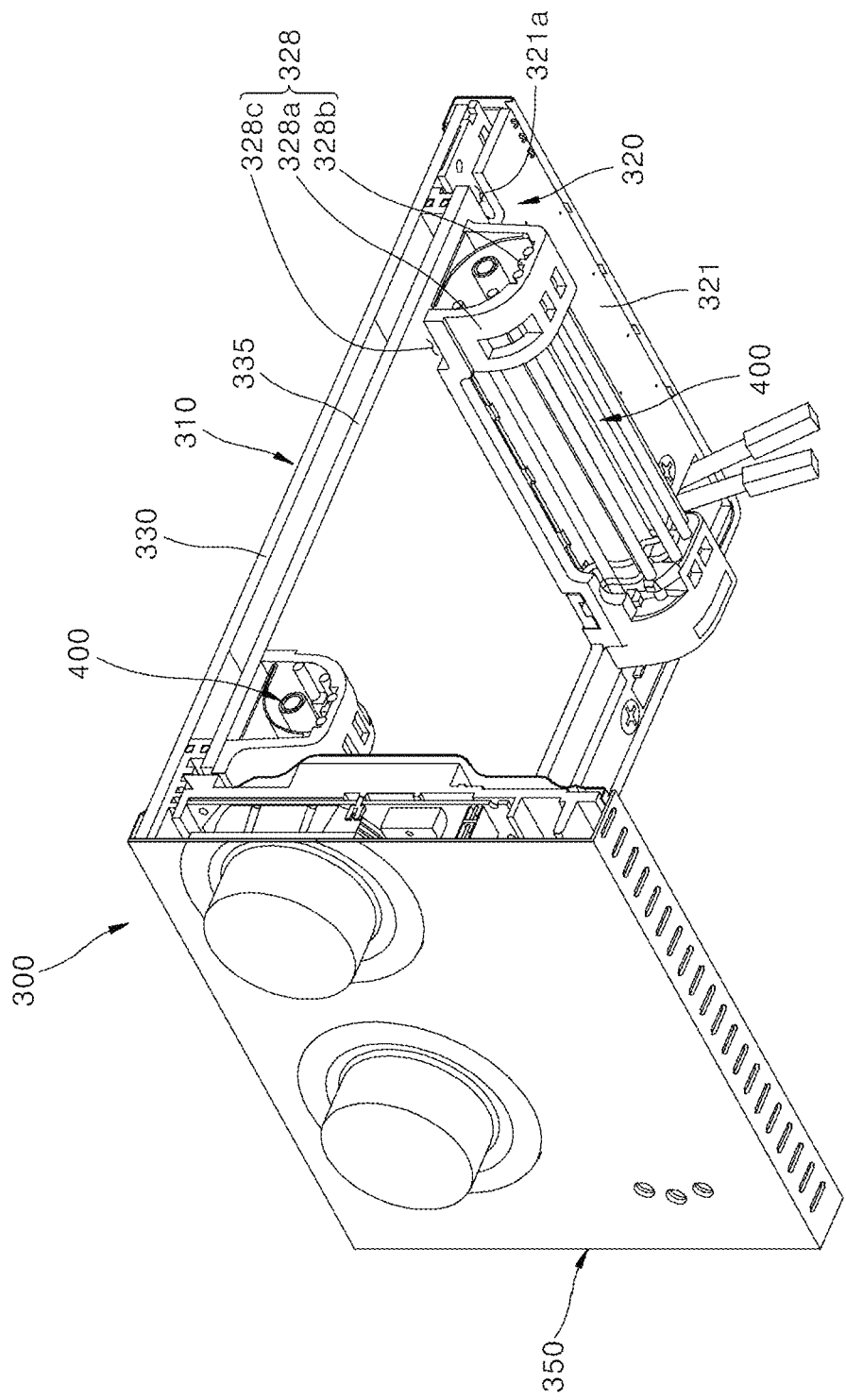
FIG. 69 is a cross-sectional perspective view showing an inner structure of a door.
Figure 71:
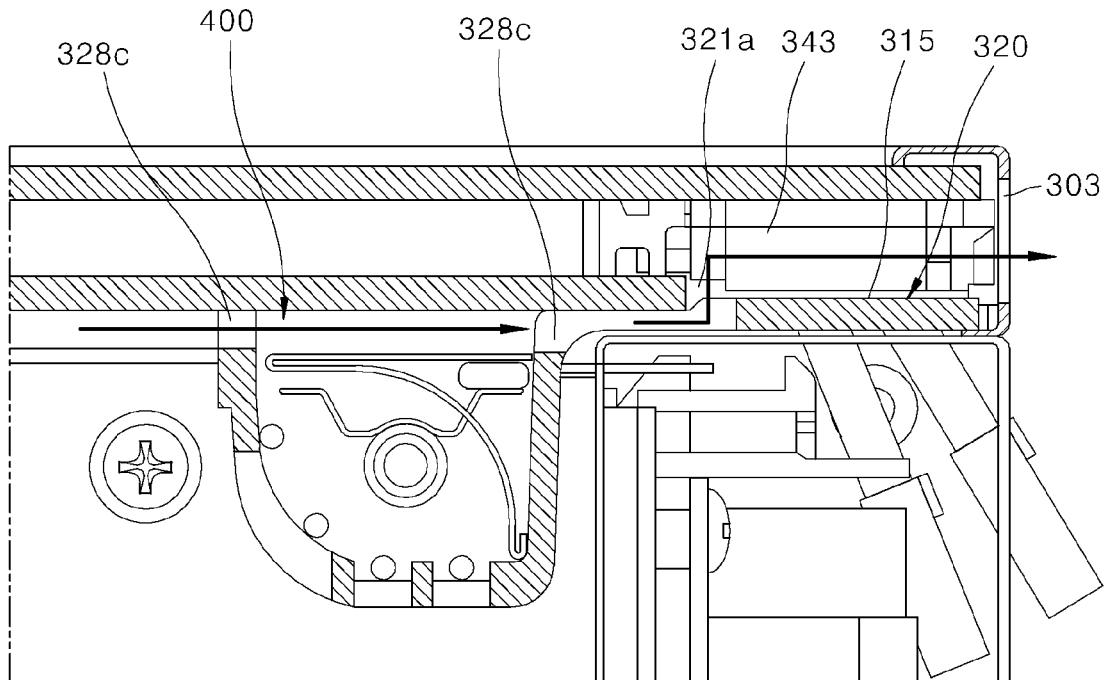
FIG. 71 is an enlarged view showing portion "XXXXXXXI" in FIG. 70.

FIG. 69 is a cross-sectional perspective view showing an inner structure of a door, FIG. 70 is a lateral cross-sectional view showing a flow of air inside a cooking appliance, and FIG. 71 is an enlarged view showing portion "XXXXXXXI" in FIG. 70.

Referring to FIGS. 6, 62 and 64, an air exhaust opening 303 may be disposed at the rear side of the door 300. Specifically, a space part 315 may be formed in the door upper surface part 310, and the air exhaust opening 303 may be disposed at the rear end of the door upper surface part 310.

Preferably, the space part 315 may be disposed between the see-through window W and the air exhaust opening 303. In an example, the space part 315 may be a spaced that is formed between the sealing member S (see FIG. 9) and the air exhaust opening 303, in the door upper surface part 310.

The air exhaust opening 303 may be formed in a way that penetrates in the front-rear direction at the rear end of the door upper surface part 310. The air exhaust opening 303 may form a passage that opens the space part 315 in the door upper surface part 310 from the rear end of the door upper surface part 310 to the outside.

Heat or steam, being generated in the door upper surface part 310 that is heated during cooking or flowing into the space part 315 from the cooking space 105, may be discharged out of the cooking appliance through the air exhaust opening 303.

A connection hole 321a may be formed in the door frame 320, specifically, the coupling part 321. The connection hole 321a may be formed in a way that penetrates in the up-down direction in the coupling part 321. The connection hole 321a may form a passage that connects between the space part 315 in the door upper surface part 310 and the cooking space 105.

Referring to FIGS. 64 to 66, heat, generated in the door upper surface part 310 that is heated during cooking, may fill the space part 315, and the heat in the space part 315 may be discharged out of the cooking appliance through the air exhaust opening 303.

Additionally, heat and steam generated in the cooking space 105 during cooking may flow into the space part 315 through the connection hole 321a. The heat and steam having flown into the space part 315 may be discharged out of the cooking appliance through the air exhaust opening 303.

Further, the heater mounting part 325 that is a structure protruding downward on the door frame 320 may be provided with a passage hole 328c.

In the embodiment, the air exhaust opening 303 is disposed at the center of the door upper surface part 310 in the lateral direction thereof while being disposed at the rear end of the door upper surface part 310, for example. Additionally, in the embodiment, the connection hole 321a and the air exhaust opening 303 are disposed in an overlapping position approximately in the front-rear direction, for example.

In an example, the connection hole 321a may be disposed at the center of the coupling part 321 in the lateral direction thereof, i.e., in a position closer to the grill supporting part 328 than the first connection end fixing part 326 and the second connection end fixing part 327. The passage hole 328c may be provided on the grill supporting part 328 such that the passage hole 328c is disposed to overlap the connection hole 321a approximately in the front-rear direction. For example, the passage hole 328c may be disposed in a position where at least a portion of the connection hole 321a overlaps at least a portion of the passage hole 328c in the front-rear direction.

The passage hole 328c may be formed in a way that penetrates in the front-rear direction at the cover 328a of the grill supporting part 328. In the embodiment, the passage hole 328c is respectively formed on both sides of the cover 328a in the lateral direction thereof, for example.

Heat or steam generated in the cooking space 105, or air discharged into the cooking space 105 through the cool air discharge part 125 at the front side of the cooking space 105 may pass through a structure such as a grill supporting part 328 protruding toward the inside of the cooking space 105 through the passage hole 328c, and flow to the connection hole 321a.

That is, the passage hole 328c may form a passage that allows air at the front side of the cooking space 105 to pass through the structure protruding toward the inside of the cooking space 105 and to move to the rear side of the cooking space 105 effectively. The passage hole 328c may form a passage that passes in the front-rear direction through the grill supporting part 328 that blocks the connection hole 321a in front of the connection hole 321a.

[Steam Forward-Discharge Prevention Structure]

Hereafter, a steam forward-discharge prevention structure of the cooking appliance in the embodiment is described with reference to FIGS. 56 to 66.

Referring to FIGS. 58 to 65, a first gasket 370 and a second gasket 380 and a third gasket 390 may be disposed between the housing 100 and the door 300.

The first gasket 370 may seal between both the lateral surfaces 120, 130 of the housing 100 and the door front surface part 350 at both the sides of the cooking space 105 in the left-right direction thereof. The second gasket 380 may seal between the bottom surface 110 of the housing 100 and the door front surface part 350, in the lower portion of the cooking space 105. In this case, the first gasket 370 and the second gasket 380 may seal between the housing 100 and the door 300, at the front of the cooking space 105.

Additionally, the third gasket 390 may seal between both the lateral surfaces 120, 130 of the housing 100 and the door upper surface part 310 respectively, at both the sides of the cooking space 105 in the left-right direction thereof. In this case, the third gasket 390 may seal between the housing 100 and the door 300, in the upper portion of the cooking space 105.

In summary, the gap between the open front surface of the housing 100 and the door 300 may be sealed by the first gasket 370 and the second gasket 380, and the gap between the open upper surface of the housing 100 and the door 300 may be sealed by the third gasket 390.

Since the gap between the door 300 and the housing 100 is sealed by the first gasket 370, the second gasket 380 and the third gasket 390 as described above, heat or steam, generated in the cooking space 105 during cooking, may hardly leak out of the cooking appliance through the gap between the door 300 and the housing 100.

That is, the gaskets 370, 380, 390 which are disposed between the door 300 and the housing 100 as described above may help to effectively prevent heat or steam generated in the cooking space 105 during cooking from leaking out of the cooking appliance through the gap between the door 300 and the housing 100.

Referring to FIGS. 56 and 57, a portion of the air having flown into the cooling channel 850 by the third cooling fan 860 may be discharged into the cooking space 105 through the channel outlet 833 and the cool air discharge part 125.

The air discharged into the cooking space 105 through the cool air discharge part 125 may create the flow of air in which air flows to the center of the cooking space 105 in the lateral direction thereof from the lateral surface 120, 130 of the housing 100.

Additionally, the air discharged into the cooking space 105 through the cool air discharge part 125 may create an air flow in which air flows to the rear side of the cooking space 105 from the front side thereof.

The flow of heat and steam, formed in the cooking space 105, may be induced in a direction away from the lateral surface 120, 130 of the housing 100 and in a direction toward the rear side of the cooking space 105, by the air flow formed by the air discharged into the cooking space 105.

That is, the flow of heat and steam formed in the cooking space 105 may be induced in a direction away from the gap between the housing 100 and the door 300 and in a direction toward the rear side of the cooking space 105 adjacent to the air exhaust opening 303, by the air discharged into the cooking space 105 through the cool air discharge part 125.

Further, the flow of the air discharged into the cooking space 105 through the cool air discharge part 125 may serve as an air curtain that blocks the gap between the door 300 and the housing 100.

In summary, the flow of air discharged into the cooking space 105 through the cool air discharge part 125 may induce the flow of heat and steam formed in the cooking space 105 in a direction away from the gap between the housing 100 and the door 300 and in a direction toward the rear side of the cooking space 105 adjacent to the air exhaust opening 303, while serving as an air curtain that blocks the gap between the door 300 and the housing 100.

Referring to FIGS. 64 to 66, the air exhaust opening 303 may be provided at the door 300, specifically, at the rear end of the door upper surface part 310, and the connection hole 321a may be formed at the door frame 320. The connection hole 321a may form a passage that connects between the space part 315 in the door upper surface part 310 and the cooking space 105, and the air exhaust opening 303 may form a passage that opens the space part 315 to the outside of the door 300.

Heat and steam that are generated in the cooking space 105 during cooking may flow into the space part 315 through the connection hole 321a. The heat and steam having flown into the space part 315 may be discharged out of the cooking appliance through the air exhaust opening 303.

In particular, the heat and steam generated in the cooking space 105 may flow to the rear side of the cooking space 105 by the air flow induced by the air discharged through the cool air discharge part 125, and then flow into the space part 315 through the connection hole 321a.

That is, the connection hole 321a may form a passage that allows the heat and steam, having flown to the rear side of the cooking space by the air discharged through the cool air discharge part 125, to flow to the air exhaust opening 303.

Additionally, the passage hole 328c may be formed at a structure protruding from the door frame 320 being disposed in the lower portion of the door upper surface part 310 toward the cooking space 105, e.g., the grill supporting part 328, and form a passage that allows heat and steam to passes through a structure protruding downward from the door frame 320 toward the cooking space 105 and to move to the air exhaust opening 303.

In summary, the forward discharge of heat and steam generated in the cooking space 105 may be prevented based on complex operations of the following structure.

First, the gap between the open front surface and open upper surface of the housing 100 and the door 300 may be sealed by the first gasket 370 and the second gasket 380 that are disposed between the housing 100 and the door front surface part 350 and by the third gasket 390 that is disposed between the housing 100 and the door upper surface part.

Second, the flow of the air discharged into the cooking space 105 through the cool air discharge part 125 may induce the flow of the heat and steam formed in the cooking space 105 in a direction away from the gap between the housing 100 and the door 300, while serving as an air curtain that blocks the gap between the door 300 and the housing 100.

Third, the flow of the air discharged into the cooking space 105 through the cool air discharge part 125 may induce the heat and steam generated in the cooking space 105 toward the rear side of the cooking space 105 adjacent to the air exhaust opening 303.

Fourth, the heat and steam generated in the cooking space 105 may flow to the rear side of the cooking space 105 by the flow of the air discharged through the cool air discharge part 125, flow into the door 300 through the connection hole 321a and then be discharged out of the cooking appliance through the air exhaust opening 303.

That is, the cooking appliance in the embodiment may block the gap between the door 300 and the housing 100, using the operations of the gaskets 370, 380, 390 and the operation of the air current discharged through the cool air discharge part 125, and induce the flow of the heat and steam in the cooking space 105 to the rear side of the cooking space such that the heat and steam, which can hardly be discharged through the gap between the door 300 and the hosing 100 in the cooking space 105, is discharged through the air exhaust opening 303.

Thus, the cooking appliance in the embodiment may effectively prevent the heat and steam generated in the cooking space 105 from leaking out of the cooking appliance from the front side of the cooking appliance.

The cooking appliance having the above-described configuration is provided as an example, and various other replacements thereof may be made.

Figure 72:
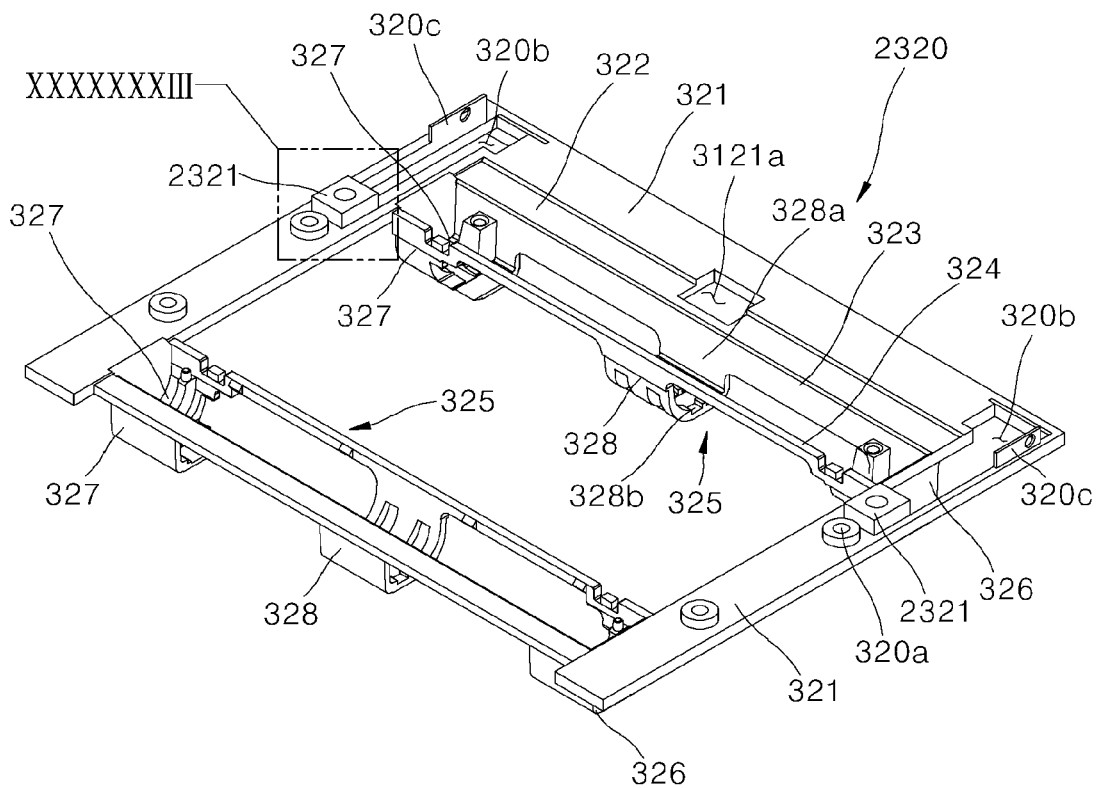
FIG. 72 is a perspective view showing a door frame in another embodiment.
Figure 73:
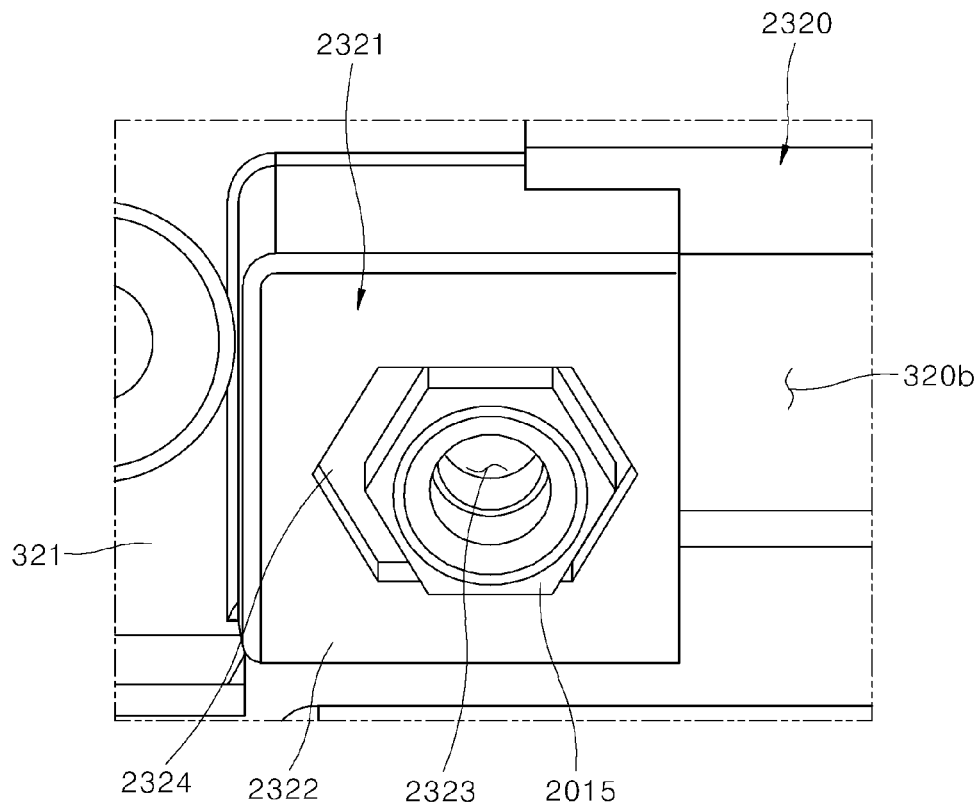
FIG. 73 is an enlarged view showing portion "XXXXXXXIII" in FIG. 72.
Figure 74:
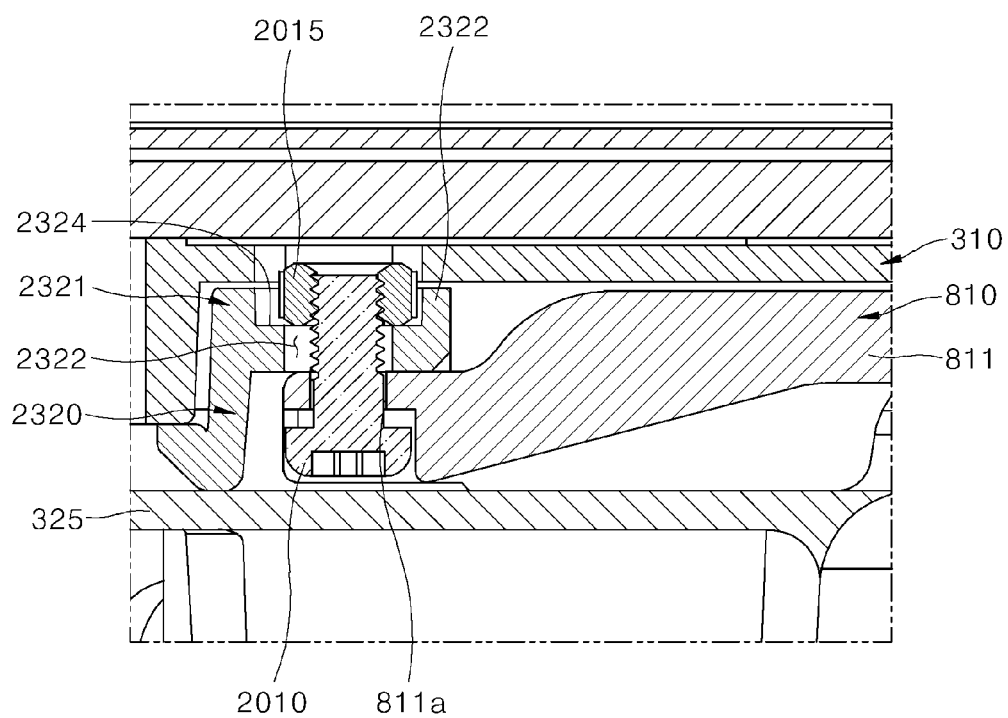
FIG. 74 is a cross-sectional view showing a coupling structure between the door frame in FIG. 72 and a hinge part.
Figure 75:
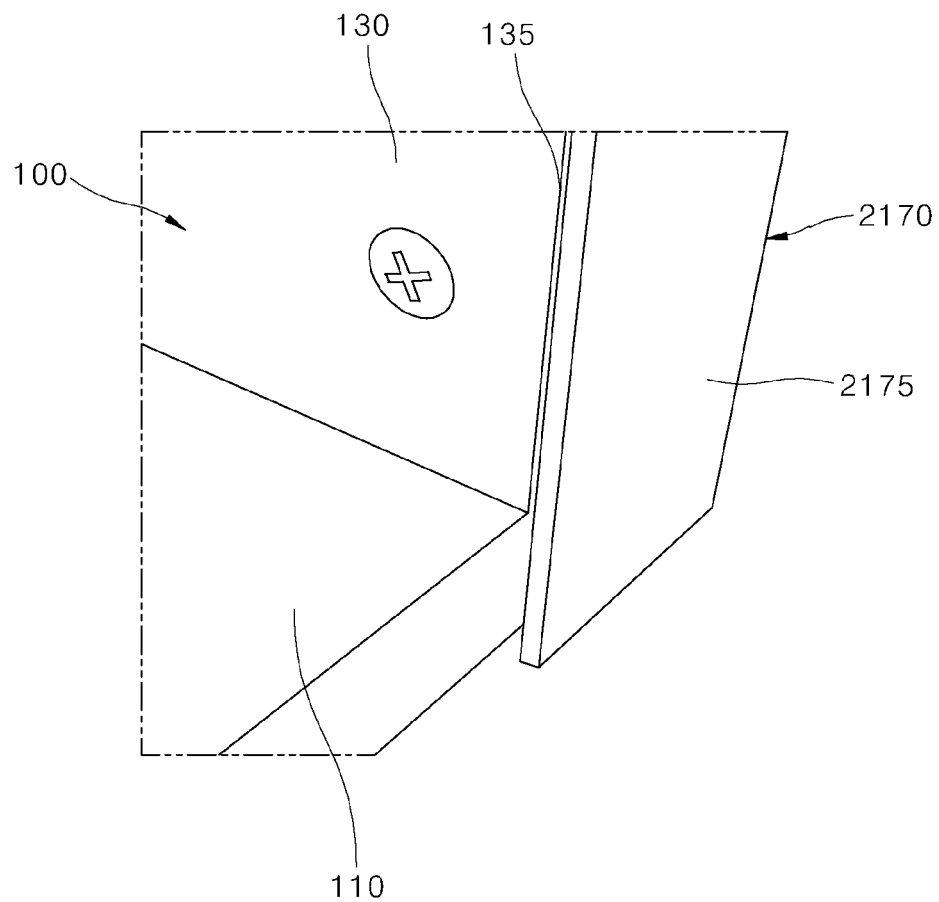
FIG. 75 is an enlarged view showing portion "XXXXXXXV" in FIG. 4.
Figure 76:
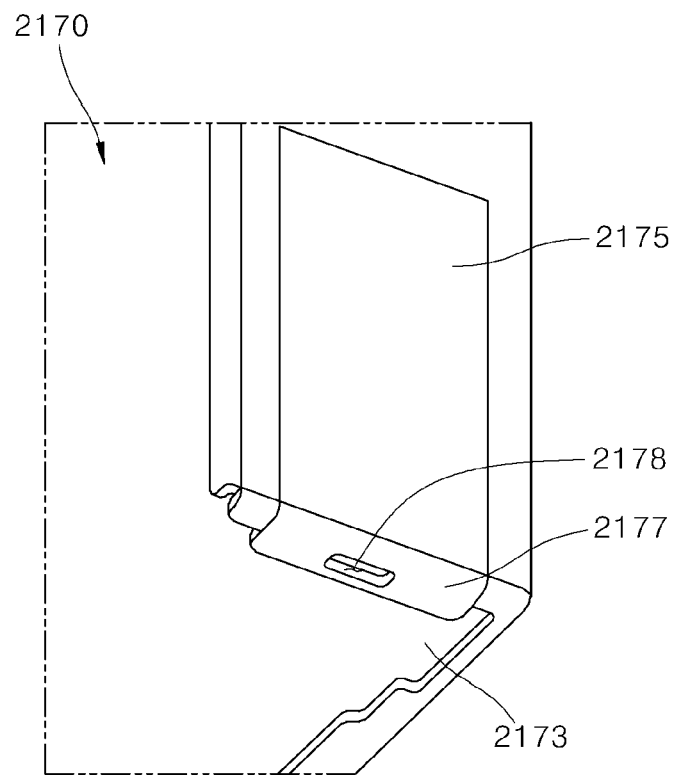
FIG. 76 is a cross-sectional perspective view separately showing a cabinet and a housing in another embodiment.
Figure 77:
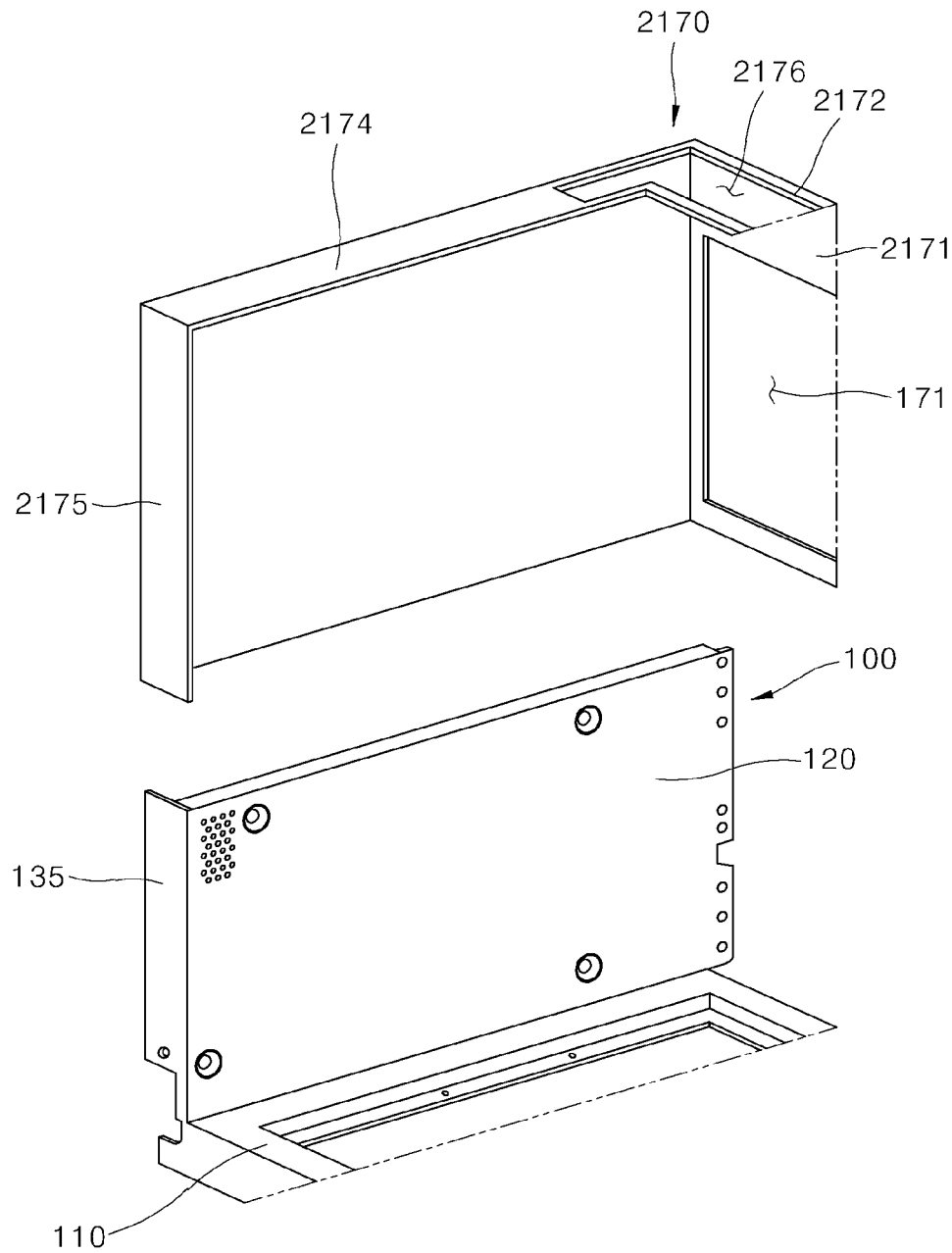
FIG. 77 is an enlarged perspective view showing a portion of the cabinet in FIG. 75.
Figure 78:
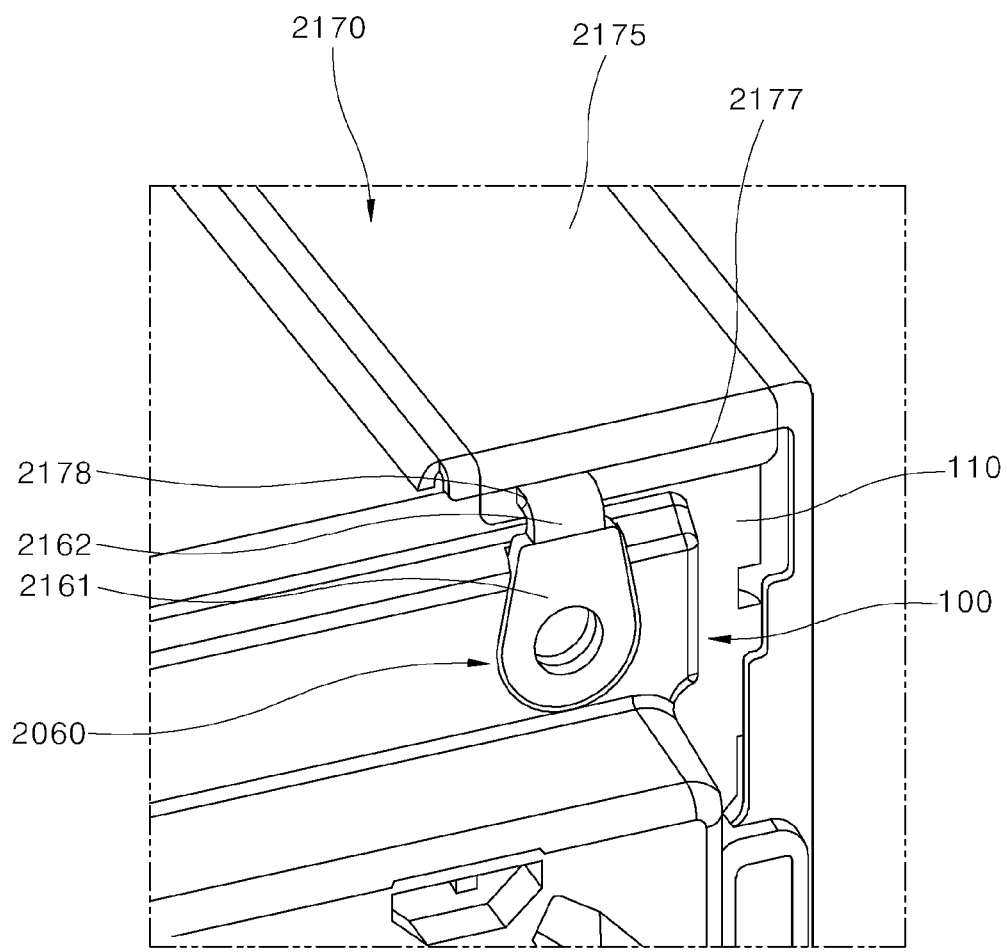
FIG. 78 is a bottom perspective view showing a lower surface side of the cooking appliance in FIG. 75.
Figure 79:
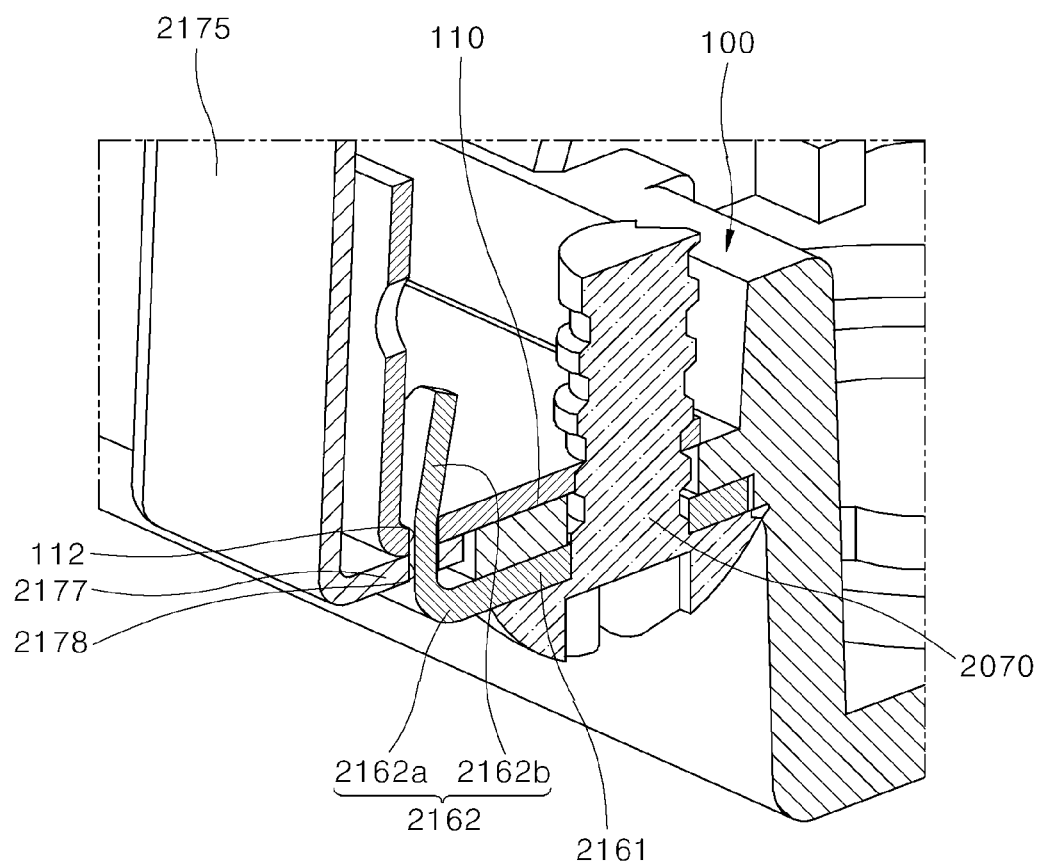
FIG. 79 is a cross-sectional view along line "XXXXXXXIX-XXXXXXXIX" in FIG. 78.

FIG. 72 is a perspective view showing a door frame in another embodiment, FIG. 73 is an enlarged view showing portion "XXXXXXXIII" in FIG. 72, and FIG. 74 is a cross-sectional view showing a coupling structure between the door frame in FIG. 72 and a hinge part. FIG. 75 is an enlarged view showing portion "XXXXXXXV" in FIG. 4, and FIG. 76 is a cross-sectional perspective view separately showing a cabinet and a housing in another embodiment. FIG. 77 is an enlarged perspective view showing a portion of the cabinet in FIG. 75, FIG. 78 is a bottom perspective view showing the lower surface side of the cooking appliance in FIG. 75, and FIG. 79 is a cross-sectional view along line "XXXXXXXIX-XXXXXXXIX" in FIG. 78.

Hereafter, another embodiment according to the present disclosure is described with reference to FIGS. 72 to 79.

The reference numerals in the previous drawings are given to the same components providing the same function in the following drawings, and description in relation to them is omitted.

[Door-Gap Adjustment Structure]

Hereafter, a door-gap adjustment structure of a cooking appliance in another embodiment is described with reference to FIGS. 72 to 74.

Referring to FIGS. 72 to 74, the cooking appliance in another embodiment may include a hinge coupling part 2321 and a fastening part 10, 15. The hinge coupling part 2321 may be fixed to a door 300, specifically, a door upper surface part 310, and coupled to a hinge part 810. The fastening part 10, 15 may couple the hinge part 810 to the hinge coupling part 2321.

The hinge coupling part 2321 may be disposed at a door frame 2320. Specifically, the hinge coupling part 2321 may be disposed on a coupling part 321. The hinge coupling part 2321 may be provided as a structure for a coupling between the hinge part 810 and the door frame 2320.

In the embodiment, the hinge coupling part 2321 and the hinge part 810 are coupled in the up-down direction, for example. In this case, the hinge coupling part 2320 may be disposed in front of a first hinge passage hole 320b. The hinge coupling part 2320 may include a coupling surface 2322 that forms a surface facing the hinge part 810 in the up-down direction on the first hinge passage hole 320b.

In an example, the coupling surface 2322 may be formed into a surface being disposed on the first hinge passage hole 320b in a way that the coupling surface 2322 is spaced a predetermined distance apart from the first hinge passage hole 320b. The coupling surface 2322 may be provided in a way that the coupling surface 2322 is supported by lateral walls protruding from the door frame 2320.

A first fastening hole 2323 may be formed on the coupling surface 2322. The first fastening hole 2323 may be formed in a way that penetrates in the up-down direction on the coupling surface 2322.

The hinge coupling part 2321 may be provided with a position adjustment guide part. The position adjustment guide part may guide a coupling position in the front-rear direction between the fastening part and the hinge coupling part 2321. Additionally, the fastening part may be coupled to the position adjustment guide part in way that the fastening part can move in the front-rear direction, and coupled to the hinge coupling part 2321.

In the embodiment, the fastening part includes a bolt member 2010 and a nut member 2015, for example. In this case, the bolt member 2010 may be coupled to the hinge part 810 and the coupling surface 2322, passing through the hinge part 810 and the coupling surface 2322 in the up-down direction. The nut member 2015 may be coupled to the bolt member 2010 and fix the bolt member 2010 to the coupling surface 2322.

The bolt member 2010 and the nut member 2015 may be screw-coupled, and at least any one of the bolt member 2010 and the nut member 2015 may be coupled to the position adjustment guide part. In the embodiment, while the nut member 2015 is coupled to the position adjustment guide part, the bolt member 2010 and the nut member 2015 is coupled, for example.

The bolt member 2010 may pass through the coupling surface 2322 in the up-down direction through the first fastening hole 2323 that is formed in the way that penetrates in the up-down direction on the coupling surface 2322. In this case, the bolt member 2010 may be coupled to the hinge coupling part 2321, passing through the coupling surface 2322 in the state in which the head of the bolt member 2010 is disposed under the coupling surface 2322.

The nut member 2015 may be coupled to the bolt member 2010, on coupling surface 2322. That is, the nut member 2015 may be coupled to a portion of the bolt member 2010, which protrudes upward from the coupling surface 2322, and based on the coupling between the bolt member 2010 and the nut member 2015, the hinge part 810 may be coupled to the door frame 2320.

In the embodiment, the position adjustment guide part may include the first fastening hole 2323. The first fastening hole 2323 included in the position adjustment guide part may be formed in a way that extends in the front-rear direction. That is, the position adjustment guide part may include a first fastening hole 2323 that has a front-to-rear length greater than the diameter of the bolt member 2010.

Since the first fastening hole 2323 is elongated in the front-rear direction further than the bolt member 2010, as described above, the fastening part may be coupled to the hinge coupling part 2321 in a way the front-to-rear position of the fastening part can be adjusted.

Accordingly, the bolt member 2010 and the hinge coupling part 2321 may be coupled not only in a way that the front-to-rear position of the bolt member 2010 is fixed to any one position relative to the hinge coupling part 2321 but in a way that the position of the bolt member 2010 can be adjusted in the front-rear direction relative to the hinge coupling part 2321.

That is, the position in which the bolt member 2010 and the hinge coupling part 2321 are coupled can be adjusted along the front-rear direction by the first fastening hole 2323 that is elongated in the front-rear direction while allowing the bolt member 2010 to be inserted into the first fastening hole 2323.

The hinge part 810 being coupled to the fastening part by the bolt member 2010 may be coupled to the door frame 2320 in the way that the front-to rear position of the hinge part 810 can be adjusted while being coupled to the door frame 2320 by the fastening part.

That is, the coupling position between the hinge part 810 and the door frame 2320 can be adjusted in the front-rear direction, depending on the position in which the bolt member 2010, fitted into the hinge coupling part 2321 through the first fastening hole 2323 that is elongated in the front-rear direction, is coupled to the hinge coupling part 2321 in the front-rear direction.

Further, the position adjustment guide part may further include a fastening and guiding groove 2324. The fastening and guiding groove 2324 may be concave in the upward direction or the downward direction from the coupling surface 2322. In the embodiment, the fastening and guiding groove 2324 is concave in the downward direction from the upper surface of the coupling surface 2322, for example.

At least a portion of the nut member 2015 may be inserted into the fastening and guiding groove 2324. In this case, the screw-coupling between the bolt member 2010 and the nut member 2015 may be performed in the fastening and guiding groove 2324.

In the embodiment, the front-to-rear length of the fastening and guiding groove 2324 may be greater than the longest diameter of the nut member 2015. That is, like the first fastening hole 2323 being elongated further than the bolt member 2010 in the front-rear direction, the fastening and guiding groove 2324 may be elongated further than nut member 2015 in the front-rear direction.

Accordingly, while the nut member 2015 is fitted and coupled to the fastening and guiding groove 2324, the nut member 2015 may be fitted and coupled to the fastening and guiding groove 2324 in a way that the nut member 2015 can move in the front-rear direction. That is, while the nut member 2015 is fitted to the fastening and guiding groove 2324 through the open upper portion of the fastening and guiding groove 2324, the position of the nut member 2015 relative to the hinge coupling part 2321 may be adjusted along a front-to-rear passage, being formed in the fastening and guiding groove 2324, in the front-rear direction.

The nut member 2015 may be formed into a polygonal pillar. Additionally, the fastening and guiding groove 2324 may be formed in a way that the fastening and guiding groove 2324 interferes with the nut member 2015 to limit the rotation of the nut member 2015.

For example, the nut member 2015 may be formed into a hexagonal pillar. Additionally, the fastening and guiding groove 2324 may be formed in a way that a shape of a hexagonal pillar corresponding to the shape of the nut member 2015 is elongated in the front-rear direction and engraved on the coupling surface 2322.

Thus, while the nut member 2015 may move in the front-rear direction in the state in which the nut member 2015 is fitted into the fastening and guiding groove 2324, the nut member 2015 may be fitted and coupled to the hinge coupling part 2321 in the state in which the nut member 2015 rotates around the bolt member 2010 limitedly.

The fastening and guiding groove 2324 and the nut member 2015 being fitted into the fastening and guiding groove 2324 may be disposed on the door frame 2320. That is, the fastening and guiding groove 2324 and the nut member 2015 may be disposed onto the upper surface of the door frame 2320, facing the door upper surface part 310.

Accordingly, the fastening and guiding groove 2324 and the nut member 2015 may be disposed in the space between the door upper surface part 310 and the door frame 2320. That is, the fastening and guiding groove 2324 and the nut member 2015 may be accommodated in the space surrounded by the door upper surface part 310 and the door frame 2320.

The door frame 2320 with the above-described position adjustment guide part, the hinge part 810 and the door upper surface part 310 may be coupled as follows.

That is, as the nut member 2015 is fitted into the fastening and guiding groove 2324, the bolt member 2010 may be coupled to the hinge part 810 and the hinge coupling part 2321 in the state in which the hinge coupling part 2321 and the hinge part 810 contact each other in the up-down direction.

In an example, the bolt member 2010 may be coupled to the hinge part 810 and the hinge coupling part 2321, passing through the hinge part 810 and the coupling surface 2322, in the state in which the head of the bolt member 2010 is disposed under the coupling surface 2322. In this case, in the state in which the hinge part 810 is disposed under the coupling surface 2322, the bolt member 2010 may pass through the hinge part 810 and the coupling surface 2322, and at least a portion of the bolt member 2010 may protrude upward from the coupling surface 2322 through the first fastening hole 2323. The portion of the bolt member 2010, protruding upward from the coupling surface 2322, may be coupled to the nut member 2015 in the fastening and guiding groove 2324.

In the embodiment, a first hinge link 811 of the hinge part 810 is directly coupled to the hinge coupling part 2321, for example. In an example, the first hinge link 811 may be provided with a second fastening hole 811a. The second fastening hole 811a may be formed in a way that penetrates in the up-down direction in the first hinge link 811. The second fastening hole 811a may have a diameter corresponding to the diameter of the bolt member 2010.

The bolt member 2010 may pass through the hinge part 810 through the second fastening hole 811a. The bolt member 2010 may penetrate the hinge part 810 and the hinge coupling part 2321 consecutively through the second fastening hole 811a and the first fastening hole 2323, and then be coupled to the nut member 2015 on the upper surface of the coupling surface 2322, specifically, in the fastening and guiding groove 2324.

In this case, since the rotation of the nut member 2015 is limited by the fastening and guiding groove 2324, the bolt member 2010 may be fastened to the nut member 2015 smoothly without additional labor or equipment for fixing the nut member 2015.

Additionally, the position in which the bolt member 2010 and the nut member 2015 are coupled may be adjusted in the front-rear direction, in the fastening and guiding groove 2324. Thus, the coupling position between the first hinge link 811 and the hinge coupling part 2321, i.e., the coupling position between the hinge part 810 and the door frame 2320, in the front-rear direction may be adjusted easily and effectively.

The door frame 2320 to which the hinge part 810 is coupled as described above may be coupled to the door upper surface part 310. Accordingly, the door 300 may be swivably coupled to the housing 100 through the hinge part 810. In this case, the door 300 may be coupled to the hinge part 810 in a way that the front-to-rear position of the door 300 can be adjusted relative to the hinge part 810.

In the embodiment, the coupling position between the hinge part 810 and the door frame 2320 in the front-rear direction may be adjusted, and depending on the adjusted coupling position between the hinge part 810 and the door frame 2320, the front-to-rear position of the door 300 may be adjusted relative to the housing 100.

Further, the door frame 2320 may be coupled to the door upper surface part 310, while covering the open lower portion of the door upper surface part 310. Accordingly, the fastening and guiding groove 2324 and the nut member 2015 may be disposed in the space between the door upper surface part 310 and the door frame 2320. Additionally, the bolt member 2010 may be coupled to the nut member 2015 in the space between the door upper surface part 310 and the door frame 2320.

Thus, the fastening portion between the bolt member 2010 and the nut member 2015 may be disposed in the space between the door upper surface part 310 and the door frame 2320 and not be exposed to the outside of the door 300. That is, the hinge part 810 and the door 300 may be fastened to each other easily and efficiently, and the door 300 being exposed to the outside have a neat exterior.

In the embodiment, a plurality of gaskets 370, 380, 390 such as a first gasket 370 see FIG. 59), a second gasket 380 (see FIG. 61) and a third gasket 390 (see FIG. 63) may be installed in the door 300.

The gaskets 370, 380, 390, as described above, may suppress the leakage of heat and steam through the gap between the door 300 and the housing 100, prevent a scratch on the door 300 or the housing 100, and absorb an impact that is applied to the door 300 when the cooking space 105 is opened and closed.

Due to the gaskets 370, 380, 390, it may be difficult to manage tolerance in relation to the gap between the door 300 and the housing 100. That is, additional gaskets 370, 380, 390 between the door 300 and the housing 100 may cause a change in the gap between the door 300 and the housing 100. Accordingly, it may be more difficult to manage tolerance in relation to the gap between the door 300 and the housing 100.

The gap (hereafter, a "Z-axis gap") between the upper end of the lateral surface 120, 130 of the housing 100 and the door upper surface part 310 the gap between the door 300 and the housing 100, and the gap (hereafter, a "Y-axis gap") between the end portion of the front of the lateral surface 120, 130 and bottom surface 110 of the housing 100 and the door front surface part 350 may be mainly taken into account as the gap between the door 300 and the housing 100. Depending on how tolerance in relation to the gaps is managed, it may be determined whether the door 300 is opened and closed smoothly and whether heat and steam generated in the cooking space 105 is effectively blocked from leaking.

The Z-axis gap-related tolerance may be managed more easily than the Y-axis gap-related tolerance. The number of Z-axis gap-related gaskets may be less than the number of Y-axis gap-related gaskets, and the Z-axis gap-related tolerance is highly likely to be compensated by the load of the door 300 itself to some degree.

Additionally, considering that the number of Y-axis gap-related gaskets is greater than the number of Z-axis gap-related gaskets and that the direction in which the load of the door 300 itself is applied differs from the direction in which the Y-axis gap increases or decreases, the management of the Y-axis gap-related tolerance may be more difficult than the management of the Z-axis gap-related tolerance.

In the embodiment, considering the fact, a structure for the management of the Y-axis gap-related tolerance is disclosed. That is, in the embodiment, the fastening part is coupled to the hinge coupling part 2321 in a way that the fastening part can move in the front-rear direction in the position adjustment guide part, and the hinge part 810 installed in the housing 100 and the door frame 2320 coupled to the door 300 are coupled by the fastening part.

In this case, the gap between the front surface of the housing 100 and the door front surface part 350, or the gap between the end portion of the front of the lateral surface 120, 130 of the housing 100 and the door front surface part 350 may be adjusted, depending on the front-to-rear position of the fastening part being coupled to the position adjustment guide part. Additionally, as the gap between the front surface of the housing 100 and the door front surface part 350 is adjusted, the Y-axis gap-related tolerance may be effectively managed.

[Cabinet Fixing Structure]

Hereafter, a cabinet fixing structure of the cooking appliance in another embodiment is described with reference to FIGS. 75 to 79.

Referring to FIGS. 3 and 75 to 77, the exterior of the cooking appliance in another embodiment may be formed by a door, a housing 100 and a cabinet 2170.

The cabinet 2170 may be provided to cover both the lateral surfaces 120, 130 and the rear surface 140 of the housing 100. Additionally, the cabinet 2170 may be provided to cover the end portion of the front and the end portion of the upper portion of both the lateral surfaces 120, 130 of the cabinet 270, and the upper portion of a second control board 700 being disposed behind the rear surface 140.

The cabinet 2170 may surround and protect a hinge case 830 disposed on both the lateral surfaces 120, 130 of the housing 100, and the second control board 700 disposed on the rear surface 140 of the housing 100 from the outside, and form the lateral and rear exteriors of the cooking appliance while forming a portion of the front of the cooking appliance together.

The cabinet 2170 may include a rear surface covering part 2171, a pair of lateral surface covering parts 2173 and a front surface covering part 2175.

The rear surface covering part 2171 may form the rear surface of the cabinet 270, and disposed behind the rear surface 140 of the housing 100. The rear surface covering part 2171 may surround and protect the second control board 700 being disposed on the rear surface 140 of the housing 100 from the outside.

A through hole 171 may be formed in a way that penetrates in the front-rear direction in the rear surface covering part 2171. Additionally, a suction exhaust grill 175 may be installed in the through hole 171. The configurations and operations of the through hole 171 and the suction exhaust grill 175 are the same as or similar to those described with reference to the previous embodiments, and detailed description in relation to them is omitted.

The lateral surface covering part 2173 may form the lateral surface of the cabinet 2170, and be disposed outside the lateral surface 120, 130 of the housing 100 in the lateral direction thereof. In the embodiment, a pair of lateral surface covering parts 2173 is disposed on both sides of the rear surface covering part 2171 with the rear surface covering part 2171 therebetween, for example. The pair of lateral surface covering parts 2173 may surround and protect both the lateral surfaces 120, 130 of the housing 100 and the hinge assembly 800 outside both the lateral surfaces 120, 130 of the housing 100 in the lateral direction thereof.

The front surface covering part 2175 may form the front surface of the cabinet 2170, and be disposed in front of both the lateral surfaces 120, 130 of the housing 100 and the hinge assembly 800. In the embodiment, the front surface covering part 2175 is formed in a way that extends inward from the end portion of the front of the lateral surface covering part 2173 in the lateral direction thereof, for example. That is, a pair of front surface covering parts 2175 may be provided on both sides of the front of the cabinet 2170.

Additionally, a front extension surface part 135 may be provided respectively in the end portion of a first lateral surface 120 and a second lateral surface 130 adjacent to the front surface of the housing 100, i.e., in the end portion of the front of the first lateral surface 120 and the second lateral surface 130. The front extension surface part 135 may protrude in the direction in which the first lateral surface 120 and the second lateral surface 130 are farther away from each other, i.e., in a direction toward the outside of the housing 100 in the lateral direction thereof.

The front extension surface part 135 may be formed in a way that the end portion of the front of the first lateral surface 120 and the end portion of the front of the second lateral surface 130 bend respectively in the lateral direction. The front extension surface part 135 may be formed into a flat surface parallel with the front surface and the rear surface 140 of the housing 100.

As the front extension surface part 135 is formed as described above, the first lateral surface 120 and the front extension surface part 135, and the second lateral surface 130 and the front extension surface part 135 as well as the bottom surface 110 and both the lateral surfaces 120, 130 of the housing 100 may integrally connect without a joint.

Further, the hinge assembly 800 being coupled to the first lateral surface 120 may be disposed in the space surrounded by the first lateral surface 120 and the front extension surface part 135. The hinge assembly 800 may be coupled to the first lateral surface 120 and the front extension surface part 135 while contacting the first lateral surface 120 and the front extension surface part 135.

The lateral surface of the hinge assembly 800, facing the first lateral surface 120, may be coupled to the first lateral surface 120 while surface-contacting the first lateral surface 120, and the front surface of the hinge assembly 800, facing the front extension surface part 135, may be coupled to the front extension surface part 135 while contacting the rear surface of the front extension surface part 135.

Further, the hinge assembly 800 being coupled to the second lateral surface 120 may be disposed in the space surrounded by the second lateral surface 130 and the front extension surface part 135. The hinge assembly 800 is coupled to the second lateral surface 130 and the front extension surface part 135 while contacting the second lateral surface 130 and the front extension surface part 135.

That is, the lateral surface of the hinge assembly 800, facing the second lateral surface 130, may be coupled to the second lateral surface 130 while surface-contacting the second lateral surface 130, and the front surface of the hinge assembly 800, facing the front extension surface part 135, may be coupled to the front extension surface part 135 while contacting the rear surface of the front extension surface part 135.

The front extension surface part 135 being coupled to the hinge assembly 800 may guide a coupling position of the hinge assembly 800 in the front-rear direction thereof. That is, the position in which the front surface of the hinge assembly 800, facing the front extension surface part 135, contacts the rear surface of the front extension surface part 135 may be the coupling position of the hinge assembly 800.

Additionally, the front extension surface part 135 may allow the housing 100 and the hinge assembly 800 to be coupled in at least two or more directions, thereby helping to improve the strength of the coupling between the housing 100 and the hinge assembly 800.

As like the front extension surface part 135, a coupling structure in which a structure protruding from the lateral surface 120, 130 of the housing 100 in the lateral direction is coupled to the hinge assembly 800 in the front-rear direction is formed, resistance against the deformation of both the lateral surfaces 120, 130 of the housing 100 in the lateral direction thereof may improve further.

The front surface covering part 2175 may cover the front extension surface part 135 from the front. The front surface covering part 2175 may form the exterior of a portion of the cooking appliance except for the door 300. The front surface covering part 2173 may cover a portion of the bottom surface 110 along with the lateral surface covering part 2173.

The front surface covering part 2175 may cover the front of the housing 100, and a gap may be formed among the front extension surface part 135 and the bottom surface 110 of the housing 100 and the front surface covering part 2175. The gap may be narrowed as much as the front extension surface part 135 and the bottom surface 110 of the housing 100 and the front surface covering part 2175 are closely coupled.

That is, unless the front extension surface part 135 and the bottom surface 110 of the housing 100 and the front surface covering part 2175 are coupled closely and properly, the gap between the front extension surface part 135 and the bottom surface 110 of the housing 100 and the front surface covering part 2175 may be widened further in the front-rear direction.

Additionally, the cabinet 2170 may further include a lower end extension part 2177. The lower end extension part 2177 may extend from the lower end of the front surface covering part 2175 in a parallel direction with the bottom surface 110 of the housing 100. For example, the lower end extension part 2177 may be formed to include a flat surface that extends rearward from the lower end of the front surface covering part 2175 while being approximately orthogonal to the front surface covering part 2175.

The lower end extension part 2177 formed as described above may not allow the sharp cross section of the cabinet 2170 to be exposed to the lower end of the cabinet 2170, thereby improving the esthetic qualities of the exterior of the cooking appliance. Additionally, the lower end extension part 2177 may prevent a user from being cut by the sharp cross section of the cabinet 2170.

The lower end extension part 2177 at the lower end of the cabinet 2170 may make it difficult to install the cabinet 2170 in the housing 100.

That is, since the lower end extension part 2177 being disposed at the front of the cabinet 2170 extends rearward, the cabinet 2170 and the housing 100 may interfere with each other when the cabinet 2170 is installed in the housing 100.

Ordinarily, the cabinet 2170 on housing 100 caps the housing 100 under the cabinet 2170 when the cabinet 2170 is installed in the housing 100. However, since the lower end extension part 2177 at the lower end of the cabinet 2170 protrudes toward the housing 100 to be disposed inside the cabinet 2170, the housing 100 and the lower end extension part 2177 are highly likely to interfere with each other when the cabinet 2170 is installed in the housing 100.

For example, while the cabinet 2170 caps the housing 100, the lateral surface 120, 130 of the housing 100 may be scratched by the lower end extension part 2177 or the bottom surface 110 of the housing 100 may be scratched by the lower end extension part 2177.

Further, when the cabinet 2170 caps the housing 100, the cabinet 2170 and the housing 100 may interfere with each other frequently because of the lower end extension part 2177 being formed to protrude toward the housing 100, making it difficult to cap the housing 100 with the cabinet 2170.

To avoid the interference between the cabinet 2170 and the housing 100, the lateral surface covering part 2173 or the front surface covering part 2175 of the cabinet 2170 may be open to the outside or the front side of the cabinet 2170 in the lateral direction thereof, to install the cabinet 2170 in the housing 100.

In this case, the gap between the housing 100 and the cabinet 2170 may increase, and it may be more difficult to manage tolerance in relation to the gap between the housing 100 and the cabinet 2170, as the coupling between the housing 100 and the cabinet 2170 is completed.

In this case, since the cabinet 2170 is open, the cabinet 2170 may be deformed permanently, thereby causing an increase in the defect of the quality, in particular, the aesthetic quality of the cooking appliance.

That is, since the lower end extension part 2177 is formed at the lower end of the cabinet 2170, a scratch on the housing 100, difficulty in installing the cabinet 2170, difficulty in managing tolerance in relation to the gap between the housing 100 and the cabinet 2170, or a defect in the aesthetic quality of the exterior of of the cooking appliance may occur.

To solve the problems, the cooking appliance in the embodiment may be further provided with a cabinet fixing part. The cabinet fixing part may couple the cabinet 2170 to the housing 100 while limiting the front-to-rear position of the front surface covering part 2175. The cabinet fixing part (as illustrated in FIGS. 76 to 79) may include a fastening bracket 2060 and a fastening member 2070.

The fastening bracket 2060 may be coupled to the cabinet 2170. At least a portion of the fastening bracket 2060 and the bottom surface of the housing 100 may contact each other.

The fastening bracket 2060 may be coupled to the lower end extension part 2177 while passing through the lower end extension part 2177 in the up-down direction. The fastening bracket 2060 may include a fastening surface part 2161 and a fitting part 2162.

The fastening surface part 2161 may from a flat surface that contacts the bottom surface 110 of the housing 100 in parallel. The fastening surface part 2161 may be coupled to the fastening member 2070 in the state in which the fastening surface part 2161 and the bottom surface 110 contact each other.

The fitting part 2162 may extend from the fastening surface part 2161. The fitting part 2162 may be fitted and coupled to the lower end extension part 2177 while passing through the lower end extension part 2177, to fix the fastening surface part 2161 to the cabinet 2170.

In the embodiment, a first bracket fitting hole 2178 may be formed in a way that penetrates in the up-down direction in the lower end extension part 2177. Additionally, the fitting part 2162 may extend toward the lower end extension part 2177 from the fastening surface part 2161. For example, the fitting part 2162 may be formed in a way that extends from the fastening surface part 2161 to form an approximate "L" shape along with the fastening surface part 2161. The fitting part 2161 may include a first fitting part 2162*a* and a second fitting part 2162*b*.

The first fitting part 2162*a* may extend from the fastening surface part 2161 in a parallel direction with the direction in which the first bracket fitting hole 2178 penetrates. For example, the first fitting part 2162*a* may connect to the fastening surface part 2161 in a way that the first fitting part 2162*a* is orthogonal to the fastening surface part 2161.

The second fitting part 2162*b* may extend in a way that tilts in the front-rear direction while extending upward from the first fitting part 2162*a*. For example, the second fitting part 2162*b* may extend obliquely in a direction between the upward direction and the rearward direction from the first fitting part 2162*a*.

The second fitting part 2162*b* may penetrate the lower end extension part 2177 through the first bracket fitting hole 2178 and protrude from the upper portion of the lower end extension part 2177. The front-to-rear length of an area of the upper portion of the lower end extension part 2177, being occupied by the second fitting part 2162*b* protruding from the upper portion of the lower end extension part 2177, may be greater than the front-to-rear length of the first bracket fitting hole 2178.

In other words, the front-to-rear position of the upper end of the second fitting part 2162*b* protruding from the upper portion of the lower end extension part 2177 may be further rearward than the first bracket fitting hole 2178 since the second fitting part 2162*b* extends obliquely in a direction between the upward direction and the rearward direction from the first fitting part 2162*a*.

That is, the second fitting part 2162*b* may extend obliquely in a direction between the upward direction and the rearward direction from the fitting part 2162*a*, and pass through the lower end extension part 2177 and protrude from the upper portion of the lower end extension part 2177 through the first bracket fitting hole 2178. Additionally, the upper end of the second fitting part 2162*b* protruding from the upper portion of the lower end extension part 2177 may be disposed further rearward than the first bracket fitting hole 2178.

In the embodiment, a maximum length of the first bracket fitting hole 2178 is less than a minimum length of the fastening surface part 2161 with respect to the lateral direction, and the length of the fitting part 2162 may be the length of the first bracket fitting hole 2178 or less. Additionally, the length of the fitting part 2162 may be the length of the first bracket fitting hole 2178 or less with respect to the front-rear direction.

Accordingly, the fitting part 2162 may be inserted into the first bracket fitting hole 2178, while the fastening surface part 2161 may remain outside the first bracket fitting hole 2178.

Further, while the fitting part 2162 is fitted into the lower end extension part 2177 through the first bracket fitting hole 2178, the front-to-rear position and the left-to-right position of the fastening bracket 2060 may be regulated. To this end, the fitting part 2162, specifically, the first fitting part 2162a, may be press-fitted to and engaged with the inner circumferential surface of the lower end extension part 2177 surrounding the first bracket fitting hole 2178.

For example, the front-to-rear length of the first fitting part 2162a may correspond to the front-to-rear length of the first bracket fitting hole 2178, and the left-to-right length of the first fitting part 2161a may correspond to the left-to-right length of the first bracket fitting hole 2178.

Further, the up-to-down position of the fastening bracket 2060 may be regulated in a way that the lower end extension part 2177 is fitted between the fastening surface part 2161 being disposed under the lower end extension part 2177 and the second fitting part 2162b protruding from the upper portion of the lower end extension part 2177 through the first bracket fitting hole 2178.

To this end, the up-to-down length of the first fitting part 2162a may correspond to a total of the up-to-down length of an area of the bottom surface 110, being disposed between the lower end extension part 2177 and the fastening surface part 2161, and the up-to-down length of the fastening surface part 2161. That is, with respect to the up-down direction, the first fitting part 2162a may have a length that is a total of the lengths of the bottom surface 110 and the fastening surface part 2161.

In this case, the fastening surface part 2161 may interfere with the lower end of the bottom surface 110 of the housing 100, under the lower end extension part 2177, and prevent an upward movement of the fastening bracket 2060. Additionally, the second fitting part 2162b, which protrudes obliquely in a direction between the upward direction and the rearward direction from the upper portion of the lower end extension part 2177, may interfere with the lower end extension part 2177 or the upper end of the bottom surface 110 of the housing 100, and prevent a downward movement of the fastening bracket 2060.

Thus, the up-to-down position of the fastening bracket 2060 may be regulated in a way that the lower end extension part 2177 is fitted between the fastening surface part 2161 and the second fitting part 2162b. While the up-to-down position of the fastening bracket 2060 is regulated in this way, the fastening bracket 2060 may be fixed to the cabinet 2170.

That is, the fitting part 2162 is simply fitted into the lower end extension part 2177 through the first bracket fitting hole 2178, and then the lower end extension part 2177 is simply fitted between the second fitting part 2162b and the fastening surface part 2161, to fix the fastening bracket 2060 to the cabinet 2170 easily and quickly.

In this case, the second fitting part 2162b may bend in the direction in which the upper end of the second fitting part 2162b becomes closer to the lower end extension part 2177, to fix the fastening bracket 2060 to the cabinet 2170 more firmly.

Further, the lower end extension part 2177 may be disposed under the bottom surface 110, and a second bracket fitting hole 112 may be disposed on the bottom surface 110. The second bracket fitting hole 112 may be formed in a way that penetrates in the up-down direction on the bottom surface 110, and disposed in a way that communicates with the first bracket fitting hole 2178 in the up-down direction. The second fitting part 2162b may protrude from the upper portion of the bottom surface 110 through the second bracket fitting hole 112.

That is, the second fitting part 2162b may pass through the lower end extension part 2177 and the bottom surface 110 of through the first bracket fitting hole 2178 and the second bracket fitting hole 112 and protrude from the upper portions of the lower end extension part 2177 and the bottom surface 110. Furthermore, the cabinet 2170 and the housing 100 may be coupled temporarily by the fitting part 2162 that passes through the first bracket fitting hole 2178 and the second bracket fitting hole 112 as described above.

Because of the temporary coupling between the cabinet 2170 and the housing 100 by the fitting part 2162, a coupling position between the cabinet 2170 and the housing 100 may be guided, and the fastening may be performed easily and efficiently using a fastening member 2070.

The fastening member 2070 may couple the fastening surface part 2161 to the bottom surface 110 while passing through the fastening surface part 2161 and the bottom surface 110 in the up-down direction, which contact each other in the up-down direction. In the embodiment, the fastening member 2070 includes a bolt member, for example. Accordingly, the bolt member may be coupled to the fastening surface part 2161 and the bottom surface 110 while passing through the fastening surface part 2161 and the bottom surface 110 in the up-down direction.

In another example, the fastening member 2070 may further include a nut member. The nut member may be coupled to the bolt member on the bottom surface 110 and fix the bolt member onto the bottom surface 110. The bolt member and the nut member may be screw-coupled.

In this case, the bolt member may protrude from the upper portion of the bottom surface 110 while passing through the fastening surface part 2161 and the bottom surface 110 in the state in which the head of the bolt member is disposed under the fastening surface part 2161. The nut member may be coupled to the bolt member on the bottom surface 110. That is, the nut member may be coupled to a portion of the bolt member, protruding from the upper portion of the bottom surface 110, and based on the coupling between the bolt member and the nut member, the fastening bracket 2060 may be coupled to the bottom surface 110 of the housing 100.

The fastening surface part 2161 may be coupled to the bottom surface 110 by the fastening member 2070 that passes in the up-down direction through the fastening surface part 2161 and the bottom surface 110 which contact each other in the up-down direction. Based on the above-described coupling between the fastening surface part 2161 and the bottom surface 110, the up-to-down position of the lower end extension part 2177 may be regulated relative to the bottom surface 110.

Additionally, based on the coupling between the fitting part 2162 and the lower end extension part 2177, the front-to-rear position of the front surface covering part 2175 may be regulated relative to the front surface of the housing 100.

That is, based on the coupling between the fastening surface part 2161 and the bottom surface 110 by the fastening member 2070, the up-to-down position of the cabinet 2170 installed in the housing 100 may be regulated. Additionally, based on the coupling between the fastening bracket 2060 and the cabinet 2170 by the fitting part 2162 of the fastening bracket 2060, the front-to-rear position of the cabinet 2170 installed in the housing 100 may be regulated.

In this case, the front surface covering part 2175 of the cabinet 2170 may be coupled to the housing 100 in the state in which the front surface covering part 2175 is pulled rearward by the fastening bracket 2060. Accordingly, the cabinet 2170 may be coupled to the housing 100 in the state of closely contacting a front extension surface part 135 in front of the front extension surface part 135 of the housing 100.

As a result, as the coupling between the housing 100 and the cabinet 2170 is completed, a gap between the housing 100 and the cabinet 2170 may be narrowed, and tolerance in relation to the gap between the housing 100 and the cabinet 2170 may be easily managed.

That is, since the front surface covering part 2175 of the cabinet 2170 is coupled by the fastening bracket 2060 to the housing 100 in the state of closely contacting the front extension surface part 135, in front of the front extension surface part 135 of the housing 100, the gap between the housing 100 and the cabinet 2170 may be narrowed, and tolerance in relation to the gap between the housing 100 and the cabinet 2170 may be easily managed.

Accordingly, even when the lateral surface covering part 2173 or the front surface covering part 2175 of the cabinet 2170 may be open to the outside or the front side of the cabinet 2170 in the lateral direction thereof and then the cabinet 2170 is installed in the housing 100, the cabinet 2170 may closely contact the housing 100 effectively.

Thus, problems such as a scratch on the housing 100 due to the lower end extension part 2177, difficulty in installing the cabinet 2170, difficulty in managing tolerance in relation to the gap between the housing 100 and the cabinet 2170, and a defect in the aesthetic quality of the exterior of the cooking appliance may be prevented effectively.

That is, in the above-described structure for installing the cabinet 2170, difficulty in installing the cabinet 2170 may be eased, and the aesthetic quality of the exterior of the cooking appliance may improve.

Since the front surface of the cabinet 2170 and the front surface of the housing 100 contact each other closely as described above, air may be effectively prevented from leaking through a gap between the front surface of the cabinet 2170 and the front surface of the housing 100.

In the embodiment, a third cooling fan 860 (see FIG. 56), a cooling channel 850 (see FIG. 56), a cool air discharge part 125 (see FIG. 56) and the like are disposed around the front extension surface part 135 of the housing 100 and the front surface covering part 2175 of the cabinet 2170.

If the housing 100 and the cabinet 2170 are coupled in the state in which the front extension surface part 135 of the housing 100 and the front surface covering part 2175 of the cabinet 2170 are spaced from each other, air is highly likely to leak through the gap between the front surface of the cabinet 2170 and the front surface of the housing 100.

When air leaks through the gap between the front surface of the cabinet 2170 and the front surface of the housing 100, cool air may not be properly discharged through the cool air discharge part 125. As a result, heat and steam in the cooking space may not be discharged properly through the rear of the cooking appliance, or severely, heat and steam in the cooking space may leak through the gap between the front surface of the cabinet 2170 and the front surface of the housing 100.

Considering the fact, in the embodiment, the front surface covering part 2175 of the cabinet 2170 may be coupled to the housing 100 by the fastening bracket 2060, in the state in which the front surface covering part 2175 of the cabinet 2170 closely contacts the front extension surface part 135 in front of the front extension surface part 135 of the hosing 100.

Thus, air may be blocked from leaking through the gap between the front surface of the cabinet 2170 and the front surface of the housing 100, and cool air may be effectively discharged through the cool air discharge part 125.

The embodiments are described above with reference to a number of illustrative embodiments thereof. However, the embodiments are provided only as examples, and numerous other modifications and embodiments can be devised by one skilled in the art, based on the above embodiments. Thus, the protection scope of the subject matter should be defined by the appended claims.

DESCRIPTION OF REFERENCE NUMERALS

100: Housing
105: Cooking space
110: Bottom surface
120,130: Lateral surface
125: Second slot
135: Front extension surface part
140: Rear surface
150: Rear surface case
160: Insulating plate
170: Cabinet
171: Through hole
175: Intake and exhaust grill
180: Base
200: Tray
205: Tray main body
210: Mounting part
211: First protrusion
213: Second protrusion
214: Sliding surface
215: Mounting groove
220: Water receiving groove
230: Steam cover
300: Door
301: Air intake port
303: Air exhaust opening
305: Handle
305a: Fitting projection
310: Door upper surface part
315: Space part
320: Door frame
320a: Fastening hole
320b: Hinge passing hole
320c: First hinge coupling part
320d: Second hinge coupling part
321: Coupling part
321a: Connection hole
321b: Third gasket fitting hole
322: Seating surface
323: First transverse supporter
324: Second transverse supporter
325: Heater mounting part
326: First connection end fixing part
327: Second connection end fixing part

328: Grill supporting part
328a: Cover
328b: Fixing rib
328c: Passage hole
329: Connection end supporting member
329a: Coil spring
329b: First coupling part
329c: Second coupling part
330, 335: Glass
340, 345: Cable mounting part
341, 346: Fastening boss
343: Connecting member
350: Door front surface part
360: First cooling fan
370: First cooling fan
371: First sealing body
372: First gasket hollow hole part
373: First sealing cover
374: First sealing projection
375: First support body
380: Second gasket
381: Second sealing body
382: Second gasket hollow hole part
383: Second sealing projection
385: Second support body
386: First protrusion support part
387: Second protrusion support part
390: Third gasket
391: Third sealing body
392: Third gasket hollow hole part
393: Third sealing projection
395: Third support body
396: First protrusion support part
397: Second protrusion support part
300a: Door main body part
310a: First door main body part
310a: First door main body part
312b: Third gasket fitting hole
350a: Second door main body part
351a: Through hole
353a: Fastening hole 2
350b: Door rear surface cover
352b: First gasket fitting hole
354b: Second gasket fitting hole
400: First heating part
410: Heating element
420: First connection end
421: Cylinder-shaped part
422: Extension part
423: Step
425: Key-shaped part
430: Second connection end
440: Reflector
441: First reflector
445: Second reflector
450: Protective grill
500: First control board
501: Terminal
550: Supporting panel
550a: First area
550b: Second area
550c: Coupling area
551: Main panel part
552: Rib
553: Lower portion supporting part
553a: Body part
553b: Protruding part
555: Lateral portion supporting part
557: Temperature sensor supporting part
557a: Second lateral wall part
557b: Second supporting surface part
557c: Boss part
557d: Hook
558: Cable fixing part
558a: Body part
558b: Protruding part
559: Cable supporting part
559a: First projection
559b: Second projection
560: Supporting projection
561: Guiding projection
561a: Body part
561b: Protruding part
562: Fastening hole
563: Fastening member
563a: Body part
563b: Head part
565: Touch panel supporting part
565a: Protruding surface part
565b: Protruding and supporting surface part
565c: Protruding rib part
566: Packing member
567: Outer support projection
570: Communication module
580: Temperature sensor
581: Sensor main body
583: Flange
590: Bracket
591: First coupling part
591a: Guiding hole
591b: Fastening hole
593: Second coupling part
593a: Fastening hole
593b: Fitting hole
595: Connection part
600: Second heating part
610: Working coil
611: Coil installation base
613: Coil
615: Coil connection wiring
620: Receiver coil
621: Coil installation base
623: Coil
630: Electromagnetic shielding plate
640: Temperature measuring module
700: Second control board
730: Second cooling fan
735: Power source connecting part
740: Communication module
750: Rear surface supporting panel
750a: First area
750b: Second area
751: Main panel part
755: First protruding edge part
756: Hook
760: Rear surface cover
761: Main cover part
762: Vent hole
763: Fan installing hole
764: Cut part
765: Second protruding edge part
800: Hinge assembly
810: Hinge part
811: First hinge link 811a: Second fastening hole
812: Second hinge link
813: Third hinge link
814: Fourth hinge link
820: Mounting projection
830: Hinge case
831: Channel inlet
833: Channel outlet
835: Discharge projection
840: Fan mounting part
850: Cooling channel
851: First section
853: Second section
860: Third cooling fan
1000: Manipulation device
1100: Shaft
1200: Encoder
1300: Knob
1310: Shaft coupling part
1311: Shaft coupling hole
1320: Skirt part
1321: Coupling groove
1330: Second connecting and supporting part
1340: Projection
1350: Knob cover
1360: Front surface part
1361: Penetrating part
1370: Lateral surface part
1600: Socket member
1610: Outer supporter
1611: Inserting groove
1620: Inner supporter
1630: First connecting and supporting part
1631: Flange-shaped part
1633: Rib-shaped part
1635: Skirt-shaped part
1640: Light passing hole
1650: First coupling part
1651: First protruding projection
1653: First coupling projection
1660: Second coupling part
1661: Second protruding projection
1663: Second coupling projection
1670: Third coupling part
1680: Magnetic member
1700: Light emitting member
1800: Front surface cover member
1810: Coupling boss
1900: Touch manipulation part
1910: Board
1920: Booster
2010: Bolt member
2015: Nut member
2060: Fastening bracket
2161: Fastening surface part
2062: Fitting part
2162a: First fitting part
2162b: Second fitting part
2070: Fastening member
2170: Cabinet
2171: Rear surface covering part
2172: First upper surface covering part
2173 Lateral surface covering part
2174: Second upper surface covering part
2175: Front surface covering part
2176: Second hinge passage hole
2177: Lower end extension part
2178: First bracket fitting part
2015: Nut member
2320: Door frame
2321: Hinge coupling part
2322: Coupling surface
2323: First fastening hole
2324: Fastening and guiding groove
W: See-through window
s: Sealing member What claimed is:

1. A cooking appliance, comprising:
a housing having a cooking space defined by a bottom surface, two lateral surfaces and a rear surface of the housing, and having an open upper surface and an open front surface;
a door comprising a door upper surface part to cover the open upper surface of the housing and a door front surface part connected to a front side of the door upper surface part to cover the open front surface of the housing, and the door capable of swiveling about a rear side of the door upper surface part to open and close the open upper surface and the open front surface of the housing; and
an exhaust inducing part disposed adjacent at at least one of the two lateral surfaces of the housing to create a flow of air at a front of the cooking space,
wherein the cooking appliance comprises a hinge case disposed outside at at least one of the two lateral surfaces of the housing,
the hinge case having a cooling channel to guide a flow of the air flowing into the hinge case from an outside of the hinge case, and
the exhaust inducing part comprises the cooling channel, a channel inlet being open from the cooling channel to the outside of the hinge case, and a channel outlet being open from the cooling channel to an inside of the cooking space,
wherein the channel outlet penetrates in a lateral direction on a lateral surface of the hinge case facing the lateral surface of the housing.

2. The cooking appliance of claim 1, wherein the door includes an air exhaust opening that forms a passage for discharging the air in the door to an outside of the door.

3. The cooking appliance of claim 1, comprising a cool air discharge part communicating with the channel outlet disposed at the lateral surface of the housing, and
at least a portion of the air flowing into the cooling channel is discharged into the cooking space through the channel outlet and the cool air discharge part.

4. The cooking appliance of claim 3, wherein the channel outlet and the cool air discharge part are disposed in the lateral direction, and at least a portion of the air flowing into the cooling channel is discharged in the lateral direction through the cool air discharge part.

5. The cooking appliance of claim 4, wherein the exhaust inducing part comprises a discharge projection surrounding the channel outlet and protruding toward the lateral surface of the housing from the hinge case, and
the discharge projection connects between the channel outlet and the cool air discharge part.

6. The cooking appliance of claim 5, wherein the cooling channel comprises a first section extending upward from the channel inlet disposed at a lower portion the hinge case, and a second section extending from an upper side of the first section rearward,
the first section is disposed adjacent to the open front surface of the housing, and the second section is disposed adjacent to the open upper surface of the housing.

7. The cooking appliance of claim 1, wherein the door upper surface part has a space therein,
the door upper surface part has an air exhaust opening at a rear end of the door upper surface part, and
the air exhaust opening penetrates the rear end of the door upper surface part and opens the space of the door upper surface part to the outside of the door.

8. A cooking appliance, comprising:
a housing having a cooking space defined by a bottom surface, two lateral surfaces and a rear surface of the housing, and having an open upper surface and an open front surface;
a door comprising a door upper surface part to cover the open upper surface of the housing and a door front surface part connected to a front side of the door upper surface part to cover the open front surface of the housing, and the door capable of swiveling about a rear side of the door upper surface part to open and close the open upper surface and the open front surface of the housing; and
the door includes an air exhaust opening that forms a passage for discharging the air in the door to an outside of the door,
wherein the door upper surface part has a space therein,
the door upper surface part has an air exhaust opening at a rear end of the door upper surface part, and
the air exhaust opening penetrates the rear end of the door upper surface part and opens the space of the door upper surface part to the outside of the door,
wherein a connection hole forming a passage connecting between the space of the door upper surface part and the cooking space of the housing is disposed at the door.

9. The cooking appliance of claim 8, comprising a heating part disposed at the door.

10. The cooking appliance of claim 9, comprising a door frame supporting the heating part and coupled to the door upper surface part,
wherein the connection hole is formed at the door frame.

11. The cooking appliance of claim 10, wherein the door frame covers the space of the door upper surface part, and
the heating part is disposed at the door frame and under the door upper surface part.

12. The cooking appliance of claim 11, wherein the door frame comprises:
a heater mounting part to which the heating part is coupled; and
a coupling part coupled to the door upper surface part to support the heater mounting part,
wherein at least a portion of the coupling part is disposed under the door upper surface part, and
the coupling part comprises a connection hole that penetrates in an up-down direction and forms a passage connecting between the space of the door upper surface part and the cooking space of the housing.

13. The cooking appliance of claim 12, wherein the connection hole is disposed at a rear of the heating part, and
the heater mounting part is provided with a passage hole forming a passage connecting between a front and a rear of the heater mounting part.

14. The cooking appliance of claim 13, wherein the passage hole penetrates the heater mounting part in a front-rear direction.

15. The cooking appliance of claim 13, wherein the passage hole is disposed at a position where at least a portion of the connection hole overlaps with at least a portion of the passage hole in the front-rear direction.

16. The cooking appliance of claim 8, wherein the cooking appliance comprises an exhaust inducing part disposed adjacent at at least one of the two lateral surfaces of the housing to create a flow of air at a front of the cooking space.

* * * * *